United States Patent [19]
Crain

[11] Patent Number: 5,220,614
[45] Date of Patent: Jun. 15, 1993

[54] AUTOMATED COIN GRADING SYSTEM

[75] Inventor: Louis M. Crain, Lake Arrowhead, Calif.

[73] Assignee: Professional Coin Grading Service, Inc., Newport Beach, Calif.

[21] Appl. No.: 659,510

[22] Filed: Feb. 22, 1991

[51] Int. Cl.⁵ .............................................. G06K 9/00
[52] U.S. Cl. ........................................ 382/1; 382/8; 382/48; 358/101; 358/106; 358/107
[58] Field of Search ................... 358/101, 106, 107; 382/1, 8, 48; 356/71

[56] References Cited

U.S. PATENT DOCUMENTS

| | | | |
|---|---|---|---|
| 3,349,612 | 10/1967 | Sherman | 73/163 |
| 4,148,388 | 4/1979 | Reyner et al. | 194/102 |
| 4,191,472 | 3/1980 | Mason | 356/243 |
| 4,309,111 | 1/1982 | Sobresky, Sr. | 356/394 |
| 4,555,798 | 11/1985 | Broadbent, Jr. et al. | 358/101 |
| 4,668,982 | 5/1987 | Tinnerino | 358/101 |
| 4,679,075 | 7/1987 | Williams et al. | 358/101 |
| 4,726,458 | 2/1988 | Gati | 194/330 |
| 4,757,550 | 7/1988 | Uga | 382/8 |
| 4,811,040 | 3/1989 | Madsen | 354/75 |
| 4,819,780 | 4/1989 | Trummer et al. | 194/317 |
| 4,899,392 | 2/1990 | Merton | 382/1 |
| 4,929,893 | 5/1990 | Sato et al. | 382/8 |
| 4,943,767 | 7/1990 | Yokota | 358/101 |
| 5,050,111 | 9/1991 | Ayata et al. | 358/101 |

Primary Examiner—Jose Couso
Attorney, Agent, or Firm—Bacon & Thomas

[57] ABSTRACT

A method and system for automated grading of coins involves alignment of a target image of the coin with a reference image by mechanically moving the coin until the target and reference images are aligned, capture of multiple images of the coin under a variety of lighting conditions, and subsequent grading using an expert script made up of individual directives which can be arranged to form different scripts for different grading standards and types of coins to be graded. The system and method provide for identification of the criteria used by an expert in grading an object such as a coin, capture of those criteria, and applying the criteria to the grading of the coin in a manner which is implementable on low-cost and widely available microcomputer hardware. The process by which the system is used to identify and test the criteria for evaluating the coin is interactive, and thus, structural changes need not be made in the system in order to grade the different types of coins or apply different coin grading standards.

47 Claims, 12 Drawing Sheets

AUTOMATED COIN GRADING SYSTEM

BACKGROUND OF THE INVENTION

1. Field of the Invention

This invention relates to the field of automated grading or analysis of an object, and to the fields of robotics and image processing applied to the grading of an object. More particularly, the invention relates to an automated object grading system in which the objects are coins.

2. Description of Related Art

The value of a collectible coin depends upon its grade, which is an indication of the condition or state of wear of the coin. As with other "expert" appraisal process, coin grading depends to a large extent on the appraiser's skill and experience, and is affected by such randomly variable environmental factors as the type and amount of lighting applied to the surface of the coin being graded. Therefore, conventional manual coin grading techniques are inherently time consuming and suffer from a lack of consistency inherent in all complex manual processes.

Attempts have previously been made to increase both efficiency and consistency in the field of coin grading through the use of automation. In many other fields, it has been possible to completely automate formerly manual processes, resulting in substantial increases in efficiency. Nevertheless, because of the complexity of the coin process, previous attempts to automatically grade coins have not been successful. In general, such systems have achieved only crude approximations of present coin grading standards, for example, by basing a grade on the sum of detracting mark surface areas on a coin. No system has so far been proposed which would fully but consistently duplicate the extremely complex analysis process of the human expert coin grader in such a manner that present coin grading standards, and coins previously graded under the present standards, would be unaffected by changes in the manner in which the coins are graded.

Because the market value of a rare or antique coin may be sharply effected by even very small or subtle differences in grade, it is essential that the grades given a particular coin be both accurate and repeatable. Any new automated method of coin grading must be able to duplicate the results obtained by human coin graders if present standards are to be maintained. However, in view of the present difficulty in achieving consistent manual grading even under the most carefully controlled circumstances, exactly duplicating the results of a human grader one hundred percent of the time would be impossible. Therefore, automation also involves the problem of defining an acceptable degree of correlation between automated and manual grading results by which a new coin grading system could be judged.

A useful measure of the correlation needed to maintain present standards is that the correlation between grades given by an automated system and by a human expert should be the same as the correlation between two different human expert graders. An automated coin grading system would be considered to be acceptable if, for example, two different experts agreed upon a grade 93% of the time and the automated system agreed with each expert at least 93% of the time.

Coin grading involves a very large number of factors, not all of which are easily quantifiable. The grade of the coin depends upon such different factors as strike, luster, mirror, and cameo, as well as the number and nature of flaws on the surface of the coin. In general, no two different types of coins will be graded in exactly the same manner. A particular flaw on one coin, for example, might not be perceived in the same way on another coin depending on the other coin's luster, mirror, and so forth. Analysis of the manner in which the above factors are determined by human graders reveals that coin grading involves literally hundreds or thousands of different considerations, many of which the grader is not even consciously aware of.

An example of an existing automated coin grading system is described in U.S. Pat. No. 4,899,392 to Merton. However, the system of Merton does not attempt to duplicate the actual mental processes of a human expert numismatist, but rather attempts simply to provide a consistent coin grading system intended to replace the present coin grading system without attempting to take into account lighting, luster bands, and other factors which affect the expert grader's reaction to the qualities of a coin and its detracting marks.

In the system of Merton, each detracting mark is assigned a quantity proportional tot he detracting significance of the mark based upon its location and measured surface area, and those quantities are summed to arrive at an amount representative of all of the detracting marks on the selected coin side, after which the sum is correlated with a grde. The system does not account for the different visibility of marks on lighting conditions, the luster of the coins, or the nature of the flaws, but rather simply uses a gross measure of total surface area weighted according to location on the coin.

An expert grader, on the other hand, would tend to grade marks having identical locations and surface areas differently depending on whether the mark was, for example, a scratch, or a lighter, more evenly shaped mark. In addition, the expert would physically manipulate the coin to clearly identify all marks by varying the lighting angle, and the significance of the marks would be judged based on the quality of the background as well as the type, visibility, and location of the marks.

As noted earlier, in order to achieve a truly useful automated coin grading system, and hundreds and possibly thousands of considerations and throughout process which go into determining a final coin grade must therefore be identified. Furthermore, the numerous considerations which go into grading a coin need to be varied for each different type of coin. In order to provide a practical system, a method must be developed for providing a unique set of coin grading criteria for each different type of coin, preferably without starting at "square one" each time.

Provision of an automated coin grading system which overcomes these obstacles, i.e., which takes into accound the numerous considerations and thought processes employed by a human grader in grading a coin, and yet which provides a practical way of varying the resulting grading scripts to accommodate different coin types, has heretofore not been developed.

SUMMARY OF THE INVENTION

It is objective of the invention to provide an automated grading system for the purpose of efficiently and consistently grading objects, and in particular coins, while nevertheless maintaining present grading standards and duplicating the results of expert human graders.

It is a further objective of the invention to provide a system for identifying the criteria used by an expert in grading an object such as a coin, capturing those criteria and applying the criteria to the grading of the object in a manner which requires a minimum of skilled supervision, and is implementable on low cost and widely available microcomputer hardware.

It is still further objective of the invention to provide a computerized grading system in which the criteria used in grading may be varied utilizing an interactive process by which the expert and the system together identify and test the criteria for evaluating a new object, without the need for making structural changes in the system.

It is yet another objective of the invention to provide an automated grading system which provides multiple lighting angles in order to simulate the physical manipulation of an object such as a coin necessary to identify detracting marks and other qualities visible only under certain lighting conditions.

It is still further objective of the invention to provide an automated grading system which is able to process all the images, masks, and convolutions necessary to analyze an object such as a coin while at the same time minimizing noise and quantization errors, particularly those which arise during image capture.

These objectives are achieved by providing a system designed to utilize the expert experience of professional human graders to define for each type of object rules and procedures assembled from a larger set of basic algorithms to define a repeatable expert experiences capture methodology. Each of the individual algorithms in the set from which the final rules are assembled is defined in terms of a "directive." The directives effect image transformations by applying particular filters, convolutions, or other two dimensional matrix operations to a digital image of the coin, after which the images resulting from the transformations are scored using different combinations of the basic set of directives.

Directives are included for operating on an image to identify and define the various features effecting the determination of grade, and upon defining the features, different directives are used to assign point scores based on such parameters as image intensity at various locations, and the size and shape of features identified thereby. The point scores aRe used to determine sub-grades for the parameters in question, and the sub-grades are used to determine a final grade.

The later operations, which result in the assignation of point scores, are called metrics and are also formed by combining directives. Additional directives control the capture of the image, including the combination of multiple images of the target object taken under different lights.

Script creation from the set of basic directives is aided by the use of a menu driven interactive display interface which permits directives to be tested and assembled into scripts by operators without extensive computer programming experience.

In order to be truly functional, the program is able to select different metrics on the fly, i.e., while the grading is being performed, depending upon the results of partial analyses of the captured images. In a preferred embodiment of the invention, the target image is captured using a mechanical alignment arrangement rather than a purely electronic alignment arrangement. This results in significant improvements in both accuracy and speed in capturing the image in a form which is useable for subsequent analysis. Because the system depends upon comparison of objects being graded with models in the form of reference images or masks, it is essential that the reference or mask image and the image of the object being graded be aligned to a maximum possible precision.

In the case of coin grading, the system operates essentially as follows:

A coin to be graded is placed in a padded tray and an alignment reference image including defining landmarks on the coin such as the date or a mint mark is fetched. The coin is then moved under the camera, mechanically aligned to match the reference image, and an expert script is run. The expert script comprises directives for identifying features on the coin, and subsequently analyzing those features to develop scores, sub-grades, and the final grade for the coin. After the script has been run, a report of the sub-grades and the final grade may be generated for both the obverse and reverse sides of the coin.

DETAILED DESCRIPTION OF THE PREFERRED EMBODIMENTS

I. Image Capture

Figure 5:
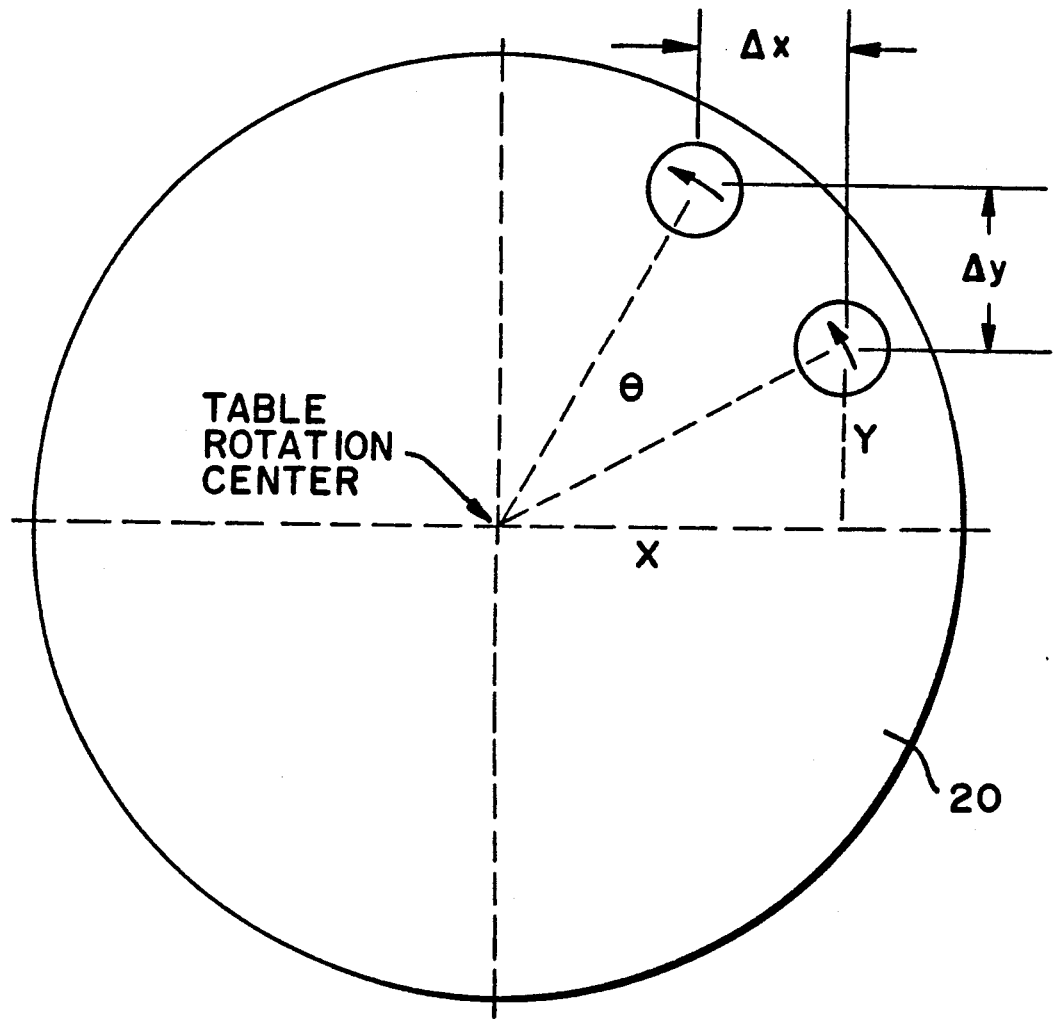
FIG. 5 illustrates the coin table to coin motion relationship for the apparatus of FIGS. 1–6.

FIGS. 1-4 illustrate portions of a preferred image capture apparatus for use in the automated coin grading system of the invention. The image capture portion of the grading process is implemented using the method shown in FIG. 6, described below. The geometry of the preferred coin table positioning method is illustrated in FIG. 5.

Because the image capture computers for operating the camera, lights, and coin positioning table need not be as fast as those used in image analysis for the purpose of grading, the image capture apparatus and image analysis hardware may be located at separate "stations". The grading stations can then be optimized for pure speed by avoiding the time consuming alignment, coin moving, and coin flipping process involved in image capture. Transfer of images from an image capture station to a grading station is preferably by means of a removable, erasable magnetooptical laser compact disk, also useful for archiving purposes. The computers used in the preferred embodiment are person computers, in particular the Apple McIntosh II ™ computer, although other computers may of course be substituted.

a. Camera

For the preferred embodiment, a Sony DXC-750 video camera 30 with RGB capability and a macro lens 31 was selected, although it will be appreciated by those skilled in the art that numerous other suitable camera systems may be substituted. This camera system has a high resolution of approximately 760 lines. Mid-range resolution cameras are also satisfactory if appropriate image enhancement and sharpening operations are added during image processing. An RGB camera was selected in order to implement color analysis techniques. With an RGB camera, each color component is a separate signal and can be analyzed and captured with available equipment.

The camers's zoom lens power, "fStop", camera angle, and focus are determined during set-up, and periodically tested or monitored to ensure that the settings have not changed over time.

In order to convert the standard NTSC signal from camera 30 into a digital form suitable for further processing by a computer, a frame grabber video imaging interface board is used. The preferred frame grabber interface board provides NTSC as well as other video standard compatible 8-bit black and white video image inputs, a real-time image processing section with eight 256×8 input look-up tables, and a 640×480×8 high speed memory mapped frame buffer memory, although numerous other video interface arrangements may also be used. The preferred interface board allows the system to digitize a video picture in "real time", 1/30 of a second, and may be driven using a conventional protocol to activate and control operation of the board.

b. Mechanical Coin Positioning

Although it is theoretically possible to align the target coin image soley by using electronic image processing techniques, a problem arises in that each region of interest will have a different optimum set of lighting conditions. For each region of interest, the reference coin must be illuminated using a certain light or set of lights. The target coin likewise must be illuminated by that same set of lights.

The problem is that the target coin will almost always be physically offset both in respect to its center and its rotational alignment as a result of an initially acceptable placement onto the coin positioning table. The coin images could be electronically adjusted to correct for placement error, but the image of the reflection of the lights would follow the adjustment in respect to the original placement of the coin since they are part of the same image. The net result would be that at the end of the electronic alignment process, the image of the coin would be properly aligned but the image of the reflection of the lights would have become misaligned by the amount of adjustment required during the coin alignment process.

Although a possible theoretical solution would be to make the lighting so flat as to eliminate the concept of an optimum lighting condiiton, which may be possible with ring lighting or strobe lighting and a full lighting tent, this would not be consistent with the way that human graders perform the process. The other solution, which is the preferred solution, is to physically align the coin before taking the analysis images.

(i) Coin Positioning Tables and Motors

Figure 1:
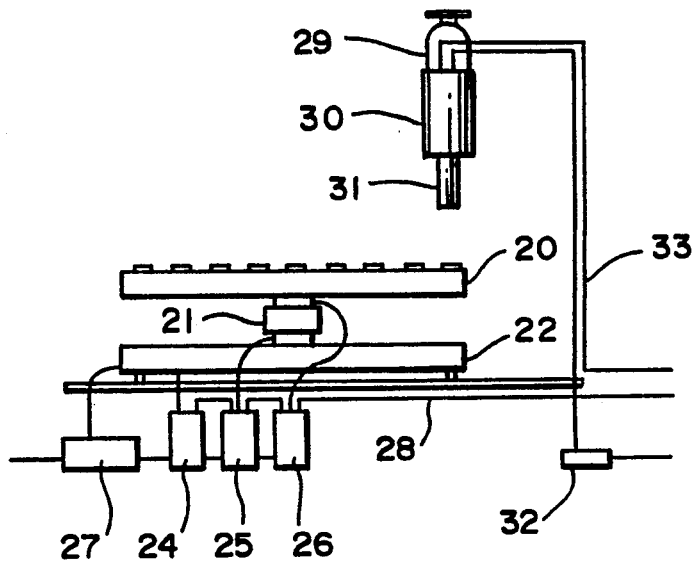
FIG. 1 is a side view of an image capture apparatus according to a preferred embodiment of the invention, including a camera and coin positioning tables.
Figure 2:
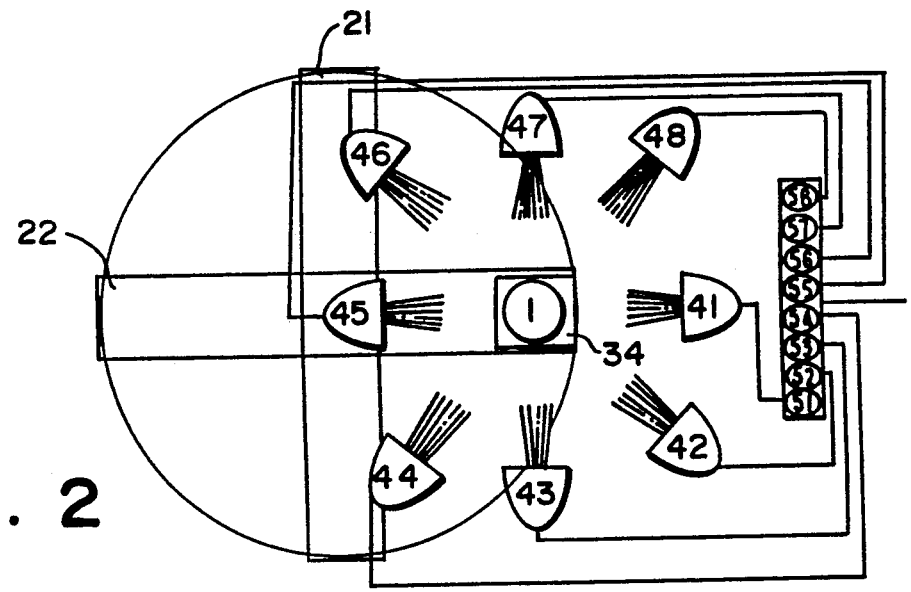
FIG. 2 is a top view showing the coin positioning tables of FIG. 1 and a multiple lighting arrangement.

FIGS. 1 and 2 show a computer controlled coin positioning apparatus. The system includes three motorized tables. A linear X table 22 and a liner Y table 21 are mounted one atop the other with a 12 inch translation and 16000 steps per inch of resolution. The motors are preferably ¼ step motors driven by a separate power supply 27. On top of both the X and Y table is a rotation table 20 with a 360° rotation capability and a resolution of 160 steps per degree. These motorized tables are controlled via motor controllers 24–26 and bus 28, which carries an RS-232 signal generated by the computer.

Alignment is an iterative process: a coin is examined, the tables are moved, the coin is reexamined, and so forth until precise alignment is obtained. The ¼ step motors are used to both increase the positioning accuracy as well as to reduce the amount of vibration which could potentially cause the coin to slide on the positioning tray. To further ensure smooth motor motions, it is also desirable that the motor controllers or computer control program include acceleration and deceleration functions to prevent sudden starts and stops.

The coin tray itself, located on the rotation table 20, is preferably made of a soft, high friction foam rubber or plastic material which prevents coin motion, does not mark the coin in any way, and is relatively invisible to the system. Although it is intended that the scope of the invention extend to coin tables which accommodate 16 coins or less, a larger number of coins per table is preferred for mass grading purposes. The table configuration shown in FIG. 4 holds 42 coins. The numbering of the coins on the tray in a serpentine sequence serves to minimize the total distance which the system must traverse and thereby increases the total throughput.

An exemplary preferred version of the coin positioning table 20 has at its base a 1.5 inch thick piece of black foam permanently mounted to an aluminium plate which is connected to the rotation table motor. The coins are placed on another 1.5 inch piece of foam in the pattern shown in FIG. 4 through the use of a coin positioning overlay, a round plastic sheet into which 42 holes have been drilled, each of which is slightly larger than the size of the coins to be analyzed. When the coins have been positioning using this plastic positioning overlay, the overlay is removed and the foam tray is placed under the camera by placing the second foam piece on top of the first. The rotational positions of the trays are matched by causing two marks, one on each of the trays, to align. The two pieces of foam have an extremely high coefficient of friction with respect to each other, and therefore the entire system is essentially a rigid system controllable by the three motors relative to the camera and lighting system.

In a variation of the above, another piece of foam may be provided to be placed on top of the second coin tray, locked in place, subsequently flipped over, and then unlocked, thus permitting all of the coins on the tray to be flipped at once for reverse analysis. As a result, the reverse image capture process for this variation must be modified to account for changes in placement of the coins. The new positions of the coins after flipping will be an X-axis mirror iamge of the original placement, with corresponding changes in the numbering pattern.

(ii) Coin Positioning Method

Movement of the coin positioning table is controlled by comparing the locations of landmarks on an image of the target coin with the locations of corresponding landmarks on a reference coin image, and moving the coin table accordingly to align the respective landmarks. In a preferred embodiment of the invention, the comparison is of two landmarks on the target coin against the same two landmarks on the reference coin, as will be described in greater detail below. It wil be appreciated, however, that numerous other alignment methods, including single landmark alignment methods, may occur to those skilled in the art and may, within the scope of the invention be substituted for the two landmark method described below.

FIG. 5A illustrates generally the coin table to coin motion relationship. A coin is located at position $X_0$, $Y_0$ relative to the center of positioning table 20. As a result of initial coin placement, it is determined that the coin must be rotated through an angle of $\theta°$ about its own center. However, the coin positioning tables can only rotate about the center of the table, which means that although a rotation about the center of the table through $\theta°$ will orient the coin properly, the coin will have become translated substantially and thus a translation of the coin is also required.

The rotation through $\theta$ results in a translation of the center of the coin of ($\Delta X$, $\Delta Y$) where $$\Delta X = X_0 \cos\theta - Y_0 \sin\theta - X_0$$

$$\Delta Y = X_0 \sin\theta + Y_0 \cos\theta - Y_0.$$

As a result of the relationship between $\theta$, X and Y, all three stepper motors may be given their instructions simultaneously and when their motion is completed according to the alignment algorithm described below, the coin will be properly angled and also centered.

The alignment algorithm uses an approach in which two basic degrees of freedom of motion, namely translational position and rotational orientation, are alternately adjusted. Initially, as shown in FIG. 5B, a first target coin landmark is identified and the coin positioning table is translarged so that the first landmark is positioned precisely over a corresponding reference coin landmark. The angular offset of a second target coin landmark from a second reference coin landmark is then computed and the coin rotated precisely about the center of the first target coin landmark through the computed angular offset so as to align the second target coin landmark with the reference second landmark.

Subsequently, the two landmark alignment routine is used for a second round of adjustments to correct for the quantization error resulting from the fact that the image is a pixel image and that locations are generally computed to a whole integer pixel locations, to correct for the face that the center of a landmark will change slightly as the angular orientation of the landmark changes, and to correct for the possibility that the physical center of the rotation table may be slightly offset with respect to the computer's previously established center location due to slight slippages in the stepper motors or slight initial alignment errors. The second round of motions causes all three of these classes of errors to be essentially eliminated. A final translational correction is performed which effects the final correction for the table centering offset if any.

When these physical operations are completed, the final location of the target coin's two reference landmarks are compared to the reference coin's two landmarks. If these landmarks are in proper location to within an appropriate tolerance, then the coin center is tested by testing the image of the coin under multiple vertical lights against a mask, so that if any part of the coin extends outside of the mask, the coin has not properly positioned. The mask is an annulus so that other nearby coins do not play a role in the test. If the number of bright pixels outside of the area designated for the coin exceeds a rather low number which accounts for the possibility of small flecks of light from the coin tray, then the alignment is considered invalid as the coin is not properly centered. In this case, a second algorithm similar to the first is performed which again attempts to align the target coin.

The alignment process is performed not on direct images of the target and reference coins but rather on the relief images of those coins. This is done so that only the geometry of the coin is involved in the alignment process because of the ability of the relief method to look "through" toning and other luster related aspects of the image. In the first algorithm, the landmarks are identified using an edge detection method in which the edges of the target and reference landmarks in their respective relief images are compared. In the second algorithm, the images of the landmarks are compared against each other.

If the second alignment attempt also fails, the system recognizes that operator assistance is required, in which case the operator is requrested to touch the two landmarks using a special cursor which shows the rectangular region centered on the cursor. The system then uses these two operator defined landmarks as the starting point for a more focused search which almost always succeeds. If however this method also fails, the system again asks for operator assistance, this time also requesting an angular offset for the initial position of the coin. This process is repeated until the coin is properly aligned or the operator either accepts or rejects the alignment results.

Thus, the algorithm is intelligen enough to recognize erroneuous data caused by lighting, dust, flaws in the coin, improper placement, improper identification, and so forth, and utilizes a two pass approach automatically balanced between an initial camera scan for the general location of the landmarks followed by a detailed follow-up examination of the selected area.

Although landmark detection is accomplished by applying appropriate reference coin masks to the image, as described below in connection with image processing portions of the system (see parts II and III below), the image processing routines used to compare reference and target coin images for alignment purposes may be performed by a dedicated positioning and lighting control computer, separate from the coin grading computer system, that than by the main image processing computers.

In the preferred embodiment, two methods may be used as necessary to initially locate the center of a coin and to verify alignment. Both of these methods are known in the art of image processing and thus will be described only in general terms below. In general, the system attempts to use a faster "intersecting rays" method first and, in case of failure caused for example by toning on the coin, the system will automatically switch to a second method, referred to the "center of gravity" centering method.

The intersecting rays method works by finding the points in a series of horizontal and vertical rays in which the background of the coin stops and the coin becomes visible. The background of the coin is the black foam of the coin positioning table on which the coins are placed. The points at which these events occur for a series of 11 vertical and 11 horizontal rays are then averaged on the left and right sides for the horizontal rays, and the lower and upper sides for the vertical rays. The average of these locations defines the center of the coin. A minimum size parameters permits the system to pass over small random flecks or reflections from the coin tray. Intersections that are inconsistent with the median value determined for the center are ignored, as can occur when a ray happens to intersect a coin at the location of dark toning.

When the toning is such that centering by the intersecting rays method fails, the system switches to a method whereby each pixel with an intensity above an arbitrary threshold is assigned a "weight" and the center of the coin is computed as the location of a simulated center of gravity of an object composed of a large number of equally weighted elements. This method is slower than the first method, but has the advantage of always working even for heavily toned coins.

In order to provide alignment to within the minimum resolution of the motor system, which is less than 1 pixel, a known concept called "splitting the atom" may be used, in which the correlation value of the optimum alignment pixel point and the eight surrounding points are used to create a bi-quadratic error surface, which is then used to compute the location of the minimum value of a continuous version of the correlation function and thus the floating point angular offset. In the preferred system, a fractional pixel orientation calculation accurate to as little as 0.05°, the minimum resolution of the motor system, has been achieved using this method.

(iii) Initialization

There are three initial physical parameters that must be extremely accurately defined in order for the coin alignment process to function properly. First, the center of rotation of table 20 must be defined in respect to images captured by the camera; next, the X-axis of translation of the table must be aligned with the camera system; and finally, the motion of the table must be calibrated in inches with pixel motions on the screen based upon the zoom factor of the lens and other camera aspects.

The initialization processes utilize an iterative approach. For the center of rotation, the center is first roughly defined by touching a display screen showing the current coin positioning table position at a point which is somewhat near the center of rotation of the table. Then, a better center point can be defined by measuring the motion of a point on the screen near the center of the table as the table rotates through 180°. Finally, the precise center of rotation can be defined by measuring the motion of a point on the outside edge of the table as the table rotates through 180°. Each of these operations improves upon the initial starting point, finally resulting in a highly accurate center definition.

The X-axis alignment step is required to ensure that a motor translation in the X direction results in an X translation in the camera/screen system. For the X-axis calibration, a similar iterative approach is taken in which the alignment is first approximated by following the motion of a point moving from one side of the screen to the other. This provides alignment to within 0.12° of horizontal. The fact that the precise center of rotation is known is then utilized to follow the motion of the table through the full 14 inches of translation coupled with a 180° rotation which brings the target point back into view of the camera. This reduces the X-axis alignment error down to under 0.014°.

Finally, calibration of motor translation in inches is calibrated to the screen motion in pixels by a similar iterative process utilizing both the precise center of rotation and the now aligned X- axis, with appropriate modifications. This is accomplished by measuring the pixal motion corresponding to known translations using the X and Y motors for points at the center and the four corners of the image. Thus, this calculation returns the average calibration of the image.

When all of these steps have been performed, the results are stored on disc and automatically read at the start of execution so that this coin positioning table initialization need not be performed again until the table is moved or the camera is adjusted. The coin positioning table values computed from this initialization process are stored independently so that each system can have its own distinct characteristics which are automatically taken into account at execution time.

c. Lighting

Figure 3:
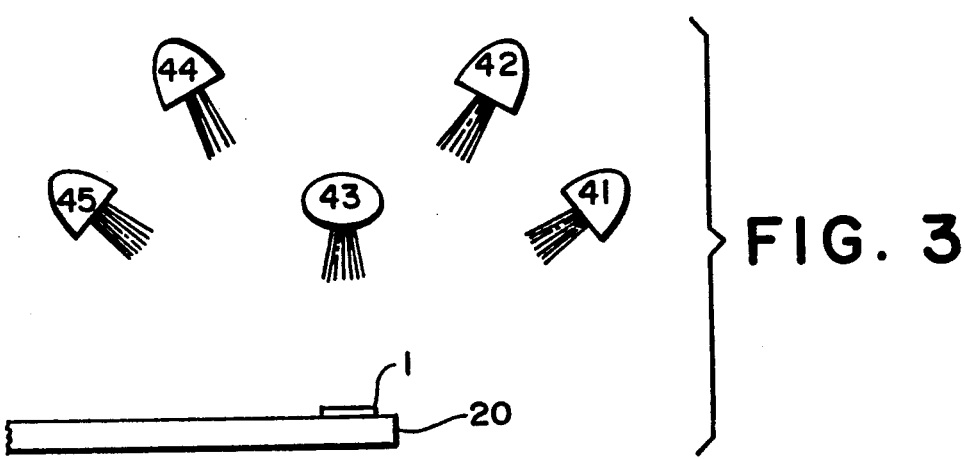
FIG. 3 is a side view showing the multiple lighting arrangement of FIG. 2.
Figure 4:
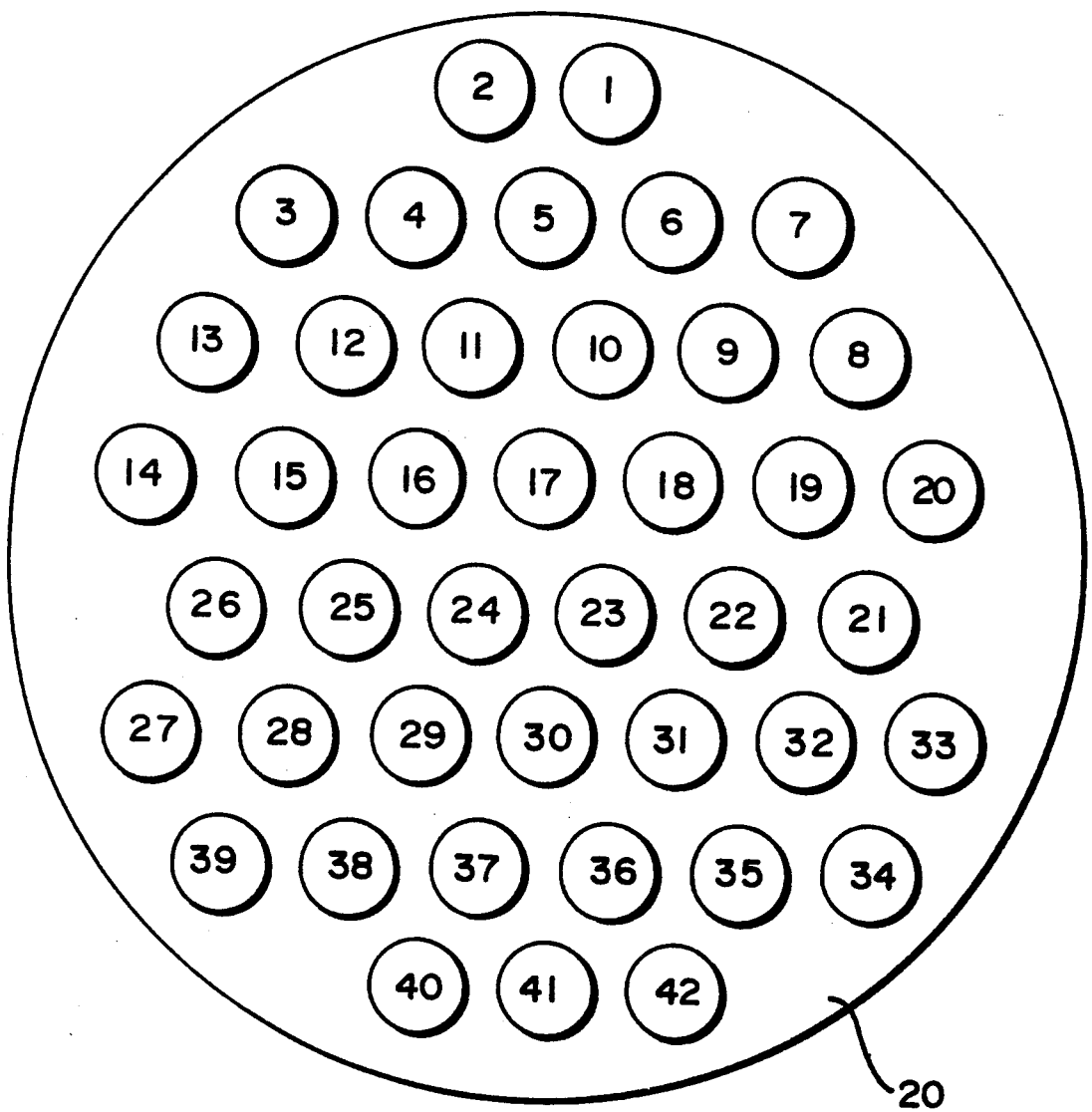
FIG. 4 is a top view showing a preferred arrangement of the coin table shown in FIGS. 1–3.

The lighting arrangement for the computerized coin grading system is shown schematically in FIGS. 2 and 3. In general, each region of interest on a coin will have an optimum set of lighting conditions. When a human expert grades a coin, he turns the coin to optimize the lighting so that all flaws will be apparent. In the preferred embodiment, optimum lighting conditions are achieved by providing multiple lights 41–48 which are individually controlled, and by physically aligning the coin before taking the analysis images. For this purpose, a set of nine lights under computer control is provided. These lights are individually switchable on and off as a function of what the computer is looking for on each coin. In the preferred embodiment, a light control box including individual switches 51–58 is provided which is driven by an RS 232 signal from the computer.

Lights 41–48 are preferably halogen lights or other lights which create a very precise temperature, good color balance, repeatability of illumination, relative brightness, and good position and multiple light intensity controlability. In order to allow the filaments to stabilize, it is desirable to effect a delay, between turning on the light and using the image, of between 0.2 and 0.42 seconds depending on the purpose for which the image is to be used. The number of lights may of course be varied according to the analysis requirements of the particular coin to be graded.

In order to optimize lighting conditions for a particular coin or other object to be graded, the positions and intensities of the lights are defined in concert with expert human coin graders to provide a high quality, well-illuminated image which highlights selected regions of the coin. The process by which lighting positions and combinations are determined for each type of coin will be discussed in part II below in connection with the overall process of developing a coin grading "script." Different coin types will have different lighting positions to reflect the different size of the coin and the different regions of specific interest. The resulting images should be of roughly consistent overall intensity and positioned so that between all of the images defined by each of these lights, all regions of the coin are fully illuminated.

In the preferred embodiment, four of the lights 41, 43, 45, and 47 are located 90 degrees apart and at a low angle with respect to the horizontal. These lights are used to generate the relief images which are used in the initial alignment, for the strike calculations and as a special indicator in the marks analysis. The other lights 42, 44, 46, and 48 are located in the "cone of illumination" which corresponds to the technique of rotating the coin under a single light at a high angle.

d. Captured Image Format

Upon capture, images are stored in a reference database, which is preferably a multiple cached system which utilizes a set of pointers located in the first 1024 data blocks to point to coin headers, which i n turn define the basic images related to a coin. Each coin can have up to 100 images associated with it. These images are not a part of the coin blocks but rather are pointed to by pointers located in the coin blocks. This means that multiple coins can share the same images through the use of multiple pointers to he same image. The blocks pointed to by these pointers are again not the actual images but rather consist of a set of values about the image along with a single pointer to the image array.

In general, an image consists of an n by m array of bytes. Generally, for coins, n and m are 480, but the size of the array can be easily modified by setting a single parameter. Each byte represents the intensity of the image at its corresponding pixel location where 1 indicates pure black and 254 represents pure white with a linear ramp of intensities in between. The values of 0 and 255 are reserved for use by the operating system. The operating system always requires a black and white value which should not be changed.

The header includes a pointer to the image, a block length of the image, a byte length of the image, a coin identification number, the image type, x and y dimensions of the image array that follows, the image depth (number of bits per pixel in the image), and the number of panes or distinct image components (e.g., a standard gray scale image will consist of 1 pane, a gradient or Fourier image may contain 2 panes, and color images are identified with panes set to 3; a color gradient image would consist of 6 panes). Finally, the header defines x and y offsets which represent translations of the origin of the image for use in combination with another image such as a region of interest, or a mask, and the lighting definition. The lighting definition is a packed bit value which consists of the set of lights that were "on" when the image was captured. The lighting definition is carried across to derived images when appropriate, such as an image copy or translation, and is otherwise set to zero when lighting is no longer a meaningful term, such as in the difference of two images.

e. Image Capture Flowchart

Figure 6:
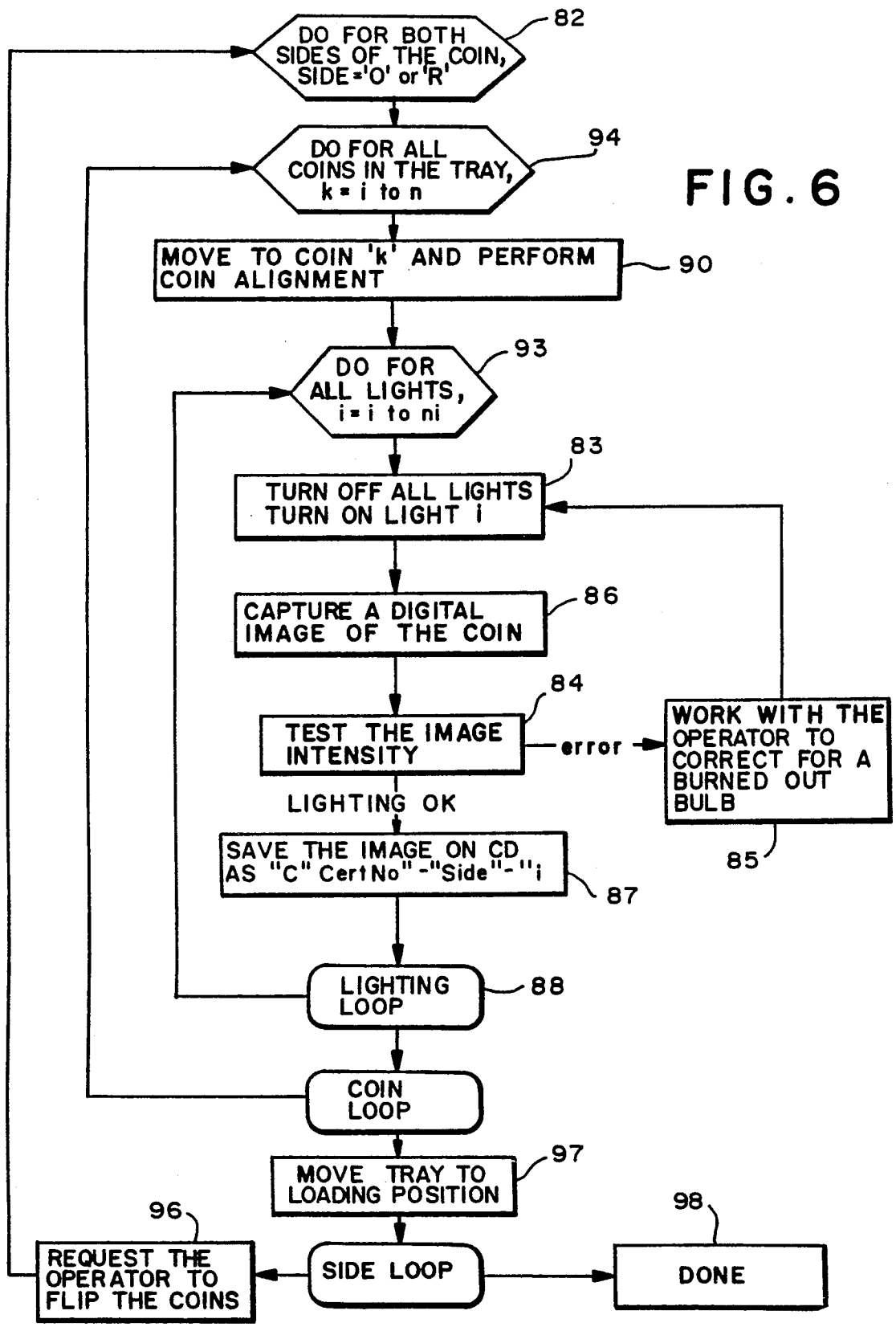
FIG. 6 is a flowchart of the image capture process.

The image capture flow is generally illustrated in FIG. 6. After activating the camera equipment, one flag is set for the side of the coin, initially observe ('O'), one flag ('k') is set for the coin number and the tray and a flag ('i') is et for different lighting conditions (step 82). An image is then taken under a lighting condition optimized for alignment (steps 83 and 86), the lighting flag is incremented, a new image is captured and saved under the current value of the "side" and lighting flags (step 87), and a new image is captured under a different lighting condition (step 88). If there is a problem with any of the lights, the program branches to an error sequence (steps 84 and/or 85).

When all lighting conditions have been completed as determined in step 93, the coin number is checked to determine whether there is another coin on the table (step 94), the table is moved to the next coin (step 90) or the operator is instructed to flit all coins (step 96) and the image capture process is repeated for the opposite side of the coin (steps 97 and 83–94) until both sides of all coins on the table have been graded and capture is complete (step 98).

f. Random Noise Compensation During Image Capture

In any electronic system, careful attention to the signal-to-noise ratio must be maintained. Because the camera and lights are based upon physical elements, any two images taken just moments apart will have slight differences in intensities due to random noise which can have a negative effect on the information contained in the image. In order to reduce this noise, and thus permit more qualitative analysis of the images, each image is captured three times in succession and the results averaged to define the actual image which will be processed. In addition, the power to the camera and lighting systems is passed through a power conditioner. The conditioner greatly reduces the voltage variations applied to the lights resulting in superior image illumination consistency. As a practical result, the variation in final grade due to variations in the image capture process are reduced to a negligible level.

II. Grading

A. Organization

Grading of the captured "target" coin images preferably takes place at a separate dedicated coin grading station using both reference and target images captured by the above-described image capture apparatus, and subsequently stored on compact discs or a similar portable mass information storage media.

A set of stored images, including at least one image for each relevant lighting condition, is provided for each side of each target coin. Also provided is a set of corresponding reference coin images for each side of the type of coin in question. Each different type of coin requires a separate set of reference images, although it is possible to use a single set of reference images with special data masks in cases where the only difference between types of coins lies in the year of the coin.

The image capture method captures the images of approximately 90 coins on each CD before the CD is transferred to the grading station. The images are assigned a name which is composed of the coin's certification number, its side identifier, and its light identifier. For example, if a coin has a certification number 987654321, then the image of the reverse side of the coin under light 7 would be stored on the CD as C987654321-R-7. This unique identification system prevents accidental grading of incorrect images.

The preferred grading system uses an optical disk drive to retrieve images by number as required during the grading process. Retrieval is controlled by "directives", discussed in greater detail below, which include the image number in their format. A set of directives used to perform a particular coin grading operation is called a "script".

The following concepts will be discussed in this section: (i) Object oriented programming and the manner in which the numerous mathematical operations used to analyze and score the target coin image are organized using directives and scripts; (ii) The creation and storage of reference coin images; (iii) Script creation; and (iv) The manner in which directives are put together.

(i) Mathematical Operators; Directives; and Scripts

Each of the reference and target images is stored in the form of a two-dimensional matrix of digital numbers or words representative of the image's intensity at a location on the coin which corresponds to the position of the number in the matrix. When displayed on a screen at a grading station, the matrix appears as an image of the coin.

It will be appreciated, however, that translating the matrix of numbers into quantifiable indications of strike, luster, toning, and other coin qualities used in determining the grade of a coin is far more complex than simply translating the numbers into intensities or colors for display on the video screen. The contributions to each of the matrix numbers attributable to one quality must be separated from contributions attributable to other qualities. Thus, the first part of the preferred coin grading process is to analyze the image matrix, and identify and separate the various coin qualities in order to subsequently determine the differences in this quantities between the target and reference images. Only after such processing can the image be scored.

Processing of the target coin image is accomplished by performing a series of image transformations on the target coin to enhance and separate relevant coin qualities or features. The result is a series of images or "windows" highlighting the various qualities to be graded. The images in the windows are then scored, creating "metrics" which measure the relevant coin qualities and are then used to assign subgrades based on the results of the measurements.

An example of the difficulties which must be overcome in order to process a target coin image prior to scoring is the fact that the information at every pixel is a combination of many factors including luster, detracting marks, toning, light reflections, planchet marks, smoothness of the metal, strength of strike, noise, and dozens of other aspects. Only when all of these elements have been taken into account can reliable identification of marks and other quantities relevant to the final grade be utilized.

After processing a target image in order to establish the various qualities of the coin, the respective separate images resulting from the processing operations are compared with corresponding reference images. Once the deviations from ideal of a coin have been detected, scores are assigned, and a sub-grade or final grade determined. Scoring requires determination of the correlation between a measured quantity and the grade assigned thereto. However, such correlation is generally non-linear, and the grade assigned one quantity is often affected by the grade assigned a second quantity.

Scoring of a coin is in many respects more of an "art" than a science. For example the "eye appeal" of the coin plays a relatively large part in determining the final grade. Nevertheless, all of these considerations ultimately depend upon analysis of a two-dimensional image matrix, consisting simply of an array of numbers, which holds all information pertaining to the image in question. As a result, the grading process requires thousands of different mathematical operations to isolate and analyze the various relevant coin qualities, both for image processing and for scoring. Furthermore, the specific types of operations and sequence of operations may be different for each type of coin to be graded. In order to provide a usable coin grading system, therefore, the preferred invention not only consists of a specific grading process and apparatus, but also a more general framework within which specific grading "scripts" may be developed in a reasonably expeditious manner.

In order to simplify the "script" creation process, so that a completely new program does not have to be written for each coin, the preferred grading system is organized into "objects," which are assembled as required from a basic set of options presented to the user of the system, the above-mentioned "directives". The particular sequence of directives used for a specific type of coin, or set of scripts, is preferably stored on a high speed large capacity disk or similar memory device together with the set of reference images for the type of coin in question.

The directives themselves are in the form of commands which direct the image processing module to operate upon an existing image to produce a new image. Creation of a new script reduces to a relatively straightforward process involving the selection and sequencing of pre-written directives, each "object" in the script being assembled as needed during grading from the set of available directives, the directives providing both the framework for actual execution of the grading program and for program development.

As will be described in more detail below each "directive" contains an operation to be performed by the computer, for example a transformation of the matrix, a combination of a matrix with another matrix, or a scoring operation such as the creation of a histogram and an operation on the histogram thus created. Each directive also contains any necessary variables to be input, while the variables themselves may be generated or calculated using other directives.

(ii) Reference images

Each expert script contains a set of instructions for manipulating images of the target coin, which is the coin being graded, and also similarly processed reference coin images. In order to save time, the processed reference images may be generated once and saved as part of a reference data base to be used as required during the analysis. Preferably, each reference coin is saved as a plurality of reference images, the number of images depending upon the requirements of the expert model or script which will be used to grade the target coin.

Reference coin images must be captured under exactly the same environmental conditions as the target coin images. Accordingly, capture of the reference coin images requires use of the image capture apparatus described above, with at least one image being captured for every lighting condition determined to be relevant to the specific grading scripts used for the type of coin in question.

Because some reference images may be generated from other reference images relatively rapidly, those images need not be saved. Other images, such as region of interest masks, to be discussed below, must be saved in the reference data base because they are manually defined by a human expert grader and cannot be generated during grading by the preferred system. Each reference coin may have up to 100 or more images, along with, preferably, three directive scripts per reference coin, one for each side of the coin, and a separate script for grading the results obtained from the first two directive scripts.

Each reference coin image is stored in the reference data base as a hierarchical set of information including pointers to reference images, replacement masks, processed images, regions of interest, expert models, and exception conditions.

In order to overcome the problem of the extremely large number of individual coins that the system can be called upon to process, the preferred system utilizes the concept of a replacement mask applied to a group coin image. A group coin image is a reference image for a general class of coins, such as the Morgan silver dollar for a large set of years. The only difference between many of these coins is the date and in some cases the mint location. A special set of masks called replacement masks is applied to the reference image in order to "mask" certain areas with a coin-specific sub-image. The manner in which masks are created will be discussed in more detail below.

Through the use of replacement masks, the various mint dates can be masked into the image of the group reference coin to create a specific reference coin at the time of analysis. The preferred system is therefore able to maintain a reference image for every possible coin but, because of the use of group reference images and smaller replacement masks, significant efficiencies can be achieved both in terms of storage and in the effort required to produce the data base.

The reference coin images include not only the obverse and reverse images of the reference coin, but processed images of these sides as well. For example, if an expert script indicates that a Fourier transform of both sides is to have a factor in the scoring process, then the reference coin data base may also contain Fourier transformed images. If one or more regions of interest are designated in the expert models along with specific filter designations, then masters of the filtered region of interest will be included as well. This procedure speeds up processing of the target coin because most operations will be on the target coin and not on the reference. Multiple reference coins can reference the same image.

In case it is not possible to find a perfect reference coin, synthetic reference coins may be stored by modifying a reference coin image to remove imperfections. The synthetic reference coin is treated in all ways like a standard reference coin, but may not actually exist in the real world. Synthetic references images may be generated by interactive image modification using the same arrangement that facilitates interactive script creation, to be described in the next section.

Another method sometimes used is to create a synthetic image by averaging the images of a great many coins of the same year under identical lighting conditions, which serves to eliminate all flaws in the resulting synthetic image because it is rare that two coins of the same type would have flaws in the same locations. This type of synthetic image is of particular use in the high frequency marks analysis method discussed in part C, below.

(iii) Interactive Script Creation

In order to create grading scripts, the preferred system provides a display screen capable of displaying a complete coin image and images which have been operated upon to isolate the various qualities used to assign sub-grades and grades. The script creator works directly from a list of all possible directives, selecting and sequencing those which he or she believes will result in a correct ultimate sub-grade or grade for the coin in question.

Because of the large number of directives necessary to create a script, and the fact that the considerations which determine the final grade cannot always be articulated by even a very experienced expert coin grader, script creation is an iterative process. First, a potential script is created, then tested, subsequently rearranged as necessary, and then re-tested. Testing is generally accomplished by running the script on a variety of target coin images of different qualities. During testing, a script can be written to measure not one but hundreds of alternative metrics for each coin and later these metrics can be compared to select the best ones for any particular purpose.

By knowing what each directive accomplishes, the script creator can make educated guesses at the form a script should take. The script creator then creates a trial script by either interviewing one or more expert coin graders, or by using his or her own knowledge. However, because of the psychological aspects of grading, such as the "eye appeal" factor, the script creation process is inherently, to an extent, a trial and error process.

Advantageously, although the interactive script creation process of the preferred embodiment may be time consuming, it does not require detailed computer programming knowledge except on the higher level of choosing and sequencing directives. Thus, script creation may be performed by professional coin graders or numismatists rather than by professional computer programmers. The system is preprogrammed to the extent that directives are automatically created from raw mathematical algorithms, and an overall system shell is set up within which the expert is free to put together the scripts by simply assembling the various directives made available by the system in the form of menu options.

Each of the options or directives listed below is accessible through a hierarchical menu structure. For example, the "Process" menu has five selections including the item "convolutions" which when selected presents a menu of twenty selections including the item "Fast Edges" which when selected presents a menu of twenty options. In order to create a script, the expert grader selects from the menu of options and arranges them into a script. Testing may be performed on the fly by applying the selected options to images on the display screen and viewing the results. In addition to image processing operations, lighting, robot control, data base requests and other options may also be selected.

At the highest level, the menu items are as follows:

| | |
|---|---|
| File: | All file related options except for the Reference Data Base, 21 options |
| Edit: | All test editing operations for use on Scripts, 8 options |
| Image: | All image capture and display options, 25 options |
| Process: | Hierarchical menu presenting the sub-options: |
| | Input LUT, 12 options |
| | Output LUT, 20 options |
| | Image Operations, 36 options |
| | Morphologies, hierarchical with 20 options |
| | Convolutions, hierarchical with 54 options |
| | Score, 43 options |
| Setup: | All camera and positioning options presenting the sub-options: |
| | setup Lens, 15 options |
| | setup Lighting, 6 options |
| | setup Positioning, 13 options |

-continued

| | |
|---|---|
| | setup Motors, 16 options |
| | setup Movement of Coin Tray, 5 options |
| Data Base: | All Reference Data Base operations, 19 options |
| Grade: | Single Coin and Production modes, 16 options |
| Results: | Results review, 11 options |

Figure 7:
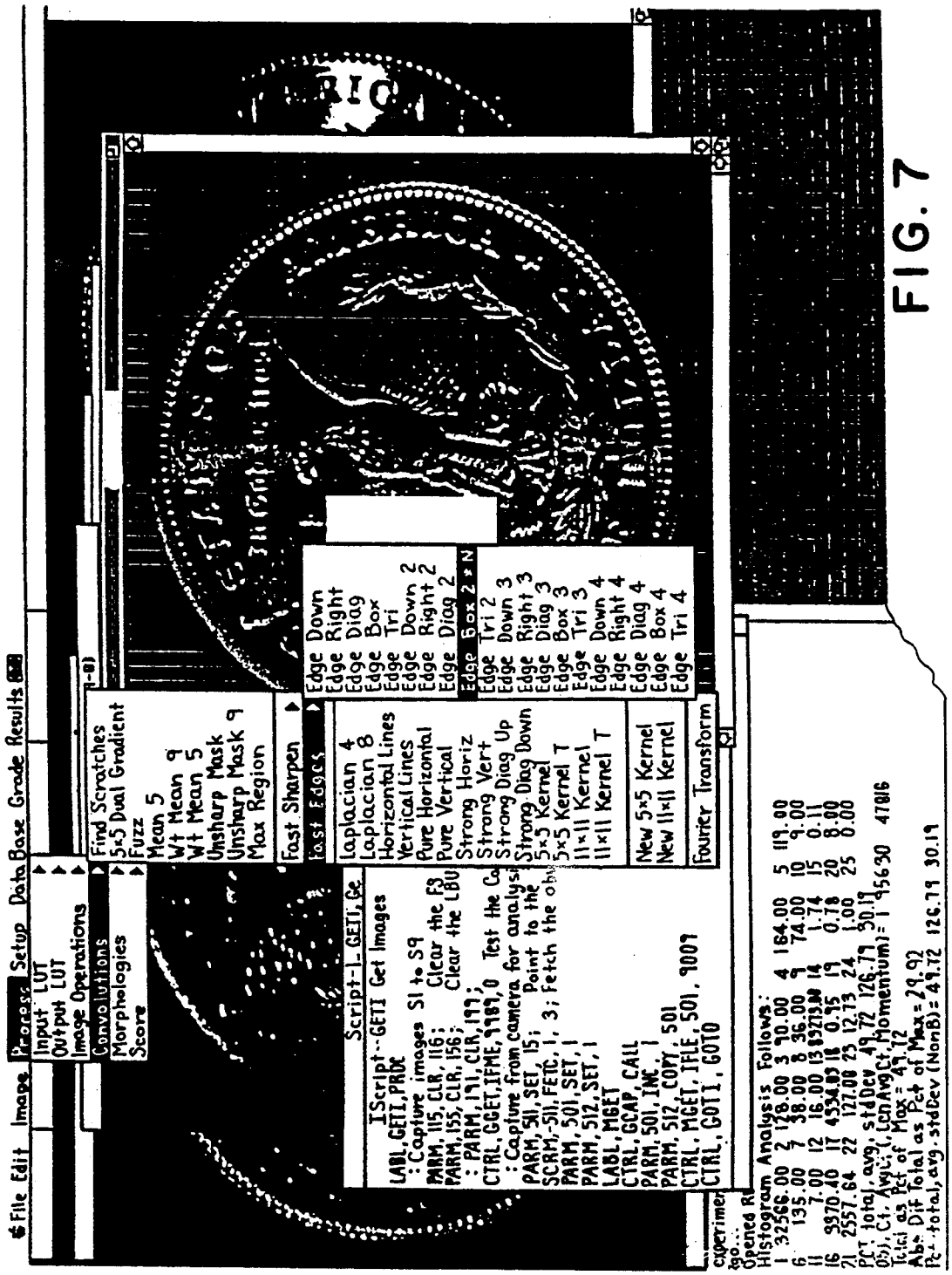
FIG. 7 shows an image of an interactive screen with a hierarchical menu selected.

FIG. 7 is a representation of a typical pulldown "menu" 101 as it would appear during script creation or an image processing operation. The screen displays a window or "object" and when a menu item is selected, the user is making a request of this object to create a new image in place of the current image based upon information currently in this or other windows. As an example, if the window indicated in the drawings by reference numeral 100 is the active window, i.e., if window 100 is foremost and therefore visible with unique markings indicating its active status, then a request for a threshold operation will generate a threshold of an image whose window number will be requested by the system. It is permissible, in general, for a window to generate an image based upon itself, but this is not required. Many image operations generate a new image based upon two or more images, as will be explained in more detail below. Directives are an alternative means of generating images and utilize the structured format described. Virtually all operations can be requested in either of the two means: menu selection or directive. This makes possible interactive investigation during script generation and testing, and a formal command process during production operation.

In the example shown in FIG. 7, the "convolutions" option of the "Process" menu has been selected via a cursor control or mouse, resulting in the appearance of a second menu which permits selection of the type of convolution. In this case, the "Fast Edges" option has been selected, which causes the display of yet another submenu from which the particular edge detector "Edge Box 2" has been selected. In addition, FIG. 7 illustrates the existence of multiple screens, a script window, and an information display window.

(iv) Directive Format

A directive is a single command which directs the image processing module to operate upon an existing image to produce a new image. Each directive has a standard syntax or format. For the screen creation directive, for example, the syntax is as follows:

SCRN, image-id, verb, input-image, input-image-2, data

The first word is the type of directive. The screen creation directive, SCRN, for example, creates "windows" or images for subsequent analysis or further transformation. The "image id" is the screen number that will be generated from the directive, "verb" is the action to be performed, "input-image" is the number of the image to be operated upon, "input-image-2" is the number of the second image involved in the operation, if required, and "data" is a set up of up to three numbers that control the action. For example, to effect an image rotation, "data" would contain 3 numbers: X origin of rotation, Y origin of rotation and the number of degrees of rotation.

The following are examples of other SCRN directives and their meanings (additional explanations and examples will be given in parts IIB and IIC, below):

SCRN, 2, ISUB, 2, 1; Create a new screen 2 image by subtracting image 1 from the current image 2.

SCRN, 9, ROTA, 5,101,102,103; Produce screen 9 by rotating the image in screen 5 about a point given by parameters 101 and 102 through an angle given by parameter 103.

Each field of a directive is input in exactly four characters. Each of the three data fields are also limited to four characters each. The directives are saved in a text format and can be created or edited by the system or by another text processing program. The use of parameters will be described in more detail below, but it will be appreciated that the use of parameters in place of "hard wired" values gives the directives exceptional power because parameter values, such as 101-103 in the above example, can be based upon calculations made as part of other operations.

Other directive types include: HIST for histogram, LUT for look-up table, SCOR for image scoring, CTRL for execution control, LABL for a statement label, and so forth. Appendix A contains a list of the various types of directives and the verbs that will be supported thereby, including brief descriptions thereof. The directives are referred to in the following descriptions by the number given in the left hand column of the directive format tables included in Appendix A.

It should be emphasized that the list of directives is not to be construed as limiting. Although suitable for developing a wide variety of scripts, the list may be changed for different types of coins or other graded objects, and for different grading standards or systems. Numerous mathematical operations other than those described will undoubtedly occur to those skilled in the art including, for example, those based on "wavelet" analysis, a recently developed substitute for Fourier analysis in image processing. All such variations are intended to be included within the scope of the invention.

B. Image Processing Operations

Each of the image processing operations described below is the basis for a "verb" used to form an image processing directive. The exact arrangement of directives in a script depends on the coin to be analyzed, and the same verb may be used in different types of directives. For example, various gray scale operations may be carried out as part of a SCRN (screen creation) or LUT (look-up table) directive, and histogram operations may be used in either SCRN or SCOR (scoring) operations.

Except as otherwise indicated, the following image processing operations are based on well-known mathematical algorithms. The directives are defined, and scripts arranged, by an interactive process which requires interviews with Expert coin graders, and subsequent testing models developed as a result of the interviews to determine whether their results correlate to an acceptable degree with those obtained by manual grading. During development, the scripts are interactively generated by the use of pull-down menus, as described in part IIA above, which enable the developer to enter command lines via a keyboard or similar input.

The following concepts will be discussed in this section: (i) the use of subroutine calls and "parameter" directives to create a powerful new programming language able to execute an unlimited number of operations from a relatively limited and manageable set of directives; (ii) mask creation; and (iii) image processing operations which transform the original target image into processed images suitable for scoring as described in part C.

(i) Subroutine Calls and "Parameters"

The computer coin grading system scripting language enables the script to define and execute subroutines or procedures and to pass variable arguments to those procedures through use of a call and return option in the form of control (CTRL) directives 1403 and 1422 as listed in Appendix A. CALL invokes a named procedure and RET returns from the procedure. The call and return logic is implemented using a stack method, which means that the subroutines can call other subroutines which can call other subroutines, and so forth. In fact, a subroutine can even call itself and therefore become recursive.

To make subroutines even more powerful, indirect references to screens and other parameters are implemented using "parameters", listed in Appendix A as directives 1500–1524. In this approach, any reference to a screen which contains a negative number cannot make sense, and therefore the system references the parameter with the absolute value of that number and uses the value of that parameter as the number of the screen (PARM directive 1500). This combined with subroutines, looping, and conditionals makes the scripting language a true computing language with great image analysis power.

Other PARM directives include various mathematical operations which can be performed on the parameters (Add (1501); Div (1505); Increment (1507); Find the smaller of two parameters (1511 and 1512); Multiply (1515); Round to the nearest whole number (1517); and subtract (1520)) and miscellaneous operations such as clear (1502), copy (1503), display (1504), and so forth. In addition, a set of vector operations are preferably included, such as DOTV, the dot product of two vectors, and SUBV, subtraction of a value from a vector.

The principle value of subroutines is to simplify and modularize the logic of a script. For example, all of the Marks data collection may be referenced in a single statement: CTRL, MARK, CALL, while the statement CTRL, LUST, CALL handles all data collection for Luster. As a result of subroutines and looping, a script consisting of for example 100 directives may execute hundreds or thousands of actual directives. For example, directives with "parameters" defined by other directives may be used to perform the same data collection using different masks and lighting conditions in a doubly nested structure.

As an example of a directive using an indirect reference, consider the following statement:

SCRN, 5, MASK, 5, 9

This statement requests the creation of screen 5 by masking the image currently in screen 5 with the mask in screen 9. Now consider the following set of statements:

PARM, 101 SET, 5
PARM, 102 SET, 9
SCRN,-101, MASK,-101,-102

These three statements do the same thing as the first statement. While this seems to be a more complicated set of instructions, imagine that there are twenty statements in a row similar to the original statement and that the script calls for execution of those 20 statements again and again using different base images and different masks. In order to do so, three statements are put inside of a subroutine and the subroutine is called after first setting PARMs "101" and "102" which identify the particular screen and the particular mask used at the time. The subroutine is then called again with a different value in those parameters and twenty statements are again generated, but this time using a different image and a different mask.

(ii) Masks

A mask is a sub-image with a special property. It has only two values, 1 and 254. If 1 represents the property of opacity, then a mask, m(i,j), may be applied to an image such that $f(i,j) = f(i,j)$ if $m(i,j) \neq 1$ and $f(i,j) = 1$ if $m(i,j) = 1$.

This means that a mask can cause certain areas of an image to disappear while retaining others in an arbitrary fashion. Because a mask shares the same data range as an image, operations such as thresholding can be used to create a mask at execution time which can then be applied to a subsequent image.

A mask is utilized in defining a "region of interest." For example, if the breast of the eagle on a coin is a region of importance in one of the measures for a certain coin, then a mask defining the eagle's breast will be created and stored as part of the reference coin. The image header for the mask contains the size of the image mask and if not defined causes a full size image to be used as the mask. Once a mask operation has been performed, tests within that region of interest can be performed, without regard to information that had existed around the region, because the mask sets all information except in the region of interest to black.

A first task in developing a script is the definition of "regions of interest" using an interactive graphic process. Regions of interest may be arbitrarily shaped portions of the image within which multiple arbitrary sub-regions may be excluded, and are of course based upon the reference coin. As suggested above, a region of interest defining mask is an image of arbitrary size with a defined offset, and which consists of two pixel classes; transparent and opaque.

According to a preferred mask creation method, a fully transparent window is superimposed on the active image of the reference coin face, and the mask is sized using standard window sizing and moving controls. When the "window" is properly positioned, the user exits the positioning mode and the remainder of the window becomes opaque, leaving a rectangular, transparent mask on the image.

The user then creates an outline of a region by adjusting the region's borders. The user touches either the interior or exterior of a region, and the system automatically opaque fills to the region borders from the point of contact. When done, the mask consists of the two classes of regions, transparent and opaque. The mask is then given an identification number and stored in a "region of interest" data base within the reference data base from which it may be recalled using SCRN directive 16, "image" being the number under which the mask is stored. In addition, the system also contains the ability to "import" masks and images from other commercial applications using the industry standard TIFF format.

Figure 8:
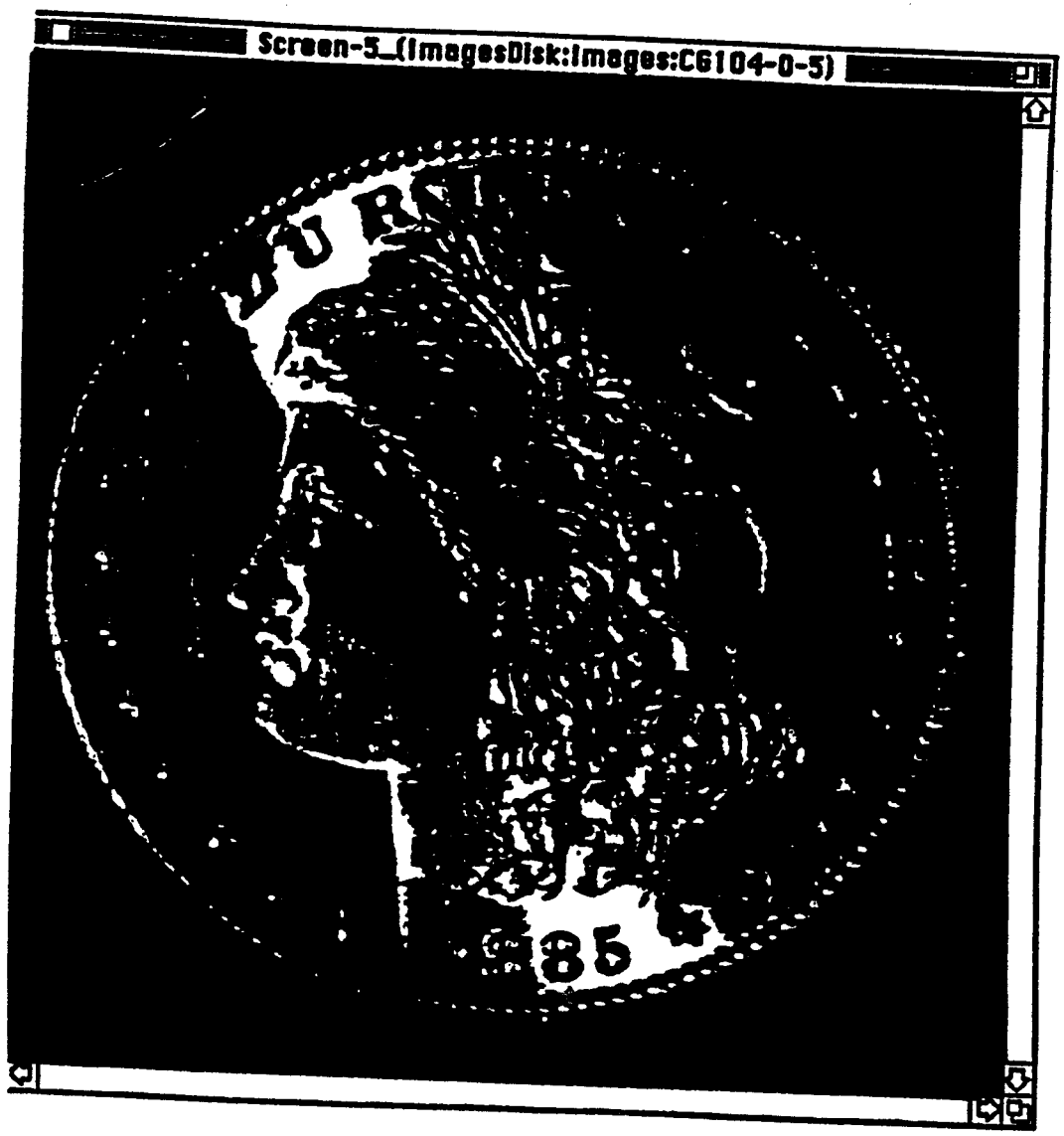
FIG. 8 shows an image of a coin identified as coin G104 obverse under lighting condition five.
Figure 9:
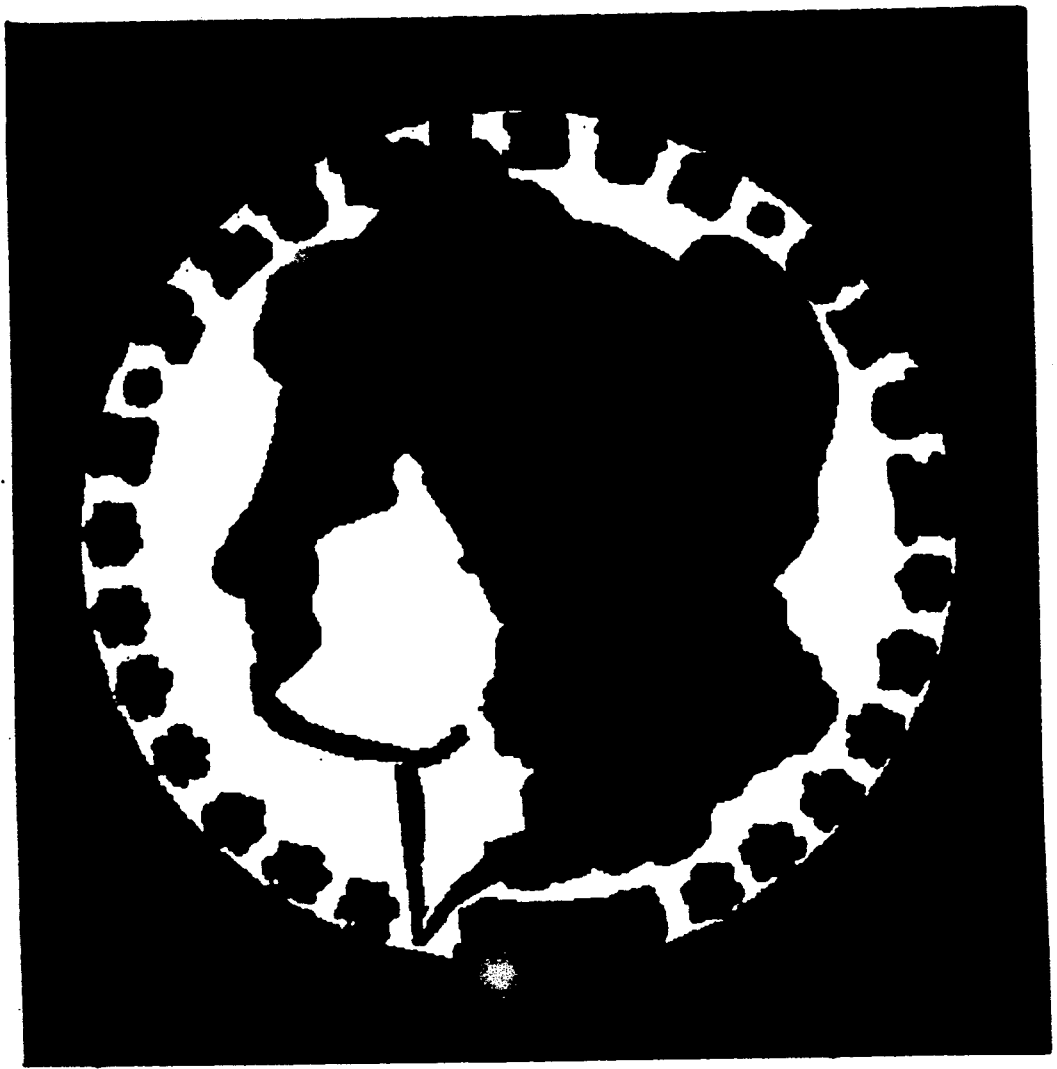
FIG. 9 shows a typical mask image, in this case the low frequency segregation mask for an 1885 Morgan.

An example of a sample mask is shown in FIG. 9. The mask represents the low frequency segregation mask for the obverse side of the 1885 Morgan Silver Dollar depicted in FIG. 8. The coin shown in FIG. 8 has a grade of MS-63.

(iii) Image Transformation Operations

Many operations create an image from another image. These operations are presented in this section.

Each of the images captured by the system is defined by an array of pixels associated with the array, f(i,j), where f can assume any positive integer value between one and maximum, and i and j are indices into the array such that i and j range from zero to $i_{max}$ and $j_{max}$. Variables $i_{max}$ and $j_{max}$ are defined by the size of the image in horizontal and vertical pixels, respectively. The maximum value for f is equal to $2^m - 1$ where m is the depth of the image, i.e., the number of bits per pixel.

In the preferred system, m is set to eight bits so that the maximum value for f(i,j) is 254. A value of one indicates no light intensity, or black. A value of 254 indicates maximum light intensity, or white. All values in between represent various shades of grey. The extreme values of zero and 255 are reserved for the operating systems permitting, for example, black and white text to be displayed at any time.

A single image for a round coin is 480 pixels wide by 480 pixels high, where each pixel is represented as eight bits, or one byte. Thus, a single image requires 230,400 bytes. The storage requirement for a picture is measured in bytes and is equal to $$(i_{max} * j_{max}) + 32$$

for an ixj image with a 32 byte header.

This basic image may be compressed using various image compression techniques. In some cases, data expansion may also be utilized. Data compression is the creation of a smaller image in terms of number of pixels from a larger image, preferably maintaining as much information as possible in the compression without taking too much time. In the preferred embodiment, two compression techniques, Compress 0 and Compress 1 (SCRN directives 1008 and 1007, respectively), are utilized. Compress 0 reads every other pixel and thus speeds up the image capture by a factor of two. Compress 1 averages the four adjacent pixels to define the central pixel value, and is best suited for non-color images. Preferably, the operation of scripts should be independent of image size, whether 480×480, or a compressed 240×240. Corresponding image expansion directives 1011 and 1012 are also provided. Additional image compression using the industry standard JPEG compression technique using either software or special purpose hardware accelerators are also supported.

a. Geometric Operations

The class of single image operations that perform the image equivalent of a rigid body transformation are called geometric operations. They include translation, rotation, and scaling which are an essential part of the initial/reference registration process. These operations will be briefly described below.

1. Image Translation

An image translation is a simple shift of array locations such that for a translation of ($\Delta i$, $\Delta j$), $$f(i,j) = f(i - \Delta i, j - \Delta j).$$

For any operation, if the index of the function f becomes less than zero or greater than $i_{max}$, then the value of f is set to zero.

The directive 1044 for this operation has the format "SCRN, nScrn, TRAN, nBase, idx, idy," where idx is $\Delta i$, jdy is $\Delta j$, and nbase is the input image number.

2. Image Rotation

To rotate an image f(i,j) about the origin ($x_0$, $y_0$) through an angle $\theta$, the well-known formula using polar coordinates is $$f(i,j) = f(ri, rj)$$

where $$ri = (i - x_0) * \cos(\theta) - (j - y_0) * \sin(\theta) + x_0$$

$$rj = (i - x_0) * \sin(\theta) + (j - y_0) * \cos(\theta) + y_0.$$

Because (ri, rj) will in general be a floating point number, simply rounding to the nearest integer for purposes of filling the array would introduce significant errors into the image. Therefore, some form of interpolation is required, preferably either linear, quadratic, or cubic.

The format for this directive, 1035, is SCRN, nScrn, ROTA, nBase, $x_0$, $y_0$, $\theta$.

3. Data Scaling

The formula for scaling or "zooming" an image by a factor S centered on the point ($x_0,y_0$) is $$f(i,j) = f[1/S(i - x_0) + x_0/S(j - y_0) + y_0].$$

When S is less than 1.0, the image shrinks about the origin ($x_0,y_0$). When S is greater than 1.0, an enlargement of the image about ($x_0,y_0$) occurs.

The format for this directive, 1046, is "SCRN, nScrn, ZOOM, nbase, $x_0$, $y_0$, zoom," where zoom is the factor S by which the image is to be scaled. If directive 1045 is used, the x and y dimensions of the image may be varied by the factors "xzoom" and "yzoom".

b. Gain and Bias Modification

Gain and bias modification is a basic image processing technique for improving image quality by varying contrast and brightness. In this technique, implemented by directive 1018, pixel values are transformed as $$f(i,j) = G * F(i,j) + B$$

where G is the gain and therefore controls contrast, while B is the bias, which controls the overall brightness.

The gain and bias modification technique may also be used where a desired mean and standard deviation is specific for an image and an existing image needs to be transformed to meet that requirement. The method utilizes the gain and bias modification equation above where $$G = \sigma(new)/\sigma(image) \text{ and}$$

$$B = m(new) - G * m(image)$$

and where $\sigma$ (new) is the standard deviation of the desired image
$\sigma$ (image) is the standard deviation of the original image
m (new) is the mean of the desired image, and
m (image) is the means of the original image.

As an example, this may be a useful method for eliminating the effect of an overall tarnish on a coin in analyses that are not effected by this property.

Various functional variations can be selected including functions of the form $$f(i,j) = [\log(1 + (e^k - 1) * f(i,j))]/k$$

The effect of this transformation is to spread out the low pixel values and compress the high values so that details in dark areas are made more visible at the expense of detail in the bright areas. The inverse operation can be defined which enhances detail in bright areas and reduces detail in dark areas. This is defined by the formula $$f(i,j) = [(1+k)^{f(i,j)} \Delta 1]/k.$$

Figure 10B:
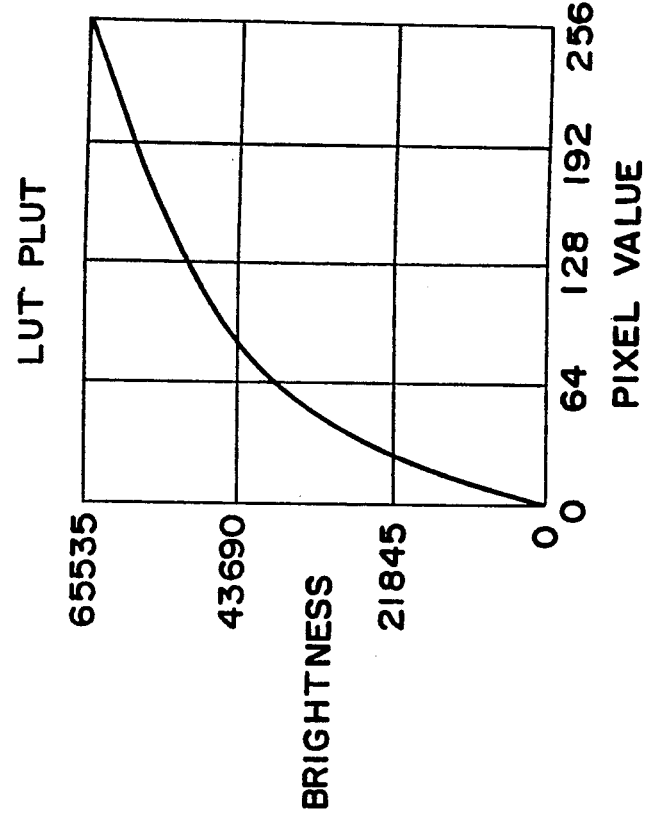
FIGS. 10A-(B) show two representative look-up table diagrams.
Figure 10A:
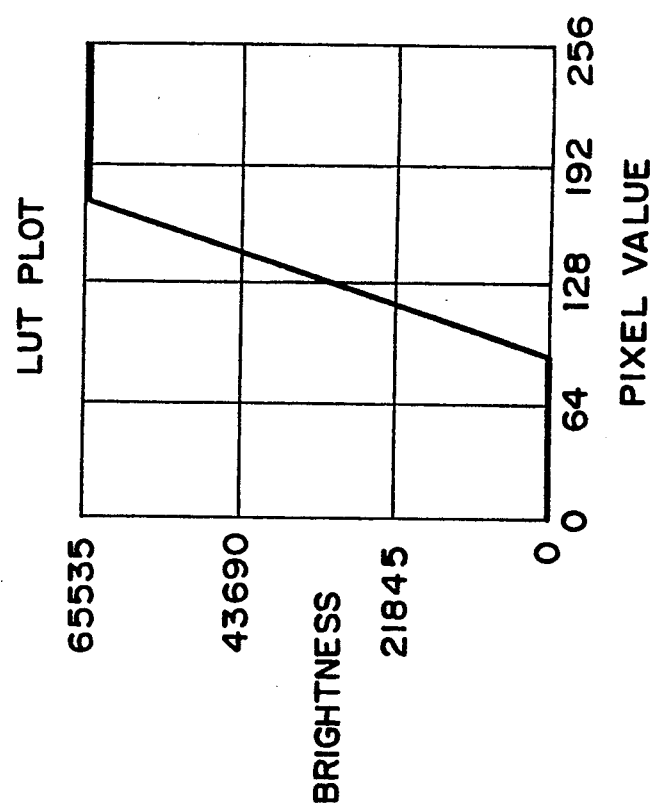

FIGS. 10A and 10B show two examples of a gray scale adjustment that can be applied either to the data in an image or to the look-up table for that image. FIG. 10A shows a Gain and Bias modification and FIG. 10B shows a logarithmic intensity modification.

c. Other Gray Scale Adjustments

The Gray Scale refers to the range of shades applied to an image. In general, the Gray Scale is defined as a linear variation from black to white. However, in many instances, images may be significantly enhanced by adjusting the shade assigned to each pixel.

There are two primary means of adjusting the Gray Scale: modification of the data values in the image, f(i,j); and modification of how each of the 256 possible individual values are displayed on the screen using a look-up table (LUT). A look-up table is a very fast means to change and observe the effect of Gray Scale adjustments. It is particularly effective in interactive image analysis.

The purpose of Gray Scale adjustment is to segregate information into meaningful categories such as coin and background, eagle and letter, surface and scratch, and so forth, and to filter or "threshold" the image to eliminate noise or background.

1. Scaling of the Gray Scale

Scaling of the Gray Scale for feature highlighting purposes can be very effective if the image does not utilize the entire Gray Scale, i.e., if the values in the image all lie between two values, A and B, such that $A \leq f(i,j) \leq B$, in which case the Gray Scale can be expanded to a larger domain, V1 to V2, by the operation $$f(i,j) = (V2-V1)/(B-A)*[f(i,j)-A] + V1$$

and for the special case of V1=0 and V2=255, the full Gray Scale, $$F(i,j) = 255/(B-A)*[f(i,j)-A]$$

This directive, 1038, has the format "SCRN, nScrn, SCAL, , t1, t2," where t1 and t2 are input values for V1 and V2.

Another case is where most of the Gray levels fall within the range A to B, in which case all of the Gray values between A and B can be expanded to fill the range V1 to V2 except for the limits V1 and V2 which are reserved for the few values that fall outside of the major group. f'(i,j) then becomes $$f(i,j) = (V2-V1-2)/(B-A)*[f(i,j)-A] + V1+1 \text{ for } A \leq f(i,j) \leq B$$

$$f(i,j) = V1 \text{ for } f(i,j) \leq A$$

$$f(i,j) = V2 \text{ for } f(i,j) > B$$

and for the special case of V1=0 and V2=255, $$f(i,j) = 253/(B-A)*[f(i,j)-A] + 1;$$

$$F(i,j) = 0$$

$$f(i,j) = 255.$$

This is effectively a bandpass filter and is defined by directive 1002, "SCRN" nScrn, BAND, ,t1, t2," where t1 and t2 again define V1 and V2.

It will be appreciated that each of these Gray Scale processes can also be accomplished using an input look-up table and, consequently, the preferred system also includes "LUT" directives 1101 and 2224 for the above operations. Also, a variety of other Gray Scale processes can also be defined using linear adjustments to the pixel values.

2. Thresholding

Thresholding is an extremely useful and powerful technique for segregating an image into two regions by assigning groups of pixels within bands of Gray Scale values a single new pixel value.

The simplest example is segregation of an image into foreground and background. Here all pixels with a value greater than a threshold value t, are assigned the value 254 while all others are assigned a value of 1. The creation of an image with the values of 1 and 245 also means that the result of a threshold operation can subsequently be used as a mask, a powerful capability.

Thresholds can be fixed as just described or made variable across the image. In a variable threshold, the threshold is varied based on the local pixel value mean. For example, if a threshold t in the neighborhood of (i,j) is defined as $$t = k*\sigma(i,j) + B_{avg}(i,j),$$

the thresholding operation for that value of t is $$f(i,j) = 0 \text{ for } f(i,j) \leq t \text{ and}$$

$$f(i,j) = 255 \text{ for } f(i,j) > t$$

where k is a parameter that controls the effect, $\sigma(i,j)$ is the standard deviation in the neighborhood of pixel (i,j), $B_{avg}(i,j)$ is the mean value of the pixels in the neighborhood, and the neighborhood is a rectangular region centered on pixel (i,j) spanning a generally odd number of pixels. In this and other transformations, any pixel values that exceed the limits are clipped to that limit. The format for this gray scale adjustment directive 1043 is "SCRN, nscrn, THOL, , t1," where t1 is the chosen threshold. Thresholding can also be accomplished via a look-up table directive 1117.

3. Pseudocolor

Pseudocolor is the use of a color in place of a particular Gray Scale. Pseudocolor can be extremely effective in highlighting a particular band of values. For example, the edges of a region of a coin can be detected and then displayed in color superimposed on the remaining Gray Scale image. Real-time interaction with the pseudocolors through the use of look-up tables can be an effective technique for understanding the contents of a complex image. Bands of pixel values can be assigned various colors to highlight the information in the image. In the extreme, each Gray Scale value can be mapped to a different color.

4. Look-Up Tables

A look-up table is simply a table which is 256 items long, each position in the look-up table containing the intensities of red, green, and blue that should be displayed for that value. Because look-up tables are hardware elements, look-up table operations are generally much faster than corresponding operations carried out by software alone.

When the look-up table is a Gray Scale ramp, then there is a direct correspondence between the image array and the display. However, without modifying the image array, the display can almost instantly change to a negative image, a linear adjustment, pseudocolor, etc. All that is required is to modify the look-up table. As a result of the speed and effect of look-up table modification, most of the methods of Gray Scale adjustment described above may also be carried out through look-up table operations.

Because of the speed of the look-up table approach, an additional image array modification method is to adjust the image array to correspond to the current state of the look-up table. In the case of a Gray Scale look-up table, the image array is modified in exact correspondence with the look-up table and then the look-up table is replaced with a linear ramp. If pseudocolor exists, only the red channel is used in the mapping.

For purposes of interactive expert script development, a very useful feature of the look-up table is its real time modification feature. With real time "LUT" modification, the image changes instantly and continuously as a mouse or other input device moves a control slide back and forth in the case of one-dimensional control such as "threshold" or "logarithm" as an odometer shows the value of the parameter. For a two dimensional control such as Gain and Bias, Scale, or Band Pass, a two-dimensional box replaces the slide. This gives the user complete freedom to explore the image and to determine the appropriate values for their use. As an example, the threshold can be interactively varied so that the marks shown on the image are limited to those that the graders feel are important.

An additional LUT option uniformly scales the intensities of an image from black up to a threshold value, e.g., the point at which 93% of the pixels are less than the intensity in question. This is the computational equivalent of increasing the exposure of an image capture.

d. Convolutions

Convolutions are the mathematical analogs of optical lenses and are presently a fundamental tool in image processing. Numerous standard image processing convolutions are known, and the preferred system makes available a large number of them, as will be described below. Implementation is generally by software, although dedicated hardware for performing specific convolutions such as Fourier transforms are also available at present.

The basic digital convolution in two dimensions can be expressed as $$G(i,j) = \sum_{k=i-w}^{i+w} \sum_{l=j-v}^{j+v} F(k,l) H(i-k, j-l)$$

This expression states that the output, G(i,j) at a pixel location (i,j) is given by a weighted sum of input pixels surrounding i where the weights are given by the array H. This is computed by a series of shift-multiply-sum operations. The values of H are also referred to as the filter weights, the filter kernel or the filter mask. For reasons of symmetry H(i,j) is generally n × n with n odd.

In the case where H may be represented as the vector outer product of a vertical component vector $H_v(l)$ and a horizontal component $H_h(l)$:

$$H = H_v(l) \cdot H_h(m)^t.$$

If so, then filter H is called separable and may be applied by first convolving the image with the horizontal component $H_h$ and then convolving the result with vertical component $H_v$. The result is that the two-dimensional convolution is replaced by two one-dimensional convolutions, reducing the computation from the order of $N^2$ to the order of 2N.

The concepts and algorithms which handle the two-dimensional digital convolution can be extended to arbitrary masses which do not satisfy the requirement of linearity and are therefore no longer convolutions in the strict sense but are called moving window operations. With this flexibility, a wide range of linear, non-linear, and adaptive filters may be implemented. This section includes general discussions of 1. Smoothing Filters; 2. Sharpening; 3. Edge Enhancement; and 4. Fourier transforms.

1. Smoothing Filters

The principal purpose of a smoothing filter is to remove noise from an image.

In a general signal from a video camera, the signal received by the computer can be defined as $$G(i,j) = F(i,j) + V$$

where G is the signal received by the computer, F is the actual image, and V is the noise. Noise is a random function which causes otherwise smooth regions to have random locations of lower or higher intensity. Another type of noise that exists in a digital image is quantization noise which is the difference between a quantized picture and its original resulting from the rounding off effect of quantization.

If the noise is totally random, then it can be reduced by averaging multiple images of the coin. This can be written as $$f(i,j) = 1/N \sum_{i=1}^{n} f(i,j).$$

Other smoothing operations based upon single images also prove useful in image analysis. A large class of filters operate by computing the value of a pixel as a weighted average of the pixels which surround it, called the neighborhood. Weighted mean convolutions are implemented, for example, by directives 1052 and 1053.

2. Sharpening

Sharpening is the opposite of blurring. Blurring is an averaging, or integration, operation, and is inherent in the image capture process. Image sharpening is, in contrast, essentially a differentiation operation. Blurring weakens high spatial frequencies more than lower ones, and thus sharpening is achieved by emphasizing high spatial frequencies.

When a picture is noisy as well as blurry, however, high emphasis filtering cannot be used indiscriminately to sharpen the image since noise generally involves high rates of change of gray level and therefore will also become sharpened. Thus, it is essential that noise be reduced as much as possible before sharpening. The two general classes of sharpening operations are the Laplacian and the Gradient.

The Laplacian is the linear derivative operator $$\nabla^2 f = \frac{\partial f}{\partial x^2} + \frac{\partial^2 f}{\partial y^2}$$

For a digital picture, the discrete analog of the Laplacian is $$\nabla^2 f = \Delta_x^2 f(i,j) + \Delta_y^2 f(i,j)$$
$$= [f(i+1,j) + f(i-1,j) + f(i,j+1) + f(i,j-1)] - 4 \cdot f(i,j)$$

which is proportional by the factor of $-1/5$ to $$f(i,j) - 1/5[f(i+1,j) + f(i-1,j) + f(i,j) + f(i,j+1) + f(i,j-1)],$$

the difference between the Gray level f(i,j) and the average Gray level in a neighborhood of f(i,j), where the neighborhood consists of (i,j) and its four horizontal and vertical neighbors. In a sense, therefore, the digital Laplacian of an image f is obtained by subtracting a blurred (i.e., averaged) version of f from f itself.

The Laplacian operator is isotropic, i.e., rotation invariant in the sense that rotating f(i,j) and then applying the operator gives the same result as applying the operator to f(i,j) and rotating the output. Operators used for sharpening must be isotropic because of the requirement that blurred features that run in any direction, such as edges and lines, be sharpened.

A digital Laplacian as defined above can be obtained by convolving the image f with the array $$\begin{bmatrix} 0 & -1 & 0 \\ -1 & 4 & -1 \\ 0 & -1 & 0 \end{bmatrix}$$

Similarly, the computation of $f - \nabla^2 f$ is the same as convolving f with the array $$\begin{bmatrix} 0 & -1 & 0 \\ -1 & 5 & -1 \\ 0 & -1 & 0 \end{bmatrix}$$

Other standard masks for the Laplacian are:

$$\begin{bmatrix} -1 & -1 & -1 \\ -1 & 8 & -1 \\ -1 & -1 & -1 \end{bmatrix}$$

and $$\begin{bmatrix} -1 & 1 & -1 \\ -1 & 9 & -1 \\ -1 & 1 & -1 \end{bmatrix}$$

The gradient operator applied to a function produces a vector at each point whose direction gives the direction and maximum change of the function at that point, and whose magnitude gives the magnitude of this maximum change. A digital gradient may be computed by convolving two windows with an image, one window giving the x component $G_x$ of the gradient, and the other giving the y component $G_y$.

The simplest set of masks to define a gradient in x and y are $[-1, 1]$ and $$\begin{bmatrix} -1 \\ 1 \end{bmatrix}.$$

The result is two images: gradient magnitude and gradient direction. Masks centered and symmetric about (i,j) are generally used. For example, the convolution with $$[-1\ 0\ 1] \text{ and } \begin{bmatrix} -1 \\ 0 \\ 1 \end{bmatrix} \text{ yields}$$

$$G_x(i,j) = f(i, j+1) - f(1, j-1)$$

and $$G_y(i,j) = f(i+1, j) - f(i-1, j)$$

Other gradient masks include the Sobel operator and the Prewitt operator, each of which is a standard three by three matrix and is listed in Appendix A under the SCRN convolutions heading.

3. Edge Enhancement

The purpose of an edge enhancement filter is to enhance or boost edges. This may mean a simple high pass filter, but also may include a thresholding of the points into edge and non-edge categories, and even linking up of edge pixels into connected boundaries in the image. Edge enhancement is especially useful when the operation performed is based on edge location, for example during alignment, which is based on "landmark" location.

Examples of edge enhancement filters include the gradient operator, keeping only the magnitude, and the Laplacian operator.

Other edge enhancement filters include filters for enhancement of edges in the direction of the Gradient, and selectively applied filters such as $$f^1(i,j) = f(i,j) + \alpha \nabla^2 f(i,j), \text{ for } \nabla^2 f(i,j) < \text{threshold}$$

$$f^1(i,j) = Mean\ (f(i,j)), \text{ otherwise,}$$

where $\alpha$ is a scaling parameter and Mean (f(i,j)) is the mean value in the neighborhood (i,j). This filter tends to enhance edges where the gradient is low and suppress noise where the gradient is high.

4. Fourier Transforms

The Fourier transform produces a representation of the spiral frequency contained in an image. Essentially, the transform frequency is the frequency with which the image varies as a function of position within the frame. Images with gradually varying patterns have low spatial frequencies while those with much detail and sharp edges have high spatial frequencies. For purposes of the preferred image processing system, the following forms of the Fourier transform and its inverse are utilized:

$$F(k, l) = \frac{1}{n} \sum_{k=0}^{n-1} \sum_{l=0}^{n-1} F(k, l) e^{j2\pi(ik+jl)/n}$$

The two-dimensional Fourier transform is separable, which means that the two-dimensional transform may be computed in two steps, first by computing the one-dimensional transforms for each value of i and the computing the one-dimensional transforms of these results for each value of j. For purposes of display, a shifted version of this function called the "optical transform" is used which places the DC term in the center of the screen, an arrangement which is much more intuitive to the observer. This is done either by breaking the image into four equal quadrants and trading quadrants 1 and 4 and quandrants 2 and 3, or by multiplying each pixel by $(-1)^{i+j}$.

The Fourier transform may be used to simplify convolution of images because convolution in the spatial domain is equivalent to multiplication in the frequency domain. Thus, instead of directly convolving f(i,j) with a mask g, their transforms may be multiplied point by point, and the result subsequently inverse transformed in order to correlate the two images.

This can be done in some instances more rapidly than a spatial convolution, especially by utilizing the fast Fourier Transform technique, introduced by Cooley and Tukey in 1965, and now widely available.

e. Edge Location (Segmentation)

Image segmentation is the process of dividing an image into meaningful regions. The simplest case is to have only two regions, foreground and background. This can be accomplished using a single band thresholding method as discussed above.

In coin grading, a more difficult problem is identifying different regions, such as the coin background or the head of a President. Both regions are likely to have very similar reflective properties. Therefore, segmentation requires a procedure more subtle than simple thresholding.

If edges are considered as boundaries between segments, then the different segments can be determined by finding the edge pixels, combining them into connected lines and grouping the lines into closed regions. The following processes are preferred ones of numerous algorithmic approaches which are possible to accomplish this. It will be appreciated, however, that the invention is intended to encompass all such approaches.

In one preferred segmentation process, the gradient of the image is first computed, resulting in an edge magnitude image and an edge direction image. Second, the edges are thinned by keeping only the boundary points whose gradient magnitude is a local maximum in its gradient direction. Finally, an edge pixel is selected and a "flying spot" walk is performed connecting pixels until the original point is returned to. If return is impossible because the edge of the mark disappears, then the mark is a special class of entity called an artifact. A scratch would be an example of an artifact.

In place of the gradient method for identifying edges, another preferred approach is to create a new image by shifting the original image by one pixel to the right and one down, and then subtracting the two images. Only those portions of the image which have changed will show up in the difference. This will work well for edges which run roughly perpendicular to the direction vector $(1,-1)$. Other vectors can also be used and the results combined to remove the effect of vector orientation.

Other segmentation methods, such as "relaxation," are also possible, but segmentation by boundary identification is currently preferred. The reference coin itself can also be used to define segmentation models. By manually classifying regions in association with the reference coin, these region definitions can be used to define corresponding regions in the target coin and measurements within these two corresponding regions can be used as a scoring function. Another class of supported operators are called morphologies which can be used to grow and/or erode information within an image. For example, first eroding and then growing a thresholded image will eliminate small features while retaining larger ones. Similarly, growing a mask and then subtracting the result from the original image results in a new mask defining the edges of the original mask.

f. Two Image Operations

Two image operations create a new image from two other images. Three basic kinds of operations can be defined: math operators, masks (discussed in part IIB-(ii), above), and Min/Max operators:

1. Math Operators

The two-image math operators are addition, subtraction, and multiplication operators. These matrix operations are well-known and require no further explanation.

2. Min/Max Operators

A min/max operator is an operator that creates a new image by selecting a dominant pixel from one of two images based upon a set of criteria. One criteria can be to choose for each pixel the intensity from the image with the highest intensity at that location. Another is to select the lowest intensity pixel. More complex criteria can also be defined utilizing information contained in the neighborhood for the target pixel. The operators are implemented by directives 1021 and 1022, listed in Appendix A. The max operator is especially useful for merging images during Marks scoring, as will be discussed below.

It will of course be appreciated that the above described image processing functions may be varied or implemented in numerous ways and that, as noted above, the list is not intended to be exclusive, although the list presented in Appendix A does in fact represent the present best mode for implementing the invention. Also, it should be noted that several image processing functions, such as histogram equalization, are first described in the following section on scoring.

C. Scoring

After processing the original target images under various lighting conditions, a series of processed image "windows" results. Essentially, the first part of the grading process is to "cascade" the original target images through these "windows" where they are processed. The processed images in the windows may then be measured, compared with corresponding references images, transformed into histograms, or otherwise analyzed to obtain "scores" for the parameters represented by the windows in question. The scoring process results in "metrics" defined during the interactive script creation process.

In some cases, images taken under different lighting conditions are desirably merged using the Image Comparison directive b 1021 for combining pixels of multiple input images. For example, the strike sub-grade is developed using different processed image windows than is the marks sub-grade. After all of the sub-grades have been determined, they are combined into a final grade for the coin, which can then be stored together with individual scores for the coins in order to enable subsequent viewers to retrieve an image of the coin, together with its grade, and also to analyze why the coin was graded as it was.

The following concepts will be discussed in this section: First, in part (i), basic pixel counting options are discussed because pixel counting is the basis for all scoring. Advantageously, the counted pixels may be arranged into histograms for further analysis, and thus histogram operations are discussed in a sub-section of part (i). Also discussed in part (i) is the concept of "object comparison," in which the computer runs a program to accomplish what any human does instantaneously—identify identical features even when they are not absolutely precisely aligned.

In part (ii), one particular approach to grading is discussed. This approach has been found to be most effective in connection with a particular exemplary grading context, although it will be appreciated that the general concepts of "luster band" and the classification of marks according to psychological impact, i.e., the classification of marks according to type and location, severity, visibility, and the psychological impact of the background brightness in the region of the mark, will find application in numerous other coin grading contexts. One the other hand, it will also be appreciated that the approach described in part (ii) is not to be taken as limiting, and that the above-described script creation system may result in numerous other approaches, depending on the type of coin and the human expert grading method to be duplicated.

(i) Scoring Operations

Once an image has been processed sufficiently, the contents of the processed image must be analyzed and scored. The objective is to come up with a single number for each image which can be used with appropriate weighting factors to define a sub-grade. Since an image is simply an array of numbers ranging from zero to 255, all scoring operations ultimately depend on counting these pixels.

a. Pixel Counting Operators

Two units of measure for the contents of the screen are the total number of pixels that are not black, and its inverse, the total number of pixels that are not white. Another measure is the total of all pixels in the image:

$$T = \sum_{i=1}^{n} \sum_{j=1}^{n} f(i,j)$$

Other basic pixel counting operations include:
1. Average of pixel values:

$$\bar{v} = \frac{1}{n^2} \sum_{i=1}^{n} \sum_{j=1}^{n} f(i,j);$$

2. Average of pixel values for which $f(i,j) \neq 0$;
3. Standard deviation:

$$\sigma = \left[ \frac{1}{n^2} \sum_{i=1}^{n} \sum_{j=1}^{n} (f(i,j) - \bar{v})^2 \right]^{\frac{1}{2}}$$

4. Absolute deviation:

$$\delta = \left[ \frac{1}{n^2} \sum_{i=1}^{n} \sum_{j=1}^{n} |f(i,j) - \bar{v}| \right]^{\frac{1}{2}}$$

These image scoring operators may be applied to any processed image or part of an image, including a regions of interest and the Fourier transform of an image, and are listed in Appendix A under the heading "SCOR Directives".

Figure 11:
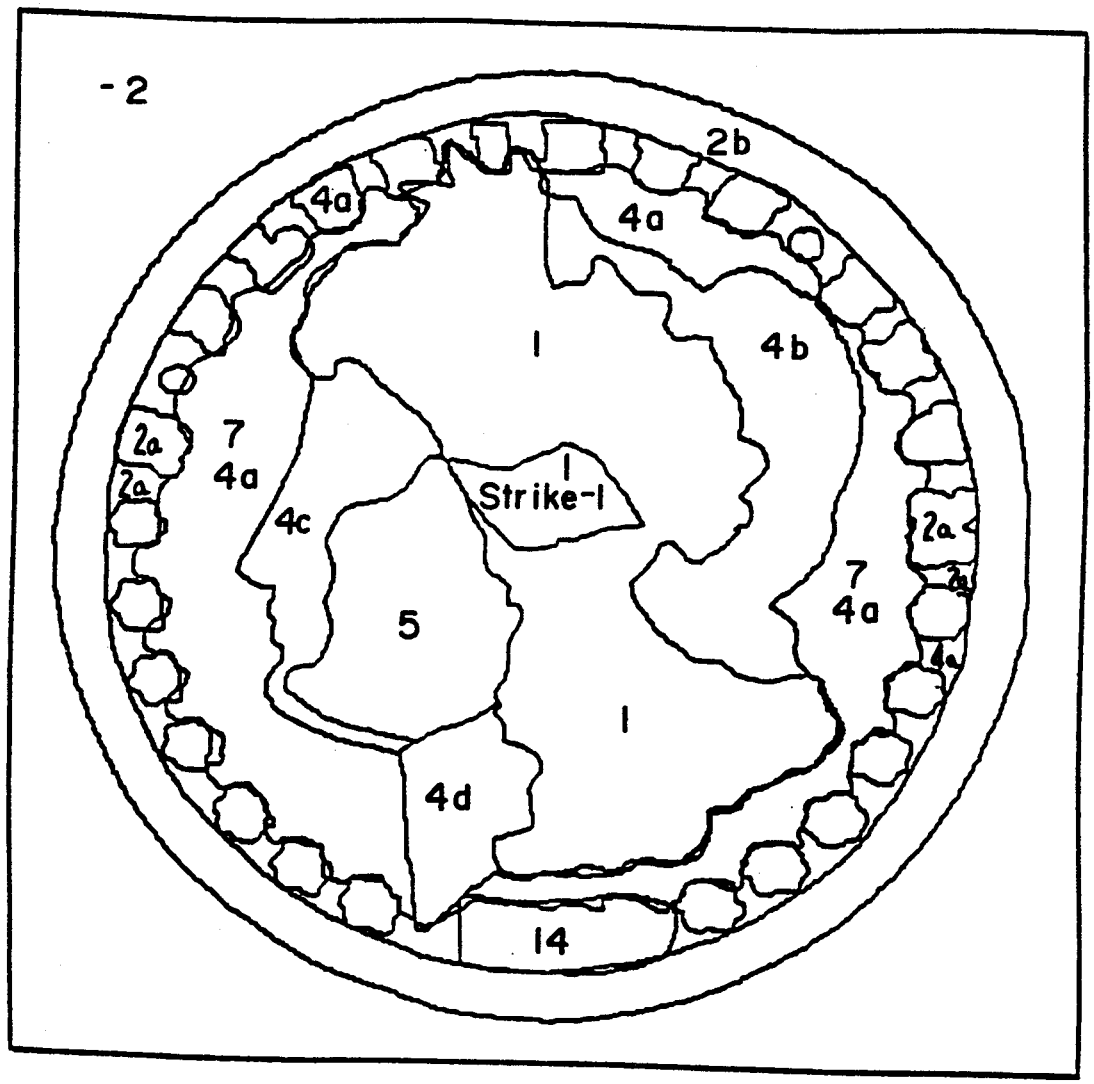
FIG. 11 shows a number of analysis regions for a particular coin.

Pixel counting may occur on a regional basis or in respect to individual artifacts. Through the use of segmentation and classification, certain regions of an image may be identified, generally by using a mask. Exemplary mask definitions for the obverse side of a Morgan silver dollar, determined by experiment during an interactive script creation process, are shown in FIG. 11.

Scores can also be defined which are the result of comparing two images. Two image scoring is an analysis of the differences and similarities of two images particularly with respect to regions and artifacts, as opposed to scoring based on combination of images using a math operator.

Many two image scoring operations are performed by subtracting the single image scores of two images. For example, a reference coin processed image could be scored for a parameter such as total pixel values in the regions, and the same could be performed for the target coin and the results subtracted to define a score. Some two image scoring parameters include:

1. proximity of region centers (center of gravity) (distance in pixels);
2. proximity of artifact centers;
3. area of intersection between regions;
4. area of target image region less area of intersection between regions;
5. image correlation; and
6. Fourier transform correlation.

b. Histograms

A histogram is simply a table, or chart of the frequency or counts with which certain pixel intensities occur in an image. For example, if the value 250 occurs in 1456 locations in the image, then the 250th value in the table (actually 251 because of 0) has a value of 1456. Histogram analysis is well-known in the art of image processing, and numerous analysis techniques other than those described below will undoubtedly occur to those desiring to practice the invention. It is intended that all such variations be included within the scope of the invention. Briefly, histogram analysis involves generating the histogram and determining relevant patterns in the resulting histogram by curve fitting. Histograms may also be used during image processing for the purpose of equalizing or matching images.

1. Histogram Generation and Curve Fitting

The computerized coin grading system has the ability to both generate and display histograms using the HIST directive or directly via the pull down menus. The total of all of the values in the histogram must be equal to the number of pixels in the image, i.e, $$\sum_{v} h(v) = n^2$$

The histogram generation function is carried out by directive 1128, "HIST, nScrn, GEN", listed in Appendix A.

It is useful in some instances to normalize the histogram to 1 by dividing both sides of the above equation by $n^2$. The result is that the normalized histogram H(g) defined by $$H(v) = \frac{h(v)}{n^2}$$

identifies the probability that a pixel with a certain intensity will be found. This is commonly referred to as the "chi squared" value of the histogram.

Other useful histogram functions include those carried out via directives 1129 and 1130, "HIST, nScrn, PIN" and "HIST, nScrn, NPIN," which "pin" the histogram by excluding extreme values such as black areas resulting from a Mask operation.

The first step in characterizing histograms is to find a smooth function which accurately tracks the essential information but does not fluctuate as a result of the natural noise of the data. The preferred method of curve fitting is the polynomial equation fit. Other classes of fits are exponential equations, power series, and the Fourier series.

In order to implement a polynomial equation fit, a polynomial equation of the following form is designed and the computer solves for the optimum set of coefficients which minimize the square of the error between the resulting curve fit and the original data. A polynomial has the form $$Y = Y_0 + A_1 X + A_2 X^2 + A_3 X^3 + \ldots + A_n X^n$$

and thus the goal of the process is to find the values $A_0$, $A_1$, $A_2$, $A_3$, and $A_n$ which minimize the difference between the curve and the original data. In choosing a value for the power of the polynomial, n, the process constrains the number of times the function can change directions resulting in a smoothing of the information. By experiment, it has been determined that a 15 degree polynomial, i.e., N=15, is optimal for purposes of the preferred system. High degree polynomials attempt to follow the randomness of the data to too great an extent, while lower values do not keep up with the basic form of the histogram.

Figure 12A:
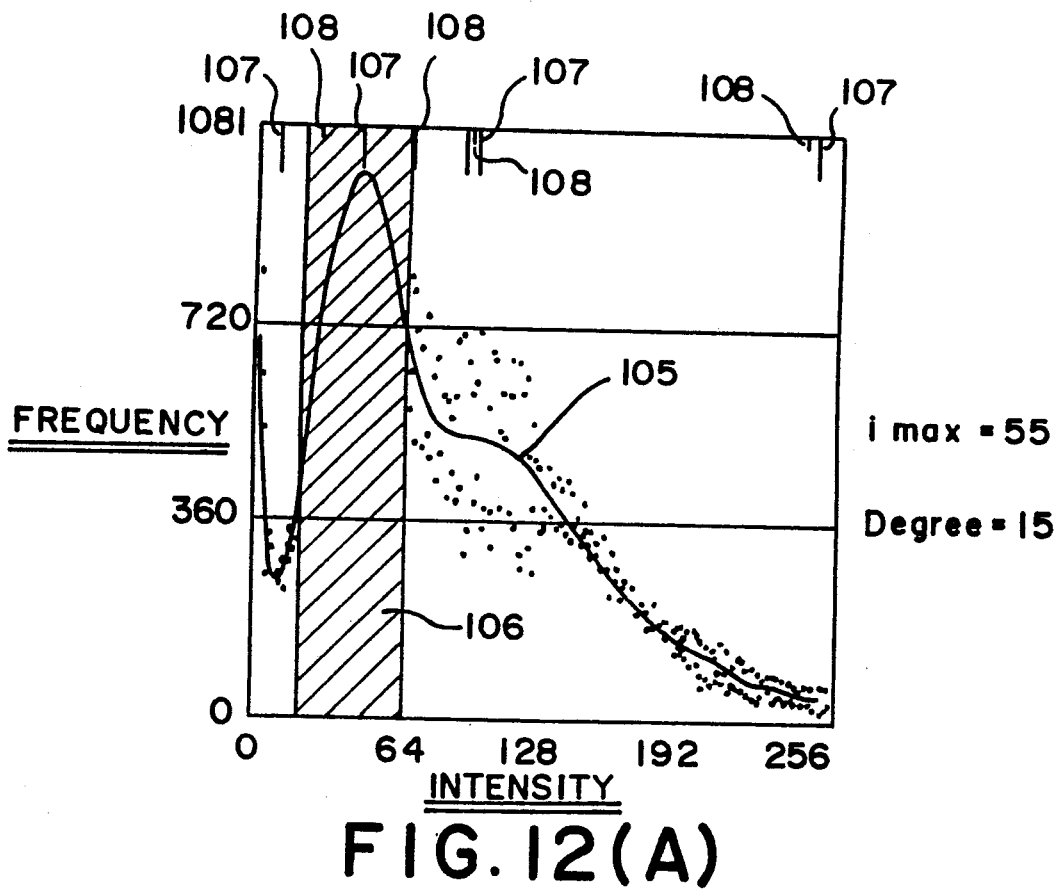
FIGS. 12(A)-(B) illustrate a histogram of a noisy image and the 15th degree polynomial fit of the histogram along with other informative markings.
Figure 12B:
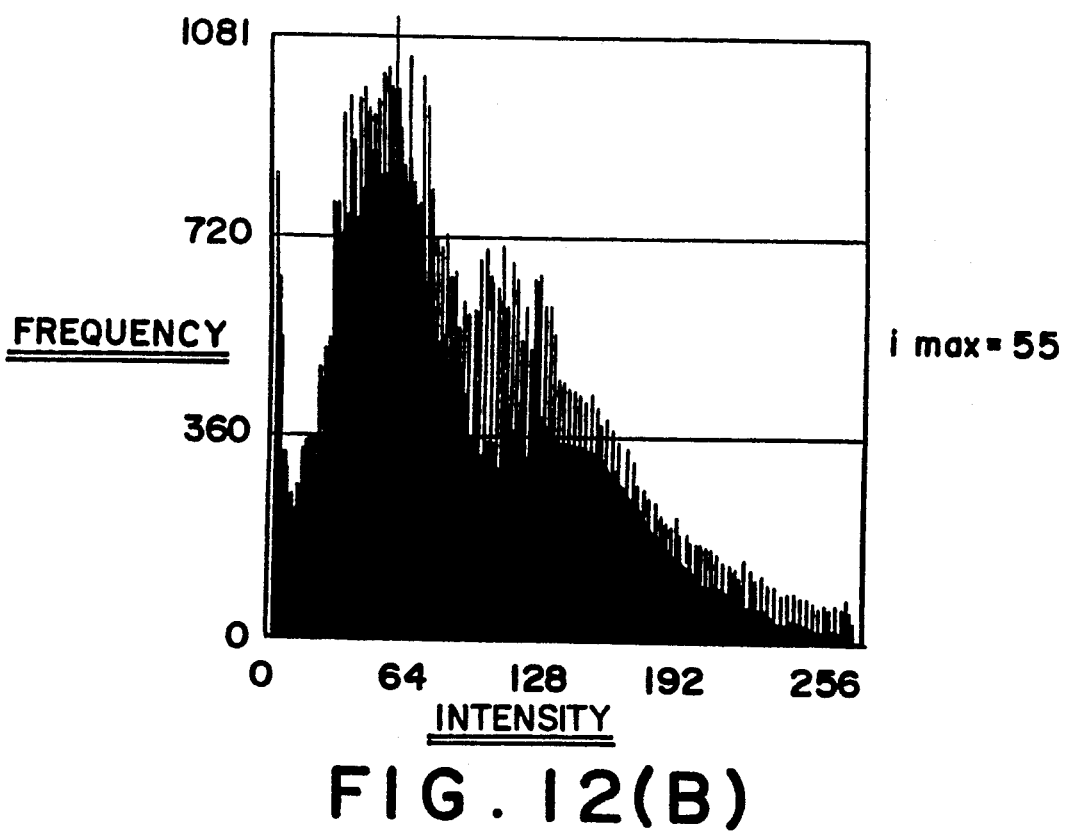

FIGS. 12A and 12B show the results of this task. For best effect, both sets of data should be viewed simultaneously. FIG. 12B is a standard histogram of pixel frequency versus intensity. FIG. 12A shows the histogram fit plot for that same histogram. The dots on the fit plot are the tops of the bars of the standard histogram. Curve 105 is the 15th degree polynomial that best fits these points. The Gray region 106 is the major region of the maximum peak which dominates the characterizations to be described later. On top of the fit plot are a set of long and short lines. The long lines 107 are at the location of peaks and valleys of the fitted curve. The short lines 108 are at inflection points, i.e., at points where the second derivative of the curve equals zero.

In order to achieve a more relevant fitted curve in some instances, the preferred system includes the functions carried out by directives 1129 and 1130 which "pin" the histogram by excluding extreme values unlikely to contribute meaningfully to the results of the analysis.

After normalization, pinning if necessary, curve fitting and other histogram processing operations, histogram analysis may be performed by such well-known techniques as computing the first and second derivatives of this equation, solving for the roots of these equations, to determine the function minima, maxima, and inflection points, and then using this information to characterize the function.

2. Histogram Matching and Equation

A powerful image matching technique utilizes the histograms of two images to define an adjustment of the Gray Scale of one of the images.

If the reference image has a histogram H(r(i,j)) and the target coin image has a histogram H(f(i,j)), then the target coin image may be transformed via a transformation T such that H(T(f(i,j)))=H(r(i,j)). This can be accomplished through the use of the cumulative histogram function, C, carried out by directive 1126 and defined by the formula $$C(V) = \sum_0^V H(f(i,j))$$

where V is the range of pixel values, in the preferred embodiment 0-255. In the case where $C(0)=0$ and $C(1)=(V2+1)^2$, generally $256^2$ or 65536, then C(V) represents the number of pixels with an intensity less than or equal to V. The resulting algorithm effects a transformation T/F(i,j) such that at every point, C(V) for the image f(i,j)=C($\phi$) for the reference image r(i,j). This will result in equal histograms for the images as well.

An important special case of histogram matching is histogram equalization, in which the objective is to cause H(f(i,j)) to be a constant, that is, to present an equal number of pixels in each Gray level. The above cumulative function algorithm may be utilized with C(V) defined as a linear ramp from 0 to $(V2+1)^2$.

The following is a list of twenty four preferred histogram analysis "metrics." By using one or more of these metrics it is possible to accurately identify, for example, a histogram for an artificially toned coin as having a rapid fall in the right side of the main peak. The first nineteen values characterize a main peak while the last few values characterize a secondary peak. Detailed explanations and specific algorithms for implementing these metrics have been omitted in the interest of brevity, but the metrics will nevertheless be familiar to those skilled in the fields of image analysis and elementary statistics.

1. Height of main peak
2. Location of main peak
3. Location of left valley of main peak
4. Location of right valley of main peak
5. Location of left sigma of main peak
6. Location of right sigma of main peak
7. Width of left valley to peak of main peak
8. Width of right valley to peak of main peak
9. Width of valley to valley of main peak
10. Width of left sigma to peak of main peak
11. Width of right sigma to peak of main peak
12. Width of left sigma to right sigma of main peak
13. Area of valley to valley of main peak
14. Fatness of main peak: 0.68*[13]/[1]
15. Relative sigma area of main peak: 0.68*[13]/([1]*[12])(non-dimensional)
16. Left steepness ([1]−[5]/([2]−[5])
17. Right steepness ([1]−[6]/([6]−[2])
18. Skewness valley to valley (8)/[7])
19. Skewness sigma to sigma ([11]/[10])
20. Number of peaks 21. Height of second peak
22. Location of second peak
23. Two peak ratio ([1]/[20])
24. Peak distance (ABS([2]-[21]))

The Gray area 106 of the chart is defined as the region surrounding the main peak which encloses 68% of the area of the main peak. The region is symmetric, i.e., equal on each side of the peak unless the curve is so shaped that the valley occurs before a symmetric Gray area is possible, in which case the remainder of the Gray area is taken from the other side of the peak. This region is defined as the 1.0 sigma region of the histogram.

Finally, a "draw large histogram" option permits the histogram to be plotted larger than in the default chart when additional details are being measured. The set histogram max. option permits the operator to establish the peak value for all subsequent histogram plots so that they all share the same scale factor.

c. The Object Comparison Method

When a human compares two coins, and when a professional grader compares the coins in his memory with a target coin, the mind goes back and forth between the two coins, identifying features on one and then comparing those features with corresponding features on the other coin. The precise location of the feature is not as important as the existence of a feature in the general area at issue. The object comparison method performs such a feature or object comparison.

The object comparison method acts somewhat like an image subtraction, except that the precise location of objects is not a factor. In an image subtraction, an x in one coin would be subtracted from an x in another coin and, in general, both x's would be present in the resulting image because the x's would not be precisely at the same locations. This is true even if the coins are exactly equally struck and positioned to within ½ pixel, in which case the left side of the x on one coin and the right side of the x on the other would still be present in the final image. In reality, what the eye would do would be to see the x in each coin and to dismiss that feature as not different because of its shape and general proximity. The object comparison method duplicates this function by matching all objects in the reference and target images which have the same size, shape, and general proximity.

The method has two input screens, five parameters as inputs, and a new screen as output. The parameters, which must be experimentally determined, control the size and degree of "sameness" of detected features necessary to cause them to be judged as identical. Generally, the input to the method consists of two-edge detection images, and the output consists of edges that should not be there. One of the input parameters is the "imperfect reference" flag. When this flag is set, it indicates that the reference coin is not perfect and that flaws in that coin should be ignored when they do not also exist in the target coin. This works well as long as the imperfect coin is relatively mark free.

A typical coin in the range of MS 63 has been found to have at least 39,235 features that must be compared with corresponding features on the reference coin. Because of the size of this number, it is useful to store reference data after analyzing the reference coin in great detail in the form of a "pseudo-image" which can be used to speed up production analysis time. The initial reference pre-processing is done only once and not as a part of grading, and the resulting "pseudo-image" is stored in the reference data base.

The object comparison method is also useful for eliminating the effect of the luster band, discussed in further detail below. The luster band is a bright region caused by the lights which moves with the lights and generally runs perpendicular to the direction of the light. Attempting to define a perfect coin as one which has no variation in certain regions is to ignore the luster bands which in turn causes these bands to be interpreted as scratches. The object comparison method treats the luster band as a feature or landmark to be involved in the comparison. This approach also takes into account lighting dependencies caused by reflection which move depending on the light angle.

(ii) Marks a. General Approach

Marks on the obverse and on the reverse of the coin are computed in five phases: the analysis of marks in "low frequency" regions of the coin; the analysis of marks in the "high frequency" regions of the coin; the analysis of planchets and carbon spots; measurement and categorization of these marks resulting in a final marks metric for each side; and finally a merging of the obverse and reverse marks sub-grades to result in a final marks sub-grade which becomes a component in the final marks synthesis process.

The "low frequency" regions of a side of a coin are those regions in which the background is changing slowly. For example, on the obverse side of a Morgan silver dollar, the low frequency regions would be the field outside of the head, the cheek and the neck. The other regions of the coin have rapidly changing backgrounds which tend to obscure scratches and these are called "high frequency" regions. The designations of low and high frequency are a reference to the values of the Fourier transforms of these regions.

b. Low Frequency Marks Analysis

1. QuickGrade

A first preferred step in scoring the marks in the low frequency region is to compute an initial estimate of the marks grade, called the QuickGrade. This method is based upon the statistical probability that the number of flaws found under one vertical light will be consistent with the number that will be revealed under other lights. In the case of silver dollars, this is a reasonable assumption yielding a correlation with marks grading of 78% (as opposed to a 93% correlation with the final method), as indicated by the QG4Metric chart (in Appendix B), to be explained in greater detail below.

The QG4Metric results in the calculation of a "Mood" flag which is a combination of a number of aspects of the coin, including the luster, the QuickGrade, the roughness of the texture, and other elements. The calculation is called the "Mood" because it simulates the immediate psychological reaction of the grader to a coin, which in turn affects his approach to the coin.

2. The Variable Iris Method

Once this initial phase is completed, the system then begins an intensive analysis of the marks in the flow frequency regions, using the FindScratches operator. The objective of this phase is to create from the multiple images of the coin a single image which integrates the effect of the marks as viewed from the multiple lighting angles. This is a simulation of the process a human grader goes through as he spins the coin under a single light observing the flaws and constructs a mental image of the total flaws in the coin. Although various gradient convolutions may be used to find subtle variances in the location and extend of a scratch, which the FindScratches operator does not, the FindScratches (FS) operator is preferred because it ignores those subtle variances that a human will also naturally ignore.

Initially, a frequency segregation mask is used to break the image into two regions: the low and high frequency regions. The reason for this mask is to take into account the physiological process of the human eye as it approaches a boundary between a bright and a dark region, or a simple or complex region. Again, the object is to simulate the human system so that in this case flaws near the boundary of a region are discerned accurately and are not affected by the disparate lighting in the adjacent region.

The FIND option takes an input image along with a frequency segregation mask and generates two distinct images: a bright flaws image and a dark flaws image. A human treats bright and dark flaws differently and at a different level, which is the reason for segregation during this phase. The input arguments for the FIND option include the size of an "iris" region, and respective thresholds for bright and dark flaws. The identification of flaws by thresholding within a region of variable size depending on its brightness is known as the "variable iris method."

The "iris" size is the measure of the region around any particular pixel that contributes to the perception of a flaw, and thus the term "iris" is a reference to a similarity to the human visual system in that the "iris" opens and closes in response to the brightness of the object being observed. Generally, it has been found that an iris size of 11 pixels gives the best results in correlation to human graders.

In its simplest form, the FIND option first generates an image in which every pixel defines the size of the "iris" at that location by defining the average brightness of the 11×11 region surrounding the pixel. This is essentially a fuzzing operation which is modified by special actions based upon the segregation mask to prevent averaging across distinct regions. The option then performs two reference subtractions: the input image less the iris image to result in a bright flaws image (FS) and the iris image less the input image to result in the dark flaws image (DFS).

The global low frequency marks analysis method performs this FindScratches operation on each of the marks analysis images under lights which are located in a "cone of illumination," which simulates the lighting angles which graders produce as they spin the coin under a stationary light.

3. Subtraction of Pseudo-Images

For each of these bright and dark flaws images, the system now performs the image equivalent of a noise reduction operation by subtracting a "pseudo-image" from each of the images. The noise that is being eliminated in this case is the random variations that result between any two otherwise identical image capture operations because of the variations in lighting and camera function from moment to moment due to the fact that these are AC processes. The pseudo-image is obtained by performing experiments designed to determine the optimum values which retain the significant portions of the image information while eliminating background noise. These values vary as a function of the Fourier frequency of each region of the coin. The pseudo-image is therefore an image in which each pixel is set to the value of signal reduction best suited to the pixel or region under analysis. A total image may then be computed by adding together the entire set of bright and dark flaws images after reducing their brightness by the amount of noise reduction provided by the pseudo-image. The resulting two images are called the total FS and total DFS images.

This method solves the problem of luster bands. Using only a single light, the bright reflection from the light that appears across the coin would become a serious impediment to marks analysis for a variety of reasons. For example, the luster band appears as a line of demarcation in an otherwise relatively smooth field and the change in intensity could be treated as an "edge" and thus as a flaw, which it is not. Also, the luster band will tend to overamplify small marks, causing them to appear more serious than they really are. To solve this problem, an accelerated approach similar to a 21 by 21 morphology is performed that defines the region containing and surrounding the bright luster band. Then the signal, the total FS image, is reduced in strength by a variable factor inversely proportional to the Fourier frequency of each region.

As a result of the actual method utilized, as described above, the luster bands are automatically eliminated from the marks images by virtue of their signal reduction and their transience, i.e., by virtue of the fact that as the lights are changed the location of the luster band moves. The combination of the noise reduction, the luster region signal reduction, and the accumulation of information from multiple lighting sources, followed by a thresholding operation, permits the luster band to be automatically eliminated, which is an accurate simulation of the human process of integrating the images seen while spinning the coin.

Another inherent property of this method is that the visibility and severity of marks significantly contributes to the final scoring of each mark. The visibility refers to the ability of a mark to be seen under various lighting angles. A mark that can only be seen from one angle is not considered by graders to be as significant as marks that are visible from various angles. Similarly, the severity of a mark is the relative brightness or darkness of the flaw with respect to the background. Thus a mark that is visible from multiple angles and which is very bright in each of the angles will be given far greater weight than the simple flaw seen only once.

The specific values which are computed are a function of the type of coin under analysis. For a Morgan silver dollar, the preferred embodiment separates the low frequency information into two regions, the cheek/neck region and the field, because of their Fourier frequencies. Then a set of five total FS images for the cheek and four total FS images for the field are accumulated each based upon a series of different signal reduction stamps. Each of these images is analyzed in the cheek, neck, and field regions by thresholding the information at various levels, resulting in a total of 22 metrics which are measures of the psychological impact of flaws taking into account the size, visibility, and severity of various classes of flaws.

Figure 13:
FIG. 13 shows a window displaying in black the luster band mask of the coin shown in FIG. 8.
Figure 14:
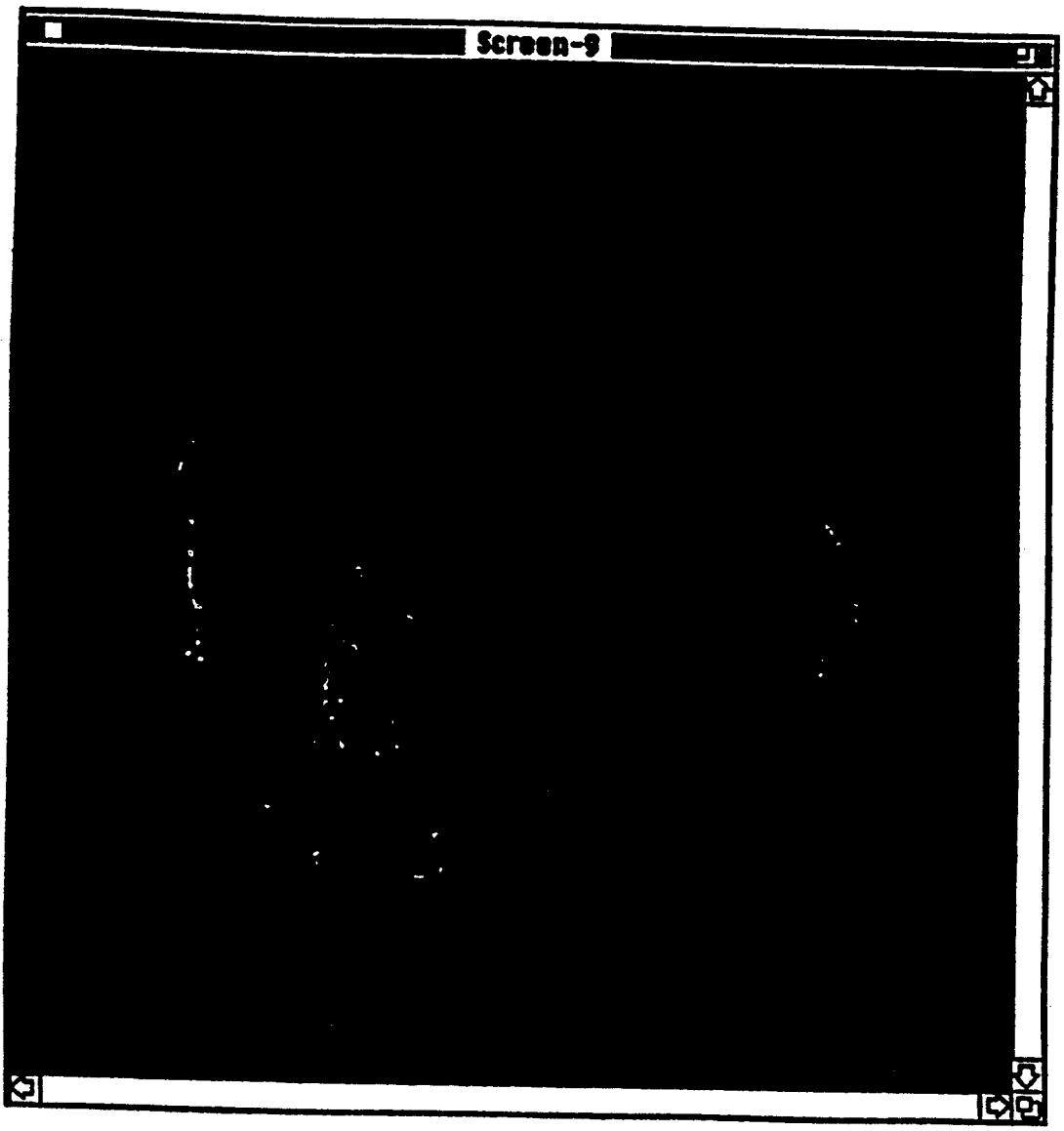
FIG. 14 shows a window displaying serious flaws found in the low frequency region of the coin shown in FIG. 8 with the coin itself shown subdued to aid to positioning the flaws.

FIG. 13 shows the luster band region in black associated with the image shown in FIG. 8. This is the region, for this particular coin, within which the low frequency information will be reduced in magnitude. FIG. 14 shows the identification of serious flaws from the image in FIG. 8 in the low frequency region under a single light. This information is not used directly but, as was detailed in this section, is merged with information from other images as modified by the luster information to result in a set of nine images containing continuous representations of the flaws in the coin.

c. High frequency marks analysis

The analysis of the marks in the high frequency regions is somewhat different than that described for the low frequency regions because the background in the high frequency regions tends to hide marks. The high frequency marks analysis method therefore utilizes a detailed comparison of the reference coin against the target coin to identify high frequency events that are not paired. The analysis utilizes the object comparison method by comparing the "pops" found in the reference image at a reference threshold against the pops found in the target image at a slightly lower threshold. "Pops" in this case are high intensity marks found using the previously described Find Scratches method. A pop can be a simple point of impact on the coin or it can be a scratch going across the coin. The Find Scratches images computed during low frequency analysis are stored on disk to improve performance of this phase. These images are then analyzed in the complementary regions analyzed previously.

The object comparison method, described above, is similar to a subtraction of two images with the additional feature that "objects" are recognized and permitted to eliminate each other when they are only approximately aligned. The need for this comes from two facts: 1.) the target coin will not in general be precisely aligned with the reference coin but can be a few pixels offset in both translation and rotation; and 2.) coins of different years and even coins from the same year and different mints can have slightly offset features. Consequently, permitting object identification greatly simplifies and reduces the size of the reference data base to be applied to each coin. The slight difference in threshold for the reference and target coins acts to prevent small variations in the intensity of true objects in the vicinity of the threshold value on the reference coin from falling below the corresponding value on the target coin and thereby cause the variations to be considered as a difference which would be scored as a "pop."

The relevant reference images for object comparison are computed during system development, stored in a reference data base, and are the result of averaging of a great many images, taken under different lighting conditions, of coins of the same type as the coin being processed. The results of the above object comparison under the first lighting condition are merged with the results for the second condition, and so forth, to finally create a single image of the total flaws in the high frequency regions for comparison with a corresponding reference image.

When the flaws have thus been identified in the high frequency regions of the coin, each of these regions is then scored to obtain individual metrics. Again, for the Morgan, these regions include the front of the face, the fine hair, the long hair, the crown, the hat, the date, the letters and stars, and the rim. An additional metric is also stored for long scratches found in the fine hair.

d. Planchets and carbon spots

Some coins contain dark or bright spots which are caused by flaws in the original planchet. These are not marks in the above described sense and, therefore, need to be separately identified. The method used is to first compute an image which is the average of all of the images of the coin. In general, such an image will tend toward a uniform gray value of 128. An exception is planchets and carbon spots which tend to be dark or bright under all illumination and therefore appear as isolated dark or bright regions in the total average image.

To identify and score the planchets and carbon spots, the total average image is processed using the previously described Find Scratches algorithm, followed by a thresholding operation on the result and its negative image. Any flaws found using this method are then identified and scored by region for later inclusion in the eye appeal subgrade. Confirmation of planchets and carbon spots is then performed by testing the identified locations against the final strike relief image. A property of the strike relief image to be described later is that such spots are not a part of that image.

F. Definition of a Marks Metric and Marks Sub-Grade

Once the above-described calculations have been completed, the system utilizes the information so gathered to define a marks metric and then the marks subgrade for a side of the coin. The calculation of this metric is based upon a series of exhaustive tests which have been shown to identify with a high degree of statistical confidence the complex and essentially subliminal means used by human graders.

During the previous phases of analysis, the system has already computed a set of metrics based upon various characteristics of the identified flaws. Next, the system begins to merge this information into a single marks metric. During a series of off-line experiments, it has been shown that the 22 metrics associated with the low frequency marks analysis have, in general, a quadratic relationship against the subjective marks subgrade. One can combine similarly formed metrics into a single metric by combining the first function with a reflection of the second, resulting in a linear function. As a result, one can utilize a known class of operations called Stepwise Linear Regression, SLR, to combine the metrics into a single metric using a linear equation of the form:

$$TotalMetric = k1*m1 + k2*m2 + k3*m3 + \ldots + Kn*nm$$

which over a large number of experiments maximizes the correlation of the resulting function with the subjective marks subgrades for those coins. The result is a set of weights, k1 to k22, which are then used with the metrics derived from the target coin to obtain a single marks metric for that coin. Thus, the proper relationship between, for example, severe highly visible marks in the cheek and faint but long marks in the field are properly taken into account.

It has also been found that the luster of the coin significantly affects the perception of marks and, as a result, a 23rd metric, luster, is also combined with the 22 marks metrics to define the final low frequency marks metric. Essentially, this step is used to simulate the effect of the luster of the coin on the human grader's perception of the marks. On a coin with very little luster, more marks will be immediately visible to the grader, while a coin with extraordinary luster will be so bright as to hide many of the marks. This phenomenon appears to be more psychological than physiological, but nevertheless is acknowledged by the graders and must be taken into account.

Next, the impact of the marks on "eye appeal" is calculated by comparing the number of flaws, and pops found in the coin by region against a table of limits. As the totality of flaws in a region approaches these limits, an "eye appeal" penalty is applied in stages consistent with statistically determined grader practices. A final set of penalties is then applied for planchets and carbons spots computed earlier.

This final marks metric is used as the input against a table which defines the functional relationship between this metric and the marks sub-grade. The marks sub-grade is then tested against a set of requirements which take into account unique combinations of events. For example, even though a coin may have received a relatively high marks sub-grade based upon the total flaws identified and scored, a non-uniform distribution of flaws, for example, lots of flaws in the cheek and virtually no flaws in the field, would prevent the setting of a high grade. These are called "necessary conditions" which also play an important role in establishing the final grade of the coin.

The obverse and reverse marks sub-grades are finally merged into a single final marks sub-grade in the final grade synthesis phase of the system. In general, most of the final sub-grades are computed using what is called obverse dominant methods. This means that if the obverse marks sub-grade is lower than the reverse marks sub-grade, the final marks sub-grade is equal to the obverse value. This is based upon standard grading practices and takes into account the fact that in the vast majority of coins, the obverse is generally more closely observed, and generally has more marks. When the obverse has a high marks sub-grade, then the final marks sub-grade is calculated as a weighted average with the obverse receiving a 1.25 weighting factor and the reverse a 1.0 factor. Again, a set of "necessary conditions" are applied to ensure that unique situations are taken into account, such as high density of flaws in the center of the coin. Different weights can be defined for any particular type of coin. Computational efficiencies can also be utilized by computing the QuickGrade of the reverse and, if it is more than a specified amount greater than the obverse final marks subgrade, skipping the detailed reverse marks analysis as it will have no effect on the final grade.

The final grade also used a dominant method in that the final grade is dominated by the final marks sub-grade. The actual set of expert based rules used to define the final grade starts with the final marks sub-grade and then applies a large set of rules based upon the final sub-grades for strike, luster, mirror, cameo, eye appeal, toning, and color, as discussed below.

(iii) Strike Analysis Method

A generalized method for measuring the strike of any object has been developed and is described in the following paragraphs.

Given an object, such as a coin, under the camera, a first relief image is generated by capturing an image of the object under two opposite lighting conditions, the lights being located at a relatively low angle, approximately 15° to the horizontal and on opposite sides of the object. These two images are then combined using the image comparison directive of SCRN, ICOM, which performs a pixel by pixel comparison in which each pixel P(i,j) in a first relief image is set to equal $$P(i,j) = 128 + [R(i,j) - S(i,j)]$$

where R and S are the two input images.

A second relief image is then generated by again capturing two more images of the object using two more lights similar to the first but located 90° from the first lights by a rotation about the vertical camera axis. These two images are relief images of the strike of the coin as defined from two orthogonal directions. These two images are then combined into a single image using the image minimum operation, IMIN. The image is then sharpened using the Fast Sharp Diagonal Signed directive, FSDS. Depending on the application, the loop-up table of that image can also be modified by effecting a scaling operation, SCAL, in which a linear ramp look-up table transformation is applied starting and ending an equal distance from 128, and starting at a location at which the cumulative histogram reaches a certain percent of maximum. Before performing the above operations, the initial images are adjusted using a logarithmic LUT modification if the image is dark, indicating toning. The logarithmic factor, K, is itself a quadratic function such that $K = (18-T)**2$ where T is the percent of brightness of the coin as seen under lighting condition 41, a low angle relief light.

The result is a highly effective image for measuring strike in any coin and is particularly effective in that the method looks through toning and results in a consistent definition of strike independent of the toning quality of the coin. In addition, the method ignores scratches, carbon spots, and planchets which, without this method, can tend to improperly increase the strike calculations.

The final relief image from this method is then utilized in combination with a variety of scoring operations to result in a final strike metric which is correlated to the human strike scale using a non-linear function to define the final strike sub-grade.

(iv) Mirror Analysis Method

The calculation of the mirror, or proof-like, quality of the coin is based upon an analysis of the way in which light reflects from the field region of the coin. Using an analogy with an actual mirror, a perfect mirror will reflect all of the light from a particular light through the well-know law that the angle of reflection is equal to the angle of incidence. If the incident angle is in the "cone of illumination" mentioned earlier, then little of the light from that illumination will reach the camera. However, as the degree of mirror decreases, more and more of the light will be scattered from the surface into the camera. Thus, there is an inverse relationship between the quality of the mirror and the brightness of the observed image in the field.

In the preferred embodiment of the system, the maximum image intensities from all images are combined into a single image which is then measured at a particular threshold level, resulting in a metric for "mirror." This metric is then interpolated using a piecewise linear inverse function to obtain the mirror value. By correlation with human graders, a mirror value less than 2.195 is defined as no mirror, 2.195 to 3.188 is called "PL", 3.188 to 4.4 is called "DMPL", and a new designation of "XDMPL" has been given to those coins exhibiting a mirror from 4.4 to 5.5.

(v) Luster Analysis Method

Luster is an important yet relatively subtle quality of a coin which relates to the psychological impact of the coin on the observer based upon the quality, intensity, and uniformity of the reflected light. The quality of the reflected light is effected by the finish of the coin as well as by artificial means such as cleaning; the intensity of the light measures the amount of light reflected from various parts of the coin including the "cartwheel" of the luster band as seen when rotating the coin; and the uniformity of the reflected light takes into account such factors as the "creaminess" of the coin. These aspects have various other names such as "fire" and "flash", and the negative aspects of "smooze" and "dull". Toning is a related but separate quality.

Before measuring the individual luster metrics, the relevant images are adjusted as has been previously described in the section on mirror to account for the effect of darkness due to toning. A set of six metrics is then measured as described below:

The first metric to be measured is designated H2L7FldX, the location of the peak of the histogram of the field of the brightness adjusted image under a lighting condition "7."

The second metric, RfL7Seg is the roughness of the low frequency region, cheek, neck and field, of the original images under lighting condition 7. The roughness is defined as the sum of the differences of adjacent pixels in both the vertical and horizontal directions within the defined region.

The next metric is PctL12CamX, the percent of the total intensity with respect to pure white of the pixels within the cameo region of the maximum of all nine brightness adjusted images.

The fourth metric, H5L2FC is the height of a rectangular area having the same area of the principal peak of the histogram of the image under a second lighting condition for the full coin.

The metric H7L5SegX gives the location of the "center of gravity" of the histogram of the brightness adjusted image under lighting condition 5 within the low frequency region.

CrmL11SegX is the creaminess of the luster as defined by the ratio of the width of the principal peak to the roughness within the low frequency region of the maximum of the lights within the cone of illumination based upon the brightness adjusted images.

Using the results of hundreds of experiments performed during script development and based upon SLR mathematics applied with the constraint of only positive weights, a set of weights is determined which is then used during coin grading to generate the luster metric. This metric is then used in an interpolation function which determines the obverse and reverse luster subgrades.

(vi) Circulated Analysis

The analysis of coins is broken into two major categories: circulated and uncirculated, also called Mint State or MS coins. A circulated segregation metric is measured early in the grading process which is called PWL11Th180Cam, is the percent of white pixels when the maximum of all of the lights in the cone of illumination is combined with a cutoff threshold at 180 within the cameo region. Essentially, this measures the amount of removal of luster from the high points of the coin. A coin for which this metric is less than 20 has had sufficient degradation of the luster to be classified as circulated.

Once a coin has been designated as circulated, a totally different approach is used to define the final grade. In this case, the final grade is based upon the degree of detail remaining in the coin as defined principally by the metric C2FS9TH9 which is essentially a measure of the detail within the high points of the coin as shown in the relief images. This metric is then interpolated using a three segment piecewise linear function in which the grade is proportional to the metric, i.e., the higher the detail, the higher the circulated grade.

(vii) Toning Analysis

Toning is probably the most subjective aspect of coin grading. Color is utilized in the preferred embodiment of the system to measure toning. During image capture, an image of the Red, Green and Blue content of the coin under three simultaneous lights is stored in a compressed format. The three lights are used to permit the system to loop deep into toning. While this tends to overexpose non-toned coins, such coins are not subject to color analysis. During analysis, the three color components are combined to obtain a 24-bit color definition. Then the location by percent of non-silver regions of the coin is constructed and from this a map of the color and the depth of the toning is generated and used in a calculation of the eye appeal effect of this toning. Positive eye appeal is derived from smooth, continuous color along with transitions to various colors with positive appeal. Negative eye appeal is derived from spotty, discontinuous color and toning using negative shades. The nature of these definitions of positive and negative eye appeal are based upon grader input and are subject to evolution over time and therefore the designations for these attributes is located in a special script which can be adjusted as required as a result of new color toning experiences.

(viii) Analysis of Captured Metrics

During the analysis of a coin, every metric that is captured is tested against the experience of the system and against reasonable limitations. If any metric is found to have a value that is somewhat beyond anything that the system has experienced before, that metric is flagged in the output results file. When a coin with such a designation is graded, the result is fed back to the system so that this event will help the system grow in experience.

If a metric is computed that is significantly beyond limits designated for reasonableness, this metric is also flagged on output indicating that something may be wrong with this coin or with the system that requires human intervention. In this case, the coin is separately graded by a set of humans and again the result is fed back to the system to correct or adjust the techniques as required.

Another class of metric flagging is the case of a metric between two values for which there is a significant change in methodologies. For example, the circulated segregation metric segregates a circulated coin from an MS coin but if the metric is very close to the transition point, then this is a coin for which there can be some disagreement as to its MS status. As a result, the metric is flagged so that again the system can learn from the experience to further refine its identification of circulated coins.

D. Grading Script Development (i) Introduction

During the development phase of the scripts, "experiments" are performed on a large number of randomly sampled coins previously and independently graded by a number of experts. These experts provide subgrades for each of the significant components known to effect the grade of a coin. These experts generally agree overall, but there is sometimes significant differences of opinion on some or all of the measures of a coin.

To define the objective for the computing system for each subgrade first involves an analysis of the human grader correlations and eventually the construction of a set of "right" or "target" answers generally based on a weighted averaging of the human measures. This then results in a target for the system as well as a definition for a Turing test. The Turing test is named for the mathematician and pioneer in artificial intelligence, Alan Turing. In this case, acceptable computer performance is defined as that point when the correlation of the computer to the target results is as good or better than the average correlation of any two human graders. That is, if among three graders the correlations of grader 1 to grader 2, of grader 1 to grader 3 and grader 2 to grader 3 are 87%, 86% and 85%, respectively, then the average correlation is 86% and the objective is for the computer to achieve a correlation to the target values of at least 86%. In all cases, the term correlation refers to the sum of the $R^2$ term in a linear regression or least squares regression analysis. 100% refers to total identity of results and 0% to total randomness.

In developing the scripts, a great many "experiments" are performed to test theories and specific factors for each subgrade. One powerful tool is Stepwise Linear Regression, noted above in connection with the Marks Metric, which is often used to develop the precise relative factors between metrics involved in a prediction. In this procedure, Stepwise Linear Regression is used to define the optimum weights between the metrics so as to maximize the correlation value of the prediction to the target values across the entire set of reference coins.

An additional tool used during development is called multi-dimensional optimization, in which a set of parameters used in defining a prediction function are varied in a systematic way so as to maximize the correlation to the target results. This is often performed using a large spreadsheet and programs such as MICROSOFT EXCEL TM, defining in the sheet the methodologies for combining metrics, placing the results of experiments into the sheet, and defining initial values for the parameters. Then these parameters are used to define a table of correlation results as that parameter is varied from one value to another in a series of steps. The parameter is assigned the value within that range that maximizes the correlation, after which the same process is performed for a second such parameter, a third, and so forth. When all the parameters have been modified, the process is repeated as by now the modifications to the other parameters will have had an effect on the optimum value for the first metric, and so forth. This is an implementation of gradient or hill climbing methods and depends upon a reasonable estimate of the starting point, which can be based upon grader experience or upon the results of the method described below.

A preferred method for defining an optimum starting location for multi-dimensional optimization, and for a modest number of variables for the optimum values themselves is a technique using "genetic algorithms." Genetic algorithms emulate the process of biological survival of the fittest in an environment. In this case, survival is defined as good correlation with the human subgrades and the environment is the nature of the simulation defining the subgrades. This method has been used successfully for defining the starting point for multi-dimensional optimization of the high frequency eye appeal limits, and has been used alone for definition of the break points in piecewise linear fits for the subgrade inverse interpolation tables. The genetic algorithms method has also been used to provide weight constraints for stepwise linear regression when it is determined that all of the signs of the weights need to be consistent for the metric to have reasonable predictive interpretations. A combination of the programs WINGZ TM and EVOLVER TM have served in these roles.

In Appendix B, the details of the results of these procedures are shown in connection with the drawing figures as they relate to the precise combination of metrics used to calculate the subgrades for Morgan silver dollars. Different weights and in some case different metrics would be used in the grading of other types of coins. The following sections are included for both the obverse and reverse analyses: Final Grade Synthesis, Marks Quick Grade, Marks Low Frequency Analysis, Marks High Frequency Analysis, Strike, Luster, Mirror, Circulated, Alignment Confirmation, and Color Analysis. Those experienced in the art will appreciate that the exact values of the various constants are likely to evolve somewhat over time as experience with the system brings new insights to the process.

2. Development of Final Metrics

Appendix B includes examples of each of the final subgrade metrics for a Morgan silver dollar and illustrates the manner in which they were obtained.

As an example, the Quick Grade metric shown on pages 12-15 of Appendix B consists of the three metrics C3FsQgCkTh25, C3FsQFldTh21, and C3FsQgFldTh33 combined with a luster computation to give the "Qg4Metric" shown in the first graph on page 1 of Appendix B. The vertical axis of the graph shows marks assigned by the average of expert human graders SC and RH to the marks on the tested coins. The human marks grades are plotted against scores obtained using a proposed Quick Grade metric. At the top of the graph is the correlation $r^2$, in this case 0.78, between the results obtained by the human graders and the results obtained by computing the Quick Grade metric. The second graph on page 1 shows the results after the scores are "pinned" so that the Quick Grade scores correspond to the human scores. In addition to the computed luster, the Quick Grade metric uses the FindScratches operator for the cheek at threshold of 25, the field at a threshold of 21, and the field at a threshold of 33.

The individual metric resulting from the FindScratch results for the cheek at threshold 25, the field of threshold 21, and the field at threshold 33 are shown on pages 2 and 3 of Appendix B. These were combined to obtain the QG4Metric shown on page 1. An optimum interpolation function is shown on page 4, which in turn defines a series of breakpoints, the final Quick Grade being plotted using the optimum interpolation function resulting in a total correlation of 79%.

A similar approach was used for the Low Frequency Marks analysis illustrated on pages 5-20 of Appendix B. It will be noted that the Obverse Marks Metric, designated "23 Metric" in the chart shown on page 5 of Appendix B, results in a correlation of 0.91. Each of the constants briefly described in Appendix B is discussed above, except for the concept of the luster band mask. The luster band mask is created using an image option having the format "SCRN, nScrn, LBM, nBase, nScr, nArgParm" (directive 1025) which generates a "luster band mask" from the image of a coin and has five arguments: baseScreen; scratchScreen; Nsize; th; and kpixel, where baseScreen is the coin image screen; scratchScreen is a screen that can be used for intermediate calculations; Nsize is the size of a rectangular search area around each pixel, where Nsize can be any odd number from 3-51; th is the threshold value for counting lustrous pixels; and kpixel is the number of pixels in the Nsize×Nsize region which must have their values greater than th in order for the center pixel to be set to black. This luster band mask option generates a mask which is black only where there is a sufficient number of pixels in a region which are above a specified brightness. It is used during the Quick Grade option and during the low frequency marks analysis.

The results of the Turning Test for the low frequency calculation of the Obverse Marks Metric is shown on page 8 of Appendix B and the 22 individual metrics for use in comparisons and extreme value verification are shown on page 8-20. The analysis for the remaining metrics is similar and each shown in Appendix B. A table of the meanings of the various metric designations is shown in Appendix C.

At this point, it should be noted that the metrics shown in Appendix B are exemplary only and that, even for generally similar types of coins the method provided by this invention will not necessarily always result in the same metrics, but are by no means exclusive. The methods described above have been refined as a result of extensive experimentation. Because of the complexity of the factors which are used in coin grading, however, further experimentation will be required whenever a new coin grading script is developed.

Appendix B is intended to give insight into the script creation process during which a "problem" is "discovered," and a solution arrived at by both educated guessing and trail and error experimentation. For example, the luster band and mark shape effects were both discovered and solved in this manner. Therefore, it is essential that the invention not be narrowly construed in terms of specific algorithms, but rather as an "approach" which may yield multiple solutions to a specific problem.

Numerous other variations of the invention will undoubtedly occur to those skilled in the art and, therefore, it is intended that the invention not be limited to the specific embodiments disclosed above, but rather that it be defined solely by the appended claims.

APPENDIX A

Directives Formats

{ SCRN Directives }        { field values can be input as -parm }

```
1000 SCRN, nScrn, ALUT                              ApplyOLutToImage;
1001 SCRN, nScrn, AVG , first, last                 AverageImages(first,last:LONG);
1002 SCRN, nScrn, BAND,      , t1, t2               BandPassImage(t1, t2: LONGINT);
1003 SCRN, nScrn, BLOK, nBase, nArgParm             BlockRegion(nBase, 4 Args);
1004 SCRN, nScrn, CAPT                              Capture from camera or from CD, gCapture
1005 SCRN, nScrn, CLR                               ClearImage;
1006 SCRN, nScrn, COCM, nBase,    , nArgParm        CreateObjCompMatrix(nBase,t1,t2,n,nt)
2000 SCRN, nScrn, 4IN1, nBase, n1, n2, n3, n4       Merge 4 images into 4 quadrants
1007 SCRN, nScrn, COM1, nBase                       Compress1(nBase: LONGINT);
1008 SCRN, nScrn, COMP, nBase                       Compress0(nBase: LONGINT);
1009 SCRN, nScrn, COPY, nBase                       CopyImage(nBase: LONGINT);
1010 SCRN, nScrn, ERAS                              EraseImage;
1011 SCRN, nScrn, EXP1, nBase                       Expand1(nBase: LONGINT);
1012 SCRN, nScrn, EXPN, nBase                       Expand0(nBase: LONGINT);
1013 SCRN, nScrn, FACT,      , r, f                 Factor image as p = (p - r)*f
1014 SCRN, nScrn, FETC, coinId, image               FetchRefImage(coinId, image, Doc)
1015 SCRN, nScrn, FIND, nBase, nScr, iris, shutDown FindScratches(nBase,mskScr,nSize,sd)
1017 SCRN, nScrn, FTRN, nBase                       Fourier(nBase: LONGINT);
1018 SCRN, nScrn, GBIS,      , gain, bias           GainBiasImage(gain,bias: EXT);
1019 SCRN, nScrn, IADD, nBase, nAdd                 AddImage(nBase,nAdd: LONGINT);
1020 SCRN, nScrn, ICOM, nBase, nSub                 ImageComparison(nBase, nSub: LONGINT);
1021 SCRN, nScrn, IMAX/IMIN, nBase, nAdd            MaxImage(nBase,nAdd: LONGINT);
1022 SCRN, nScrn, XTRM, nBase, nAdd                 ExtremeImage(nBase,nAdd: LONGINT);
1023 SCRN, nScrn, ISUB, nBase, nSub                 SubtractImage(nBase,nSub: LONG);
1024 SCRN, nScrn, LACE, nBase, nAdd                 Interlace(nBase, nAdd);
1025 SCRN, nScrn, LBM , nBase, nScr, nArgParm       GenLBM:nArgParm=ptr to 4: nin, th, kt, th2
1026 SCRN, nScrn, LOG ,      , const                LogImage(const/255.0: EXTENDED);
1027 SCRN, nScrn, MASD, nBase                       MatchAvgSD(nBase: LONGINT);
1028 SCRN, nScrn, MASK, nBase, nMask                MaskImage(nBase,nMask: LONGINT);
1029 SCRN, nScrn, MAXR, nBase, nScr, nSize          MaxInRegion(nBase, nScratch, nSize);
1030 SCRN, nScrn, NEGA                              NegativeImage;
1031 SCRN, nScrn, OCOM, nBase, nSub, nArgParm       ObjectComparison(nBase,nSub, 5 Args)
                                                    nArgParm=ptr to 5 parms: t1, t2, n, nt, im
1032 SCRN, nScrn, OCUM, nBase, nSub, nArgParm       ObjCompUsingMatrix(nBase,nSub, 6 Args)
                                                    nArgParm=ptr to 6: t1,t2,n,nt,im,matrix
1033 SCRN, nScrn, PLOT                              DrawBackgroundImage;
1034 SCRN, nScrn, RGB                               CaptureRGB;    (3 Screens)
```

```
1035 SCRN, nScrn, ROTA, nBase, xo,yo,theta    RotateImage(nBase,xo,yo,theta);
1036 SCRN, nScrn, RSUB, nBase, nSub           RefSubtract(nBase,nSub,: LONG);
1037 SCRN, nScrn, SADD,        , inc          ScalarAdd(inc: LONGINT);
1038 SCRN, nScrn, SCAL,        , t1,   t2     ScaleImage(t1, t2: LONGINT);
1039 SCRN, nScrn, SDSC                        SDScaleImage;
1040 SCRN, nScrn, SSUB,        , dec          ScalarAdd(-dec: LONGINT);
1041 SCRN, nScrn, STOR, coinId, image         StoreRefImage(coinId, image, Doc, FALSE)
                                              Note, FETC/STOR coinId of 0 yields gCoinId
1042 SCRN, nScrn, TEST                        TestPattern;
1043 SCRN, nScrn, THOL,        , t1           ThresholdImage(t1: LONGINT);
1044 SCRN, nScrn, TRAN, nBase, idx,   idy     TranslateImage(nBase,idx,idy);
1045 SCRN, nScrn, WARP, nBase, xzoom, yzoom   ZoomImage(nBase,gXO2, gYO2, xzoom, yzoom);
1046 SCRN, nScrn, ZOOM, nBase, xo,yo, zoom    ZoomImage(nBase,xo,yo, zoom, zoom);

{ SCRN Convolutions }

1050 SCRN, nScrn, 5x5G, nBase, nScr, method   Gradient5x5.(nBase,nScrMask, method);
1051 SCRN, nScrn, FUZZ, nBase, nScrMask, nSize Fuzz(nBase, nScr, nSize);
1052 SCRN, nScrn, CMN5, nBase                 Convolution(cMean5, nBase);
1053 SCRN, nScrn, CWM9, nBase                 Convolution(cWtMean9, nBase);
1054 SCRN, nScrn, CWM5, nBase                 Convolution(cWtMean5, nBase);
1055 SCRN, nScrn, CLA4, nBase                 Convolution(cLaplacian4, nBase);
1056 SCRN, nScrn, CLA8, nBase                 Convolution(cLaplacian8, nBase);
1057 SCRN, nScrn, CUSM, nBase                 Crisp(nBase);
1058 SCRN, nScrn, CUS9, nBase                 Convolution(cUnsharpMask9,nBase)
1059 SCRN, nScrn, CVL , nBase                 Convolution(cSobel, nBase);
1060 SCRN, nScrn, CHL , nBase                 Convolution(cSobelT, nBase);
1061 SCRN, nScrn, CPVL, nBase                 Convolution(cPrewitt, nBase);
1062 SCRN, nScrn, CPHL, nBase                 Convolution(cPrewittT, nBase);
1063 SCRN, nScrn, CSHL, nBase                 Convolution(cHoriz,nBase);
1064 SCRN, nScrn, CSVL, nBase                 Convolution(cVert,nBase);
1065 SCRN, nScrn, CSDU, nBase                 Convolution(cDiagUp,nBase);
1066 SCRN, nScrn, CSDD, nBase                 Convolution(cDiagDown,nBase);

{ Fast Edge Detectors }

1070 SCRN, nScrn, SSD , nBase                 Convolution(cEdgeDown,nBase);
1071 SCRN, nScrn, SSR , nBase                 Convolution(cEdgeRt,nBase);
1072 SCRN, nScrn, SSX , nBase                 Convolution(cEdgeDownRt,nBase);
1073 SCRN, nScrn, SSB , nBase                 Convolution(cEdgeBox,nBase);
1074 SCRN, nScrn, SST , nBase                 Convolution(cEdgeTri,nBase);
1075 SCRN, nScrn, SSD2, nBase                 Convolution(cEdgeDown2,nBase);
1076 SCRN, nScrn, SSR2, nBase                 Convolution(cEdgeRt2,nBase);
1077 SCRN, nScrn, SSX2, nBase                 Convolution(cEdgeDownRt2,nBase);
1078 SCRN, nScrn, SSB2, nBase                 Convolution(cEdgeBox2,nBase);
1079 SCRN, nScrn, SST2, nBase                 Convolution(cEdgeTri2,nBase);
1080 SCRN, nScrn, SSD3, nBase                 Convolution(cEdgeDown3,nBase);
1081 SCRN, nScrn, SSR3, nBase                 Convolution(cEdgeRt3,nBase);
1082 SCRN, nScrn, SSX3, nBase                 Convolution(cEdgeDownRt3,nBase);
1083 SCRN, nScrn, SSB3, nBase                 Convolution(cEdgeBox3,nBase);
1084 SCRN, nScrn, SST3, nBase                 Convolution(cEdgeTri3,nBase);
1085 SCRN, nScrn, SSD4, nBase                 Convolution(cEdgeDown4,nBase);
1086 SCRN, nScrn, SSR4, nBase                 Convolution(cEdgeRt4,nBase);
1087 SCRN, nScrn, SSX4, nBase                 Convolution(cEdgeDownRt4,nBase);
1088 SCRN, nScrn, SSB4, nBase                 Convolution(cEdgeBox4,nBase);
1089 SCRN, nScrn, SST4, nBase                 Convolution(cEdgeTri4,nBase);

{ Fast Image Sharpeners }

1090 SCRN, nScrn, FSD , nBase                 Convolution(cSharpDown,nBase);
1091 SCRN, nScrn, FSR , nBase                 Convolution(cSharpRt,nBase);
1092 SCRN, nScrn, FSX , nBase                 Convolution(cSharpDiag,nBase);
1093 SCRN, nScrn, FSDS, nBase                 Convolution(cSharpDownS,nBase);
1094 SCRN, nScrn, FSRS, nBase                 Convolution(cSharpRtS,nBase);
1095 SCRN, nScrn, FSXS, nBase                 Convolution(cSharpDiagS,nBase);
```

{ Morphological directives }

| | | | | | |
|---|---|---|---|---|---|
| 2001 SCRN, | nScrn, | GRO1, | nBase | Grow X· | X is the new, ·Exists |
| 2002 SCRN, | nScrn, | GRO2, | nBase | Grow X | |
| 2003 SCRN, | nScrn, | GRO3, | nBase | Grow X· | |
| 2004 SCRN, | nScrn, | GRO4, | nBase | Grow X: | |
| 2005 SCRN, | nScrn, | GRO5, | nBase | Grow ·X· | |
| 2006 SCRN, | nScrn, | GRO6, | nBase | Grow X | |
| 2007 SCRN, | nScrn, | GRO7, | nBase | Grow ·X· | |
| 2008 SCRN, | nScrn, | GRO8, | nBase | Grow X | |
| 2009 SCRN, | nScrn, | GRO9, | nBase | Grow ·X | |
| 2010 SCRN, | nScrn, | GROA, | nBase | Grow X | |
| 2011 SCRN, | nScrn, | GROW, | nBase | Grow ·X· | |
| 2012 SCRN, | nScrn, | ERO1, | nBase | Erode X· | X is the new, ·Exists |
| 2013 SCRN, | nScrn, | ERO2, | nBase | Erode X | |
| 2014 SCRN, | nScrn, | ERO3, | nBase | Erode X· | |
| 2015 SCRN, | nScrn, | ERO4, | nBase | Erode X: | |
| 2016 SCRN, | nScrn, | ERO5, | nBase | Erode ·X· | |
| 2017 SCRN, | nScrn, | ERO6, | nBase | Erode X | |
| 2018 SCRN, | nScrn, | ERO7, | nBase | Erode ·X· | |
| 2019 SCRN, | nScrn, | ERO8, | nBase | Erode X | |
| 2020 SCRN, | nScrn, | ERO9, | nBase | Erode ·X | |
| 2021 SCRN, | nScrn, | EROA, | nBase | Erode X | |
| 2022 SCRN, | nScrn, | ERODE, | nBase | Erode ·X· | |

{ Additional SCRN directives }

| | | | | | |
|---|---|---|---|---|---|
| 2025 SCRN, | nScrn, | FINE | | | Fine Color Creation |
| 2026 SCRN, | nScrn, | COLR | | | Quantized Color Creation |
| 2027 SCRN, | nScrn, | INTG, | nScr, | nFrames | Capture using frame integration |

{ LUT Directives }

| | | | | | |
|---|---|---|---|---|---|
| 1101 LUT, | nScrn, | 8COL | | | Init8Colors; |
| 1102 LUT, | nScrn, | BAND, | t1, | t2 | BandLUT(t1, t2: LONGINT); |
| 1103 LUT, | nScrn, | FULL | | | FullRange; |
| 1104 LUT, | nScrn, | GBIS, | gain, | bias | GainBiasLUT(fg, fb: EXTENDED); |
| 1105 LUT, | nScrn, | L2 | | | InitOLut2; |
| 1106 LUT, | nScrn, | L4 | | | InitOLut4; |
| 1107 LUT, | nScrn, | L8 | | | InitOLut8; |
| 1108 LUT, | nScrn, | L16 | | | InitOLut16; |
| 1109 LUT, | nScrn, | L64 | | | InitOLut64; |
| 1110 LUT, | nScrn, | L256 | | | InitOLut256; |
| 1111 LUT, | nScrn, | LOG, | rk | | LogLUT(rk: EXTENDED); |
| 1112 LUT, | nScrn, | NEGA | | | InitOLutNegative; |
| 1113 LUT, | nScrn, | RAND | | | InitOLutRandom; |
| 1114 LUT, | nScrn, | SAW, | nteeth | | SawtoothLUT(nteeth: LONGINT); |
| 1115 LUT, | nScrn, | SCAL, | t1, | t2 | ScaleLUT(t1, t2: LONGINT); |
| 1116 LUT, | nScrn, | SDSC | | | SDScaleLUT; |
| 1117 LUT, | nScrn, | SQRT, | t1 | | SquareTLUT(t1: LONGINT);; |
| 1118 LUT, | nScrn, | THOL, | t | | ThresholdLUT(t: LONGINT); |

{ HIST Directives }

| | | | |
|---|---|---|---|
| 1119 | HIST, nScrn, BRIL | | Build Brilliance Chart; |
| 1120 | HIST, nScrn, CHIS | | Build Cumumulative Histogram; |
| 1121 | HIST, nScrn, FIT | | Build Histogram Fit; |
| 1122 | HIST, nScrn, GEN | | Build Histogram; |
| 1123 | HIST, nScrn, NPIN | | fPinInterior := FALSE; |
| 1124 | HIST, nScrn, OFF | | fHistDraw := FALSE; |
| 1125 | HIST, nScrn, PIN | | fPinInterior := TRUE; |

---

{ FILE Directives }

| | | | |
|---|---|---|---|
| 1126 | FILE, nScrn, ARCH | | Archive as "A"CertNo"-"gSide"-"gLight |
| 1127 | FILE, nScrn, NEWI | | Create New Image Window, return nparm |
| 1128 | FILE, nScrn, NEWT | | Create New Text Window, return nparm |
| 1129 | FILE, nScrn, PRN1 | | Print One Copy of nScrn |
| 1130 | FILE, nScrn, PRNT, nCopies | | Print nCopies of nScrn |
| 1131 | FILE, nScrn, SAVA, FileName | | Save nScrn as 'FileName' |
| 1132 | FILE, nScrn, SAVE | | Save nScrn under Current Name |
| 1133 | FILE, nScrn, STOR | | Save as "C"gCoinFile"-"gSide"-"gLight |

---

{ SCOR Directives }   Return result in parm.  A second screen if reqd is scrn.

| | | | |
|---|---|---|---|
| 1201 | SCOR, nScrn, CNTB, parm | | PixelCountB; |
| 1202 | SCOR, nScrn, CNTW, parm | | PixelCountW; |
| 1203 | SCOR, nScrn, PCTB, parm | | PixelPctB; |
| 1204 | SCOR, nScrn, PCTW, parm | | PixelPctW; |
| 1205 | SCOR, nScrn, PBUM, parm, mask | | PixelPctBUM; |
| 1206 | SCOR, nScrn, PWUM, parm, mask | | PixelPctWUM; |
| 1207 | SCOR, nScrn, PTOT, parm | | PixelTotal; |
| 1208 | SCOR, nScrn, AVG , parm | | PixelAverage; |
| 1209 | SCOR, nScrn, STDV, parm | | PixelStdDev; |
| 1210 | SCOR, nScrn, CVAR, parm | | PixelCoefVar; |
| 1211 | SCOR, nScrn, KURT, parm | | PixelKurtosis; |
| 1212 | SCOR, nScrn, RUFF, parm | | PixelRough; |
| 1213 | SCOR, nScrn, SQRT, parm | | PixelSquareT; |
| 1214 | SCOR, nScrn, NST , parm | | NormSquareT; |
| 1215 | SCOR, nScrn, CONN, parm(5), scr , minObj, augValue | | |

Output = Conn: output=objects,count,augCount

1246 SCOR, nScrn, LTAB, parm(12), scr , lenDelta, lenStart     Output = 6 table of
           marks >= del, and 6 table of marks = del from   lenStart with lenDelta incrs

| | | | |
|---|---|---|---|
| 1216 | SCOR, nScrn, TONB, parm | | PixelTotalNonB; |
| 1217 | SCOR, nScrn, AVNB, parm | | PixelAvgNonB; |
| 1218 | SCOR, nScrn, SDNB, parm | | PixelStdDevNonB; |
| 1219 | SCOR, nScrn, CVNB, parm | | PixelCoefVarNonB; |
| 1220 | SCOR, nScrn, KUNB, parm | | PixelKurtosisNonB; |
| 1221 | SCOR, nScrn, RFNB, parm | | PixelRoughNonB; |
| 1222 | SCOR, nScrn, TOUM, parm, mask | | PixelTotalMask; |
| 1223 | SCOR, nScrn, AVUM, parm, mask | | PixelAvgMask; |
| 1224 | SCOR, nScrn, SDUM, parm, mask | | PixelStdDevMask; |
| 1225 | SCOR, nScrn, CVUM, parm, mask | | PixelCoefVarMask; |
| 1226 | SCOR, nScrn, KUUM, parm, mask | | PixelKurtosisMask; |
| 1227 | SCOR, nScrn, RFUM, parm, mask | | PixelRoughMask; |
| 1228 | SCOR, nScrn, SQUM, parm, mask | | PixelSquareTMask; |
| 1229 | SCOR, nScrn, NSUM, parm, mask | | NormSquareTMask; |
| 1230 | SCOR, nScrn, ABSD, parm, scrn | | PixelAbsDifOf2; |
| 1231 | SCOR, nScrn, SGND, parm, scrn | | PixelignedDifOf2; |
| 1232 | SCOR, nScrn, 2x2D, parm, scrn | | Pixel2x2DifOf2; |
| 1233 | SCOR, nScrn, 4x4D, parm, scrn | | Pixel4x4DifOf2; |
| 1234 | SCOR, nScrn, PEN2, parm, scrn | | PixelPenOf2; |
| 1235 | SCOR, nScrn, PENH, parm, scrn | | PixelPenHist; |
| 1236 | SCOR, nScrn, PENB, parm, scrn | | PixelPenBril; |
| 1237 | SCOR, nScrn, ANAL, parm(3 filled) | | PixelAnalysis;   (tot,avg,stdDev) |
| 1238 | SCOR, nScrn, ANNB, parm(3 filled) | | PixelAnalysisNonB; (tot,avg,stdDev) |

```
1239 SCOR, nScrn, ANUM, parm(3 filled), scrn    PixelAnalysisMask; (tot,avg,stdDev)
1243 SCOR, nScrn, CHIS, parm,        , int pct  Interp Cum Hist at pct
1240 SCOR, nScrn, HIST, parm,        , kResult  HistogramAnalysis; (kResult=1 to 7)
                                                 values are hMax,hiMax,bangL,bangR,Rht,Rwidth,xCG
1244 SCOR, nScrn, HFIT, parm,        , kResult  FittedHistogramAnalysis;(kResult=1 to 25)
1241 SCOR, nScrn, FOUR, parm                    FourierScoring;
1242 SCOR, nScrn, COLR, parm(6 filled)          ColorAnalysis; (3 avgRGB, 3 stdDev)
1245 SCOR, nScrn, TONE, parm, HuesTable, nhues  Color Distrib. Returns 20*nhues freq vals { MOTR Directives }

1301 MOTR, nScrn, ALGN                          Align Coin in Screen nScrn
1302 MOTR, nScrn, CENT                          Center Coin in Screen nScrn
1303 MOTR, nparm, COIN                          Move Table to Coin in nparm
1304 MOTR, nparm, EPOS                          Establish Coin position for coin nparm
1305 MOTR, light, LITE                          Toggle Light 'light' (up to 4 digits)
1306 MOTR,      , LOFF                          All Lights Off
1307 MOTR,      , ORIG                          Move Table to Origin
1308 MOTR, nparm, PLIT                          Toggle Light defined by parm
1309 MOTR,      , SLIT, ticks                   Wait for stable lights since light change
1310 MOTR,      , TCAM, parm1, parm2, parm3     Move Camera by x,y pixels, r deg
1311 MOTR,      , TRAN, parm1, parm2, parm3     Move Table  by x,y inches, r (deg)
1312 MOTR,      , WAIT, ticks                   Wait for a fixed length of time { CTRL Directives }

1320 CTRL,      , ABSE, value                   Set gAbsEdges TRUE for value=1, else FALSE
1321 CTRL,      , BEEP, times                   Beep the system bell 'times' times
1322 CTRL, loc, CALL                            Execute a Procedure call to loc
1323 CTRL,      , COUN                          Output the count of directives processed
1324 CTRL,      , ERR , parm1, parm2, code      Error exit. Output parm1, parm2, code
1325 CTRL,      , FRNT                          Turn on moving current screen to front
1326 CTRL, loc, GOTO                            Unconditional transfer to loc
1327 CTRL, loc, IFEQ, parm1, parm2              Transfer to loc if parm1 = parm2
1328 CTRL, loc, IFGE, parm1, parm2              Transfer to loc if parm1 >= parm2
1329 CTRL, loc, IFGT, parm1, parm2              Transfer to loc if parm1 > parm2
1330 CTRL, loc, IFLE, parm1, parm2              Transfer to loc if parm1 <= parm2
1331 CTRL, loc, IFLT, parm1, parm2              Transfer to loc if parm1 < parm2
1332 CTRL, loc, IFNE, parm1, parm2              Transfer to loc if parm1 <> parm2
1333 CTRL,      , NOFR                          Turn off moving current screen to front
1334 CTRL,      , NOPL                          Turn off plotting of screens
1335 CTRL,      , NOPR                          Turn off output of the directives text
1336 CTRL,      , NSCR                          Turn off plotting of Scoring directives
1337 CTRL,      , NTIM                          Turn off output of time with directives
1338 CTRL,      , PLOT                          Turn on plotting of screens
1339 CTRL,      , PRNT                          Turn on output of the directives text
1340 CTRL,      , PSCR                          Turn on plotting of Scoring directives
1341 CTRL,      , RET                           Return from the current Procedure
1342 CTRL,      , RUN                           Turn off single step, Run Continuous
1343 CTRL,      , STEP                          Turn on single step execution
1344 CTRL,      , STOP                          Stop execution of the script
1345 CTRL,      , TIM0                          Initialize timing to 0.0
1346 CTRL,      , TIME                          Compute and output time since init
1347 CTRL,      , TIMP                          Turn on output of time with directives { LABL Directives }

1350 LABL, label, comment field

{ C... Directives }

1360 comment field  (any line starting with "    " 4 blanks, or "C...")
```

[ PARM Directives ]

| | | | | | |
|---|---|---|---|---|---|
| 1501 PARM, | nparm, | ABS , | parm1 | | Absolute Value |
| 1502 PARM, | nparm, | ADD , | parm1, parm2 | | Add |
| 1530 PARM, | nparm, | BTWN, | parm1, low, high, WTP | | Err if low>=parm>=high. Err code=WTP |
| 1531 PARM, | nparm, | CERT | | | Output Cert No with a parm value |
| 1503 PARM, | first, | CLR , | last | | Clear parms from nparm to last |
| 1504 PARM, | nparm, | COPY, | parm1 | | Copy |
| 1505 PARM, | nparm, | DISP, | Associated text | | Display parameter and text |
| 1506 PARM, | nparm, | DIV , | parm1, parm2 | | Divide |
| 1532 PARM, | nparm, | DOTV, | parm1, parm2, n | | Dot Vector. Sum(p1(i)*p2(i)), i=1,n) |
| 1533 PARM, | nparm, | EXP , | parm1, parm2 | | Exponentiation, parm1**parm2 |
| 1507 PARM, | nparm, | GRAD, | n | | Save nparm as the fGrades[n] |
| 1508 PARM, | nparm, | INC , | const | | Increment |
| 1509 PARM, | first, | LIST, | last | | List to output |
| 1510 PARM, | nparm, | LOAD, | val1, val2, val3, val4 | | Load multiple registers |
| 1511 PARM, | nparm, | LONG, | upTo16Characters | | Long number |
| 1512 PARM, | nparm, | MAX , | parm1, parm2 | | Max value of parms |
| 1534 PARM, | nparm, | MAXV, | parm1, parm2, n | | Max Vector. p(i)=Max(p(i),p2),i=1,n |
| 1513 PARM, | nparm, | MIN , | parm1, parm2 | | Min value of parms |
| 1514 PARM, | nparm, | MOTR | (3 parms filled) | | Obtain Motor Position |
| 1515 PARM, | nparm, | MOVE, | first, last | | Move first to last into nparm |
| 1516 PARM, | nparm, | MULT, | parm1, parm2 | | Multiply |
| 1535 PARM, | nparm, | PIXR, | i, j, nscrn | | Pixel read of P(i,j) of nscrn |
| 1536 PARM, | nparm, | PIXW, | i, j, nscrn | | Pixel write to P(i,j) of nscrn |
| 1537 PARM, | nparm, | RANG, | parm1, low, high, WTP | | Err if low<parm>high. Err code=WTP |
| 1518 PARM, | nparm, | ROUN, | parm1 | | Round to nearest whole number |
| 1519 PARM, | nparm, | SET , | const | | Set |
| 1520 PARM, | nparm, | SHOW | | | Show |
| 1538 PARM, | nparm, | SQRT, | parm1 | | Square root |
| 1521 PARM, | nparm, | SUB , | parm1, parm2 | | Subtract |
| 1539 PARM, | nparm, | SUBV, | parm1, parm2, n | | Sub Vector. p(i)=p(i)-p2, i=1,n) |
| 1540 PARM, | nparm, | SUMV, | parm1, n | | Sum Vector. Sum(p1(i), i=1,n) |
| 1522 PARM, | nparm, | TABL, | parm1, parm2, n, parm3 | | Table interp. p1=Ys, p2=Xs, p3=Xvalue |
| 1523 PARM, | nparm, | TEXT, | Comment text | | Output a comment (no parm output) |
| 1541 PARM, | nparm, | TIME | | | Obtain the current time in clicks |
| 1542 PARM, | nparm, | TRUN, | parm1 | | Truncate to lower integer |
| 1524 PARM, | nparm, | XGET, | xparm | | Fetch an external parm into nparm |
| 1525 PARM, | nparm, | XSET, | xparm | | Store an external parm from nparm |

```
Special PARM values:   parm < 1 OR parm > cMaxParm
    nParm           Value
      < 0           Parm(-nParm)   (Indirect Reference)
        0           0.0
     9999           cBlack
     9998           cWhite
     9997           Pi
     9996           gNumScrnBytes
     9995           gXDimScrn
     9994           gYDimScrn
     9993           Number of contigious windows open
     9992           gArchive   (Archiving within grading)
     9991           gArchiveOnly  (Archive, do not grade)
     9990           gGradingAnal  (Analyize grading in detail)
     9989           gCaptureFromDisk
     9988           gSetQuickGrade
     9987           Capture to CD flag
     9986           gInvokeExtIScript
  All others        The value (nParm - 9000)
                    Example: 9016 results in 16.0, 8999 => -1.0
```

APPENDIX B

Morgan Silver Dollar Analysis

The following section details the methods and parameter used in the grading of Morgan Silver Dollars. Similar methods with different parameters and associated masks would be employed for other types of coins.

Throughout this section various charts and tables will be shown using the following conventions: The human experts are represented by a two character designation, namely, SD, RH, JD and DH. Any comparison of the *Expert* to a human grade is made against an average value for a set of human graders, generally SC and RH, and in some cases the average of all four experts. A correlation is defined as the standard statistical $r^2$ coefficient, or R2, which is a measure of the square of the correlation of the points to a least squares regression fit of the data set.

Metrics are measured values obtained by various scoring operations on a processed image. Metrics are given names corresponding to the method of measurement, the region within which the measurement is made, the lighting condition used in the original image, and parameters that define the steps leading up to the measurement, such as a threshold level.

Throughout the process we compare the results of the analysis to the "Turing Test". The Turing Test is a reference to a somewhat similar test first proposed by Alan Turing, a pioneer in computing and artificial intelligence. In this project we are attempting to create a system which compares favorably with the results obtained by a set of human graders. Therefore the definition of when we are "done" is made by comparing the correlation of the *Expert* against the average of a set of human graders against the correlation of the human graders against each other. In other words, the system is designed to be as good against the average of a set of humans as any two highly qualified humans are against each other. This objective has been achieved.

The table below summarizes the $r^2$ correlation of various combinations of experts. The "Digital Grade" is the full accuracy grade given to the coin, such as 63.87, while the "Integer Grade" is the final whole number assigned to the coin, such as MS63. In the numbering system used for grading, any coin from 63.00 to 63.99 is in the end given a final integer grade of MS63 (with some exceptions in "liners" as discussed later). The following table shows the comparison of correlations with charts of the correlations shown subsequently. In addition to the pure correlation value, R2, one should also observe the linear term of the regression line as well as the value of the intercept. For a perfect correlation, the coefficient of the x term would be 1.0 and the intercept would be 0.0. When these values are significantly off from that standard it indicates that the two participants have a different basis of measurement, such as one is tighter for high grade coins than the other, or their definition for what constitutes a 64 measurement are offset. In the first chart, which is the correlation for the ComputerGrade against the HumanGrade, the linear term is .98 (nearly 1.0) and the intercept value is 1.28 (nearly 0) which indicates that the computer and the average human grades are not only well correlated but have a very similar basis of measurement.

| Comparison | Digital Grade Correlation | Integer Grade Correlation |
|---|---|---|
| *The Expert* vs Humans | 97% | 95% |
| SC vs RH | 93% | 91% |
| SC vs JD | 90% | 89% |
| SC vs DH | 93% | 89% |
| RH vs JD | 82% | 83% |
| RH vs DH | 93% | 89% |
| DH vs JD | 94% | 94% |

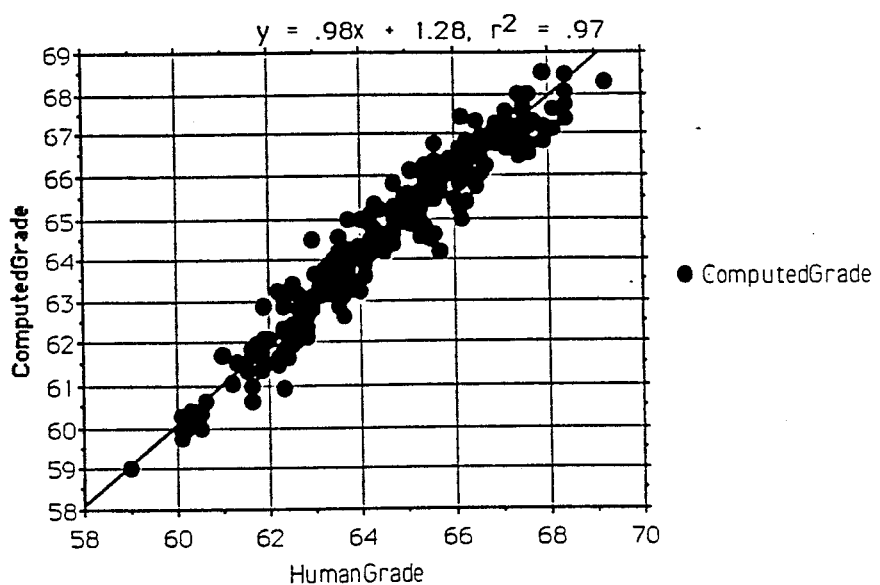
This exceeds the correlation between any two of the human graders as shown in the following correlation charts.
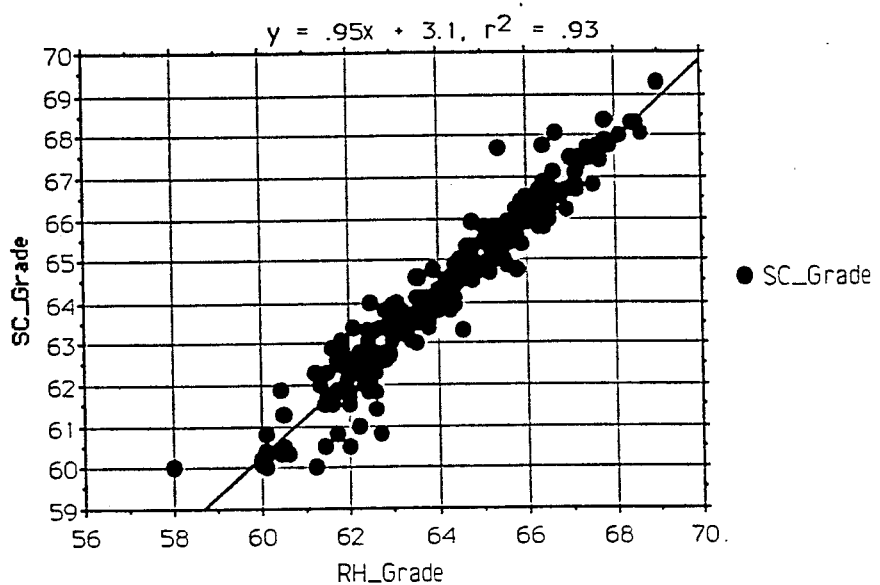

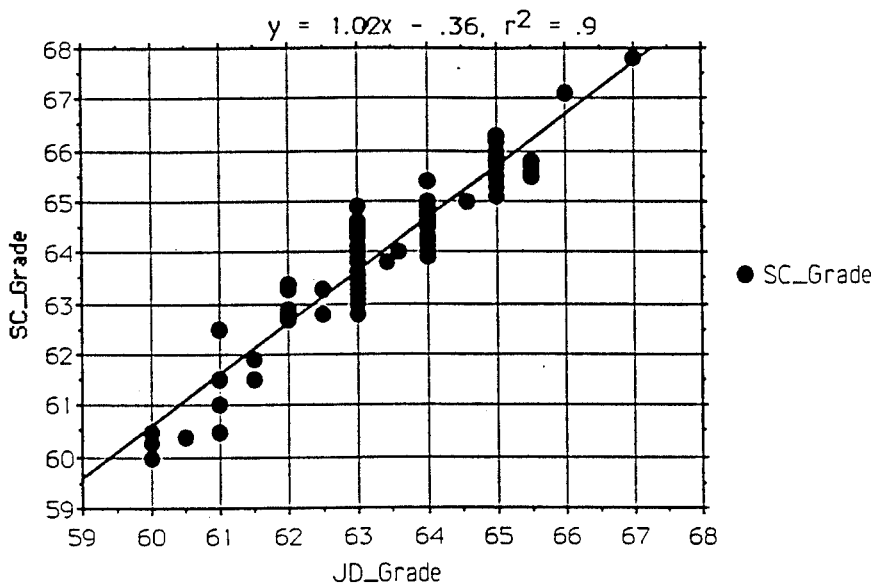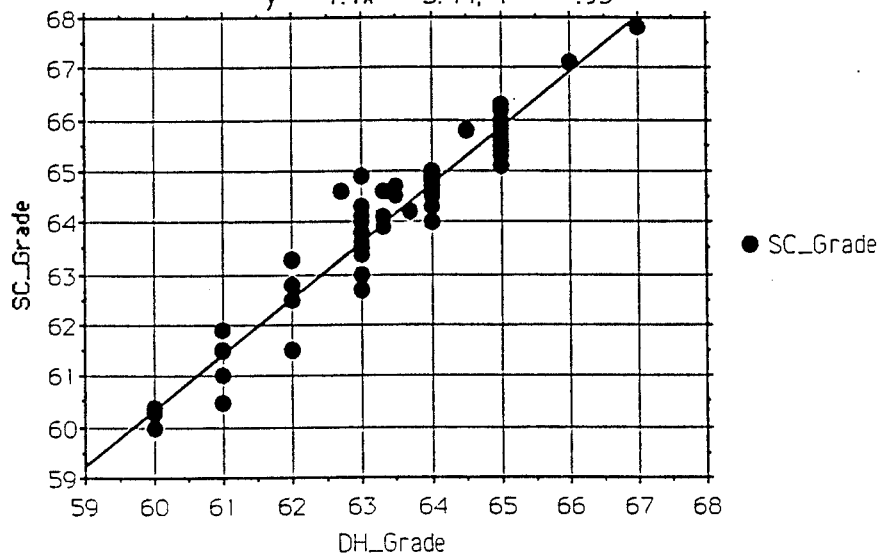

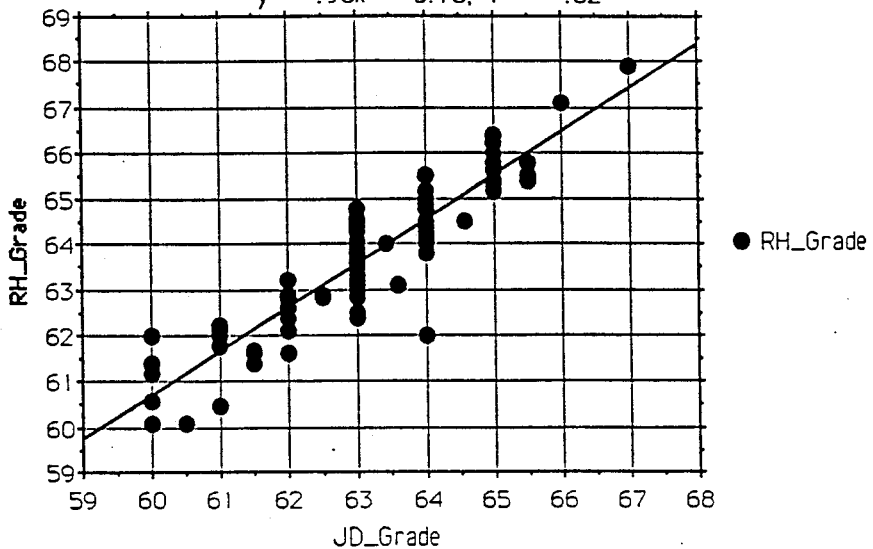
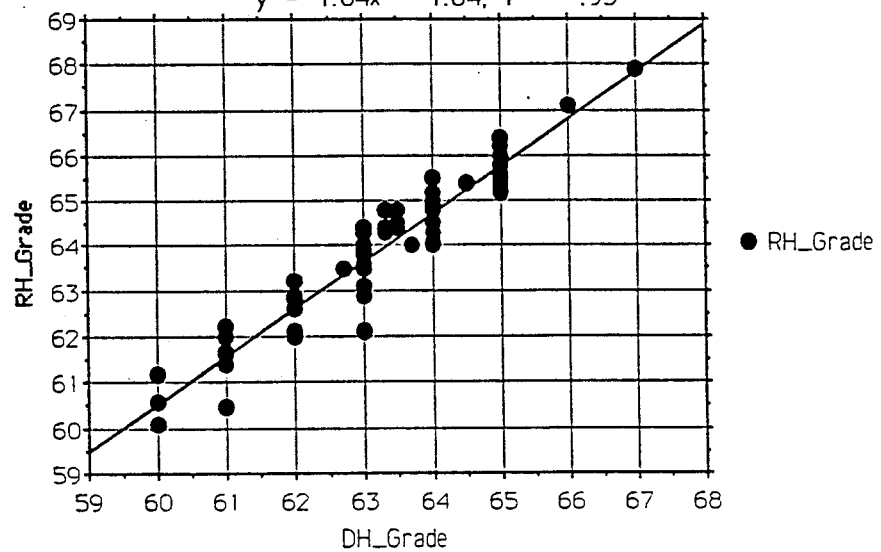

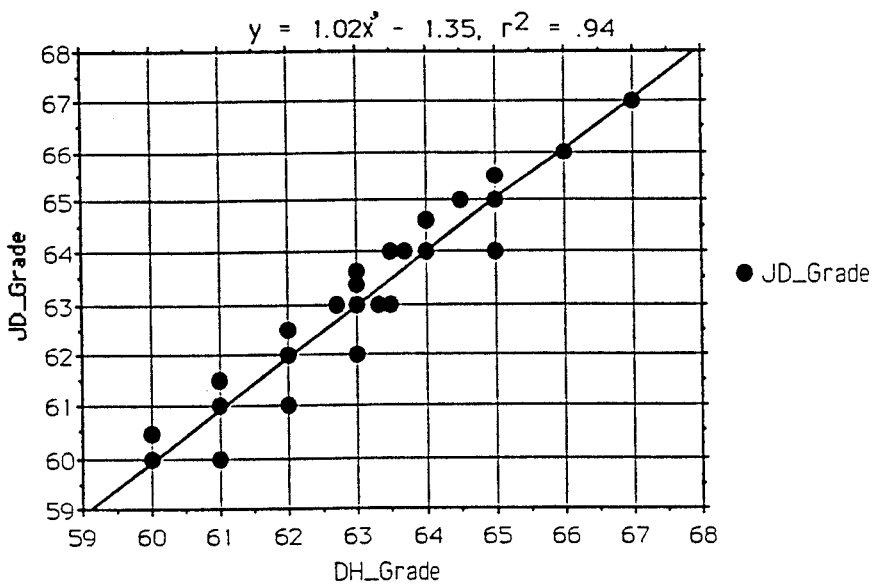

The assignment of the final integer grade also requires decision making to handle the logic of special cases and "liners". Here the grades all fall on top of each other and the errors are shifted to either a 0, 1 or 2, etc. and as a result the numeric correlation will generally drop slightly. The following diagrams show the comparison between the computer and the graders and the graders to each other for final integer grade.

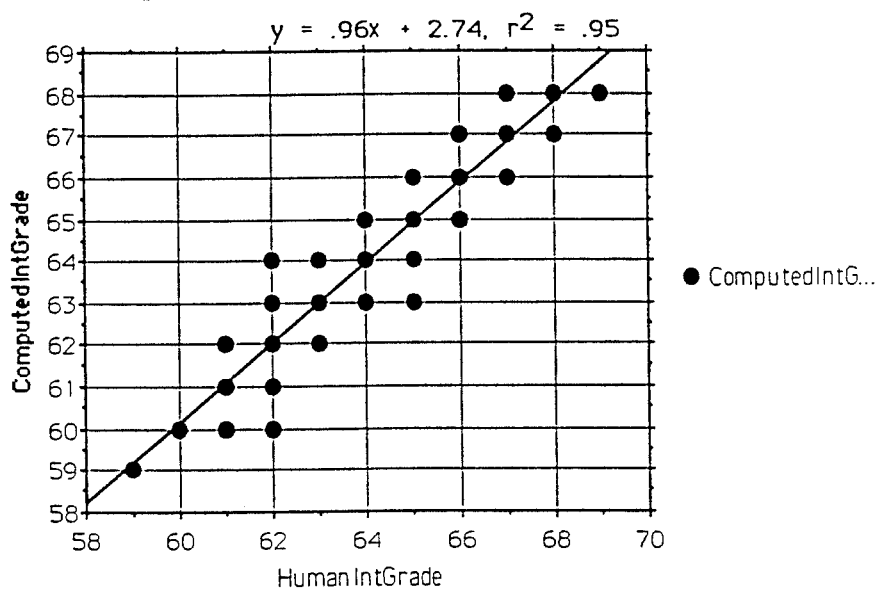

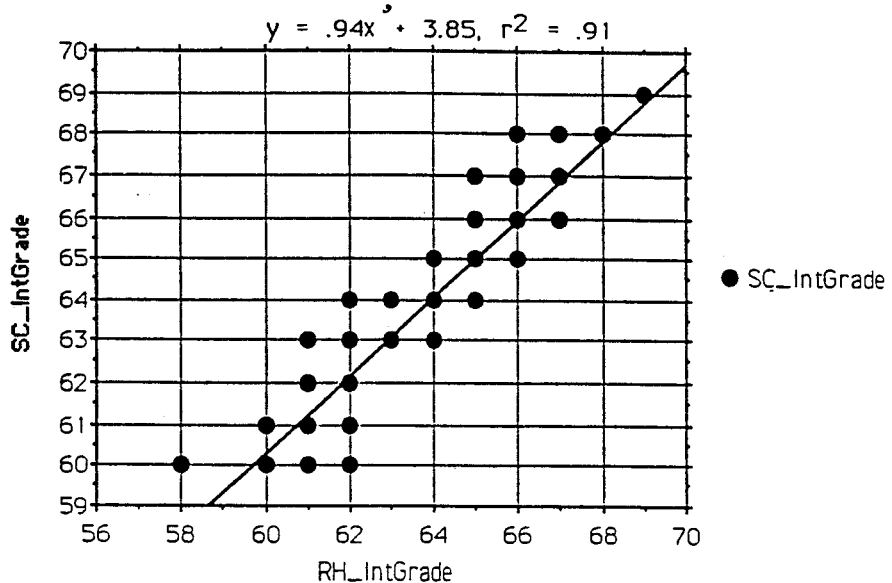
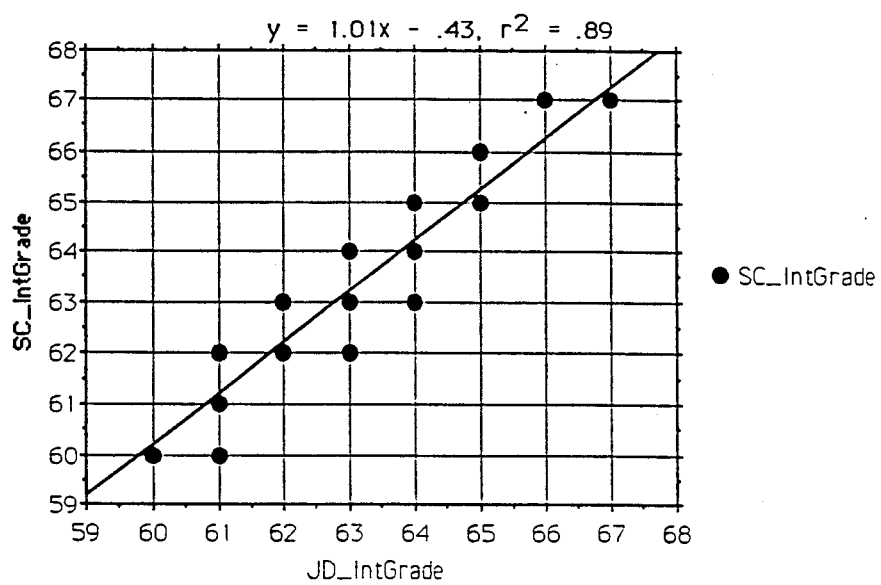

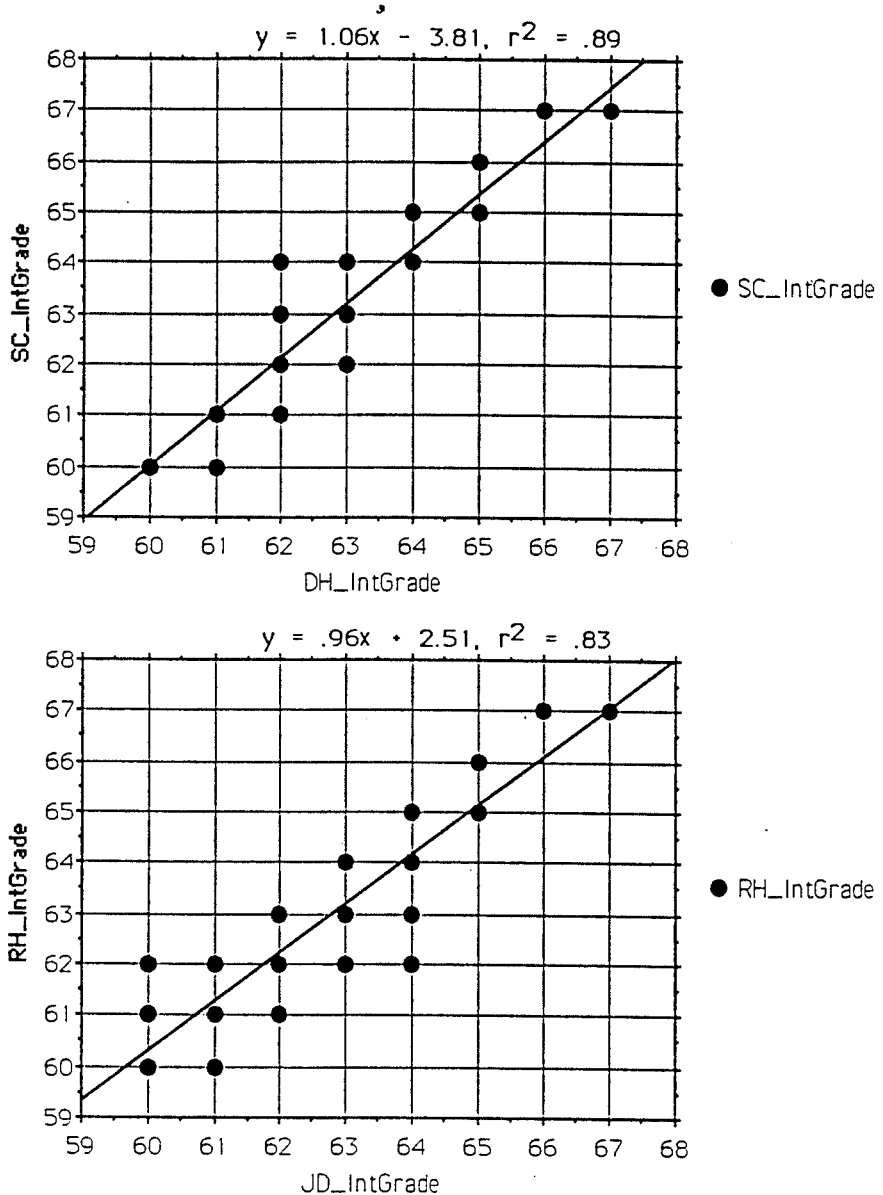

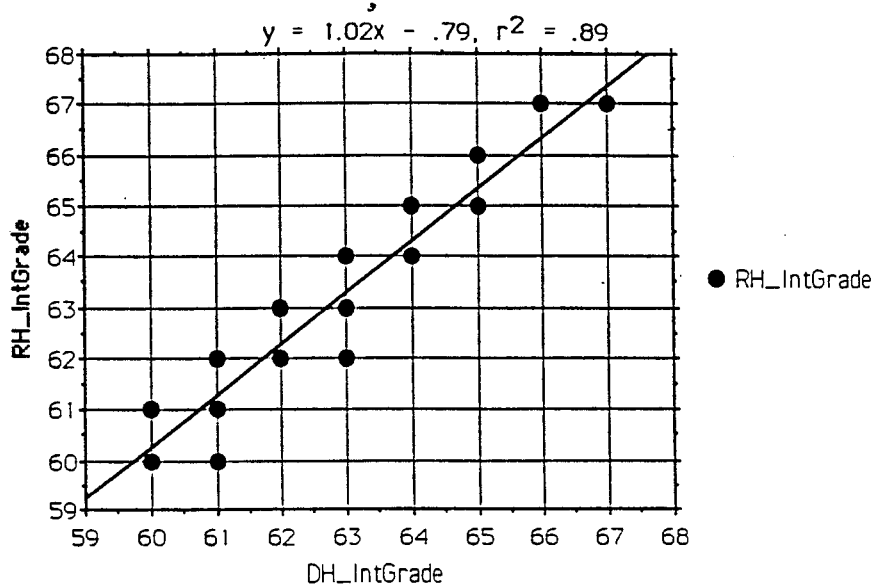
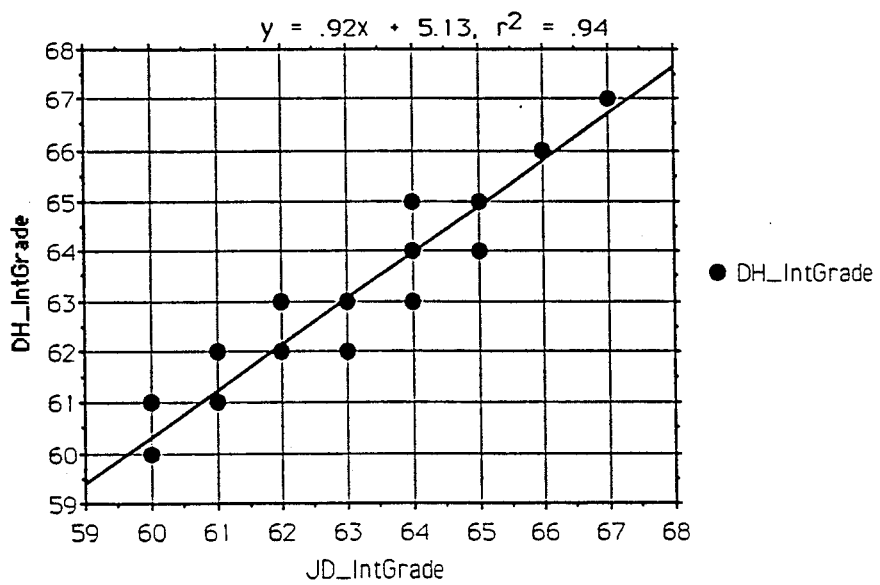

An Overview of the Method

The final grade for a Morgan silver dollar is synthesized from the subgrades and metrics computed for various aspects of a coin measured on the obverse and reverse of the coin. These subgrades include for the obverse and reverse the marks, strike, luster and mirror. Hundreds of metrics are computed for additional aspects of the coin such as the toning analysis, cleaning analysis, circulated metric, planchet flaws analysis, rim nicks, and hundreds more. When all of these measurements have been made and the subgrades computed, the system undergoes a process called Synthesis for development of the final grade.

The first step is the assignment of the final subgrades which combines the obverse and reverse subgrades using an obverse dominant technique. In general, the final subgrade for an element is equal to the obverse subgrade if the obverse subgrade is less than the reverse subgrade. If the reverse subgrade is less, then a weighted average of the two sides is performed in which the weight given to the obverse is generally larger than the reverse weight. The following table defines the obverse weighing factors.

StrikeObvWt 1.50
LusterObvWt 1.50
MarksObvWt 1.25
MirrorObvWt 1.44

All of these subgrades are obverse dominant. In addition, mirror has an obverse limitation in which the reverse will not be factored into the final mirror subgrade if the obverse mirror is less than 1.50. The "Proof Like" designation is based upon the resulting final mirror grade according to the following table.

Non-PL    < 2.195
PL    2.195 to 3.188
DMPL    3.188 to 4.4
XDMPL    > 4.4

Next the system establishes a preliminary final grade and begins a process of adding special bonuses and penalties and application of special rules including:
- Poor Strike Penalty
- High Mirror Bonus
- High Luster Bonus
- Poor Luster Penalty
- Cheek Limitation Rule
- Breast Limitation Rule
- Strike Limitation Rule
- Liner Analysis The first preliminary final grade is the final marks grade. Then a poor strike penalty is applied which essentially penalizes coins whose strike is significantly less than the marks grade for cases where the strike is less than "StrikeCutoff". The amount of the penalty is equal to the difference between the marks and the strike and then factored by an amount proportional to the weakness of strike. Specifically, the amount of the penalty is f*d where d = marks − strike (positive only) and f is a two segment function with the following three nodes: (60, FactorMax), (StrikeLimit, FactorMin), (StrikeCutoff, 0) where the parameters are defined at the following levels:

StrikeLimit 64.27
FactorMax 0.88
FactorMin 0.48
StrikeCutoff 64.53

It should be noted here that linear functions rather than step discontinuities are used in any adjustment. This is done to prevent the grade of a coin in a re-grade from changing rapidly due to random imaging noise and serves to further stabilize the repeatability of the system.

Next, bonuses for high mirror, high luster, and a penalty for poor luster is computed and applied. These values are defined by a set of linear functions. For a bonus, the bonus starts at 0.0 at "StartPt" and grows to a maximum value of "Bonus" at "EndPt". For the dullness penalty, the penalty starts at 0.0 at "EndPt" and grows to a maximum value of "Pen" when dullness reaches "StartPt" where these parameters are defined in the following table.

| Parameter | Mirror | Luster | Dullness |
|---|---|---|---|
| StartPt | 2.60 | 68.17 | 62.77 |
| EndPt | 3.21 | 68.50 | 64.88 |
| Bonus/Pen | 0.45 | 0.30 | 0.70 |

Next the system processes a number of "Limitation Rules" which handles special cases of a single metric being inconsistent with other statistical factors. The first is the Cheek Limitation Rule which states that a coin will receive a penalty if the number of flaws in the cheek is greater than a level that is acceptable for a coin of that preliminary grade. The following chart shows the limitation for cheek flaws against the preliminary predicted grade with the coins in the grading set superimposed. Any points which lie above the top line will be given a penalty which ramps up from 0.0 at the line to a value of "MaxCkPen" at or above "Delta y" units above the line with the parameters defined in the subsequent table.

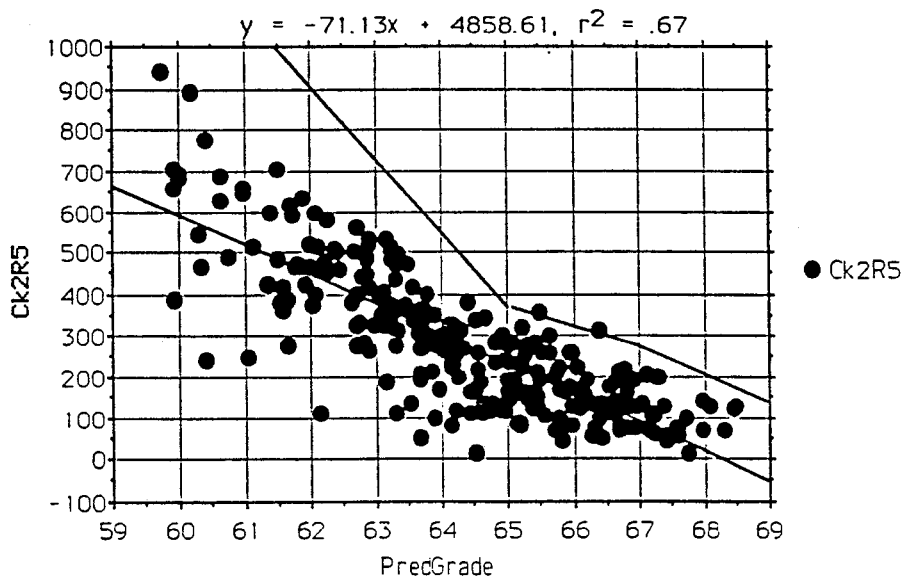

| PrelimGr | OK CkFlaws |
|---|---|
| 60.00 | 1400.00 |
| 65.00 | 367.00 |
| 67.00 | 284.00 |
| 70.00 | 68.00 |
| Delta y | 11.00 |
| MaxCkPen | 1.00 |

A similar limitation rule exists for the reverse breast marks as defined using the following chart and table.

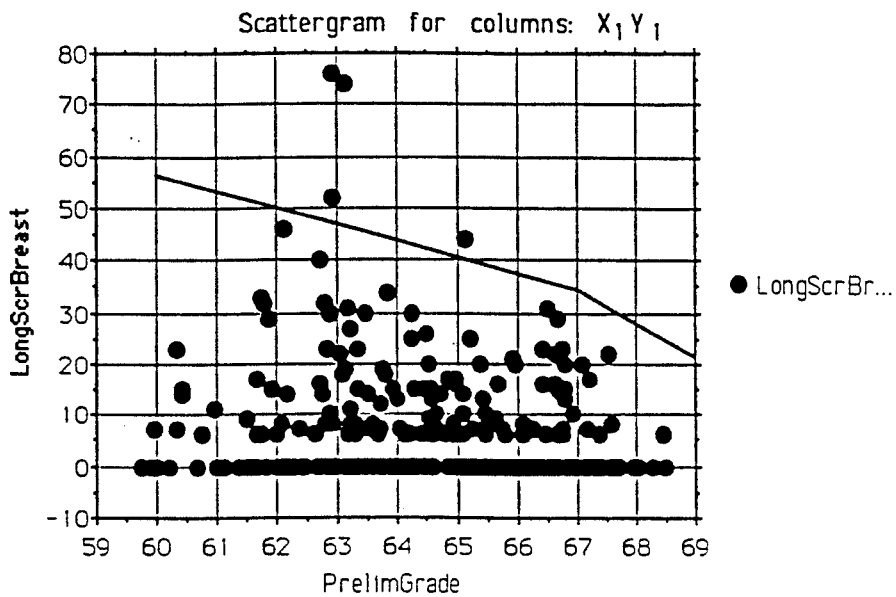

| PrelimGr | OK BrFlaws |
|---|---|
| 60.00 | 57.00 |
| 67.00 | 33.00 |
| 70.00 | 12.00 |
| Delta y | 5.00 |
| MaxBrPen | 1.00 |

Finally, the grade as defined at this point is used to perform a "liner" analysis. A "liner" is a coin whose preliminary grade is very near the boundary between two integer grades. For example, if a coin has a grade of 64.99 it is so close to being an MS65 that the system takes one final look to see if there is any way that the coin can be bumped up to the 65 level. First we define a liner as any coin graded as xx.95 or above. In this case, add to that coin the amount necessary to bring the coin to a grade of (xx+1).000 if any of the following are true:
- ObvQuickGrade > ObvMarks by 1.0 pts or more
- ObvMarks > RevMarks by 1.5 pts or more
- RevMarks > ObvMarks by 2.0 pts or more After all of these steps have been completed the final grade is assigned to the coin and written to the results data base.

Marks
Obverse Quick Grade
Compute the metrics shown below using light 5 only, after masking the FS results with the Luster Band Mask from that image. Combining the result with the computed luster, the metrics and their weights are:
| | |
|---|---|
| ComputedLuster | 0.81 |
| C3FsQgCkTh25 | -0.014 |
| C3FsQgFldTh21 | -0.0121 |
| C3FsQgFldTh33 | 0.0138 |
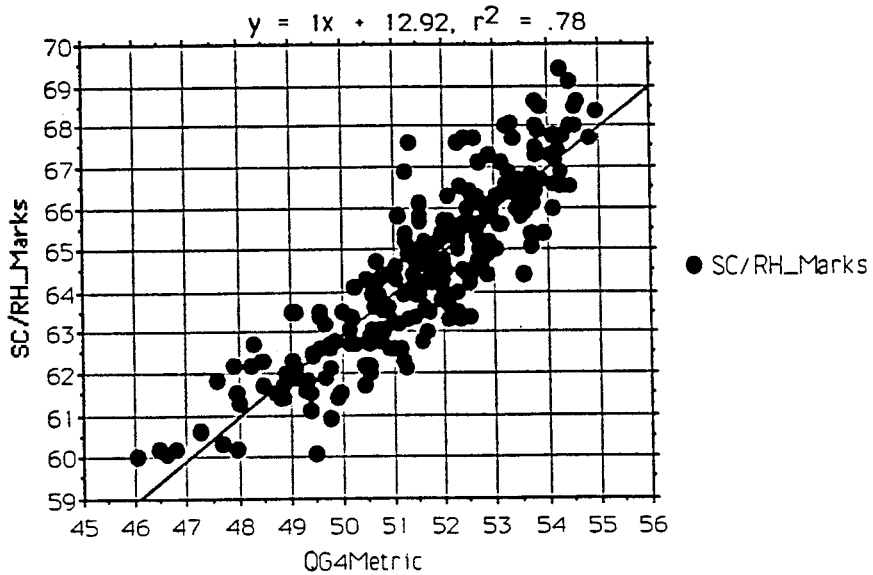
Pinning the resulting prediction results in the following.
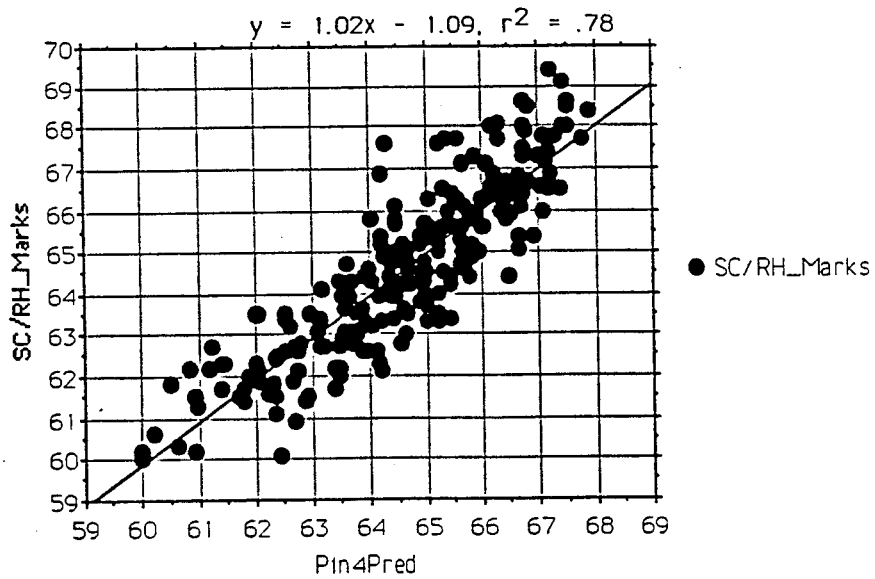

The individual metrics are shown below.
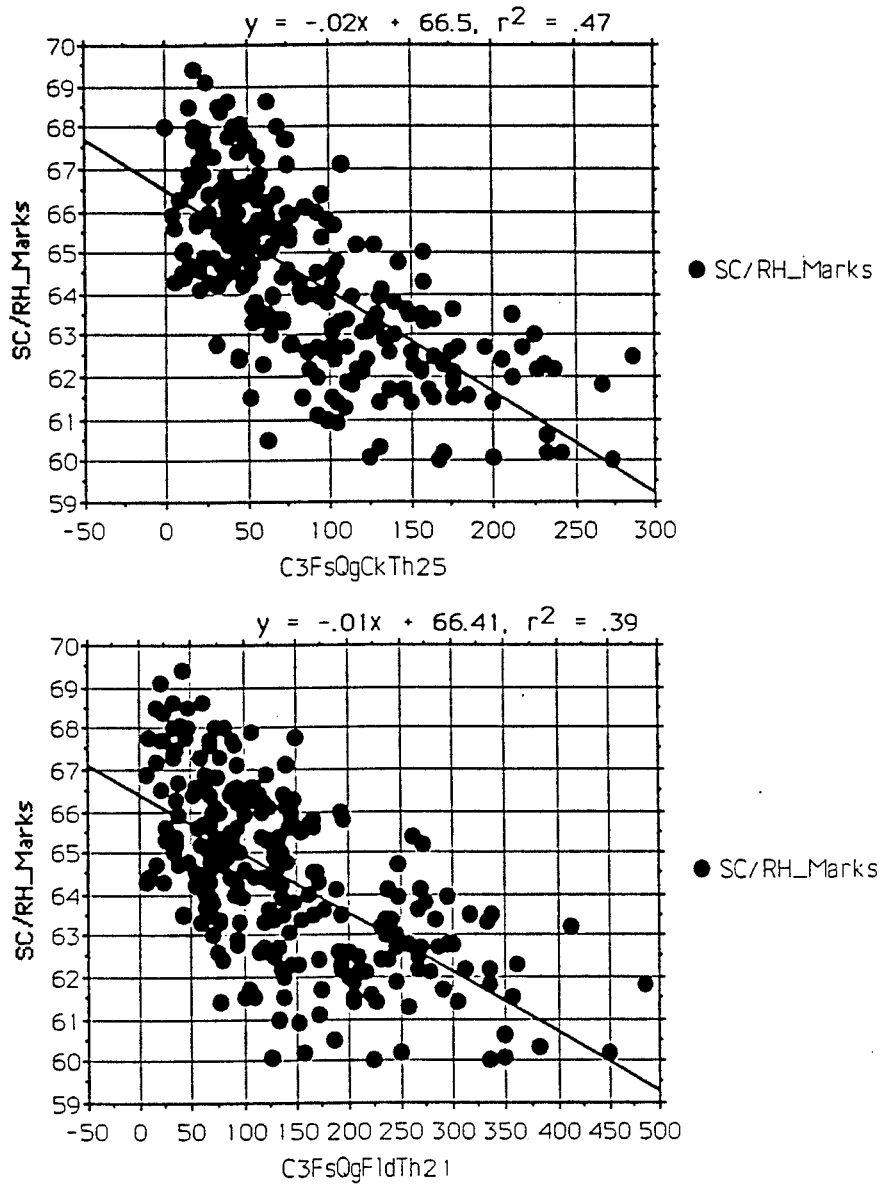

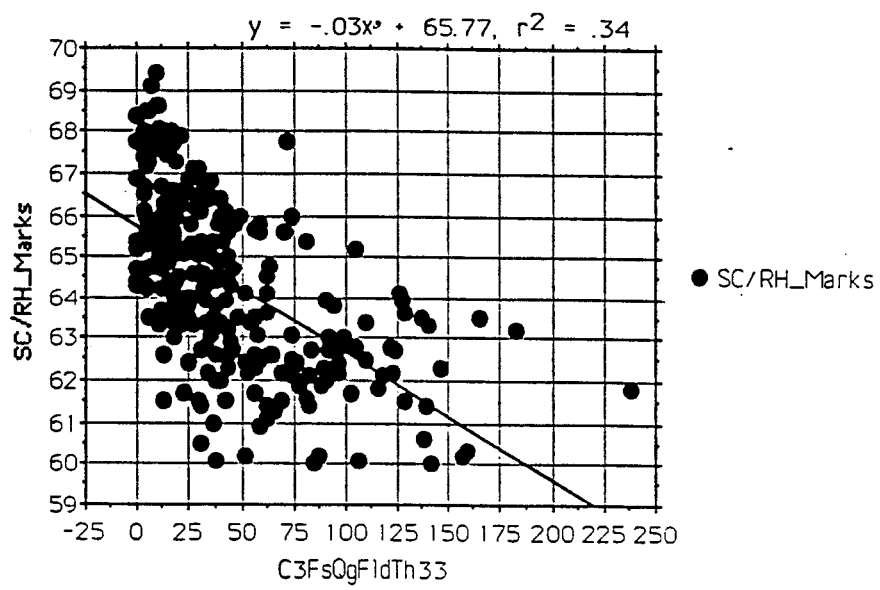
The optimum interpolation function is shown below followed by the definition of the breakpoints.

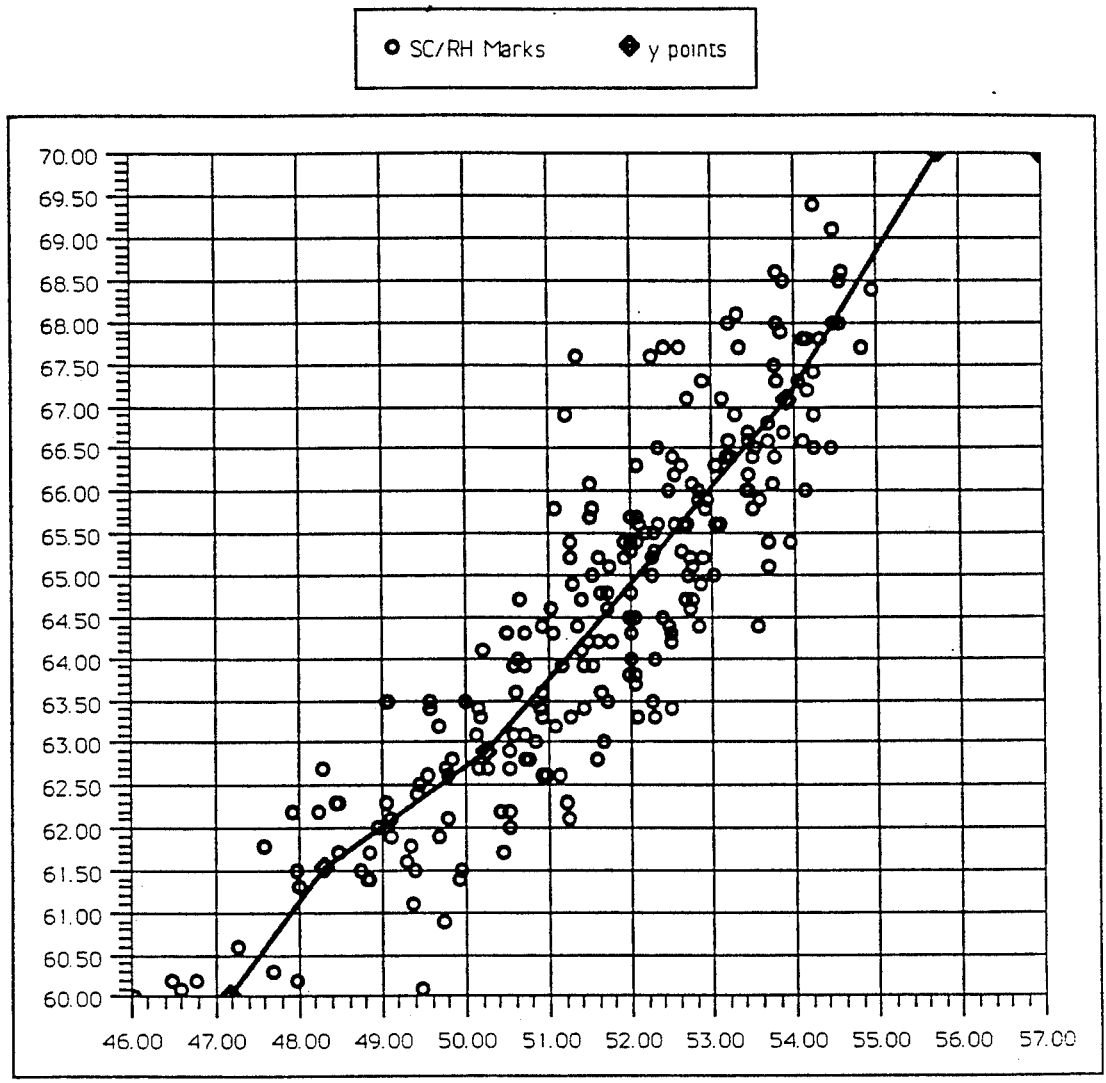
| x points | y points |
|---|---|
| 47.19 | 60.00 |
| 48.33 | 61.52 |
| 50.28 | 62.88 |
| 53.93 | 67.06 |
| 55.75 | 70.00 |
This results in a total correlation of 79%.
Exclusions
G157 (Bad Toning)
CCI49 (Very low luster, a film over cheek and field)
CCI51 (Very low luster, RH says circulated)
SDT31 (appears worse)

Obverse Marks

Full Marks Analysis

Method: Consists of two distinct analyses: ALOF and AHIF, the analysis of low frequency and the analysis of high frequency. The low frequency regions are the field, cheek and neck. The high frequency region is everything else which is then broken into the regions: long hair, fine hair, face, hat, letters, date, and rim. The next few pages describe only the ALOF calculation which dominates the obverse marks sub-grade.

ALOF Calculation

All analyses are based upon the original images. For each light, i=5 to 9, compute the FS marks and the image based LBM. For the cheek and neck, eliminate flaws within the LBM. For the field, reduce the magnitude of the flaws by a factor of 2 within the LBM. Then perform a noise reduction step by reducing the flaw strength by an amount defined within each low frequency region using an FS Reduction stamp. Accumulate the resulting flaws images to result in the total flaws image.

When the total flaws image is computed, threshold at various levels within each of the various regions at each of the various FS Reduction stamps to obtain a total of 22 metrics which in combination with the computed luster are used to compute the marks sub-grade.

The obverse marks metric and the obverse marks predictor are shown in the charts below. This is followed by the Touring tests and then the 23 metrics and weights used to compute the obverse marks metric.

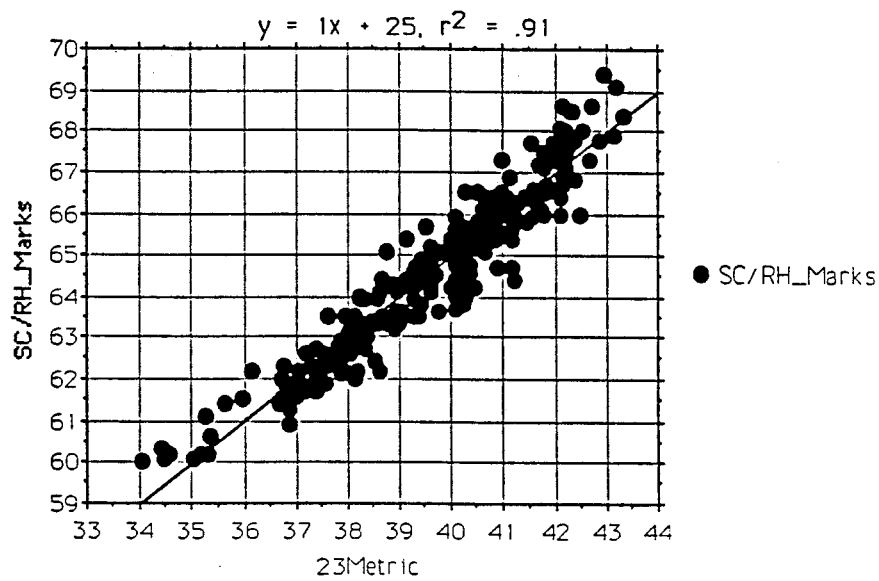

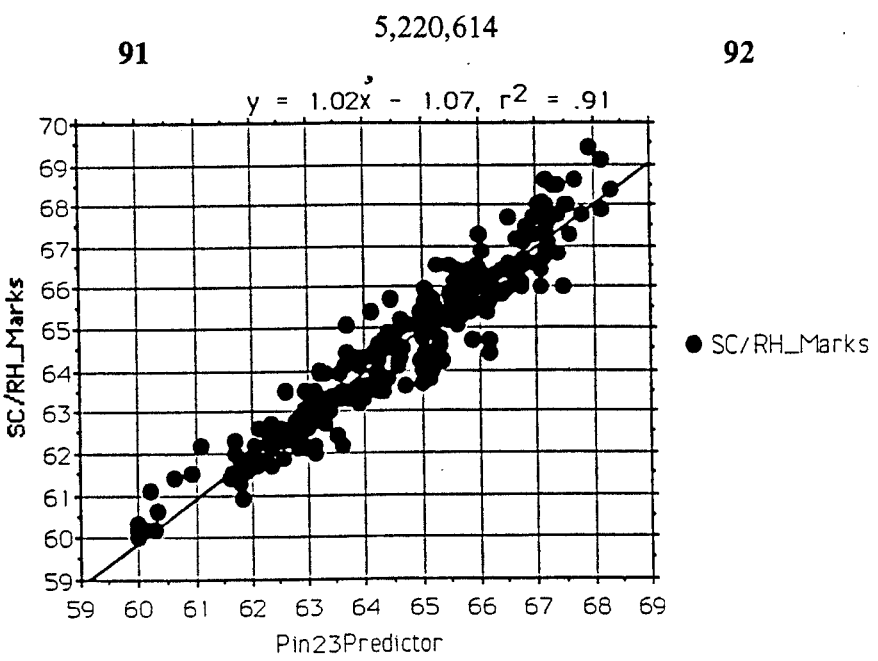

The 6 segment function shown below is the optimum piecewise linear fit to this data based upon a minimization of the sum of the squares of the residuals.
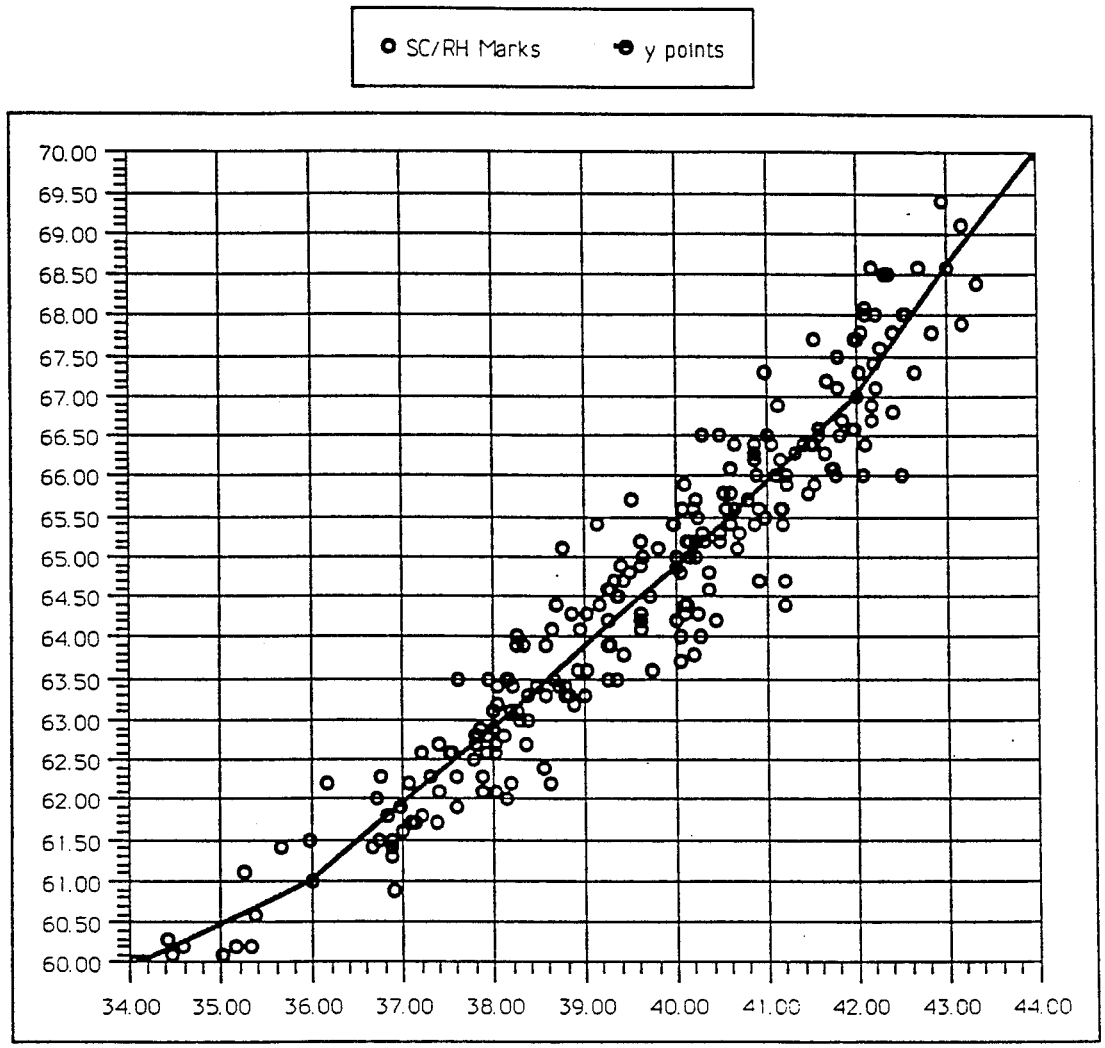
This marks table has the following breakpoints:
| x points | y points |
|---|---|
| 34.16 | 60.00 |
| 36.00 | 61.00 |
| 38.00 | 62.90 |
| 40.00 | 64.87 |
| 42.00 | 67.00 |
| 43.00 | 68.58 |
| 44.00 | 70.40 (provides room for a 70 coin to exist) |

As a result of this interpolation, the following diagram shows the ALOF subgrade correlation.
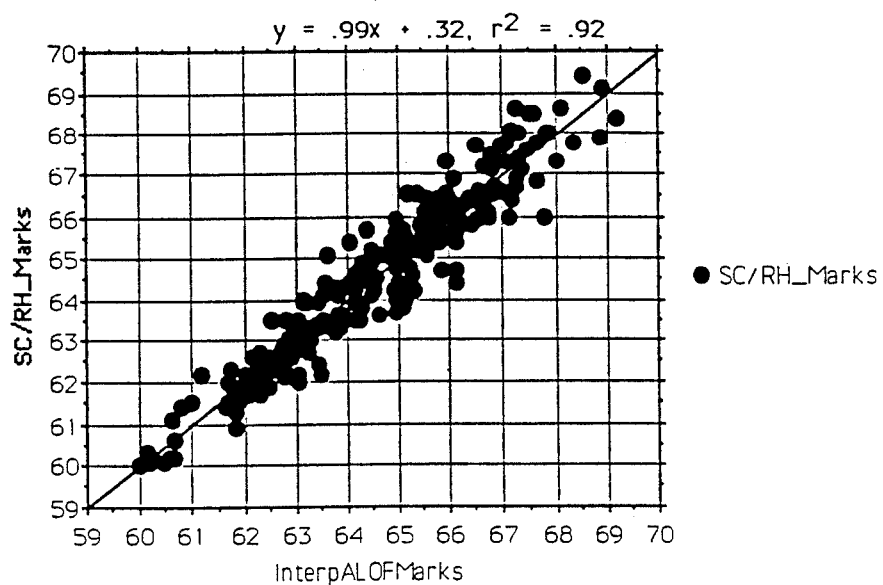

In the tables below, each of the computed metrics have been scaled by a factor of 1000 which modified the names from, for example, CkTh30R1/1000 to Ck30R1#, etc., resulting in the following weights and probabilities:

STEP NO. 23     Stepwise Regression Y$_1$:SC/RH_Marks     23 X variables

Variables in Equation

| Variable: | Coefficient: | Std. Err.: | Std. Coeff.: | F to Remove: |
|---|---|---|---|---|
| INTERCEPT | 24.96 | | | |
| Luster* | 674.18 | 46.02 | .41 | 214.65 |
| Ck30R1* | 8.67 | 1.53 | .81 | 32.29 |
| Ck10R2* | -5.24 | 1.51 | -.65 | 12.01 |
| Nk2R2* | -10.69 | 1.75 | -.37 | 37.53 |
| Nk14R2* | 29.13 | 5.35 | .84 | 29.6 |
| Nk38R2* | -33.77 | 12.04 | -.42 | 7.86 |

STEP NO. 23     Stepwise Regression Y$_1$:SC/RH_Marks     23 X variables

Variables in Equation

| Variable: | Coefficient: | Std. Err.: | Std. Coeff.: | F to Remove: |
|---|---|---|---|---|
| Nk52R2* | 45.87 | 19.56 | .33 | 5.5 |
| Ck62R3* | 62.11 | 19.04 | .7 | 10.64 |
| Nk38R3* | -70.43 | 24.35 | -.59 | 8.37 |
| Ck22R4* | -44.42 | 10.15 | -1.88 | 19.14 |
| Ck26R4* | 38.95 | 11.13 | 1.38 | 12.26 |
| Ck52R4* | -77.17 | 22.46 | -.9 | 11.8 |
| Nk26R4* | 51.18 | 15.64 | .52 | 10.71 |

STEP NO. 23     Stepwise Regression Y$_1$:SC/RH_Marks     23 X variables

Variables in Equation

| Variable: | Coefficient: | Std. Err.: | Std. Coeff.: | F to Remove: |
|---|---|---|---|---|
| Nk52R4* | 73.44 | 25.45 | .27 | 8.32 |
| Nk62R4* | -105.98 | 30.3 | -.29 | 12.23 |
| Ck2R5* | -5.09 | 2.76 | -.44 | 3.41 |
| Ck34R5* | 26.86 | 12.53 | .49 | 4.59 |
| Nk2R5* | -11.02 | 6.65 | -.25 | 2.74 |
| RedFld52R4* | -5.4 | 3.31 | -.15 | 2.65 |
| RedFld26R2* | -4.47 | 2.14 | -.71 | 4.34 |

STEP NO. 23     Stepwise Regression Y$_1$:SC/RH_Marks     23 X variables

Variables in Equation

| Variable: | Coefficient: | Std. Err.: | Std. Coeff.: | F to Remove: |
|---|---|---|---|---|
| RedFld18R3* | 13.59 | 4.39 | 2.11 | 9.6 |
| RedFld14R4* | -16.37 | 3.31 | -2.29 | 24.4 |
| RedFld22R5* | 10.06 | 2.94 | .71 | 11.7 |

In the previous table, the signal reduction values for R1 to R5 are different in the field and in the cheek/neck. The values for R1 to R5 for the field/cheekNeck are as follows:

| | | |
|---|---|---|
| R1 | 1 | 2 |
| R2 | 4 | 7 |
| R3 | 7 | 12 |
| R4 | 10 | 17 |
| R5 | 13 | 22 |

These are based upon a reduction stamp image and if used in a scalar subtraction these values should be decreased by 1 to account for the non-zero value of cblack.

The following charts are the 22 individual metrics for use in comparisons and for extreme value verification.

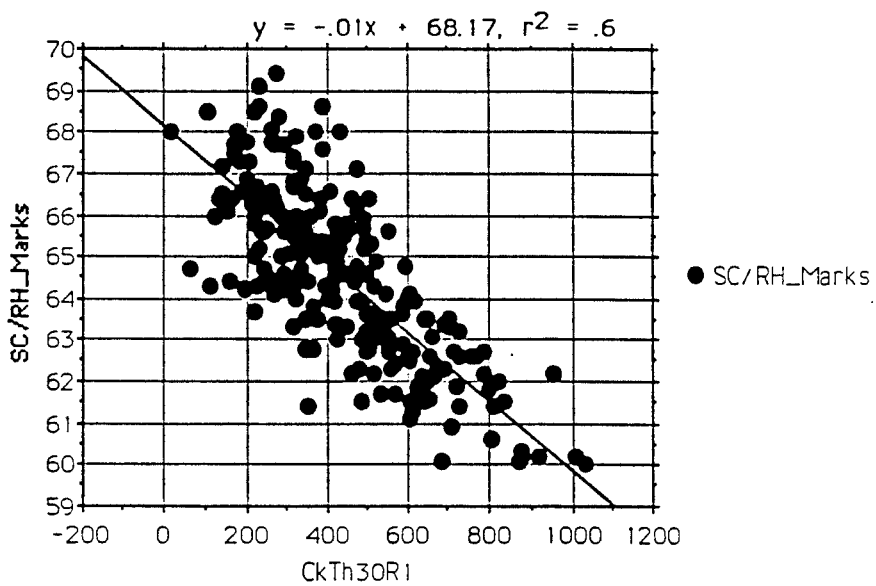

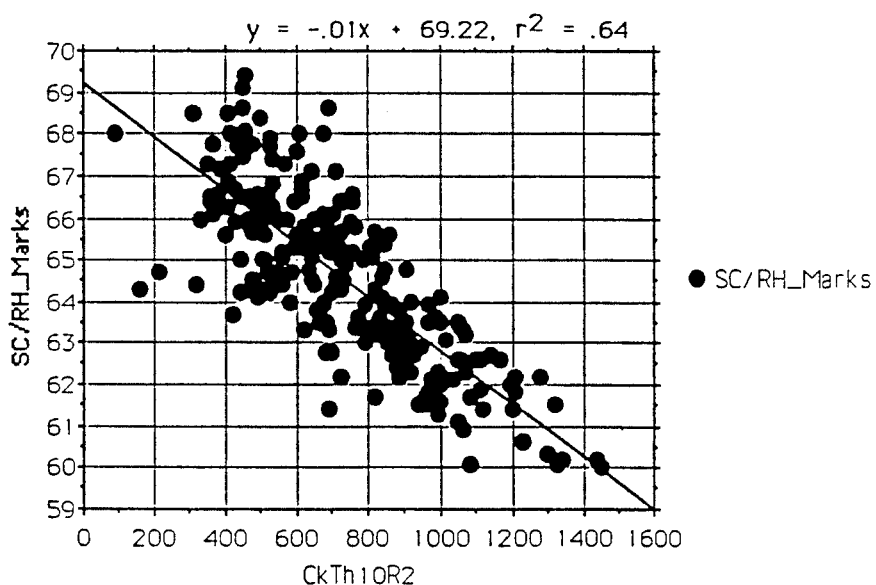

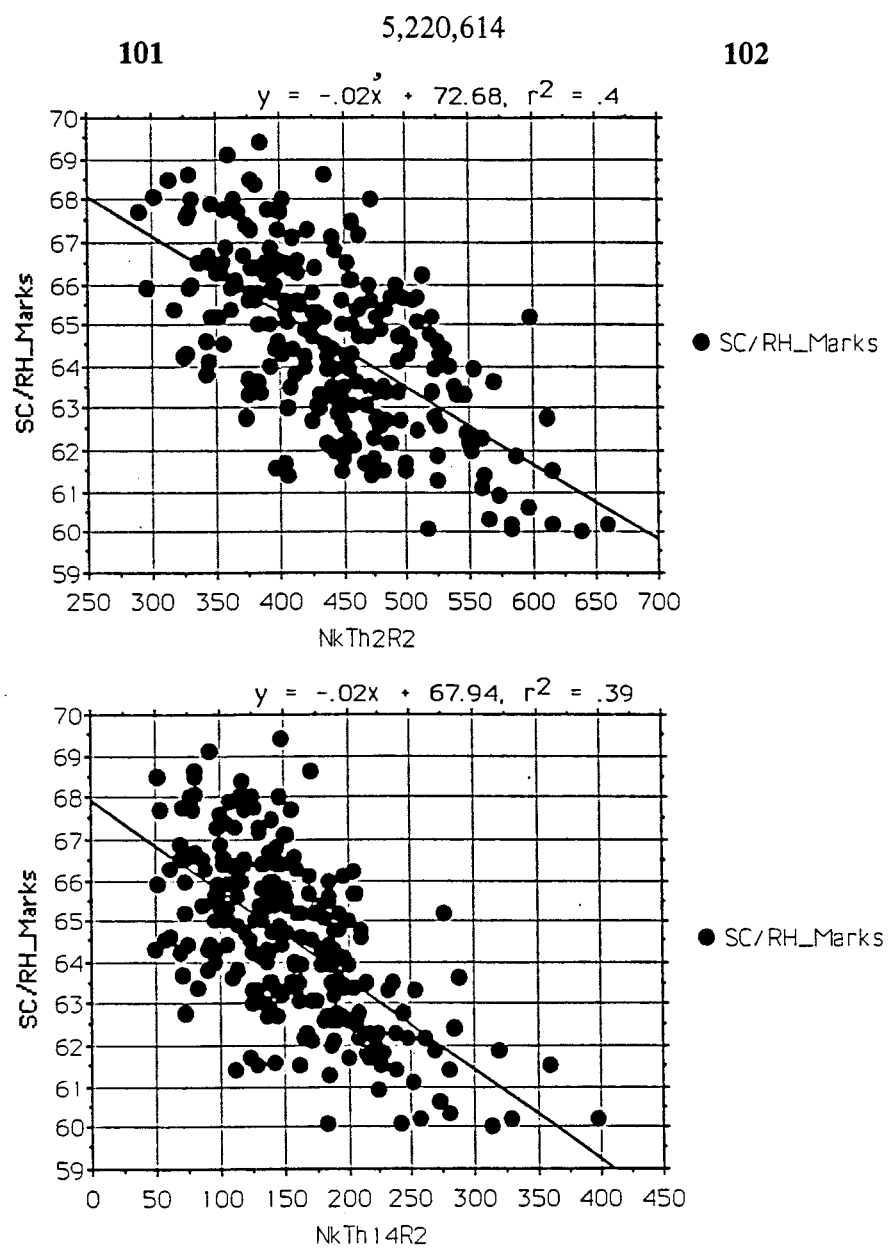

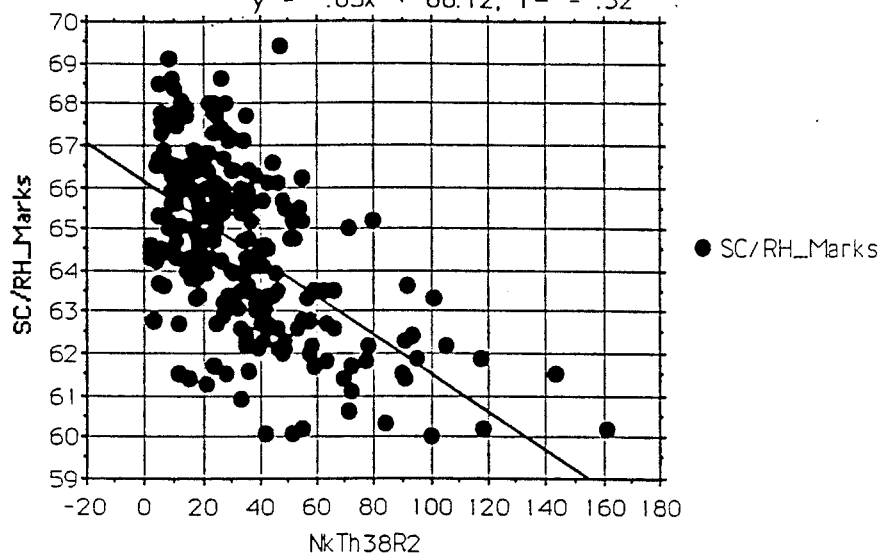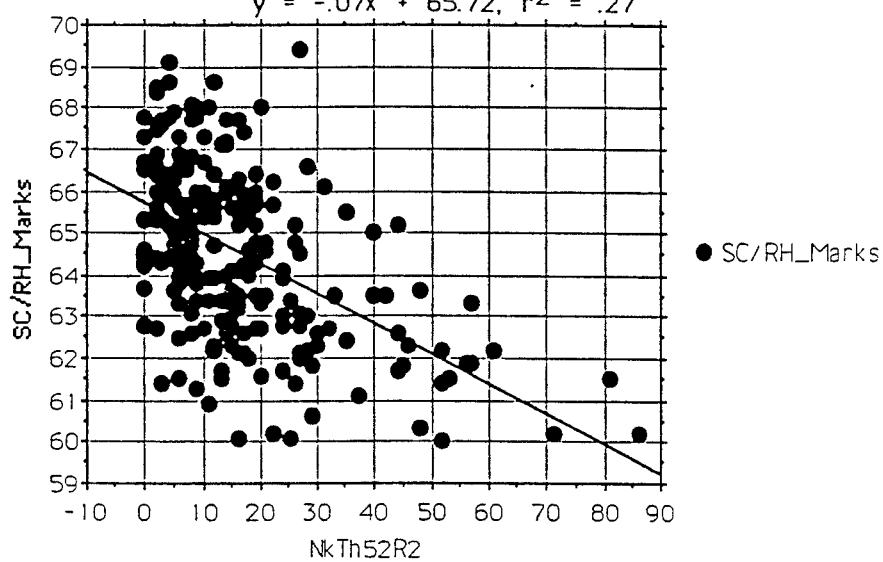

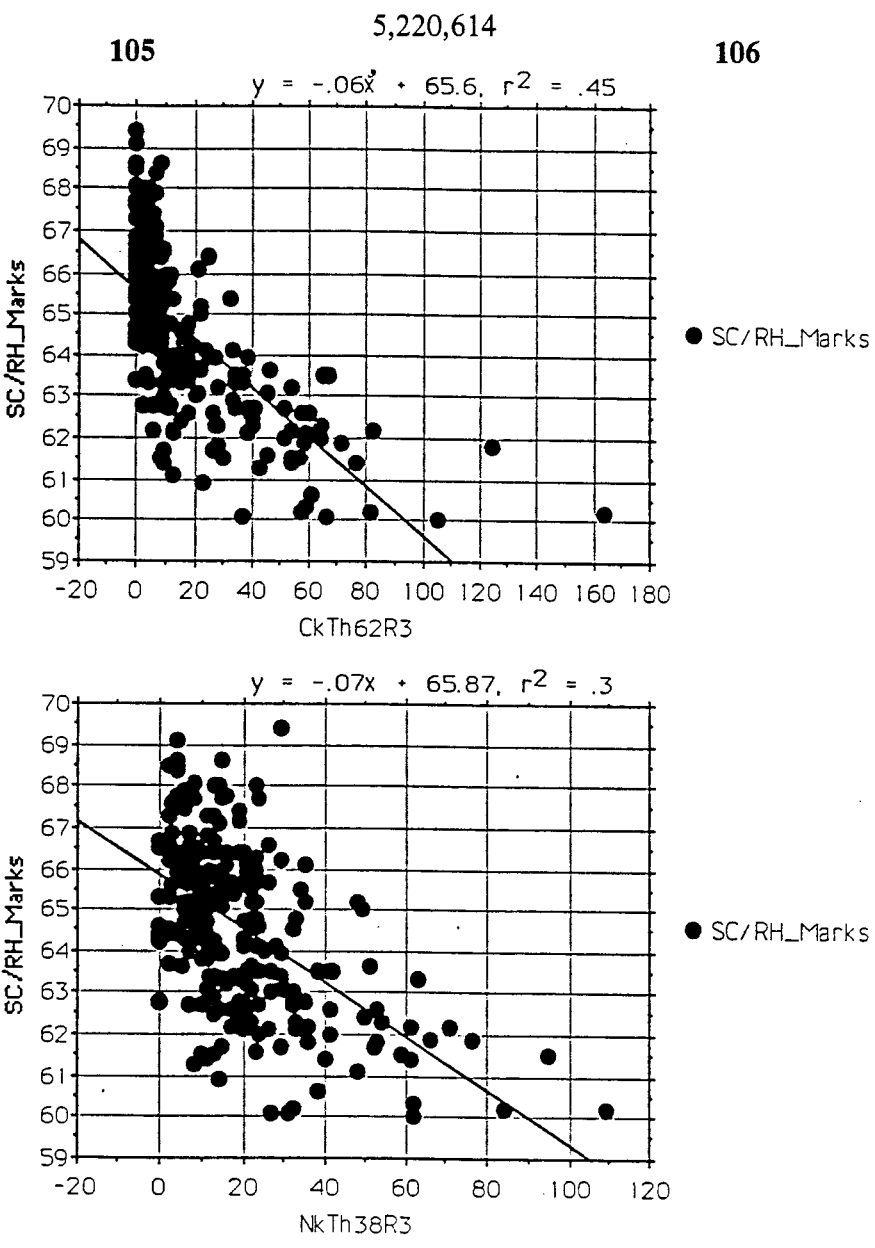

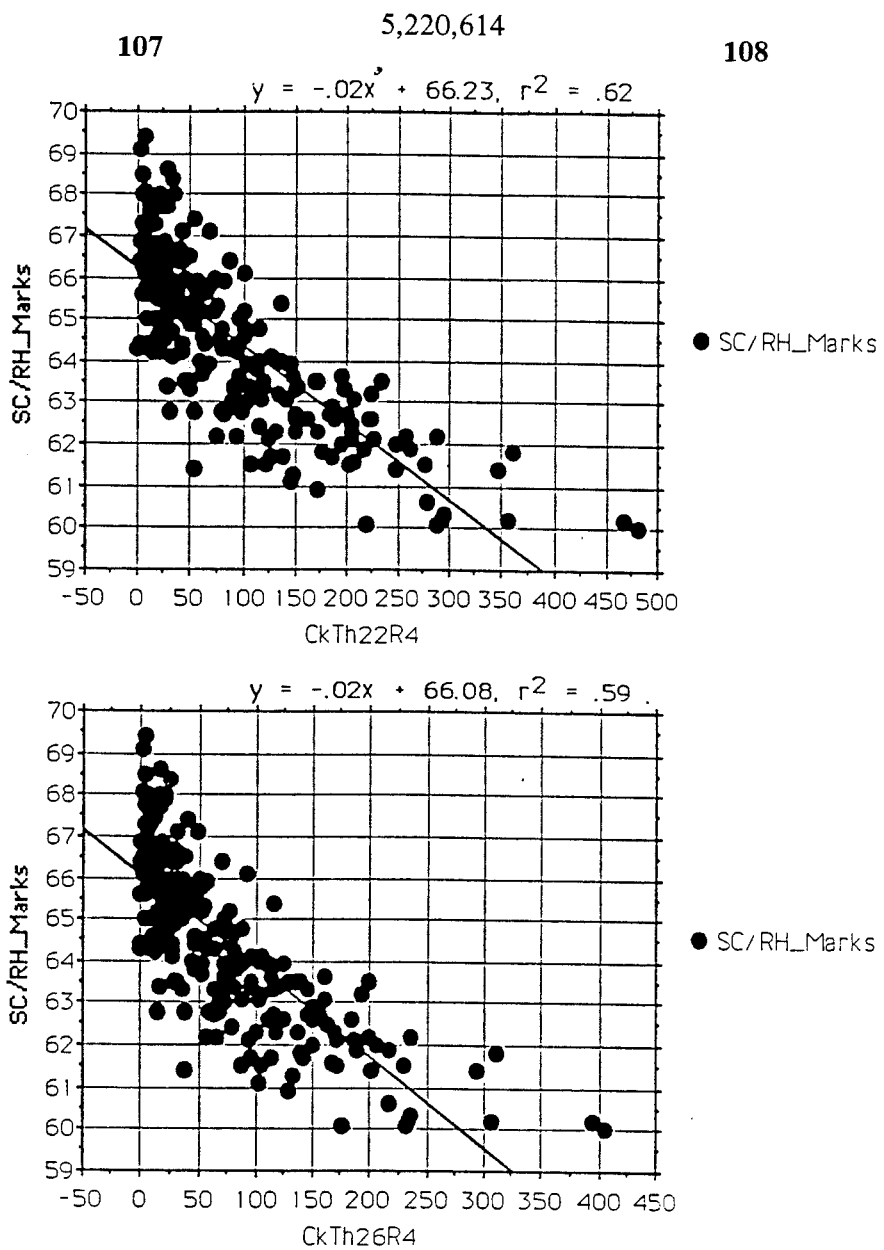

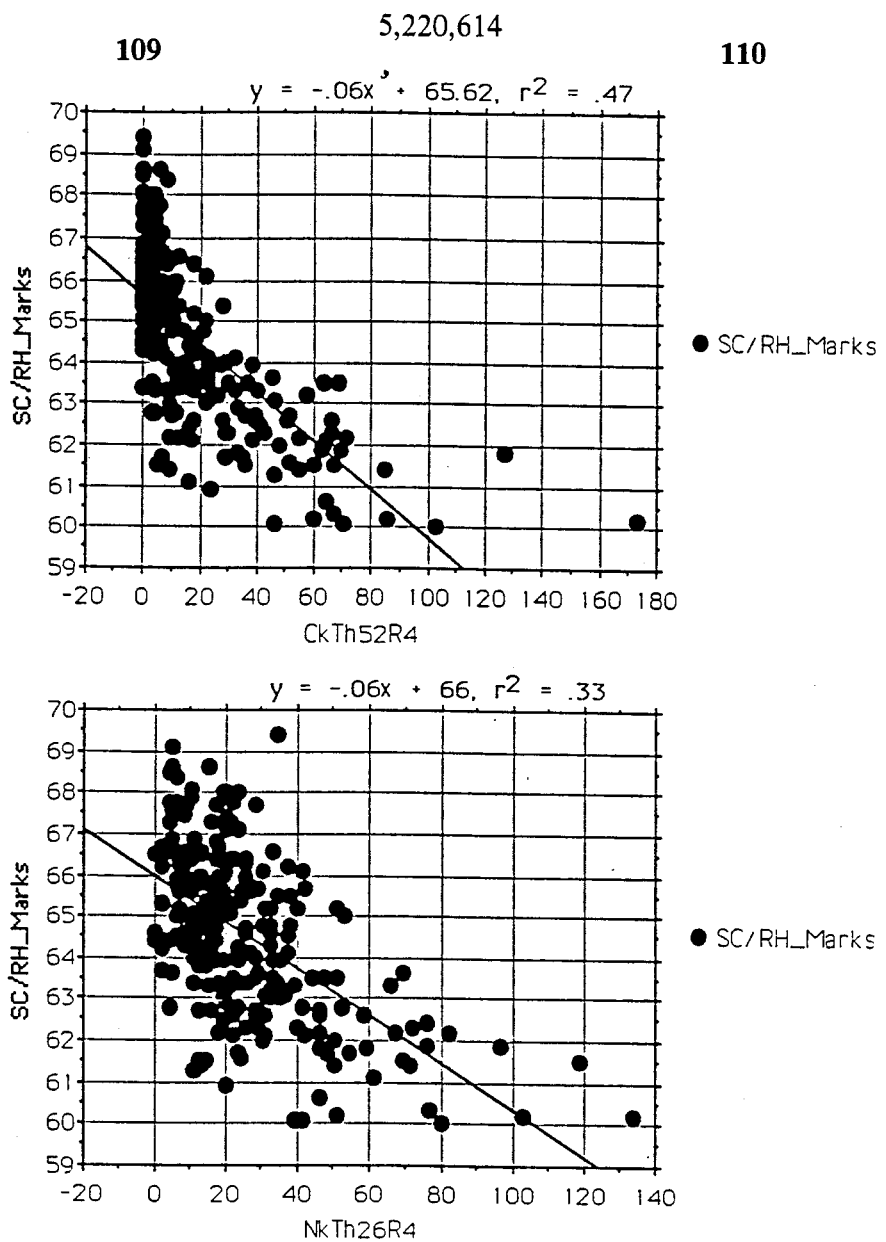

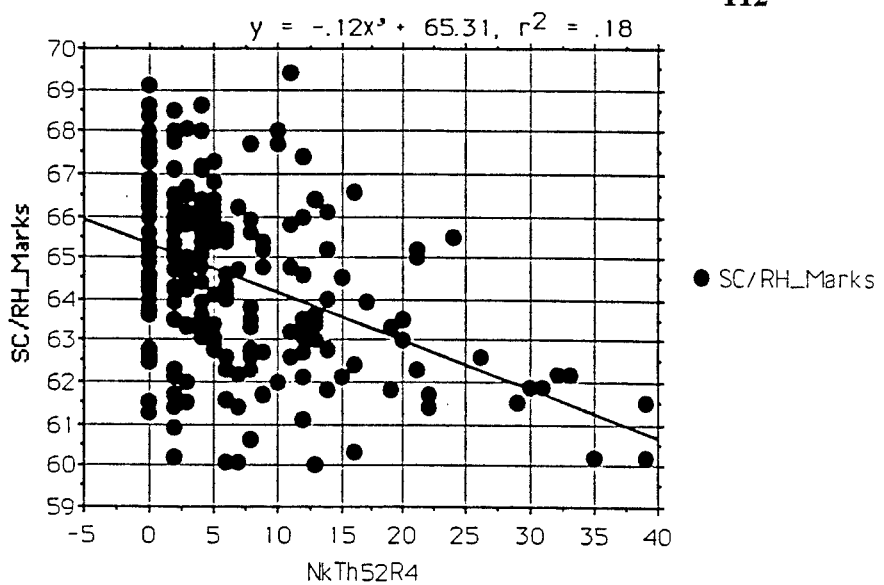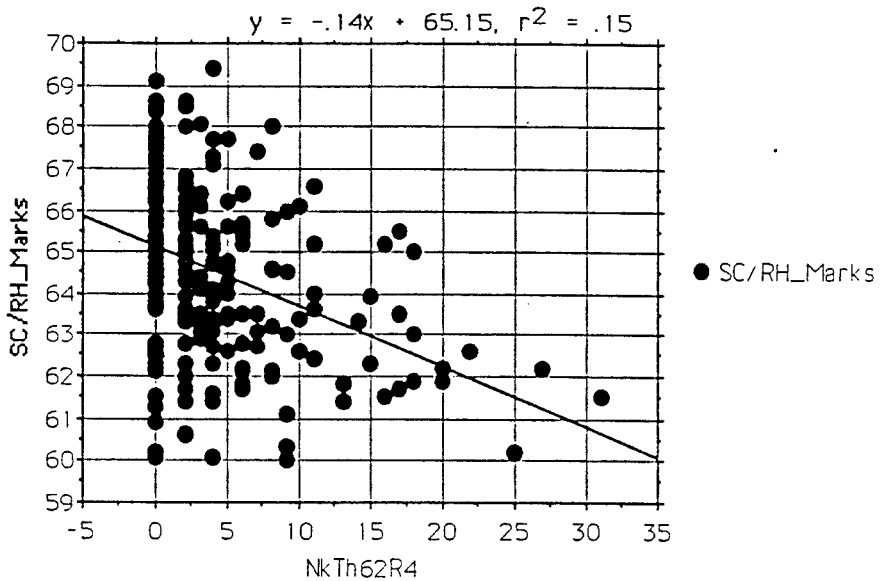

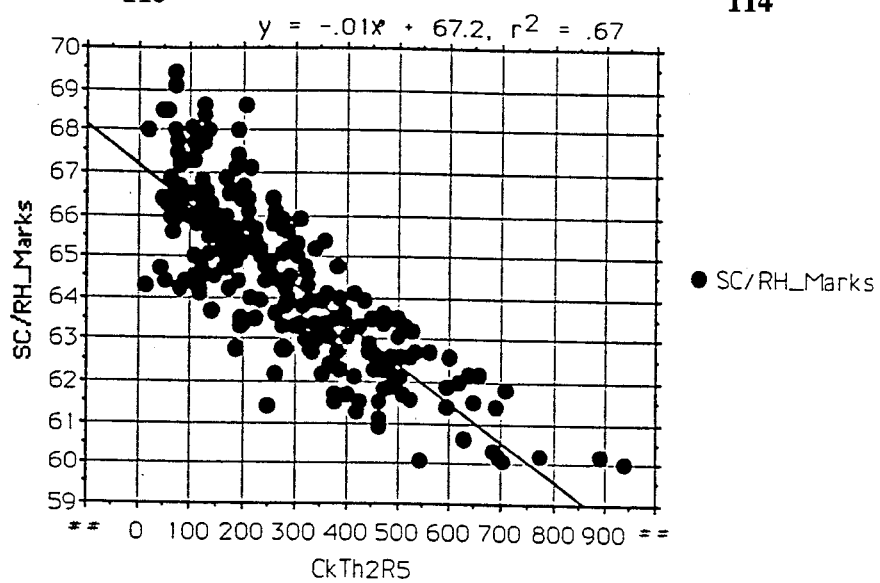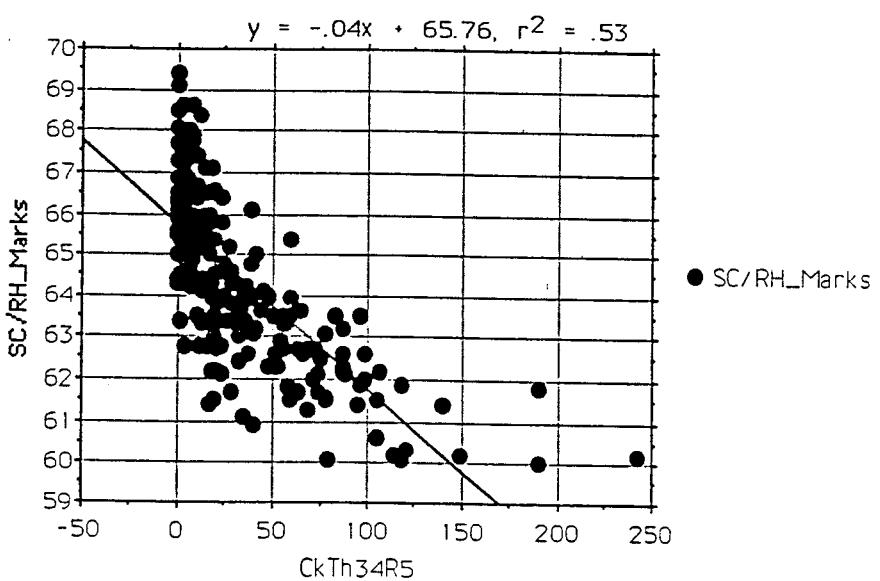

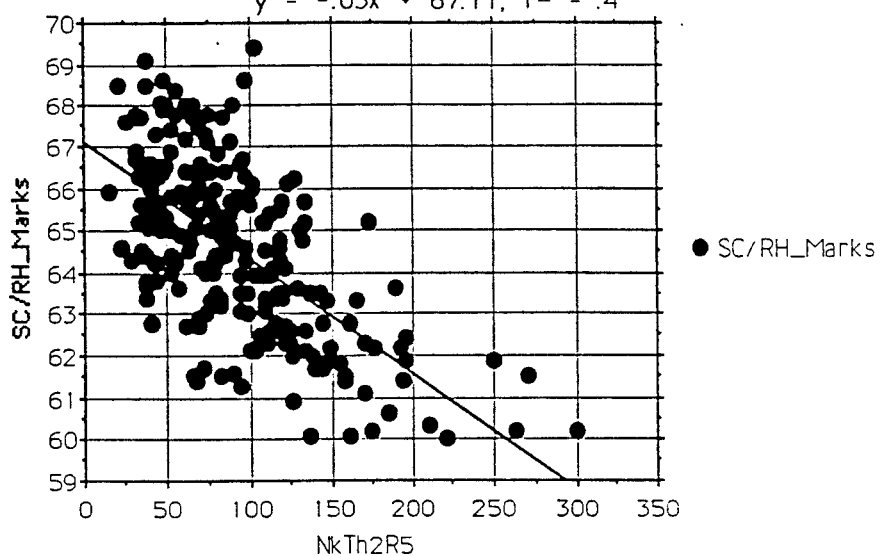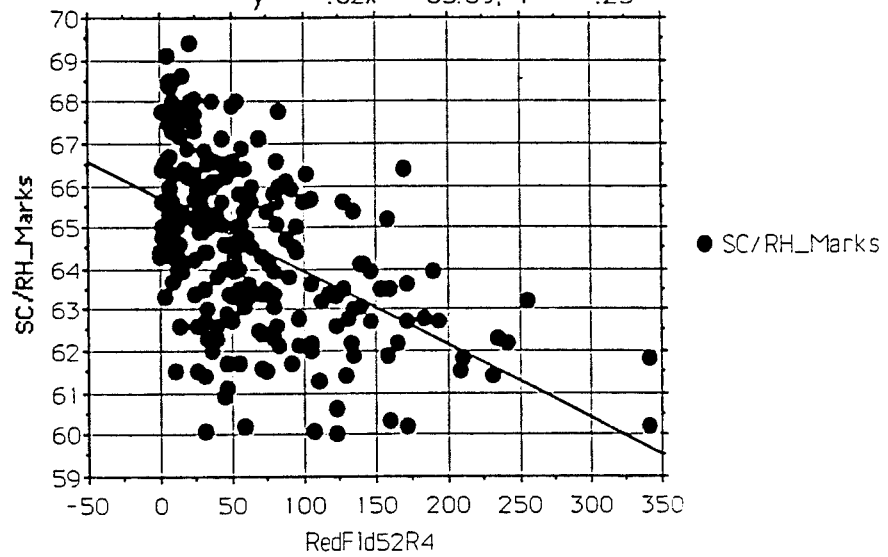

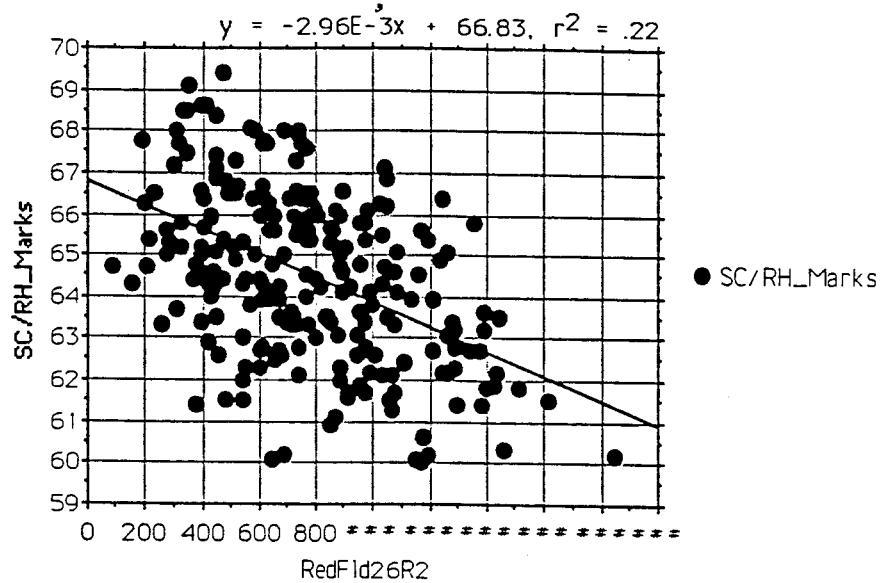
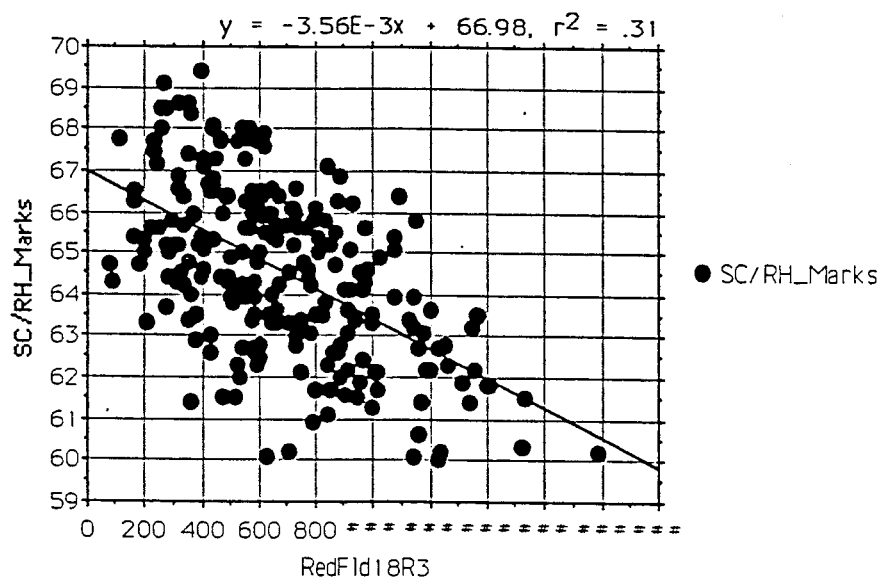

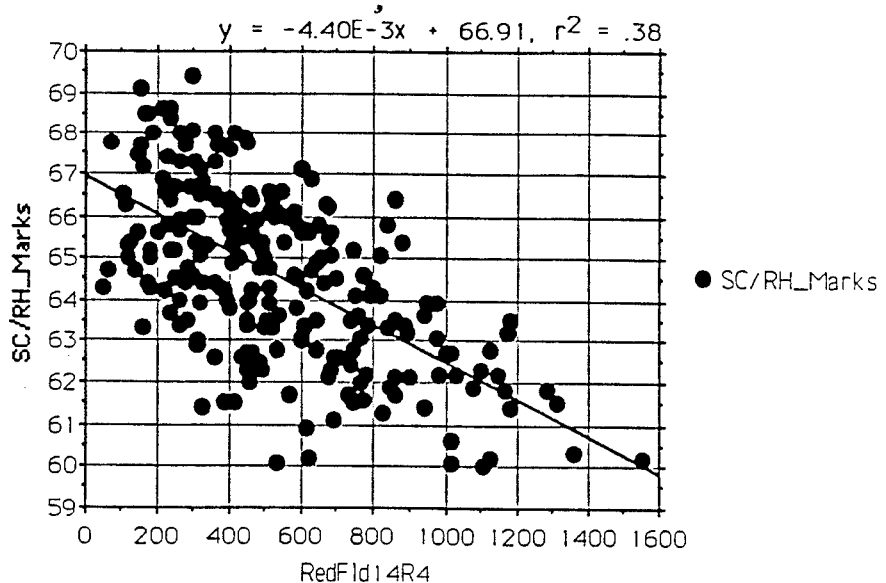
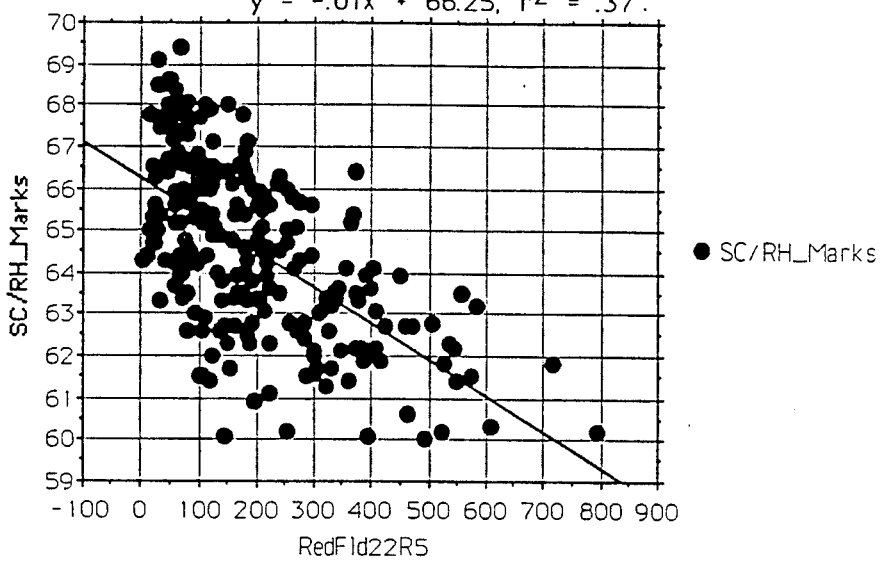

AHIF Analysis

The high frequency region analysis computes the flaws in the various high frequency regions. It identifies bright regions, or "pops", in lights 5 and 6 and compares the location of those objects with the location of objects found in the reference images for each coin type. The reference images are stored in the data base and are the result of averaging up to 60 coins of each coin type (eg 7130) under each of the individual lighting conditions. In this manner, all flaws are eliminated since a flaw would have to have occurred in the exact location on most of the 60 coins for the flaw to exist on the references. Thus the references define the true landmarks for object comparison.

The AHIF analysis results in a set of 7 metrics defining the count for flaws in the high frequency regions. These cannot be simply added to the ALOF metric but rather these metrics are used in limit tables to add a penalty to the ALOF marks grade based upon a limiting set of values. The penalty is based upon the total of the flaws found in the regions scaled by the initial marks grade of the coin. Thus a higher penalty is given to an otherwise high grade coin than to a lower grade coin.

The AHIF analysis has a relatively small effect on the final grade but does bring the total marks correlation up to 92% (91.96%).

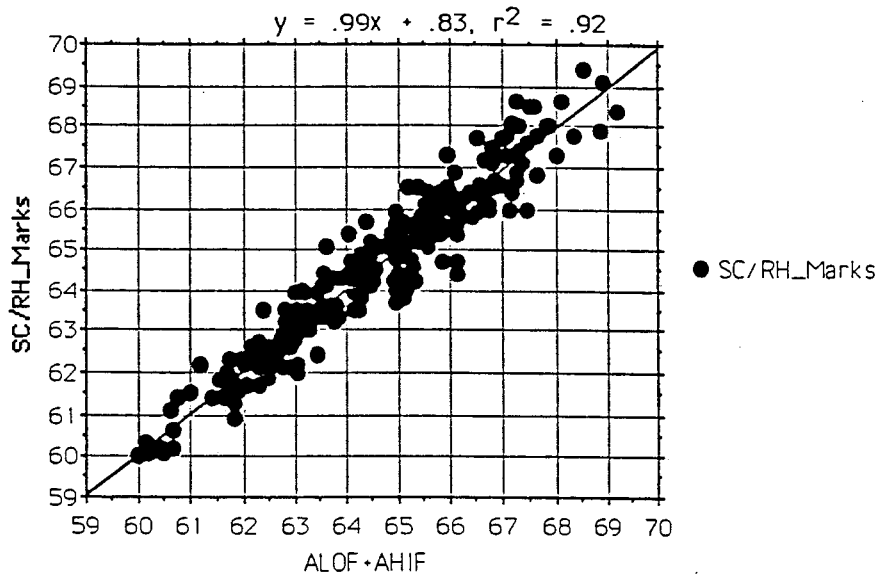

In the Turing comparison, there are a few targets: the correlation between the two graders SC and RH, the correlation between SC and JD who do not work together on a daily basis, and a similar correlation between RH and JD. These correlations are 93%, 87% and 85% as shown below. Note that even between SC/RH there are a few coins that are given significantly different marks sub-grades. In addition the Expert slope and intercept are .99 and .83 while for SC vs RH these values are .94 and 3.94 which indicates an offset in the correlation or basic standards.

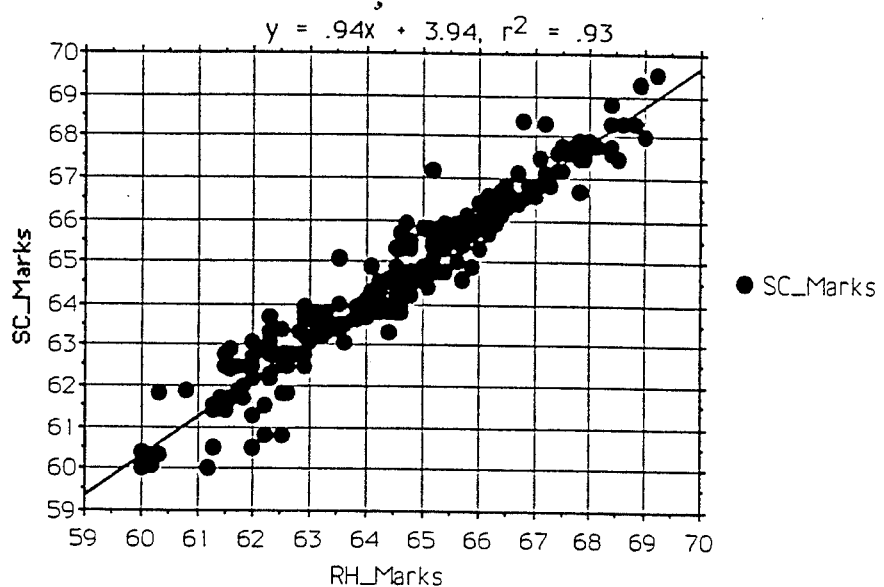
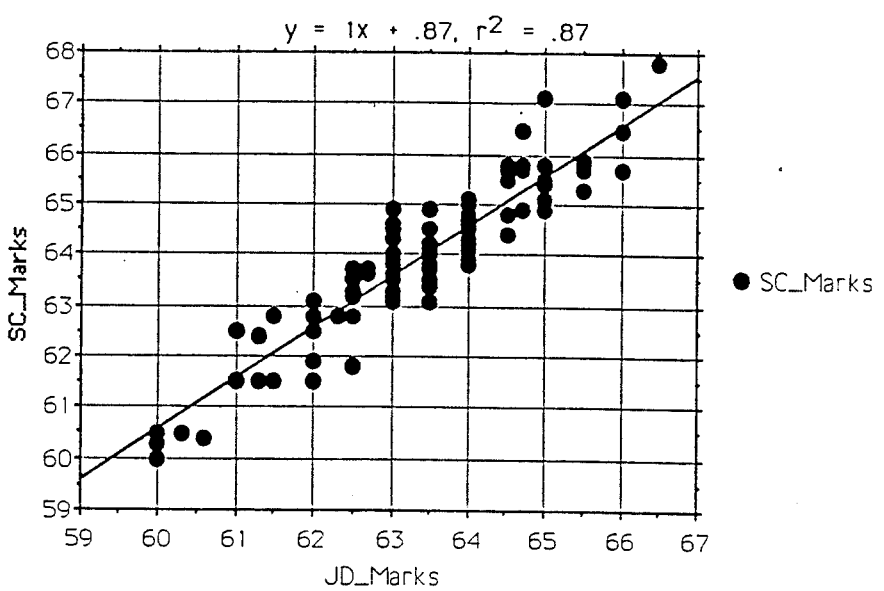

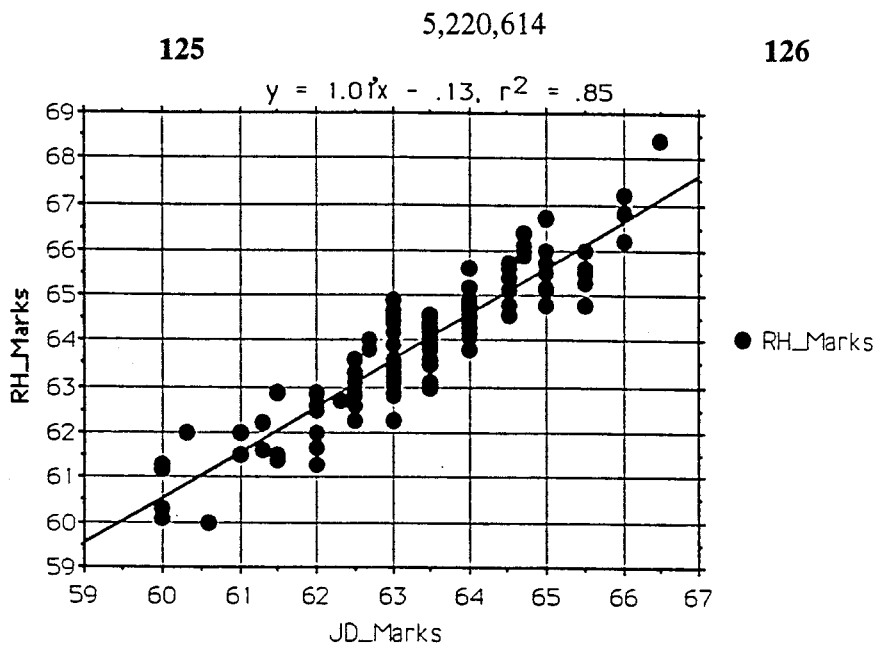

The following table defines the constants used in the AHIF penalty phase. Each of the 7 regions, have a limiting value above which a penalty is applied and the particular penalty in each region is shown subsequently. The actual penalty applied is first computed as a ramp function starting at 0 at the cutoff value - 10% and at the value shown at cutoff or above. Then the magnitude is reduced according to the basic ALOF grade so that, for example, a 1.0 point penalty for a 65 coin would result in an actual penalty of 0.5 pts. Similarly a 1.0 penalty value for a coin near 60 would receive very little additional penalty.

| | |
|---|---|
| TopPen | 1.10 |
| lowfact | 0.00 |
| highfact | 2.38 |
| LongHair | 108.50 |
| Face | 61.50 |
| FineHair | 101.50 |
| Hat | 100.50 |
| FineHairLong | 34.50 |
| Lets | 92.50 |
| Rim | 260.50 |
| LongHairPen | 0.40 |
| FacePen | 1.00 |
| FineHairPen | 0.80 |
| HatPen | 1.00 |
| FineHairLongPen | 0.35 |
| LetsPen | 0.19 |
| RimPen | 1.00 |

The scaling of these penalty values is based upon a linear function factor with the equation:
$$f = m*G - b$$
where G is the preliminary grade from ALOF defining f which is a linear function ranging from 0.0 at an initial grade of 60 to 2.38 at 70,
  m = (highfact - lowfact)/10 = .238
  b = m*60 - lowfact = 14.28

The individual AHIF2 metrics that contribute to these results are shown below for the purposes of parameter limits.
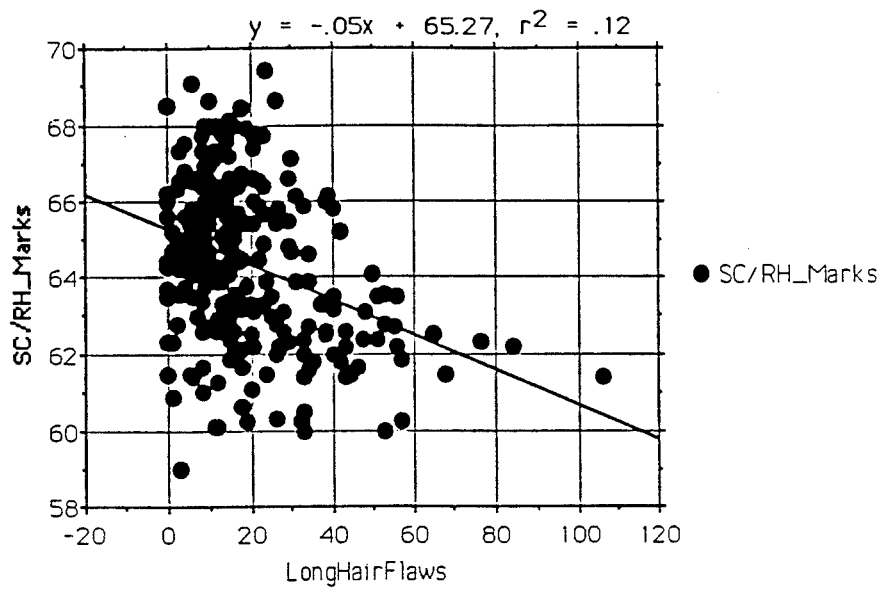
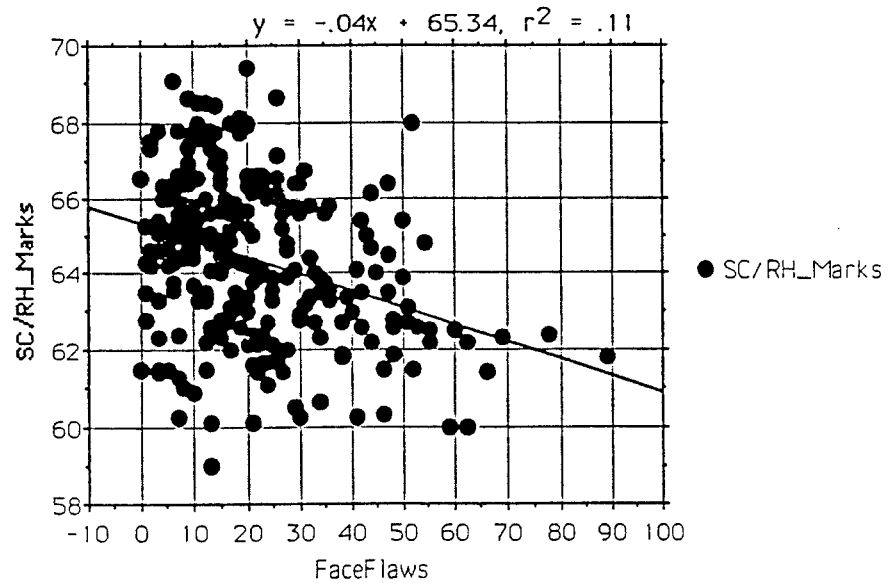

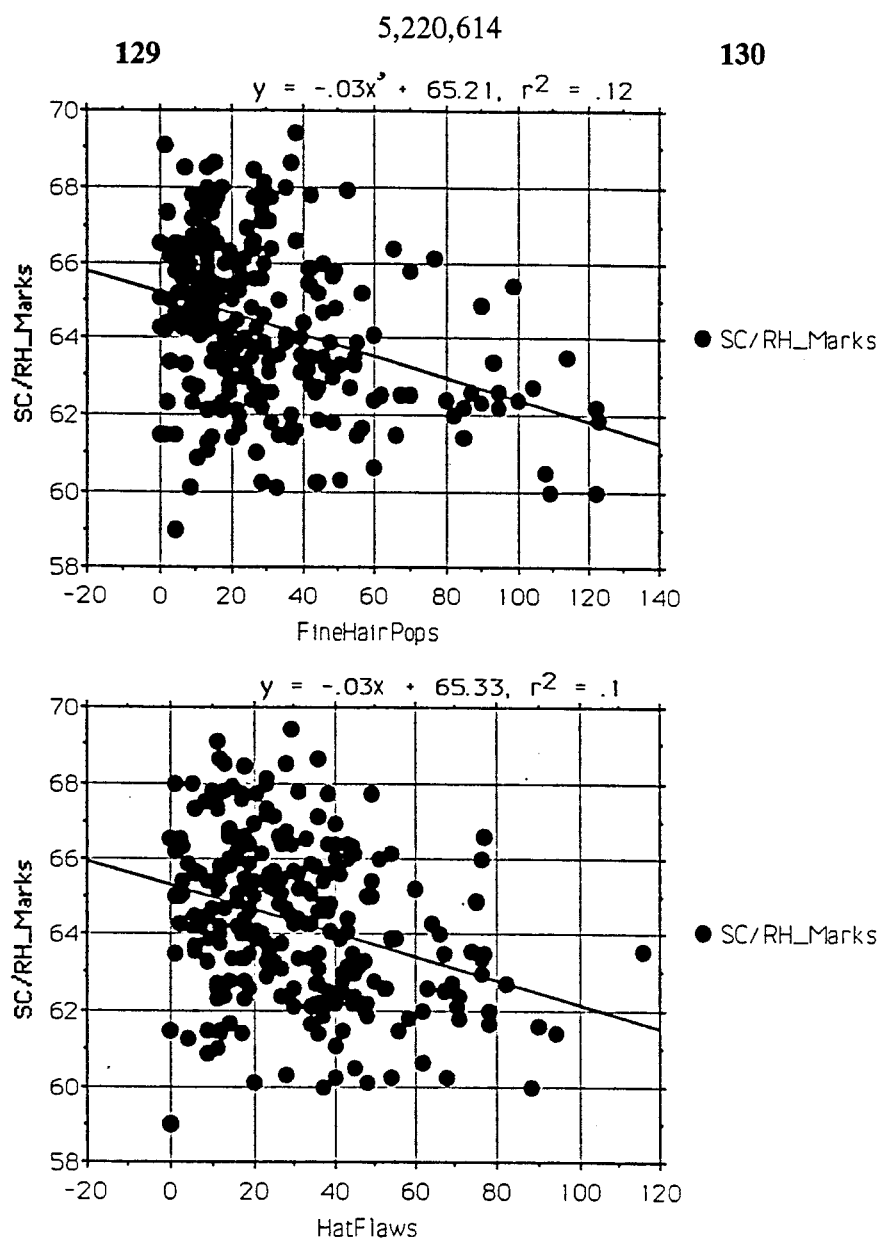

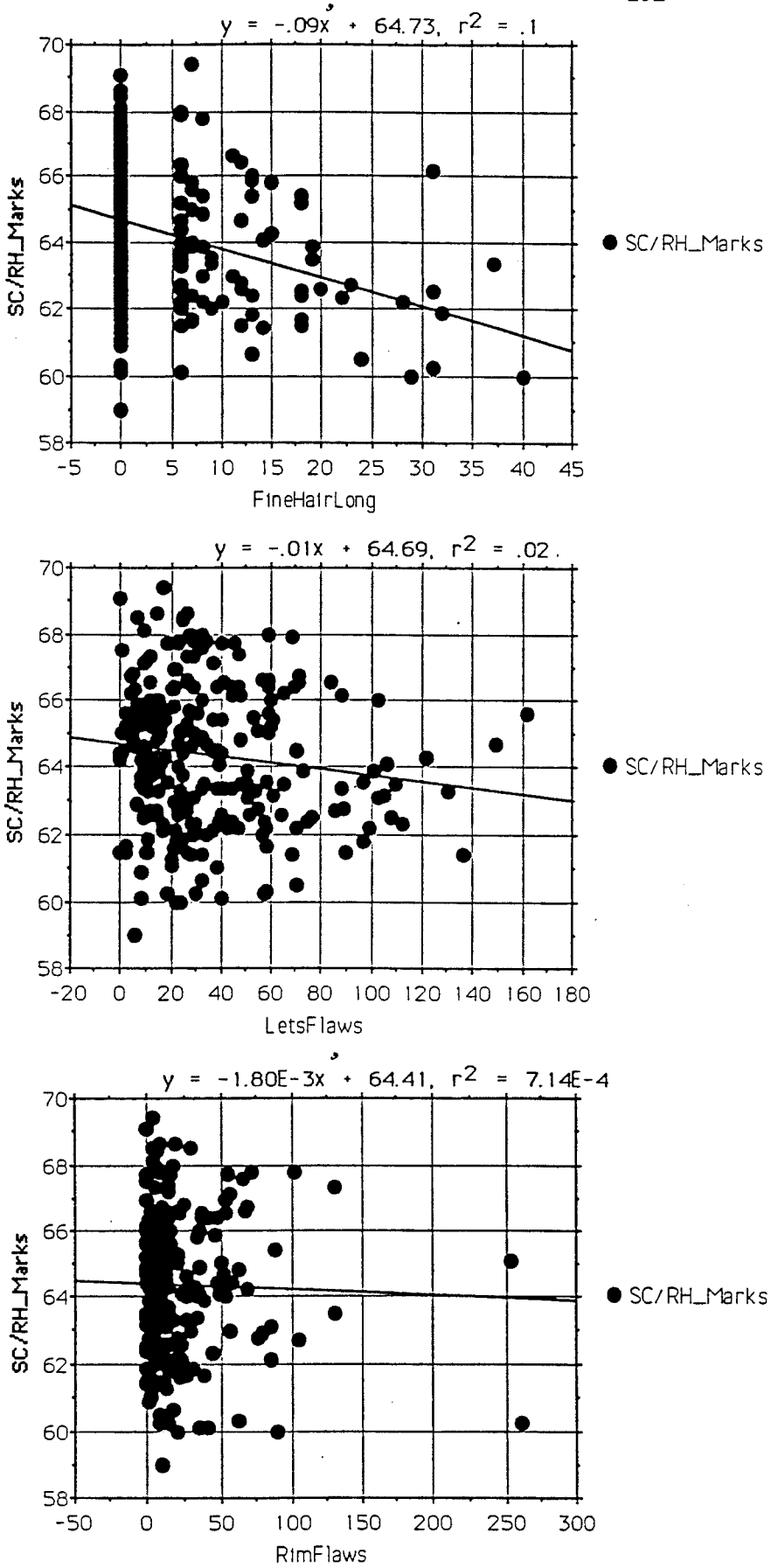

Reverse Quick Grade

Compute the metrics shown below using light 8 only, after masking the FS results with the Luster Band Mask from that image. The equation is:

QG Metric = 0.7372*PredLuster - .02542*C3FsQgFldTh29L8 and when pinned at a low of 60 has the following results:

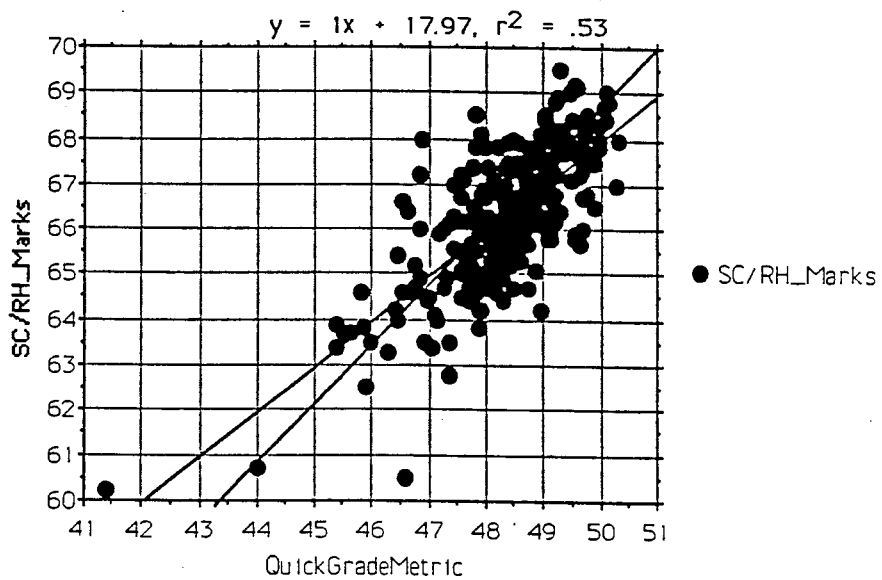

where the regression line from (42,60) is the true regression line and the line from (43.3,60) is the interpolation line to utilize for the QuickGrade. The interpolated function pays less attention to the point that will be pinned at 60 and increases the correlation for high grade coins. The charts below are for the actual regression line and not the interpolation function but the results are obviously similar.

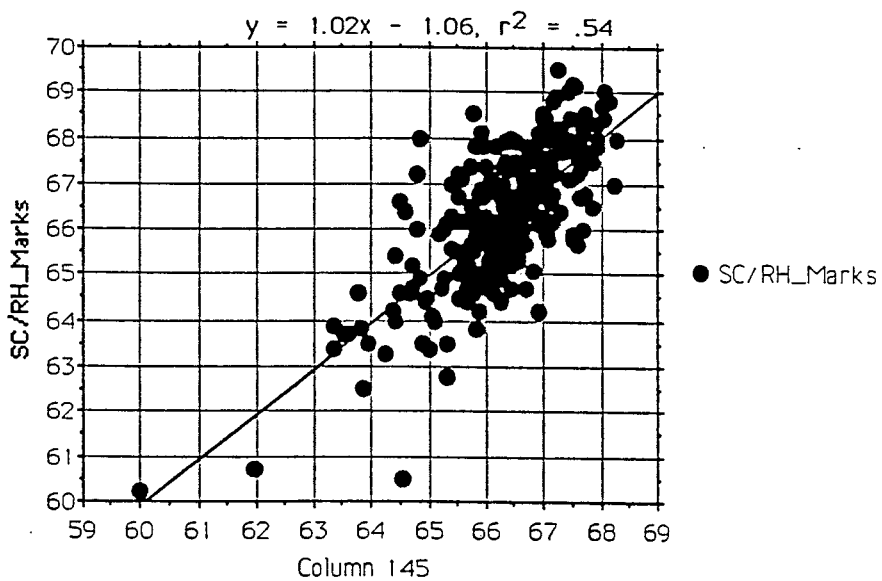

To see this somewhat more clearly, cellulation shows the following result.

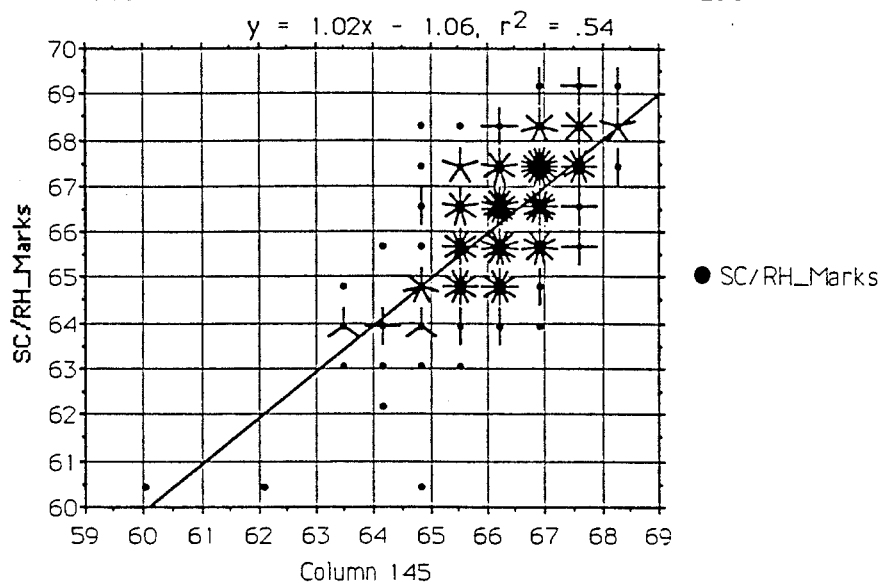
The input metric for the field is shown below.
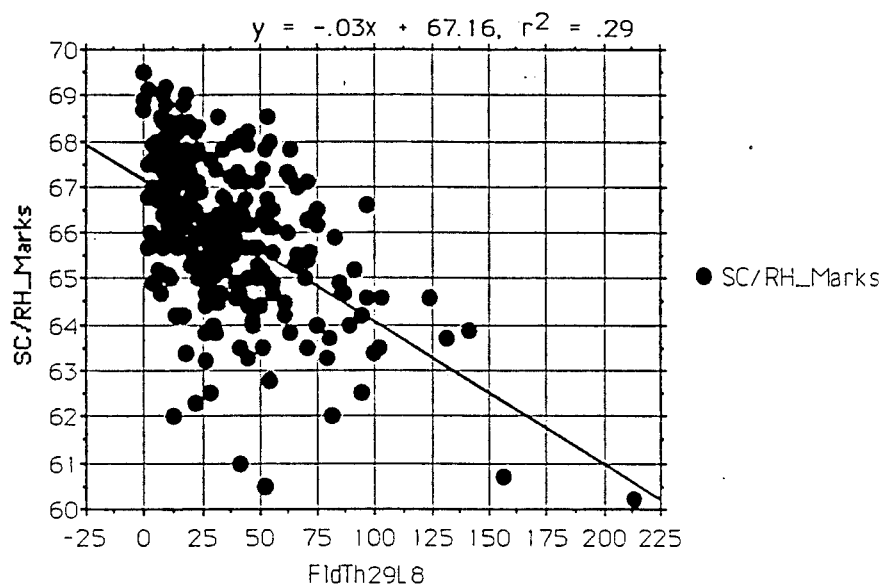

Reverse Marks Analysis

Similar to the obverse method, the reverse marks analysis consists of two major phases, the low frequency and the high frequency analysis methods, ALOF and AHIF. The final result of these methods is a 68% total correlation as shown below.

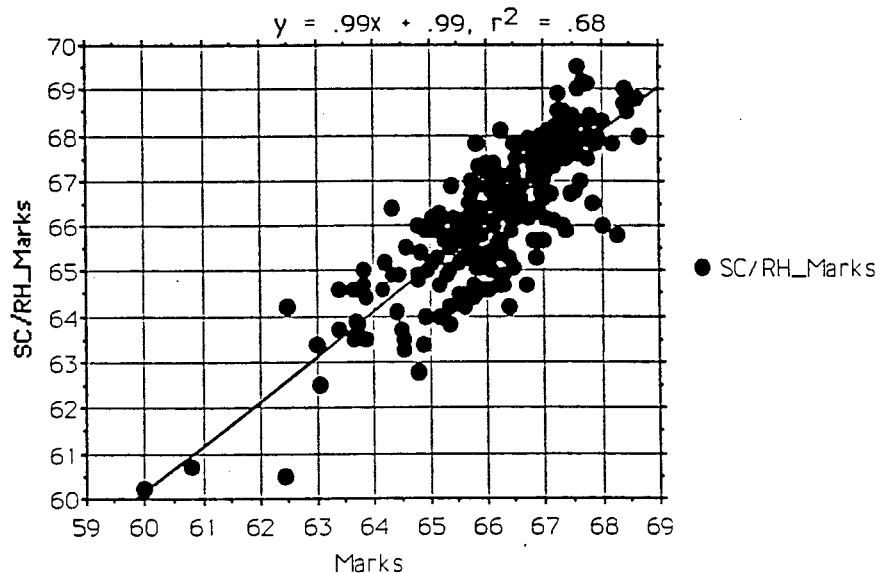

This compares reasonably with the Turing test against the human graders where the correlation ranges from 58% to 77%.

Low Frequency Reverse Marks Analysis, ALOF

The low frequency region of the reverse is the field region and only two metrics are required to be measured: FldTh52R2 and FldTh10R6. These measurements are made on the accumulated FS results from the FS images from lights 5, 6, and 8 only with the FS results reduced by a factor of 2 in the region of the LBM of each input image. As a result, the equation for reverse marks is:

RevMarksMetric = .001*(663.0*CompLuster + 19.70*FldTh38R2 - 22.4*FldTh10R6)

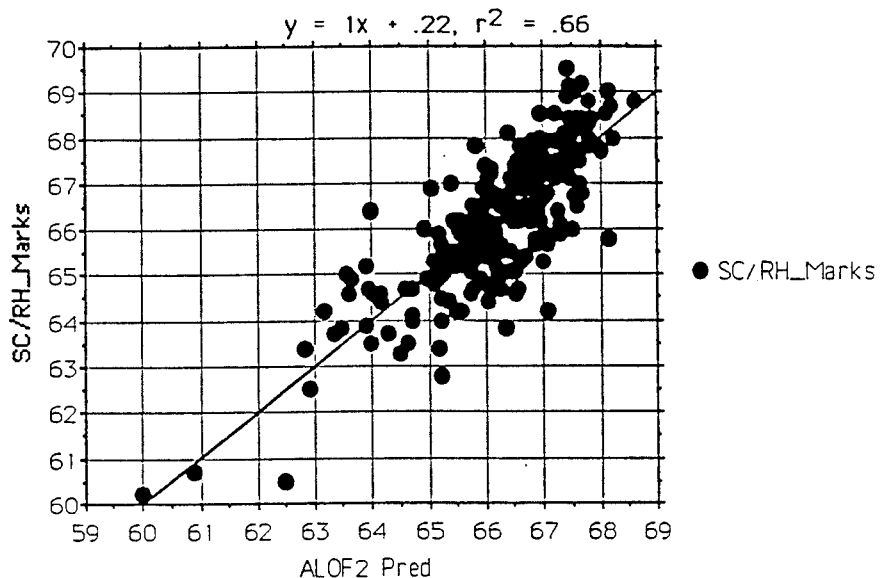

This correlation is obtained by first removing all cleaned coins and coins with toning > 50%. In addition, coin CCI59 is removed because it is so bad that the computer wants to give it a grade of 57-58 which we can correct simply by pinning. Then after the stepwise regression provides the metric weights, place CCI59 back in at a value of 60 for the above 66% correlation.

Interpolation using 4 degrees of freedom as shown below results in a 66.7% correlation value.

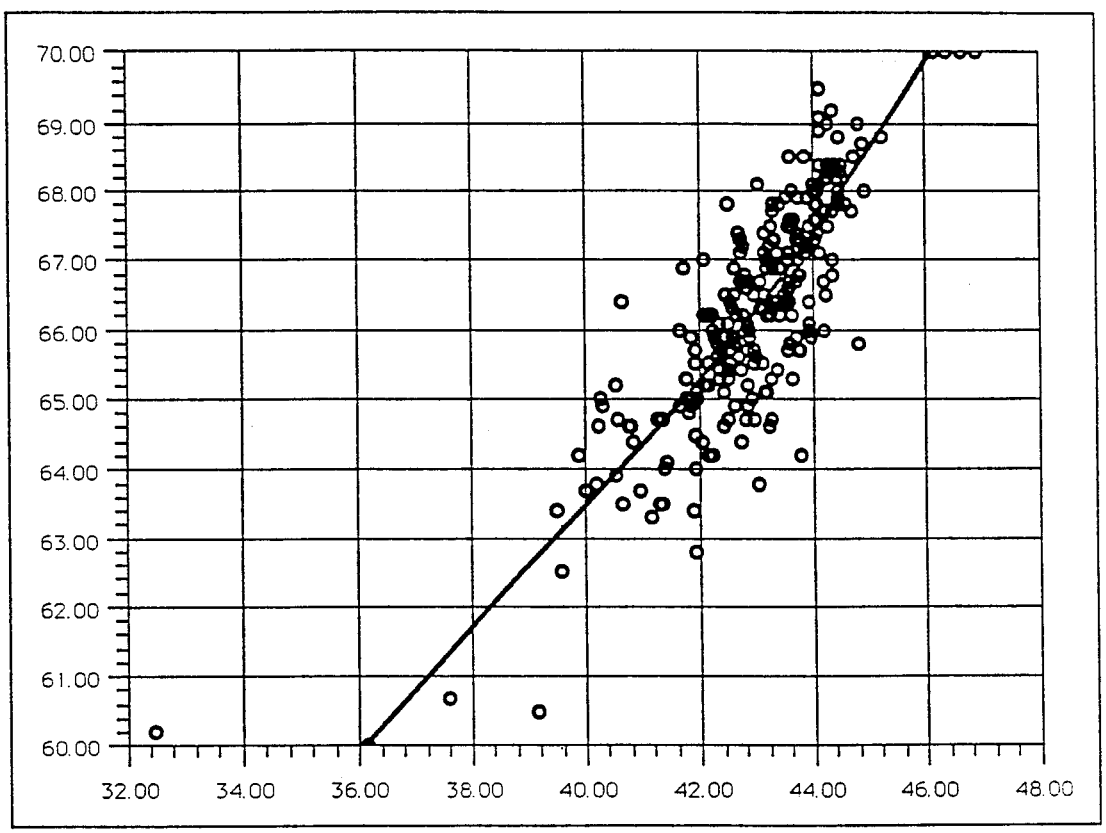
where the control points are:
| x points | y points |
|---|---|
| 36.15 | 60.00 |
| 41.76 | 65.00 |
| 43.75 | 67.00 |
| 46.14 | 70.00 |
As a result the interpolated ALOF results are as shown below.
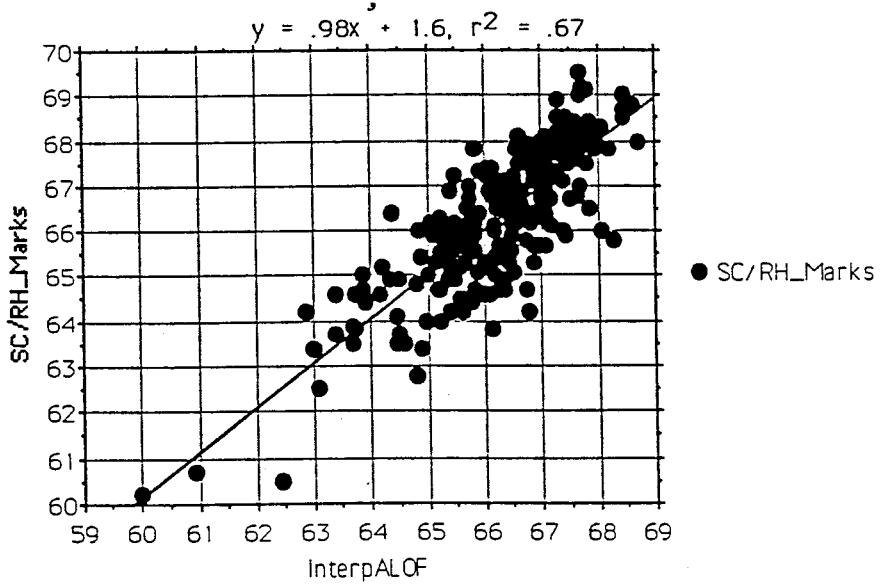
Charts for the two input metrics beyond luster are shown in the following diagrams.

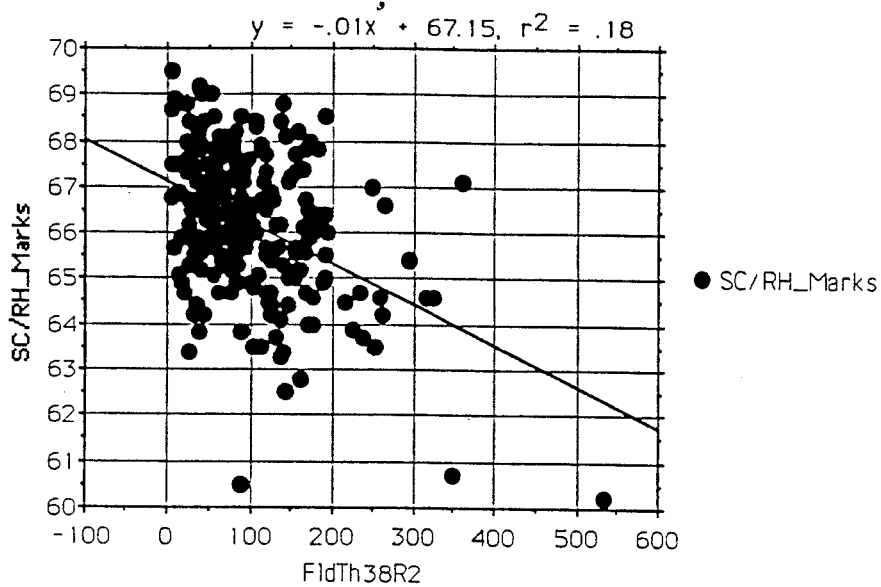

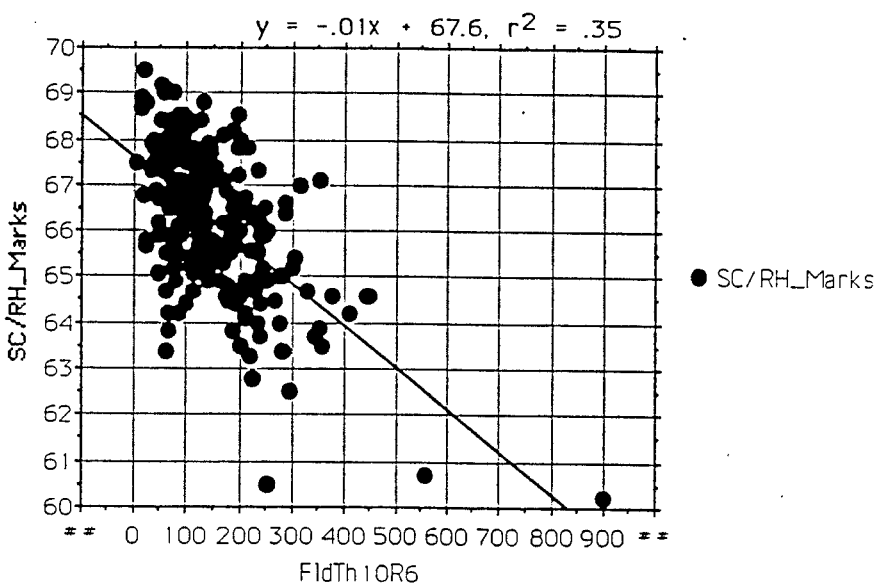

Note...The results of the ALOF analysis using all of the lights, 5 to 9 inclusive, are similar and about 1% better than the method detailed above. The only difference is the addition of lights 7 and 9 at a cost of approximately 30 seconds of time per reverse. The equation for the ALOF metric in this case is :

RevMarksMetric = .001*(614.29*CompLuster + 12.39*FldTh52R2 − 13.58*FldTh10R6)

The control points for this interpolation function are in this case:

33.01  60.00
    38.47  65.00
    40.46  67.00
    42.70  70.00

High Frequency Reverse Marks Analysis, AHIF

The AHIF analysis measures the high frequency flaws in 6 regions of the reverse and the results are processed similarly to the obverse AHIF analysis with the following parameters. Each of the 6 regions have a limiting value above which a penalty is applied and the particular penalty in each region is shown subsequently. The actual penalty applied is first computed as a ramp function starting at 0 at the cutoff value - 10% and at the value shown at cutoff or above. Then the magnitude is reduced according to the basic ALOF grade so that, for example, a 1.0 point penalty for a 65 coin would result in an actual penalty of 0.5 pts. Similarly a 1.0 penalty value for a coin near 60 would receive very little additional penalty.

```
TopPen              0.77
lowfact             0.00
highfact            1.47

WingHead           87.50   X
FullBreast        150.50   X
CenterBreast       85.50
LongScrBreast      31.50
LetsTail          341.50
Rim               150.50

WingHeadPen         0.100
FullBreastPen       0.028
CenterBreastPen     0.050
LongScrBreastPen    0.846
LetsTailPen         0.075
RimPen              0.325
```

The scaling of these penalty values is based upon a linear function factor with the equation:
$$f = m*G - b$$
where G is the preliminary grade from ALOF defining f which is a linear function ranging from 0.0 at an initial grade of 60 to 2.38 at 70,
$$m = (highfact - lowfact)/10 = .147$$
$$b = m*60 - lowfact = 8.82$$

The values for WingHead and FullBreast, identified with an X, are the highest values in the grading set and rather than indicating the threshold for a penalty represents the limit of reasonable experience for flaws in these regions.

The final result of the ALOF interpolated with an AHIF adjustment is shown below.

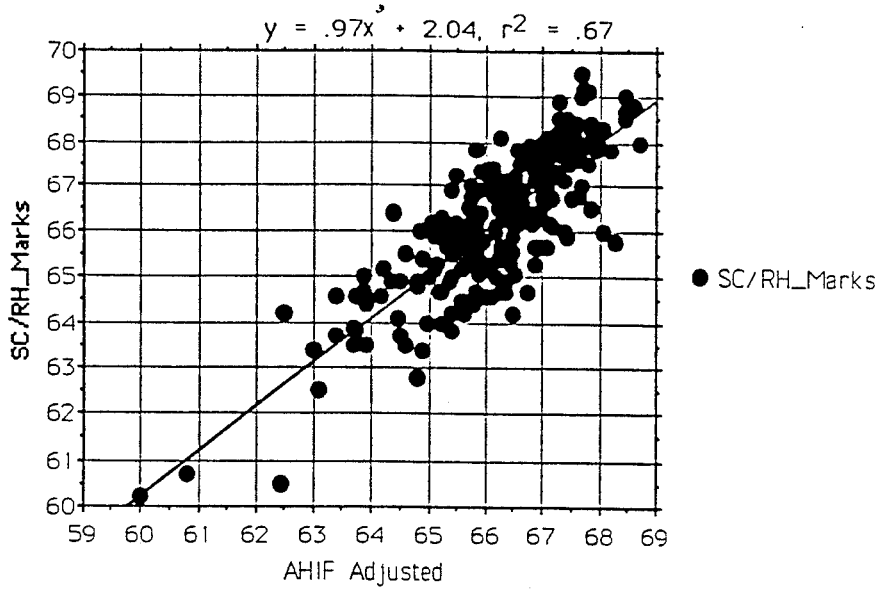
The various reverse high frequency metrics that were involved in this analysis are shown in the following charts.
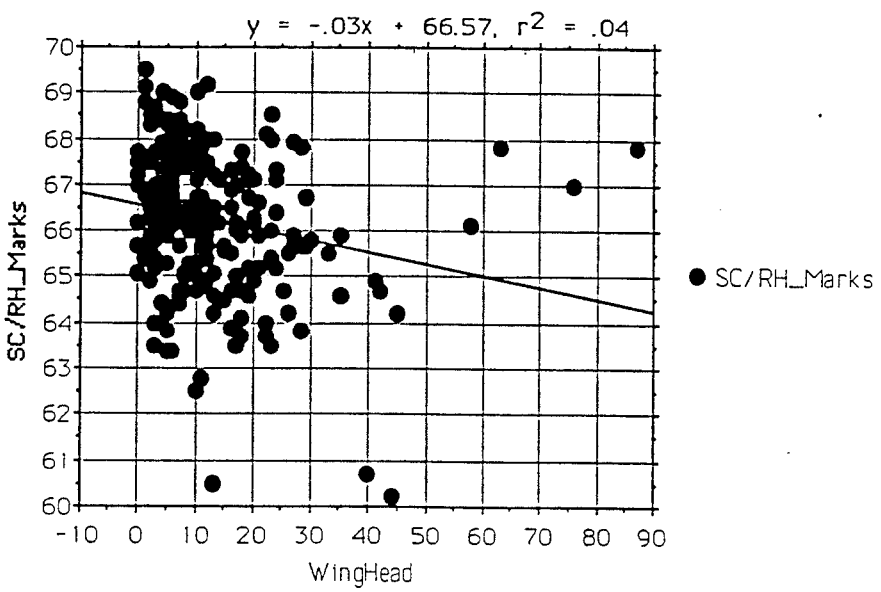

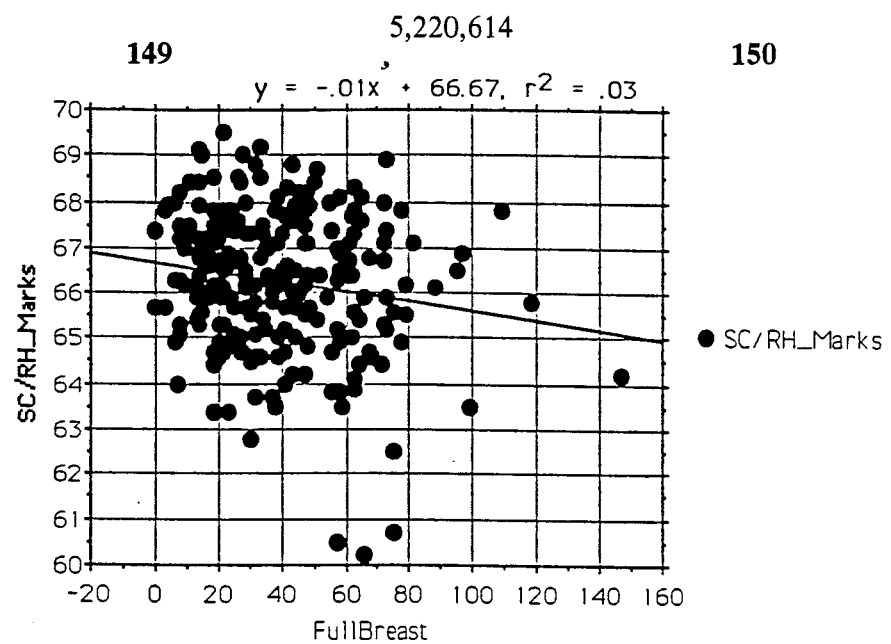
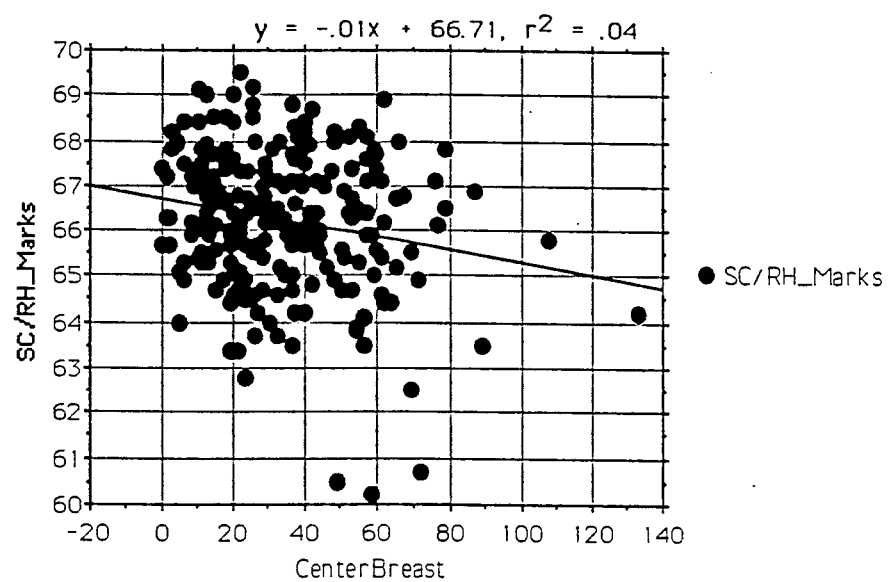

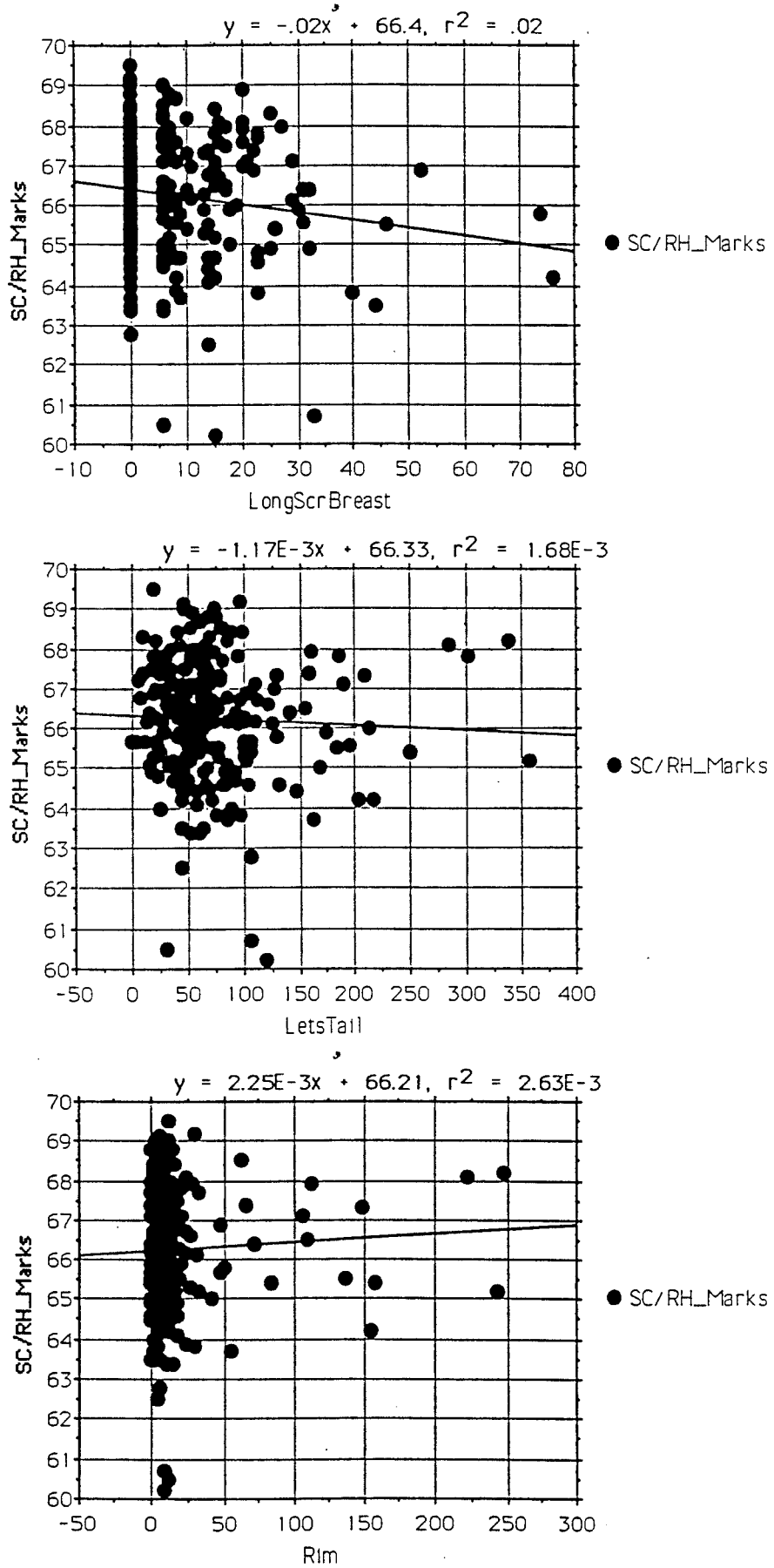

Strike

Obverse Strike

Method: Adjust S1 to S4 for dark coins, TOUM(S1, fullCoinMask) < 18 using a quadratic function for a Logarithmic brightness modification with a linear ramp down to 0 starting at 18 ending at 19. No brightness correction otherwise.
Measure C2DFS8TH6 which is the Connectivity Count using a min object of 3 based upon the DFS image of the relief image when thresholded at a value of 6. The relief image is the FSXS of the MIN(S5, S6) where S5 and S6 are the ICOM of (1,2) and of (3,4) with the above brightness corrections.

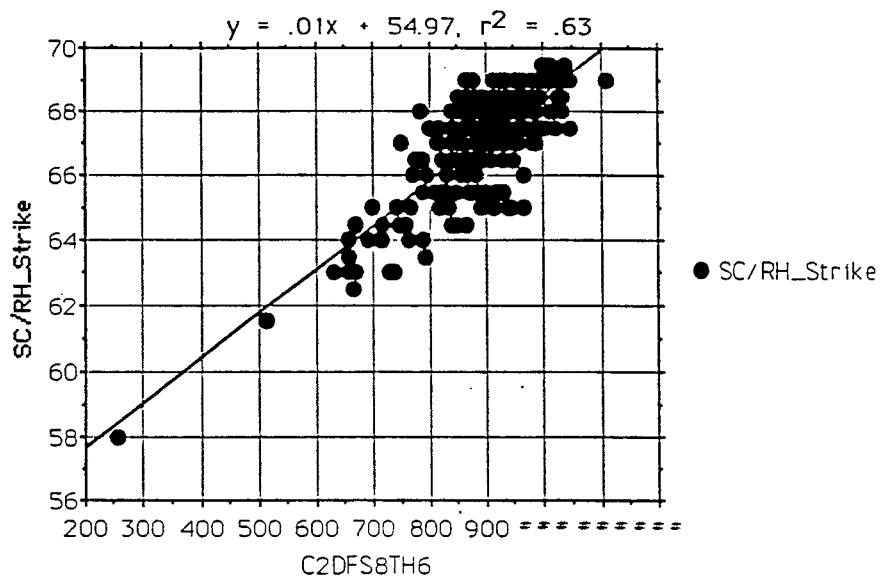

Reverse Strike

Method: Create an original image relief in S8 and a fully corrected relief in S9 in which a fully corrected S1 to S4 uses a brightness correction for dark coins based upon TOUM(S1, fullCoinMask) < 18 using a quadratic function for a Logarithmic brightness modification with a linear correction for all others based upon a (TOUM-25)/5 function.

Measure three metrics: C2DFS8TH24Cl, C2DFS9TH6LBr, and C2DFS9TH21Cl where C2DFS8TH24Cl is the count (connectivity not required) of the DFS image at th=24 in the claws region of the original relief image, C2DFS9TH6LBr is the count of the DFS image at th=6 within the breast region, C2DFS9TH21Cl is that value within the claws region. The individual and total metrics are shown below.

RevStrike = 1.67*C2DFS8TH24Cl + .393*C2DFS9TH6LBr + 1.08*C2DFS9TH21Cl

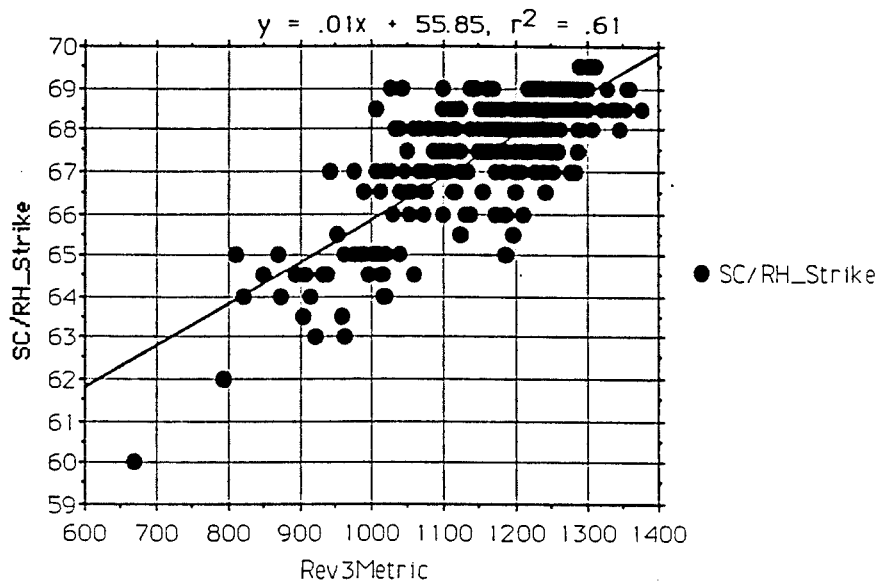

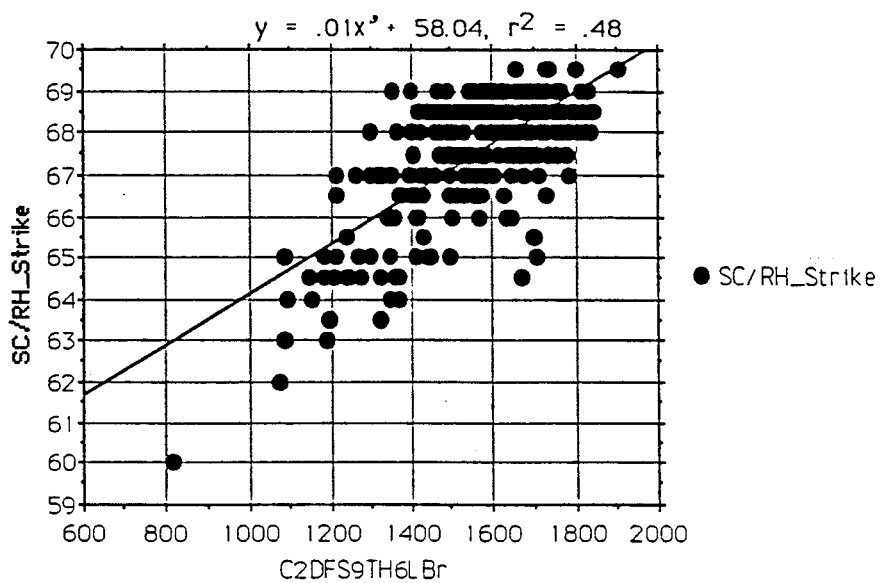
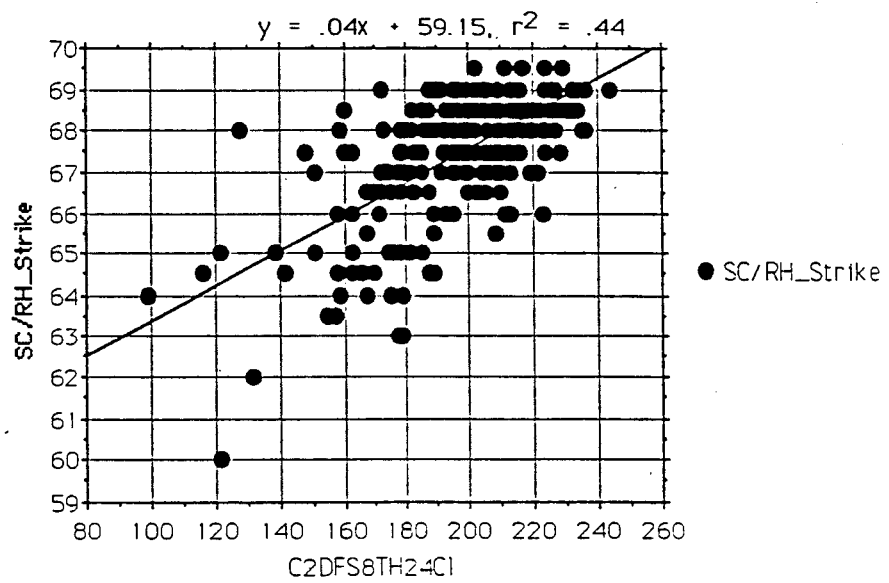
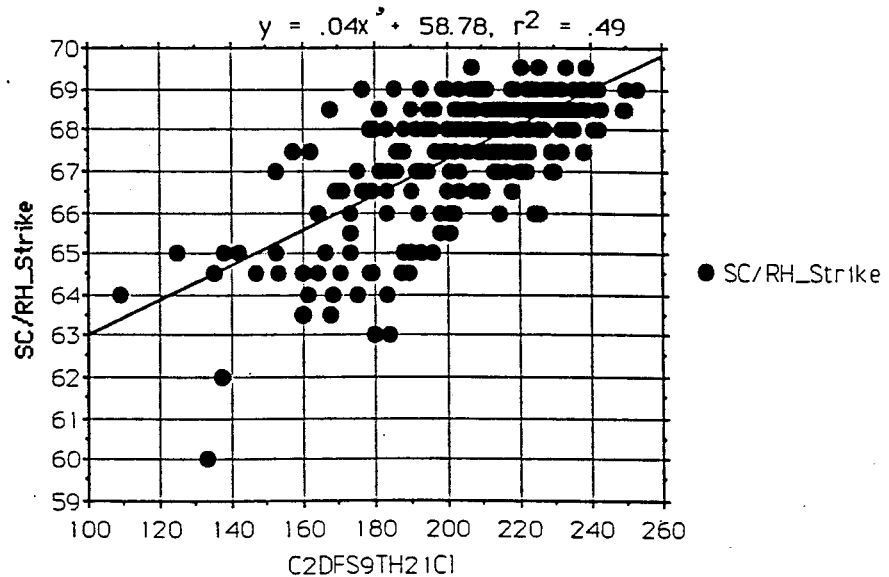

Method: Adjust S1 to S4 for dark coins, TOUM(S1, fullCoinMask) < 18 using the same method as for strike. Then measure the following parameters, X indicating with the brightness correction, non-X for the original images.

| | |
|---|---|
| H2L7FldX | -1.93 |
| RfL7Seg | -26.78 |
| PctL12CamX | +12.16 |
| H5L2FC | -.11 |
| H7L5SegX | -4.95 |
| CrmL11SegX | +6.05 |

Where Hi are the various standard histogram metrics, Pct is the PctTotUM, Li are the measurement w/to light i, i=1 to 9, 11 being MaxImage(L5 to L9), and L12 being MaxImage(L1 to L9). The mask regions are the field (Fld), Segregation Mask (Seg), Full Coin (FC), and Cameo Region (Cam).

Cleaned coins should be identified first as cleaning tends to increase the metric yielding an overly high luster value.

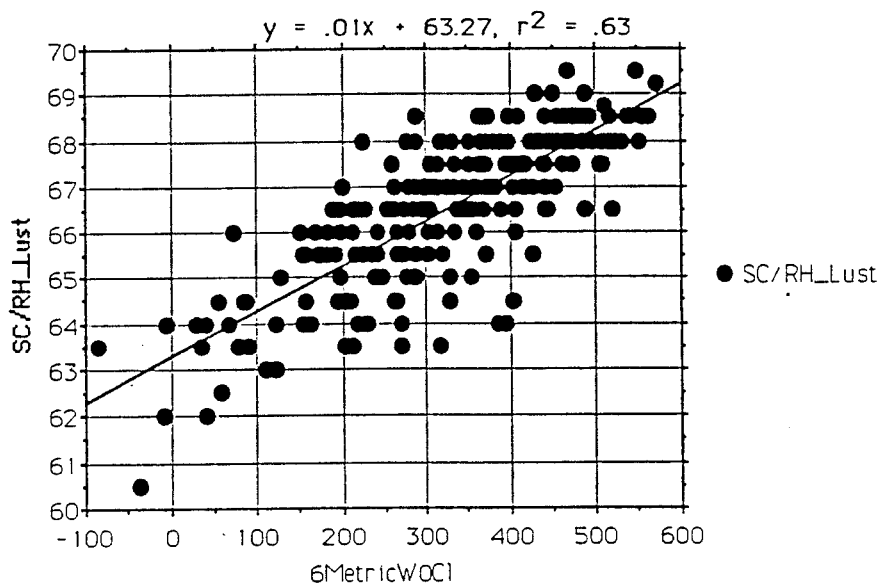

As a predictor, the linear metric provides the following result.

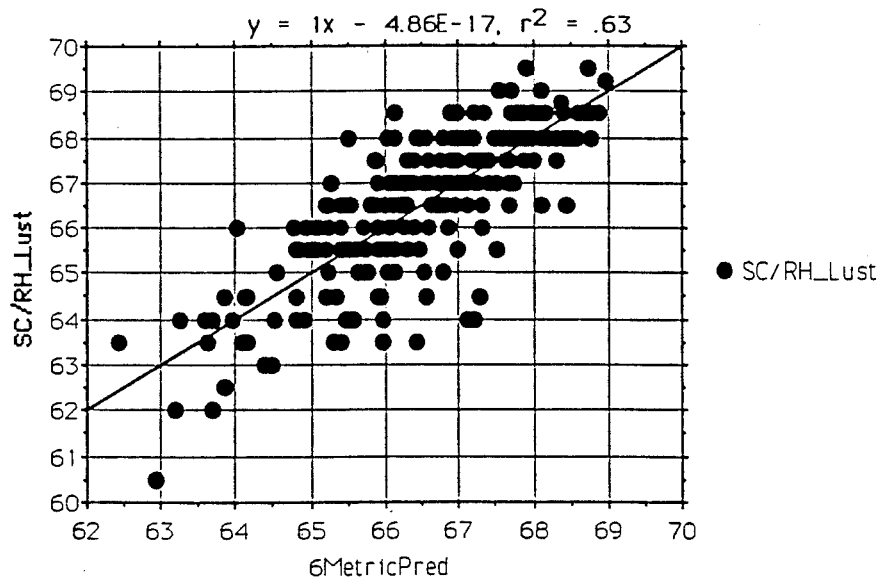

The Turing test comparison for luster would be the comparison of SC luster to RH luster which is quite poor, and the slope of .55 indicates a different basis of measurement.
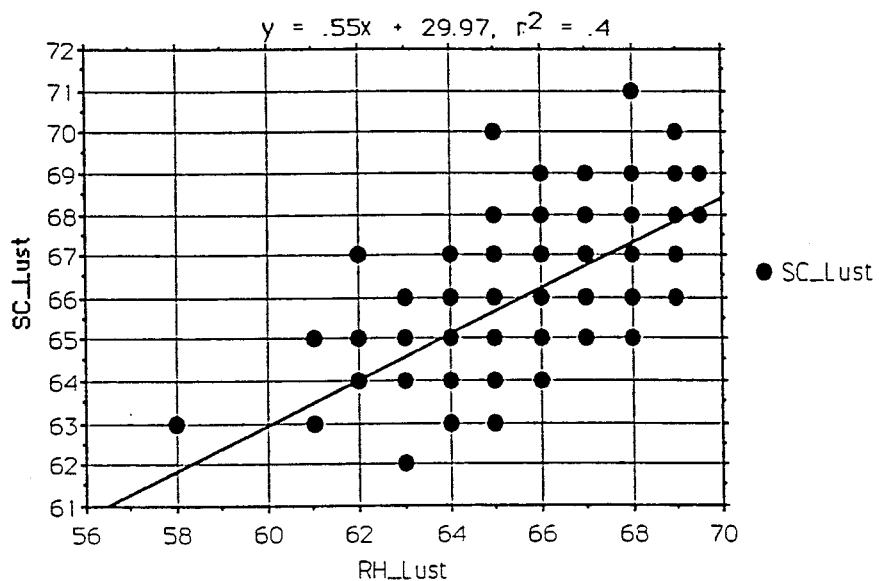
The input metrics individually are shown below to provide a basis of comparison for individual metrics.
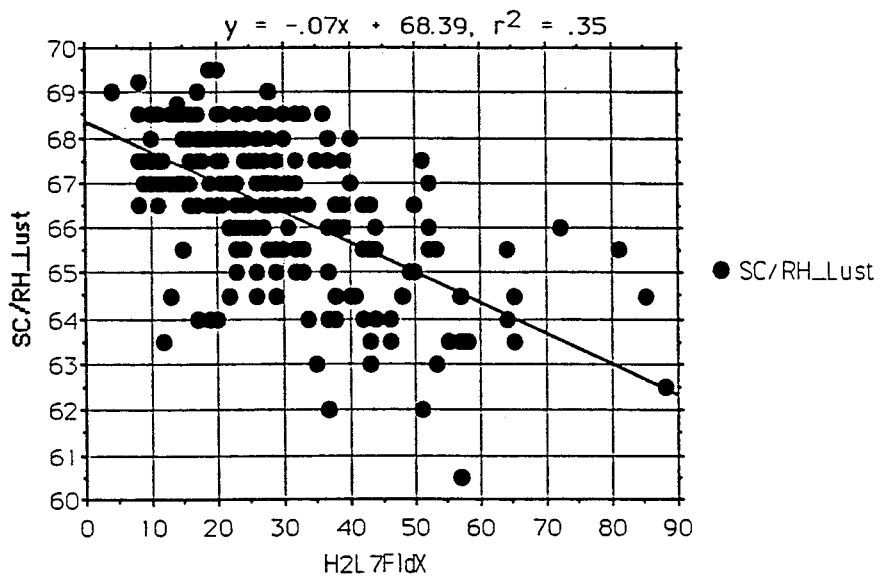

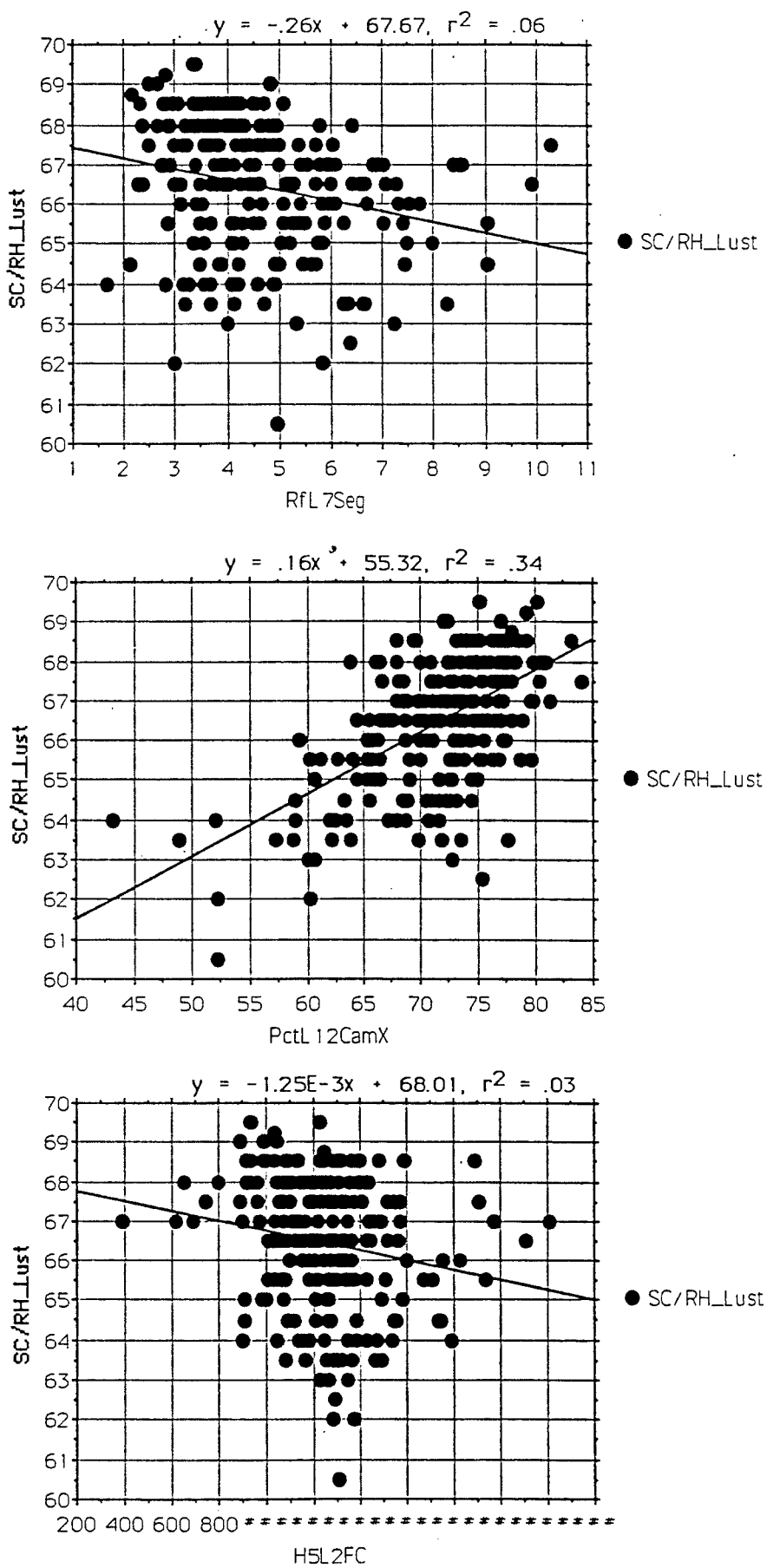

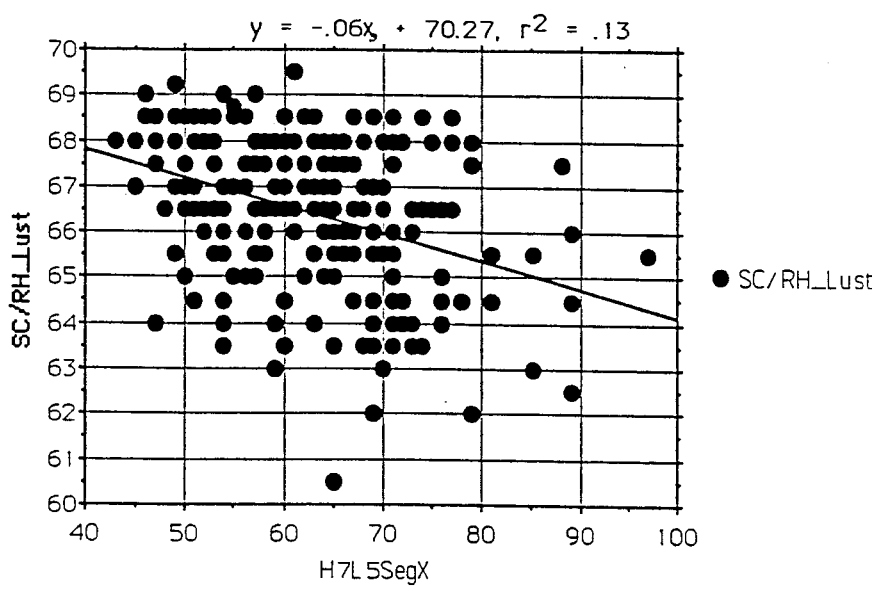
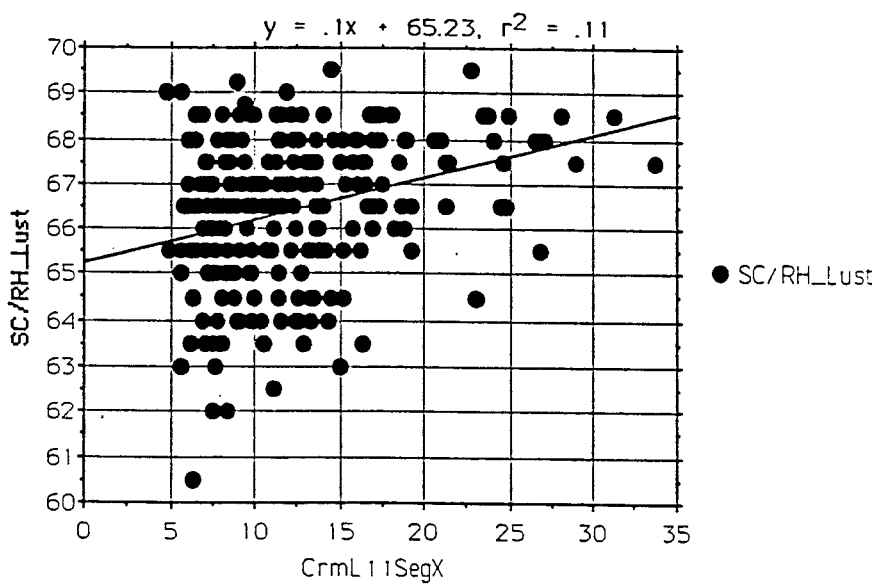

Reverse Luster

Method: Using only original images compute the following metrics:

| | |
|---|---|
| H2L5Fld | -1.64 |
| PWL12Th200Cam | 2.64 |
| H2L8FC | -2.32 |
| RfL7Fld | -38.79 |
| H5L2FC | -0.13 |

Where Hi are the various standard histogram metrics, Rf is the roughness, PWL12Th200 is the pct white at a th of 200, Li are the measurement w/to light i, i=1 to 9, 11 being MaxImage(L5 to L9), and L12 being MaxImage(L1 to L9). The mask regions are the field (Fld), Full Coin (FC), and Cameo Region (Cam).

Cleaned and toned coins should be identified first as cleaning tends to increase the metric yielding an overly high luster value, and toning causes a huge increase in the histogram peak out of balance with the non-toned coins.

The resulting metric is shown below.

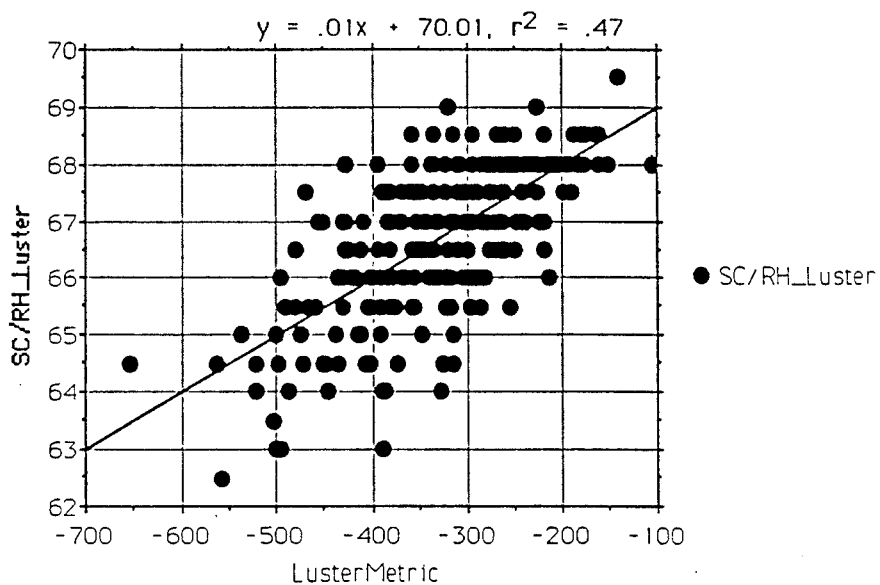

As a result this metric with the linear interpolation results in the following predictor:

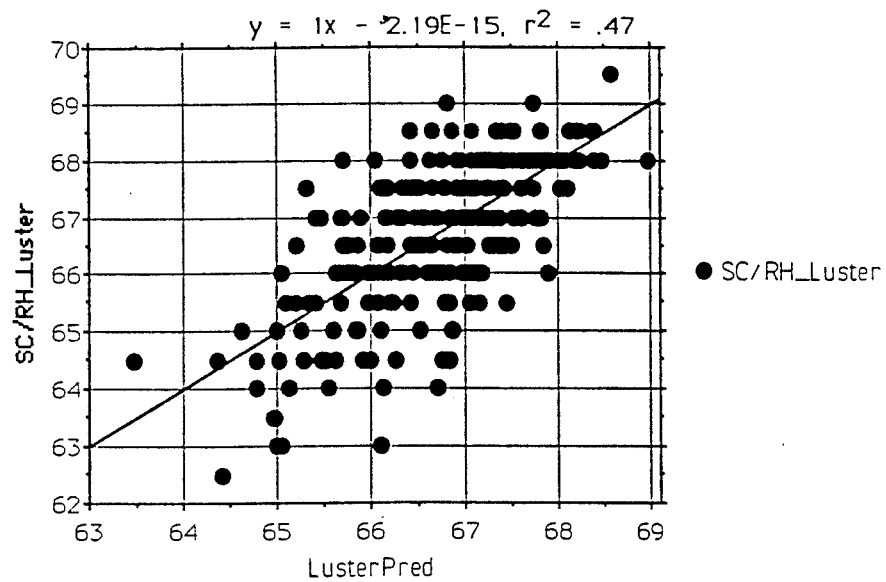

The Turing test here is a comparison of the luster grades of SC and RH which is substantially less, 37% as shown below.
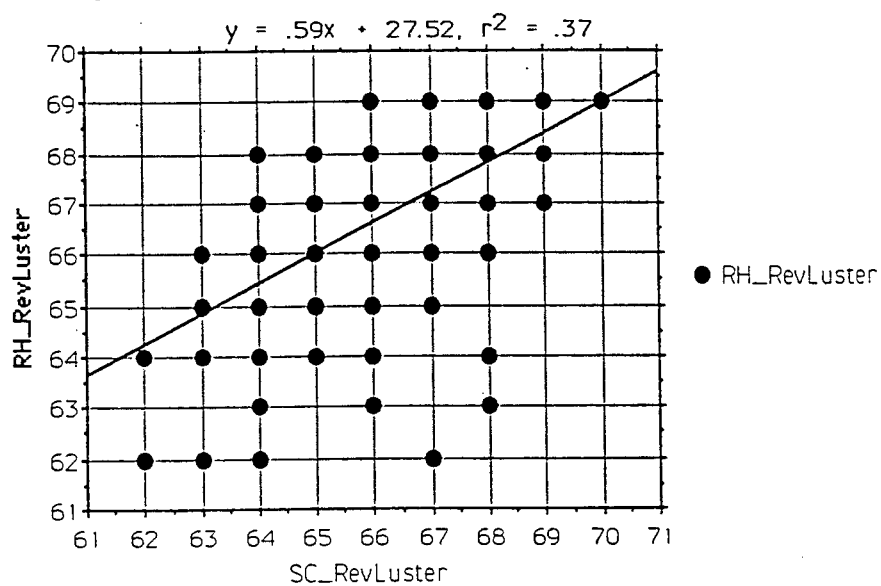
The individual metrics which make up the metric are shown in the diagrams below. Multiple each of these basic metrics by 100 to get the actual values in practice.
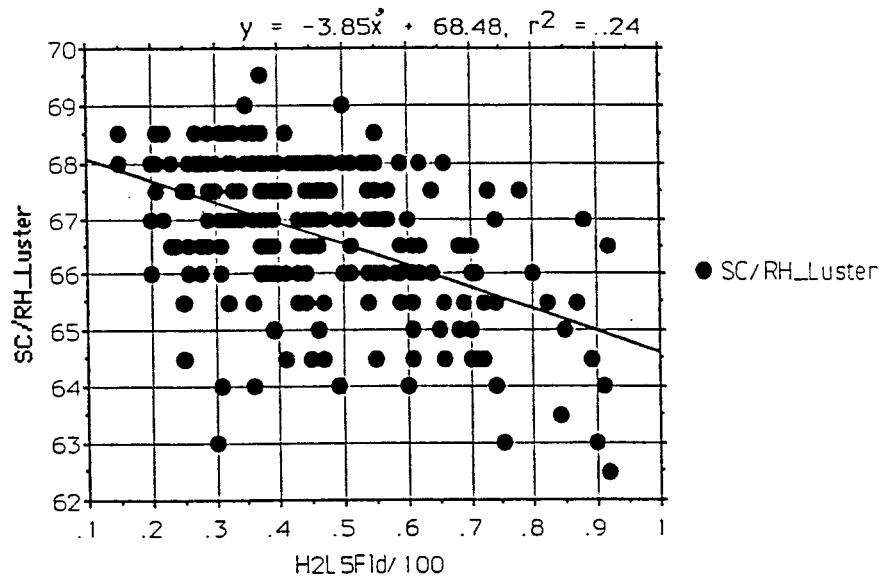

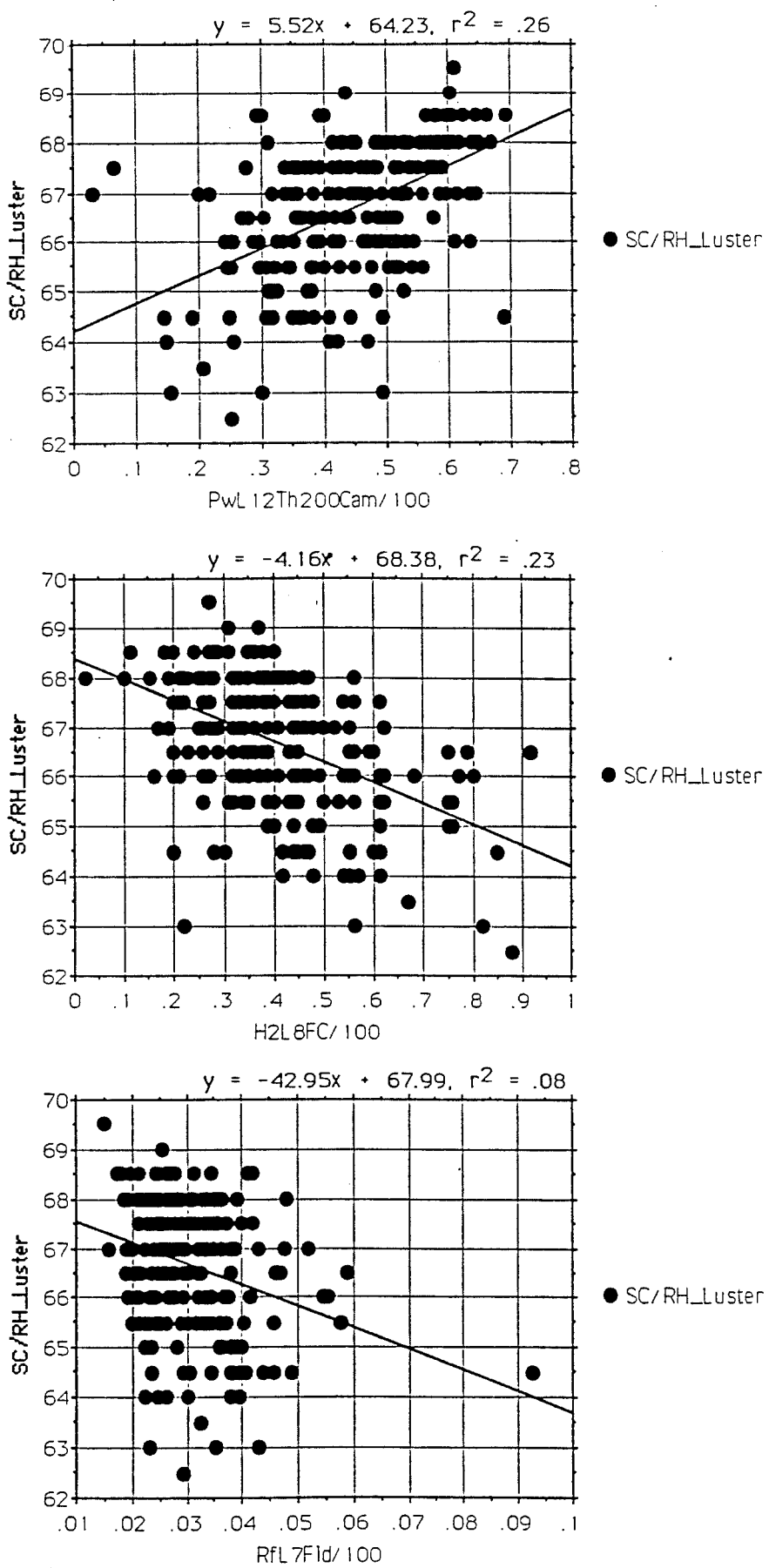

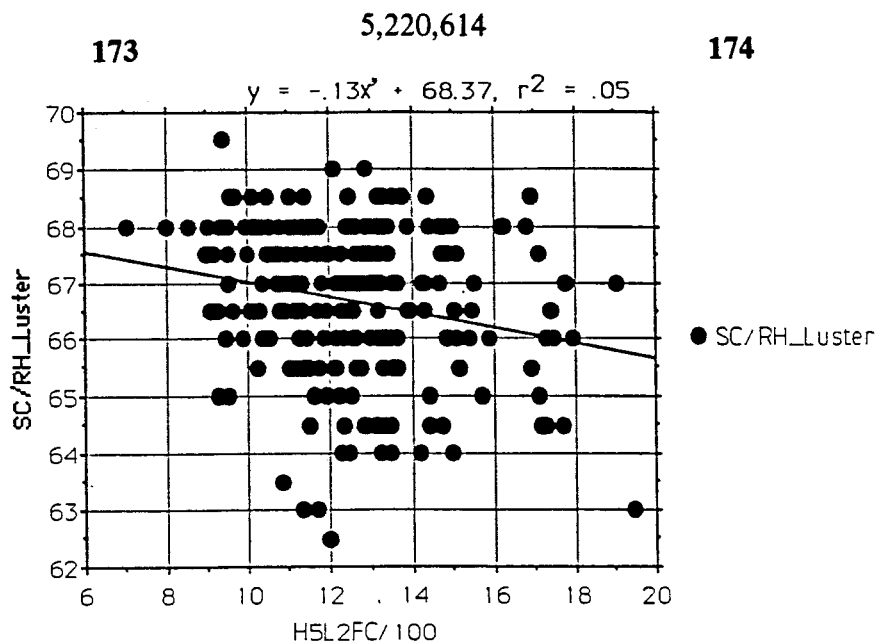

Obverse Mirror

Method: Calculate with original images, and with brightness corrected images as in luster the following metrics:

| Metric | Truncated at | Weight |
|---|---|---|
| PctL12FldX | 60 | -3.26 |
| PWL11Th75Fld | (100) | -1.87 |
| PWL10Th75FldX | 23 | -4.43 |
| H7L10FldX | 61 | -1.85 | where a truncated function of x is defined as = If x > trunc THEN trunc ELSE x.

The resulting mirror metric is shown below. A higher correlation will result from a quadratic or bilinear interpolation method. This is followed by the predictor.

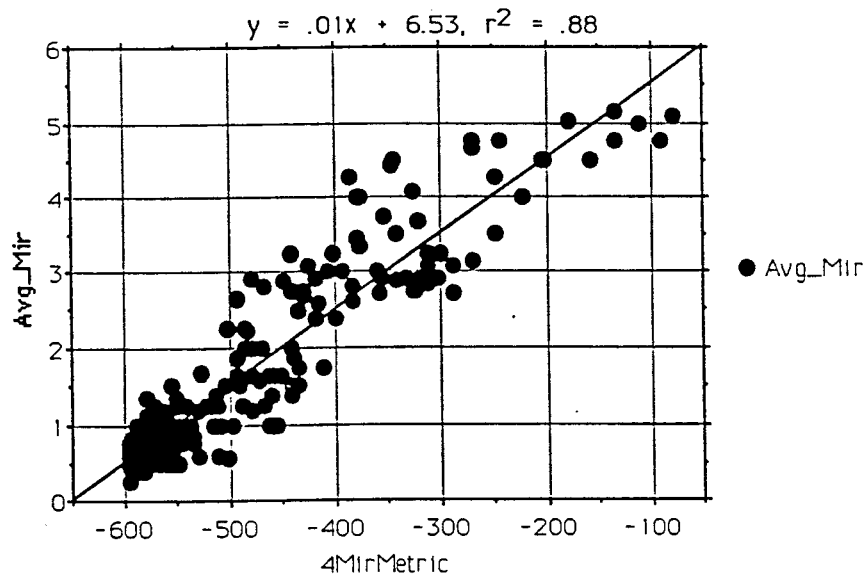

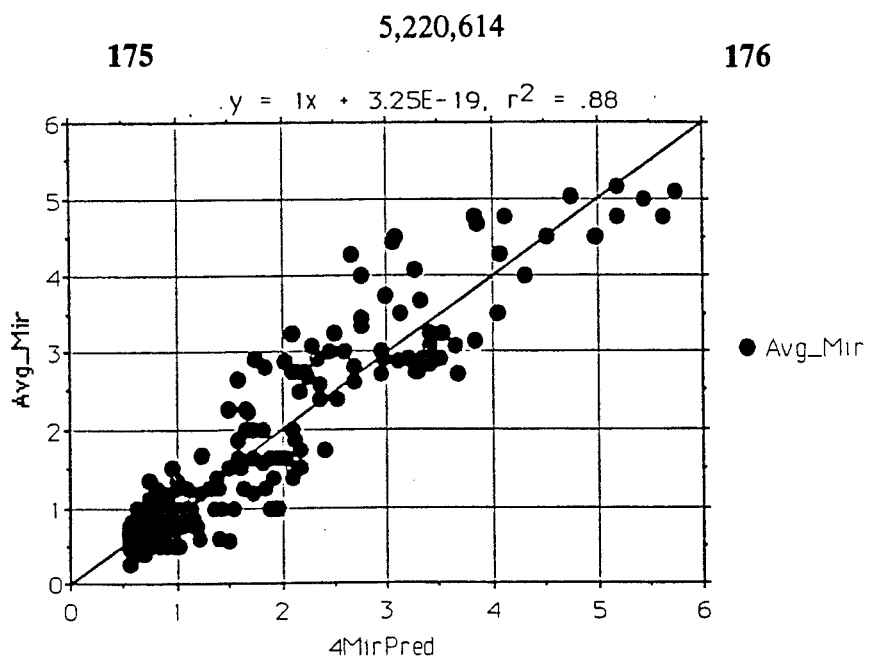
To interpolate this function use the following three segment line with the breakpoints shown.
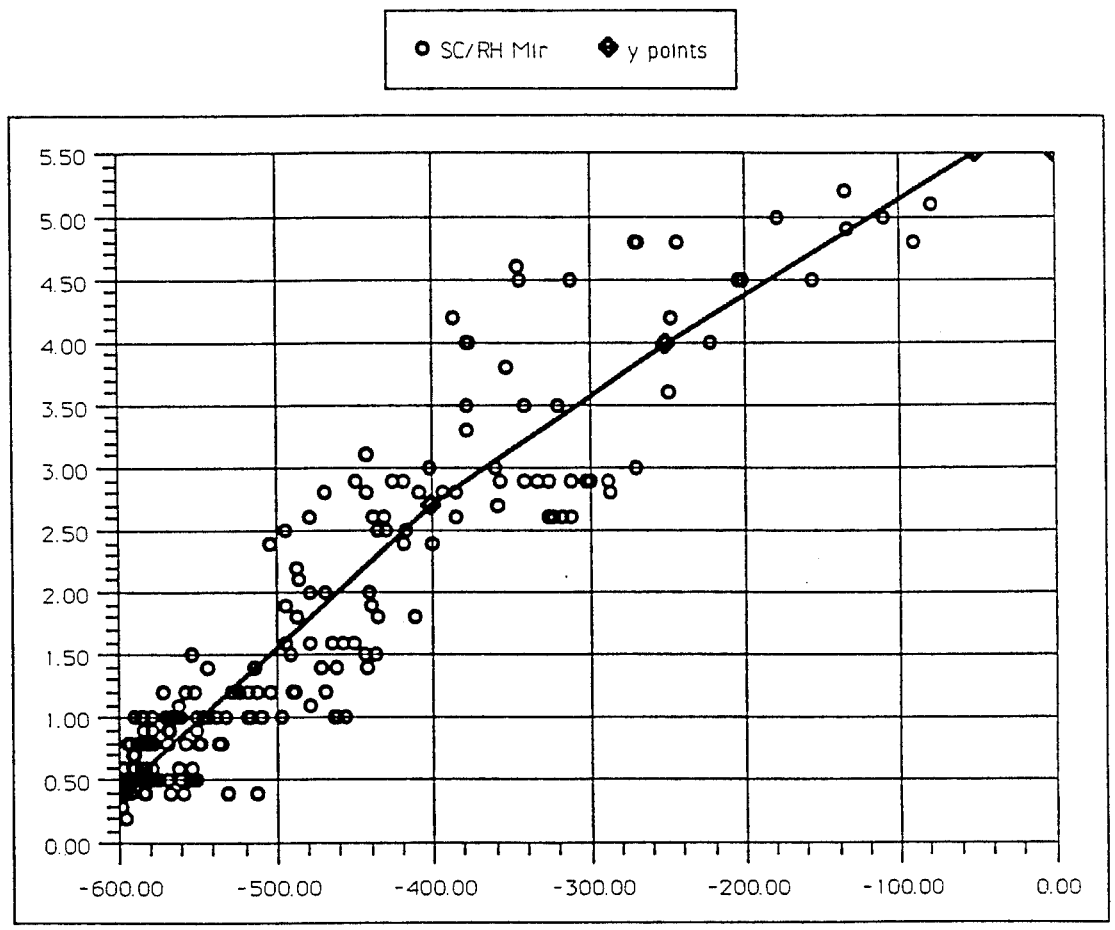
| x points | y points |
|---|---|
| -600.00 | 0.37 |
| -400.00 | 2.69 |
| -250.00 | 3.98 |
| -50.00 | 5.50 |

The individual metrics are shown below:
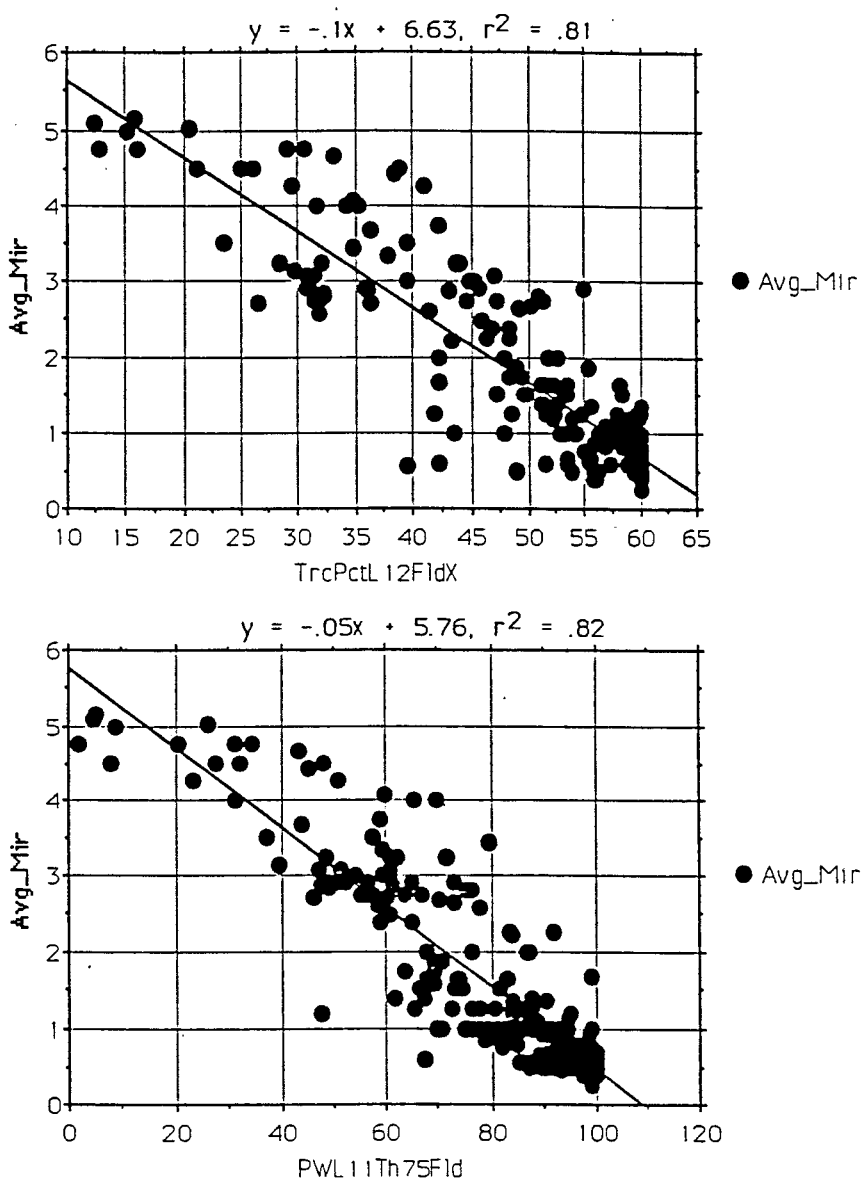

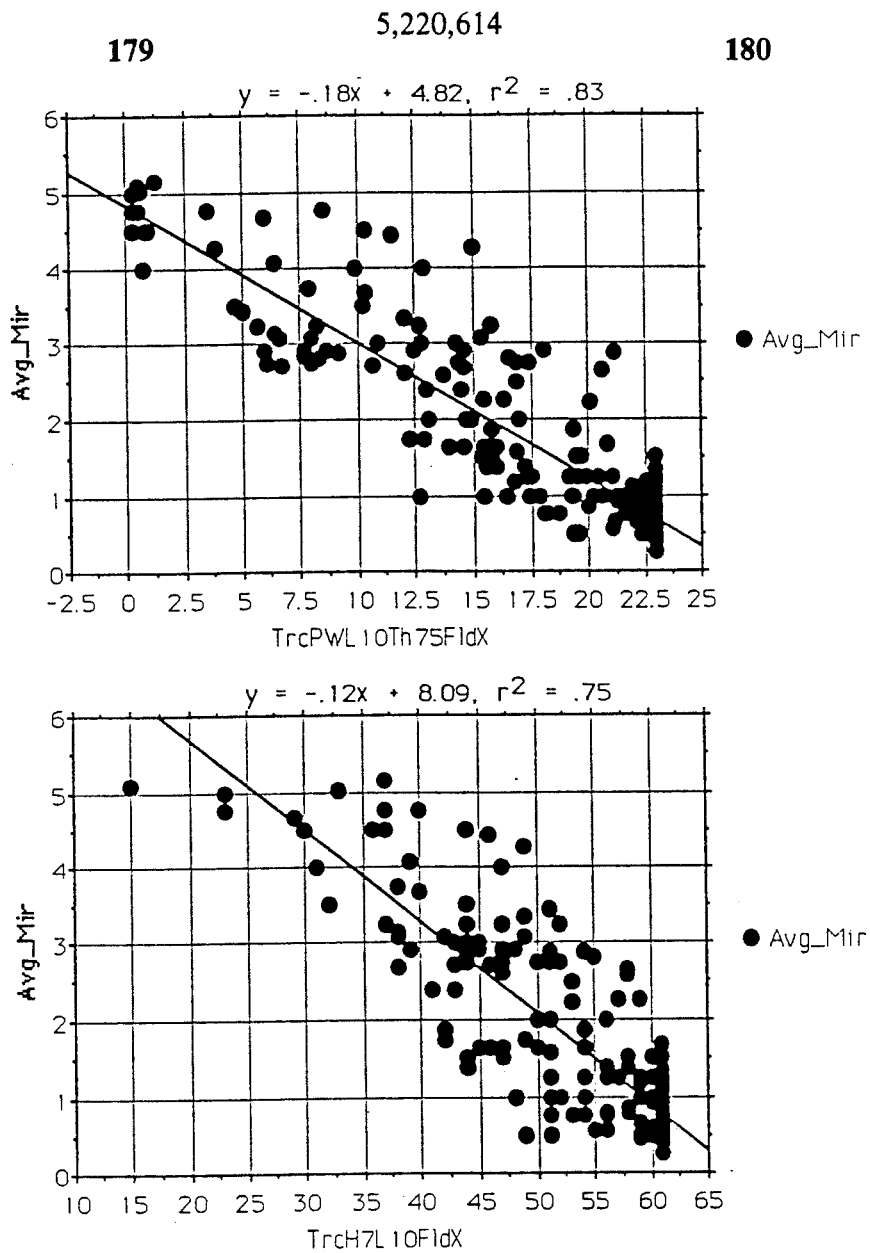
In addition, the non-truncated versions of these metrics are show as well. Essentially, a coin has very low mirror is the value of the metrics are anything above the truncation level and thus the function goes very flat at that point.

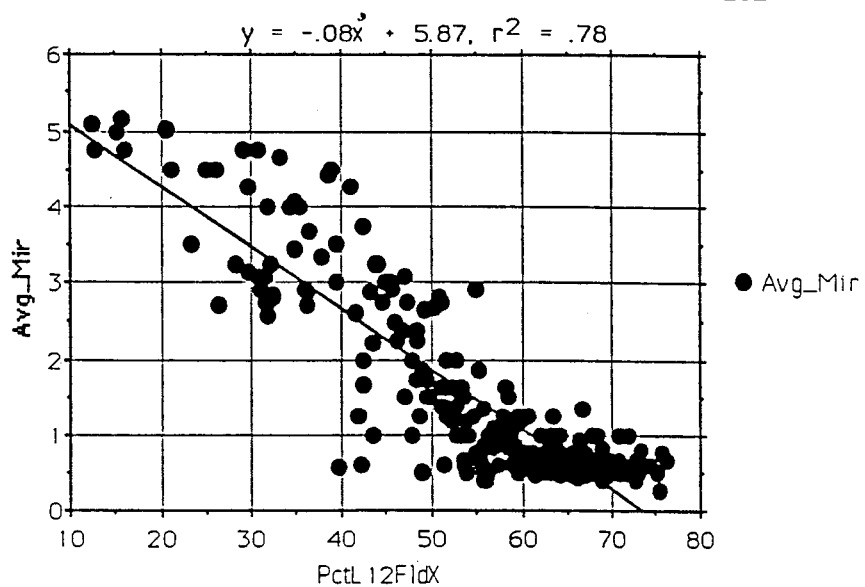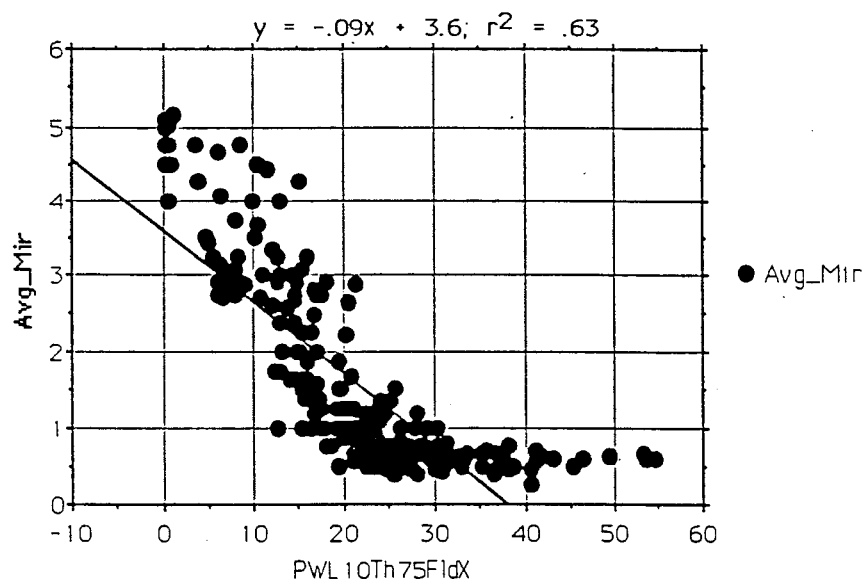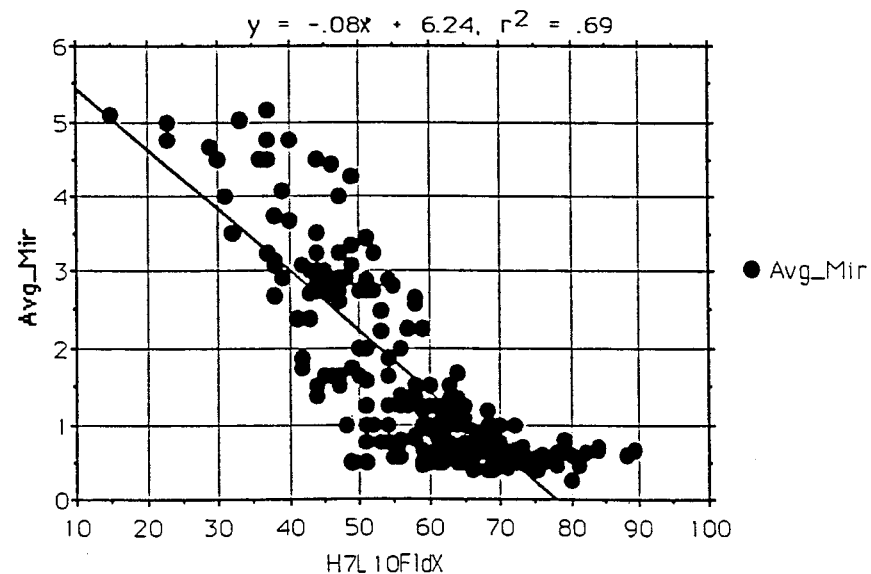

Reverse Mirror

Method: The method is essentially identical to the obverse mirror method. The metrics to calculate are the same and truncated similarly.

| Metric | Truncated at | Weight |
|---|---|---|
| PctL12FldX | 60 | -2.96 |
| PWL11Th75Fld |  | -1.69 |
| PWL10Th75FldX | 27 | -5.57 |
| H7L10FldX | 66 | -2.08 | where a truncated function of x is defined as =If x > trunc THEN trunc ELSE x. Here the truncation values and the weights are all quite close to the obverse values. Thus the predictor function is as follows:

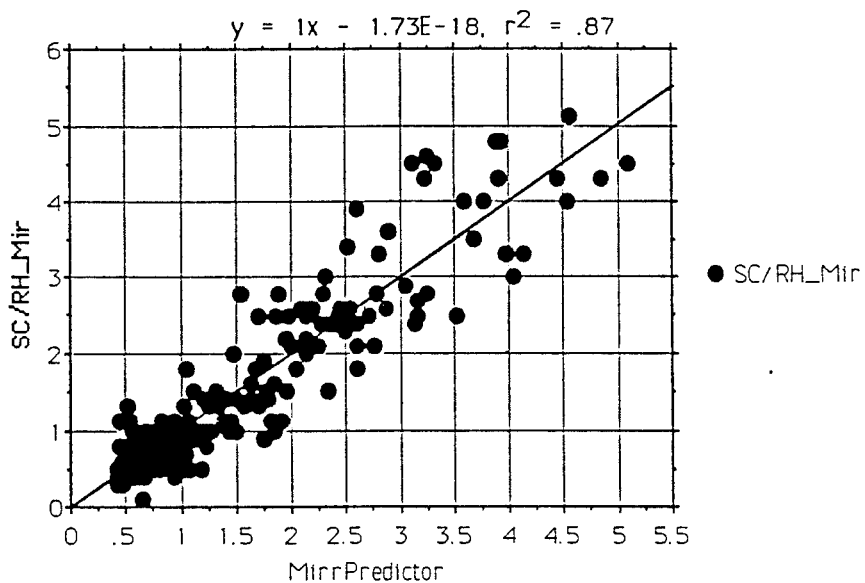

The mirror metric then is as shown below.

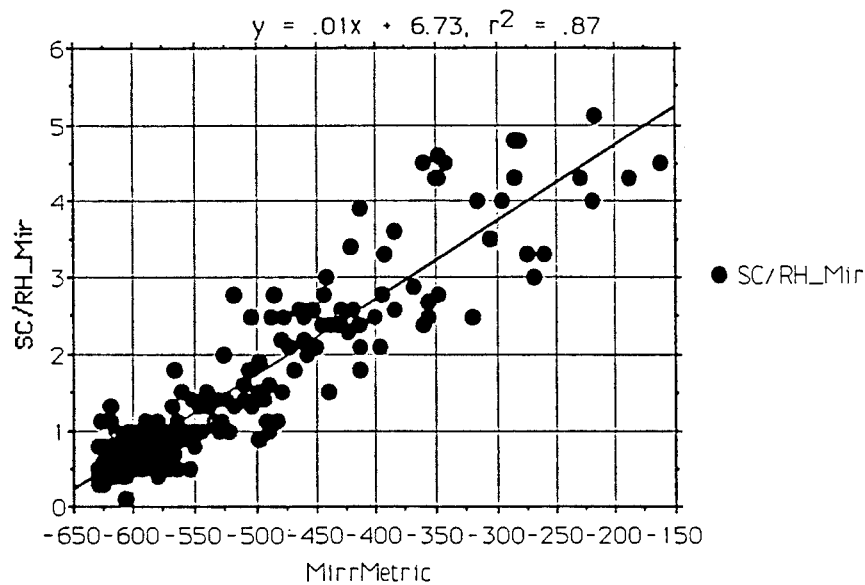

In this case, the Turing comparison is not as good as the SC/RH correlation which is shown below.
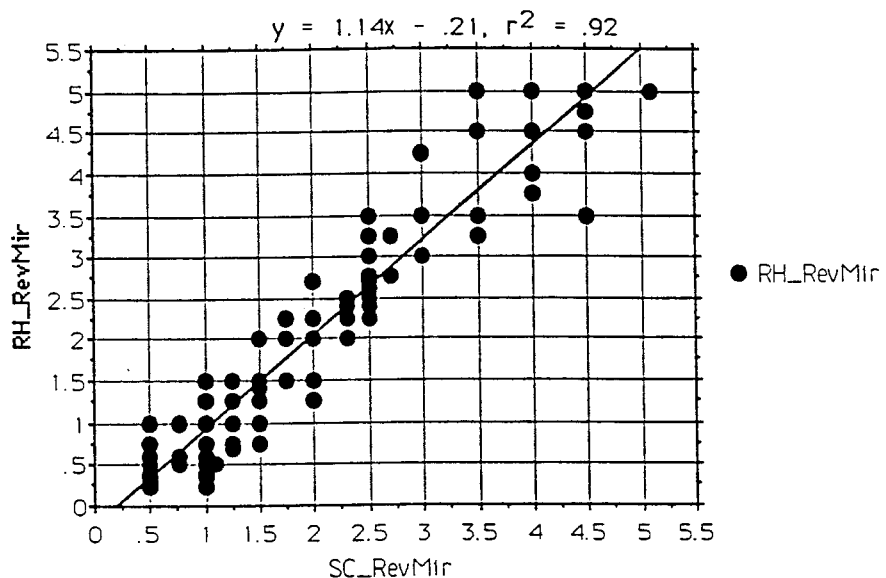
The individual input metrics as well as their truncated versions are shown in the charts below. Note that some of these charts are scaled by a factor of 100.
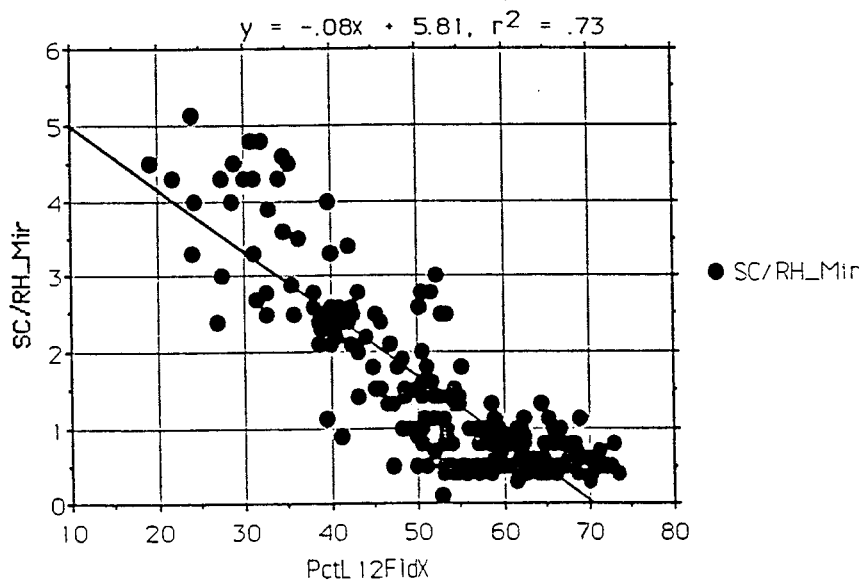

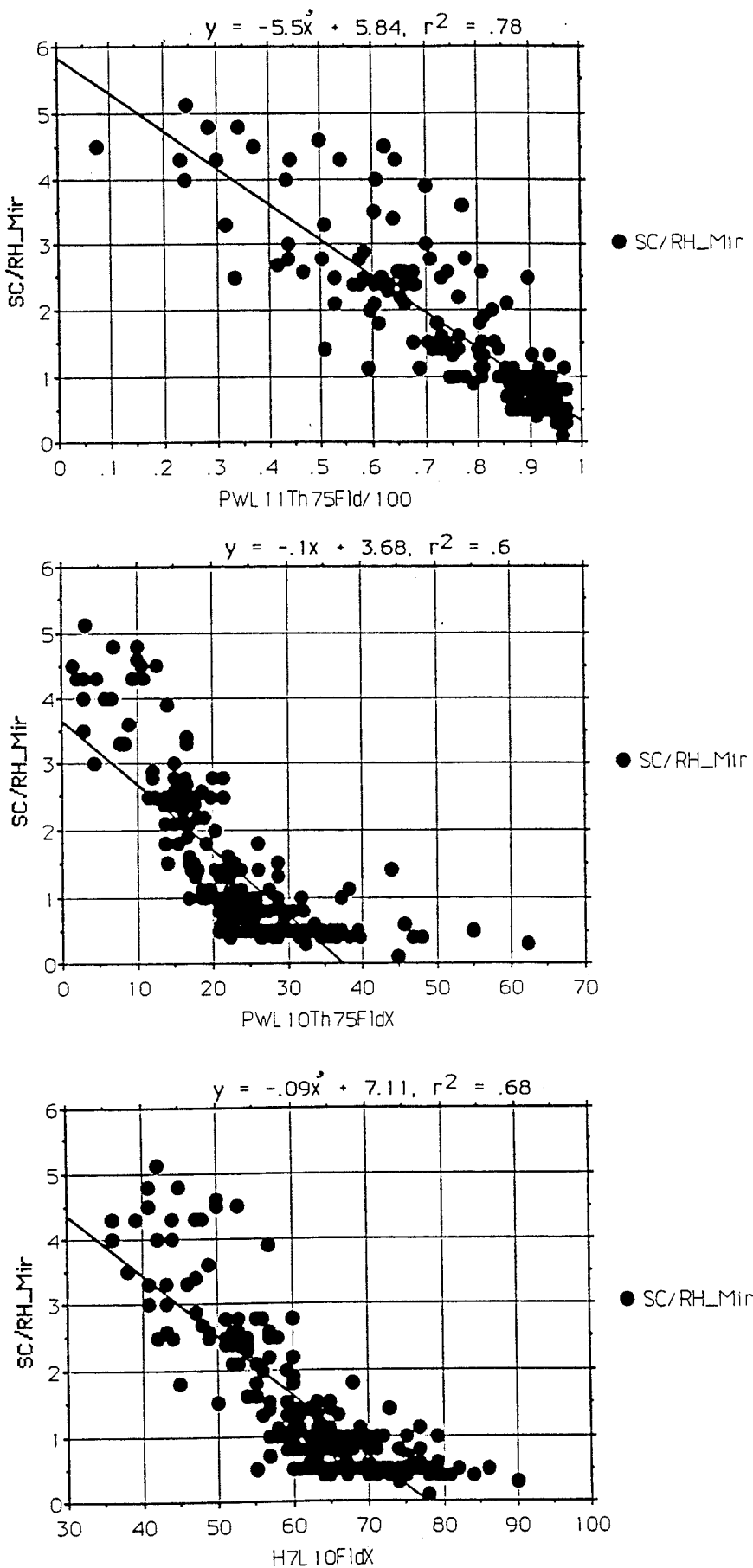

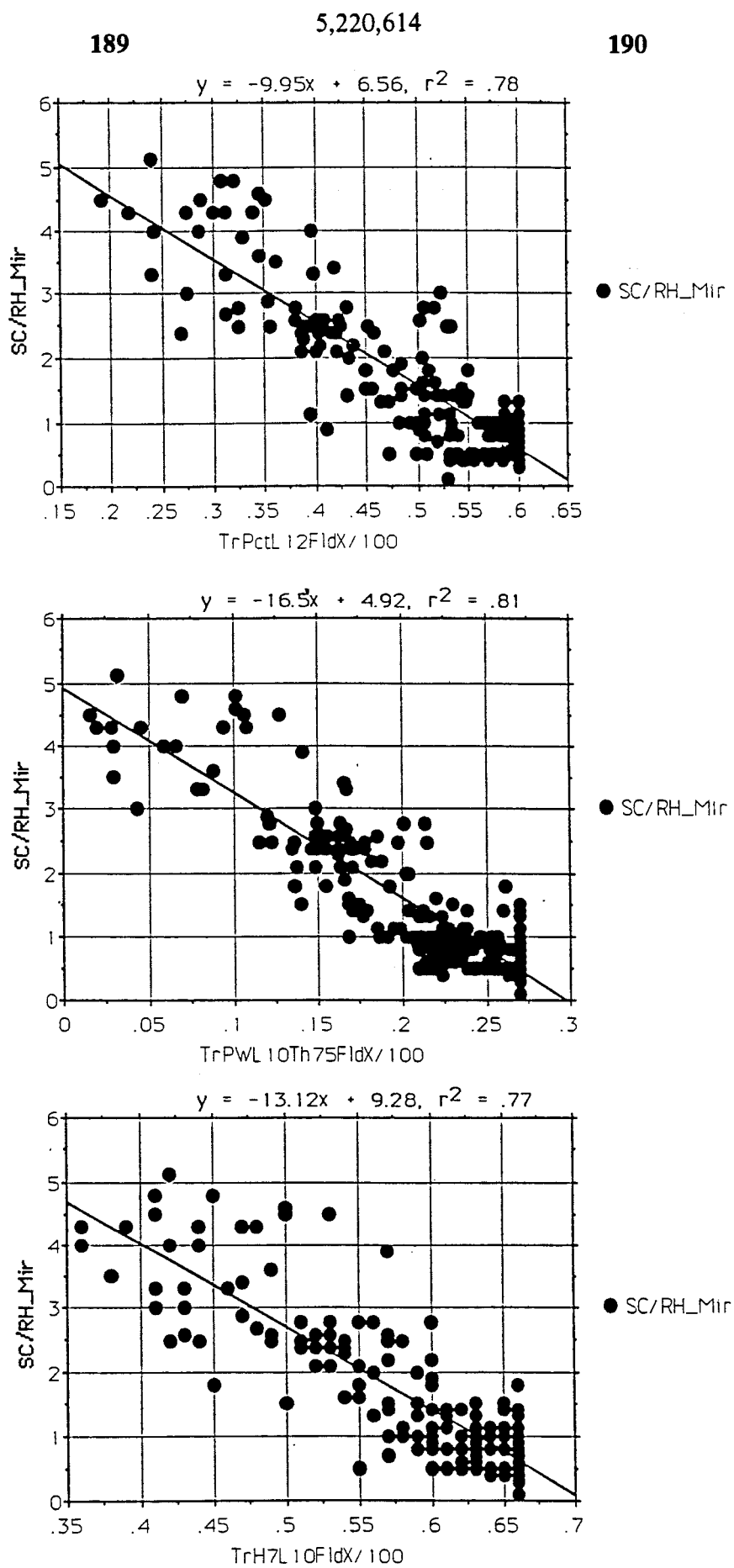

Circulated Segregation

Obverse Circulated Segregation

After first removing toned coins, the metric PWL11Th180Cam < 20 segregates Circulated coins from MS. For the entire 287 coin sample set with only coins G157, G315, and G69 removed we obtain the following results using this metric.

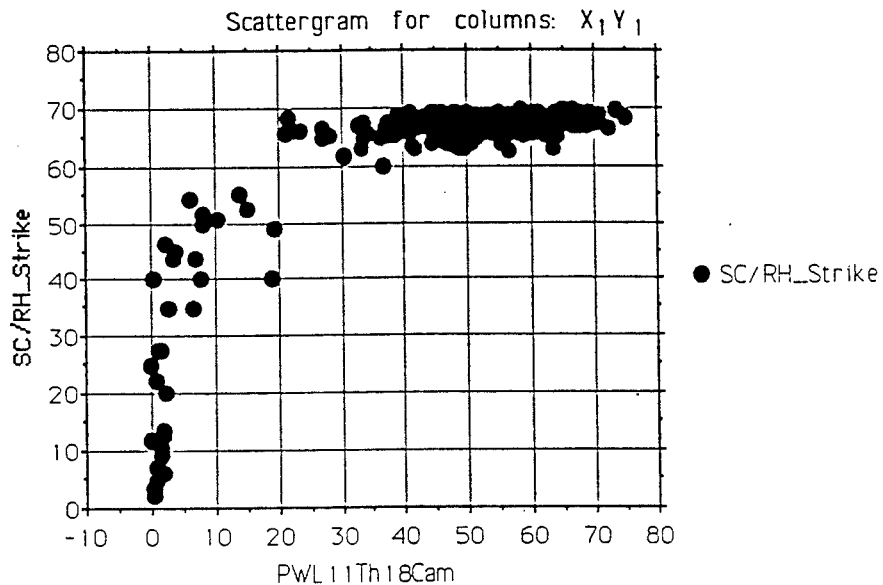

Reverse Circulated Segregation

After first removing toned coins, the metric PWL11Th180Cam < 17.5 segregates Circulated coins from MS, similar to the obverse. For the entire 287 coin sample set with only coins with reverse toning G312, P759, G9, G157, and LGS6 removed we obtain the following results using this metric.

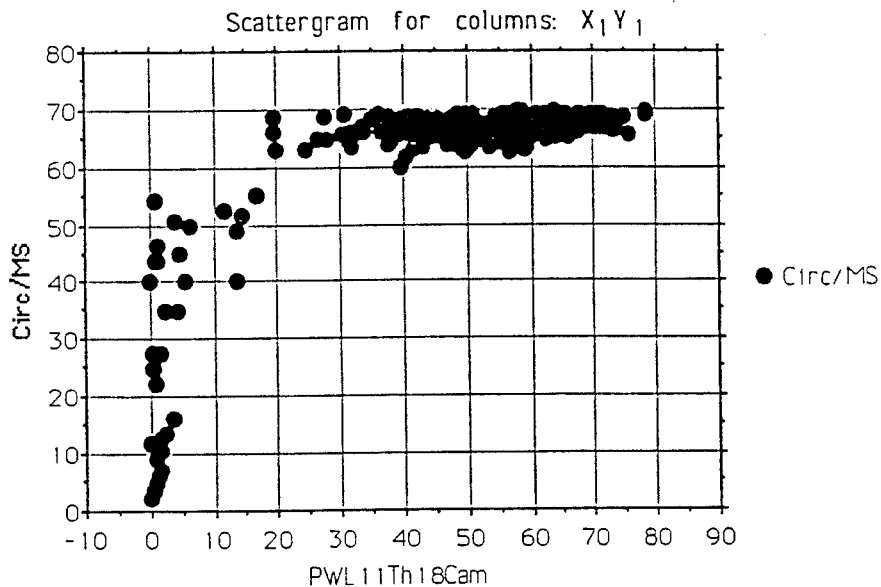

Circulated Grade

Obverse Circulated Grade
With a <18 brightness correction, compute C2FS9TH9 which is the CONN count at a min of 3 of the FS (not DFS) image of the FSRS sharpened relief image at a threshold of 9 within the obverse strike mask, the hair over the ear. This single metric provides the following results.

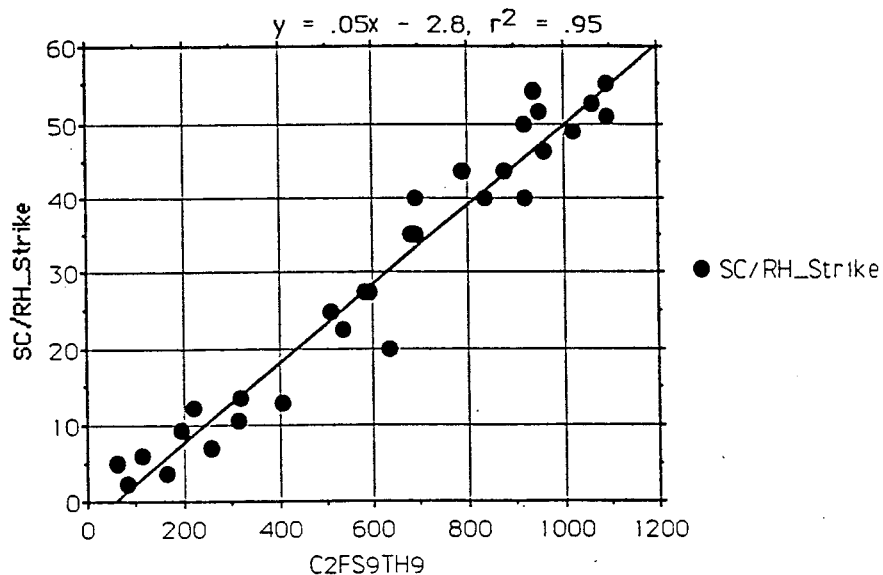

For consistency with the reverse, the same results are also realized for the obverse circulated grade based upon the original, not brightness corrected, relief image.

By interpolating this result with a three segment interpolation function, we obtain a 96% correlation, (98% if the point at 20 is changed to a 31), as shown below.

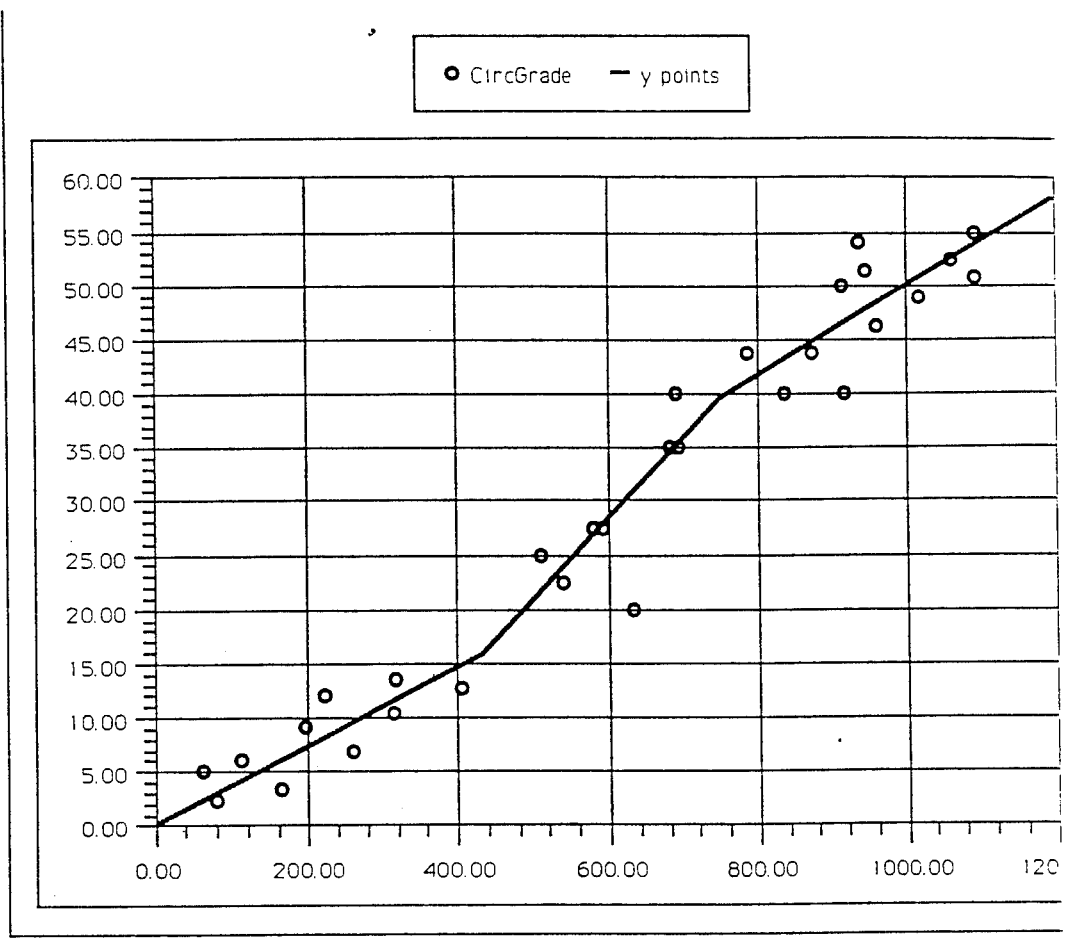
This table has the following breakpoints:
| x points | y points |
|---------:|---------:|
| 27.40    | 1.00     |
| 434.17   | 15.78    |
| 750.92   | 39.70    |
| 1197.00  | 58.00    |

Reverse Circulated Grade

With no brightness correction, compute C2DFS8TH9WHBr which is the count of the DFS image of the FSXS sharpened relief image at a threshold of 9 within the full region containing the wings, head, and breast. This single metric provides the following results.

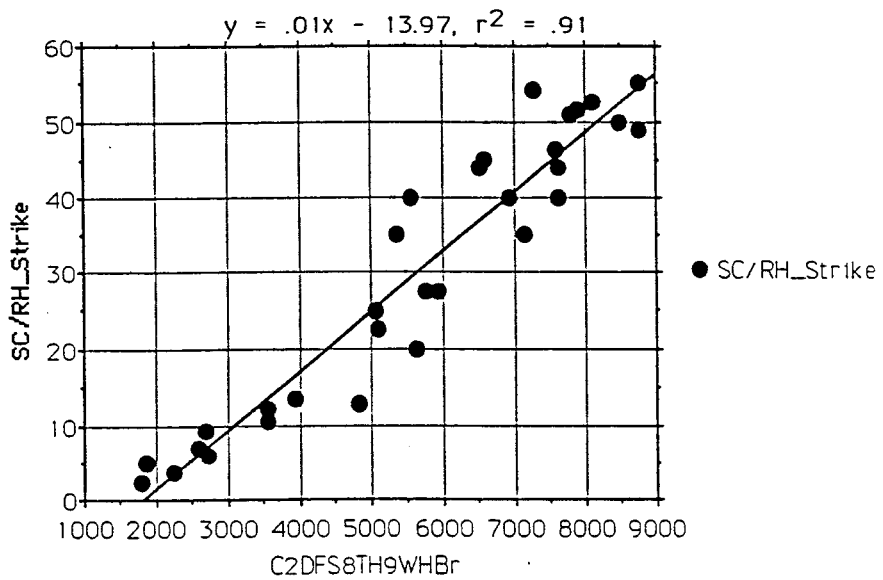

Alignment Confirmation

The FSLB, the FS marks image with the LBM eliminated is measured in the region of the border of the field mask on both the obverse and reverse. If a coin is properly aligned, than very few marks will be seen in this area, unless the coin is very badly marked up as would be the case for a 60 coin. However for a normal coin, a large number of measured flaws in this area can be indicative of three possible events. If the number of flaws is between 120 and 160 and if the coin is not an MS60 then the coin identifier may have been improperly defined, for example a 7082 may have been identified as a 7130. If the number of flaws is between 160 and 500 then it is likely that we have a designation error. If the number of flaws is greater than 500 then this is a definite problem the most likely cause being improper coin alignment.

The charts below show the flaw count within the border mask for the grading set. In the chart titled "WeirdMetric" the coins have all been given incorrect identifiers. Finally the cumulative histograms of these results are shown.

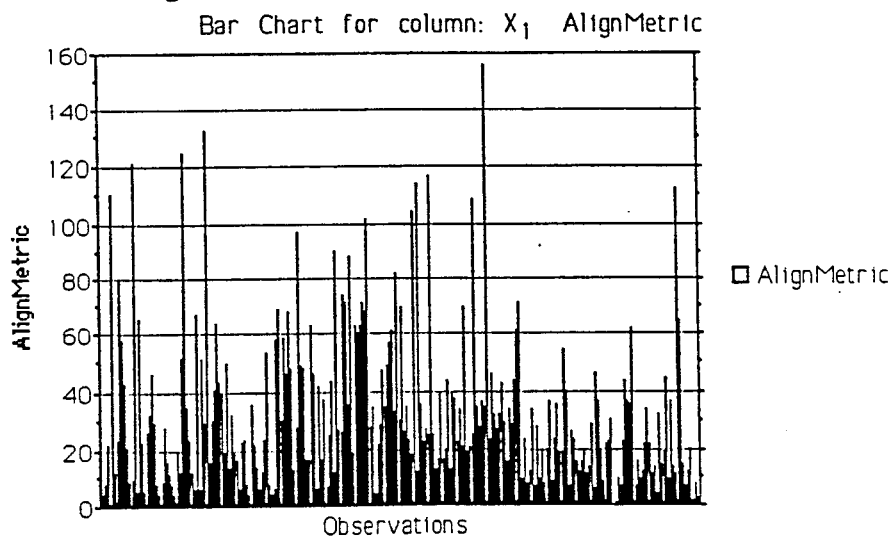

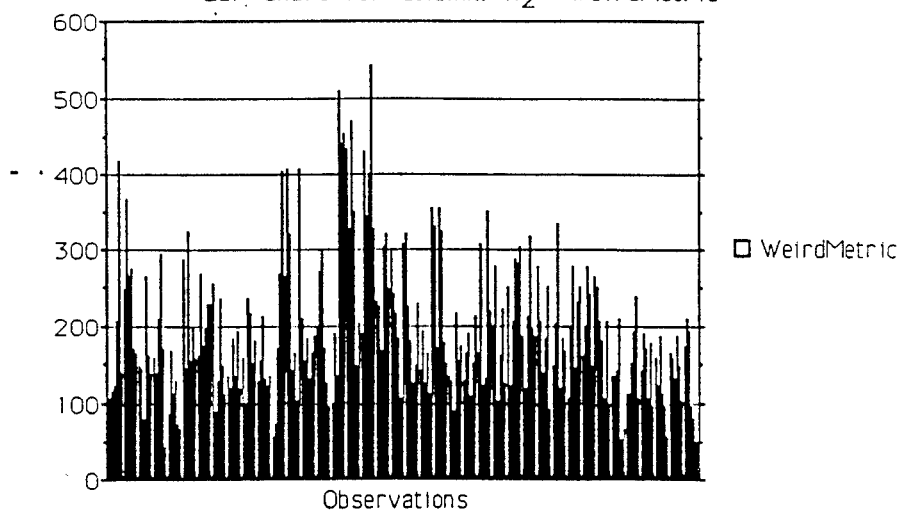
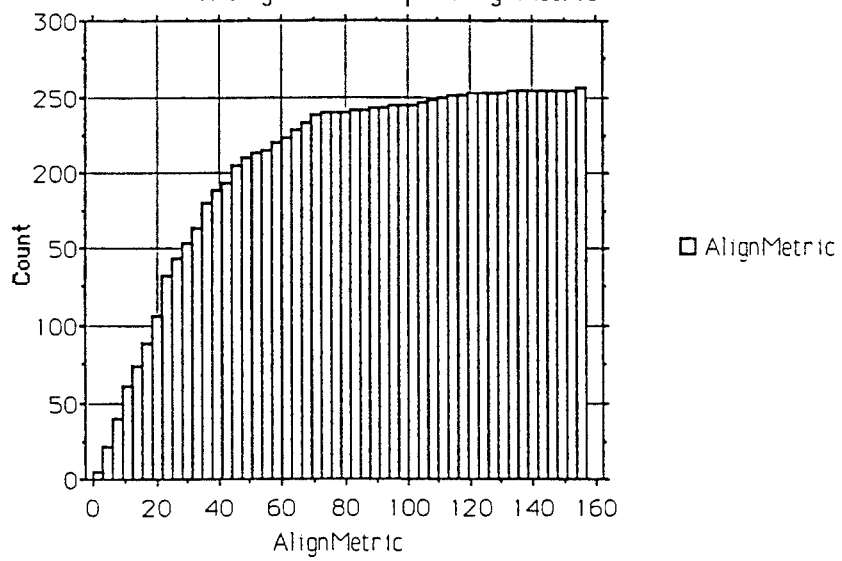
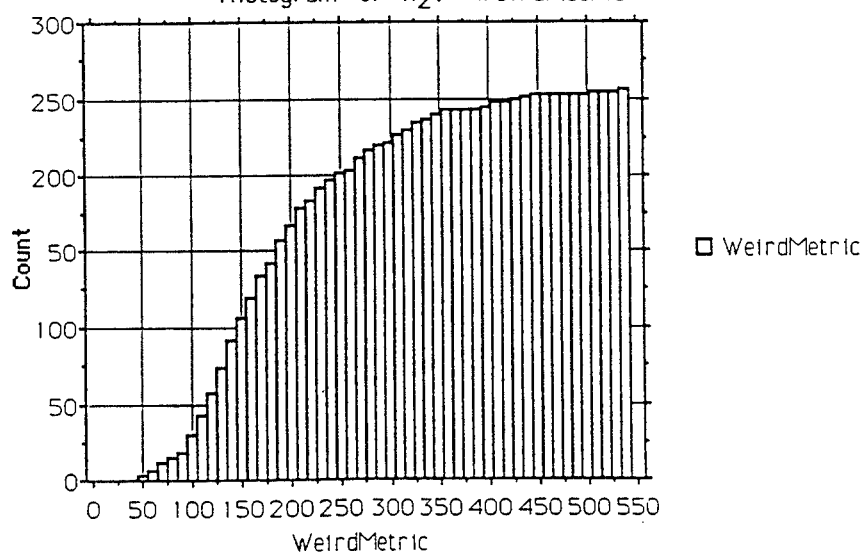

Next we see the diagram for the reverse alignment confirmation metric.
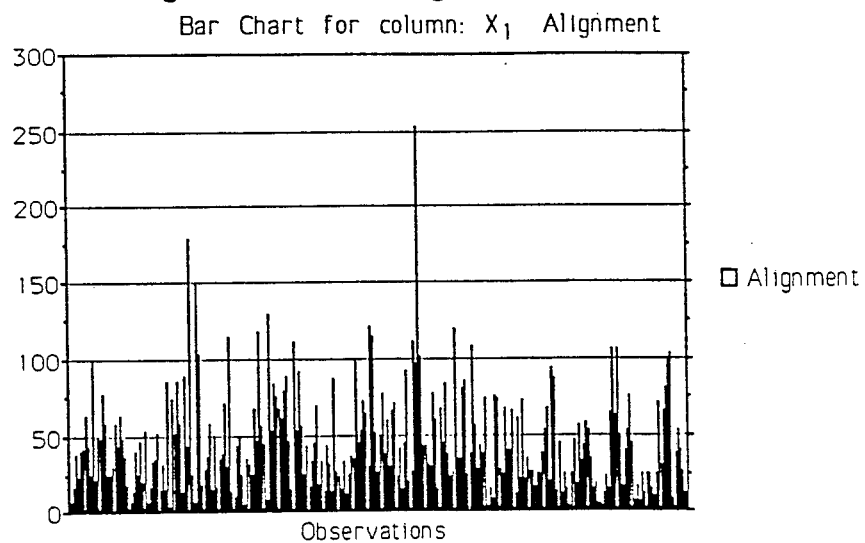
The 250 and the 178 values are associated with coins graded MS60 and the 150 point is a coin with many flaws in the border area.

Obverse Color Analysis

Color is analyzed using the lighting condition 156 simultaneously with the results placed into a 4IN1 image of RGB and composite. The RGB components are processed to locate the hue and saturation of each of the 57,600 pixels in the half size image. The frequency of each hue/sat combination is computed and the values for hues 1 to 4 and saturation levels 1 to 20 are placed into Parms. Analysis of coins in the standard set have shown that we can define "white" as a particular location of the "center of gravity" of the image in the hue-saturation space.

The percent of toning is based upon the distance of the CG of the target coin from the CG of a "white" coin using the following method. First the hue-sat frequencies are reduced by the value of FreqBase with a lower limit of 0. Then the CG is computed according to the following equation:

$$\text{CalcPctToning} = \min(\max((\text{ColorDist} - \text{Base}) / \text{Factor}, 0), 1)$$

where $\text{ColorDist} = \text{SQRT}((\text{CGx} - \text{WhiteCGx})^{**}2 + \text{yWt}*(\text{CGx} - \text{WhiteCGx})^{**}2)$ with $\text{CGx} = \sum(V_{ij}*(j-1))/\sum V_{ij}$ and $\text{CGy} = \sum(V_{ij}*(i-1))/\sum V_{ij}$ with the constants defined as shown below:

```
Base        1.75
Factor      2.00
FreqBase  525.00
yWt         4.50
WhiteCGx    3.00
WhiteCGy    1.00
```

This results in a color correlation of 88.26% as shown below:

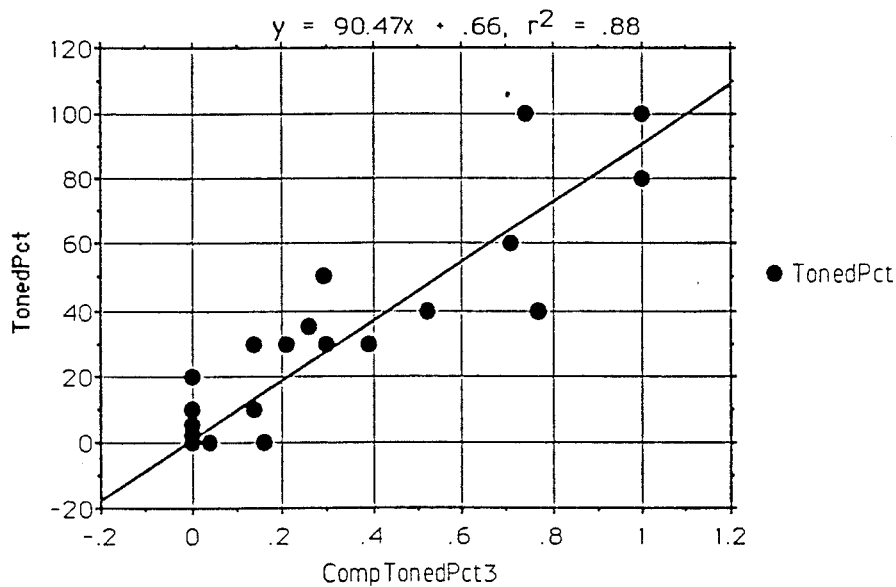

The hue-sat vs frequency diagrams that represent this information are shown below for particular examples of "white", toning, and "smooze". The first coin shown is the closest definition of "white", the G103 high quality coin.
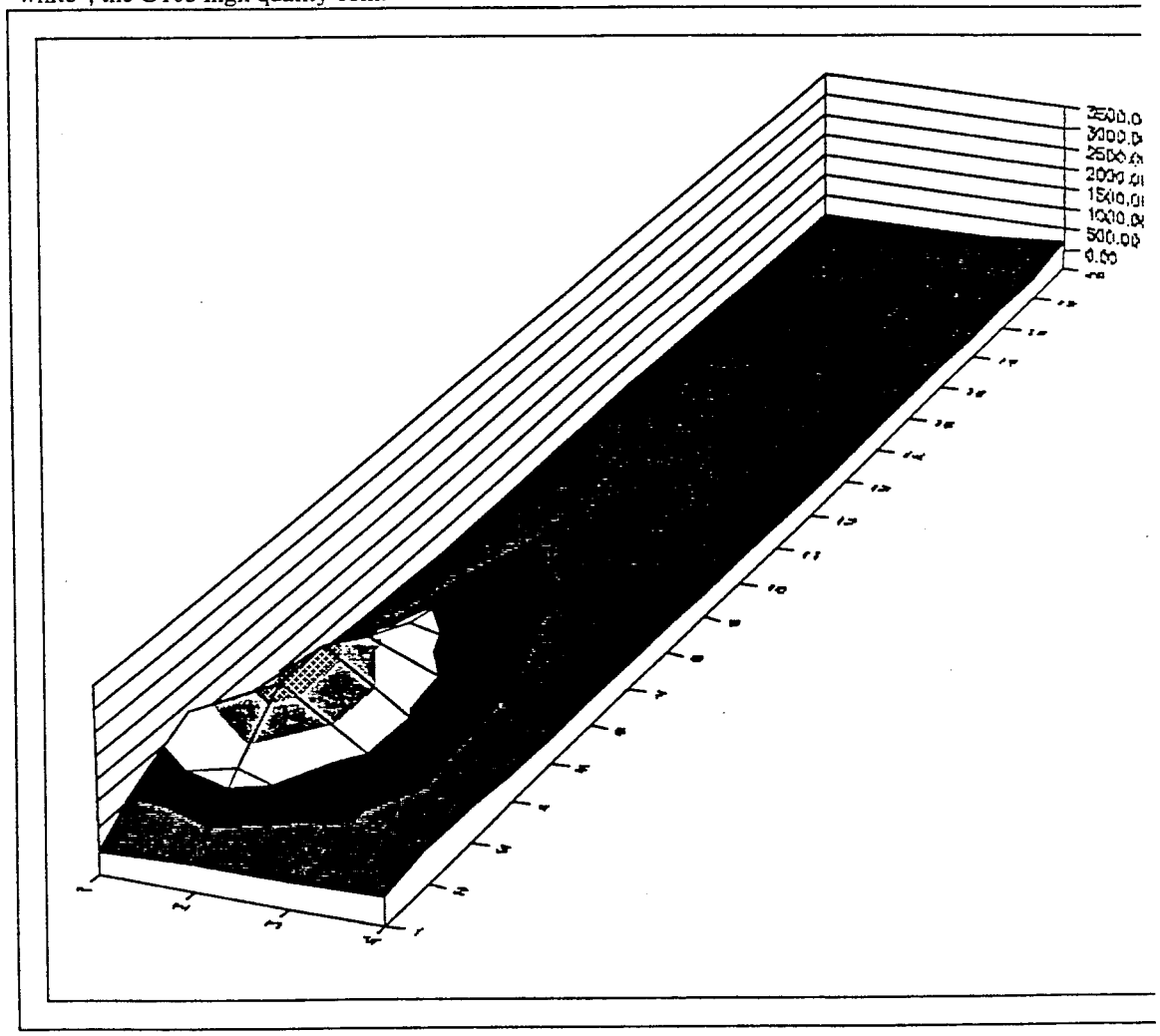

These can be compared with the toned coin, G157 shown below.
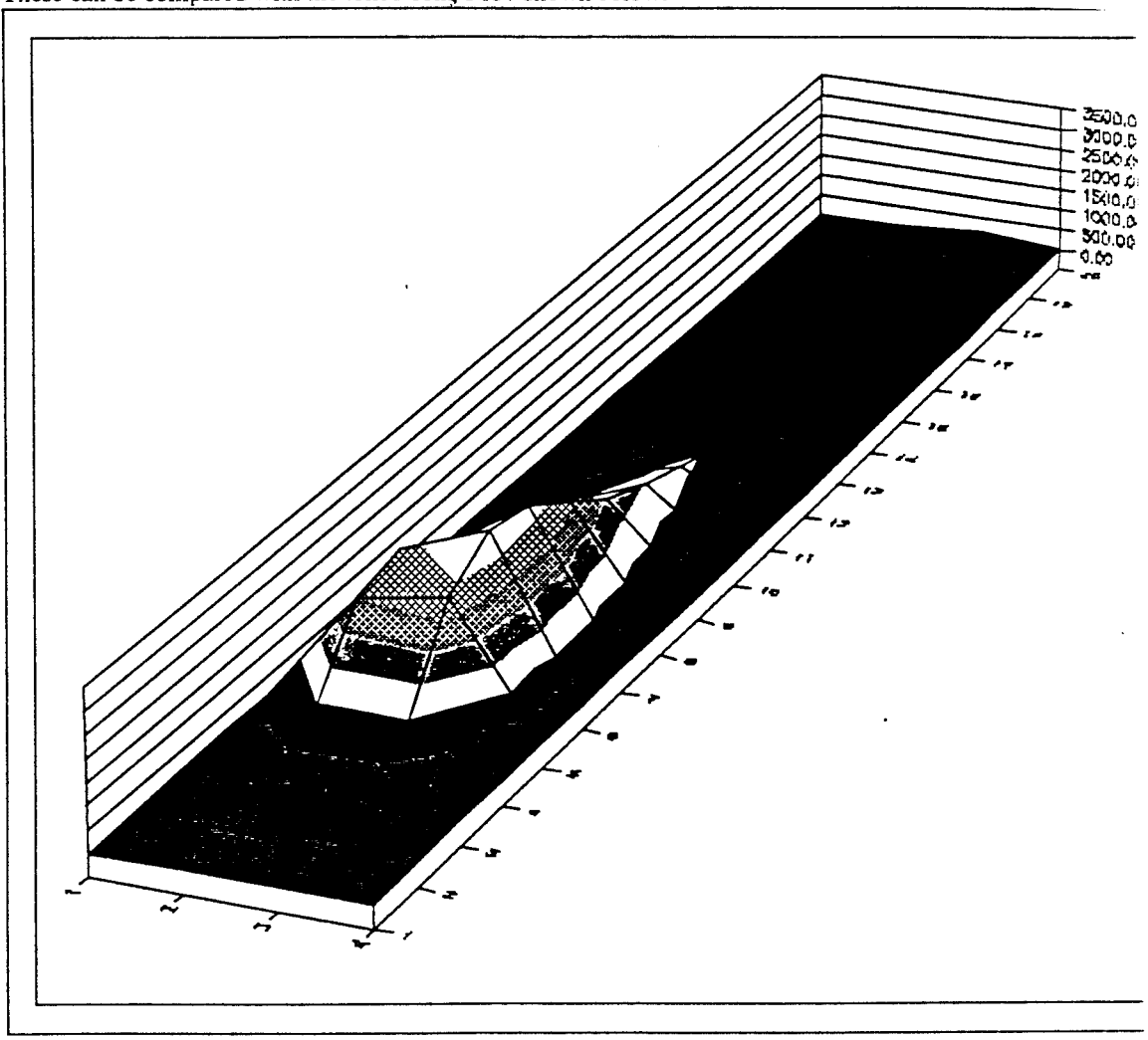

Another interesting class of toning is called "smooze". An excellent example of heavy smooze is GW21 which is shown below and has the prototypical form of a smooze color chart.
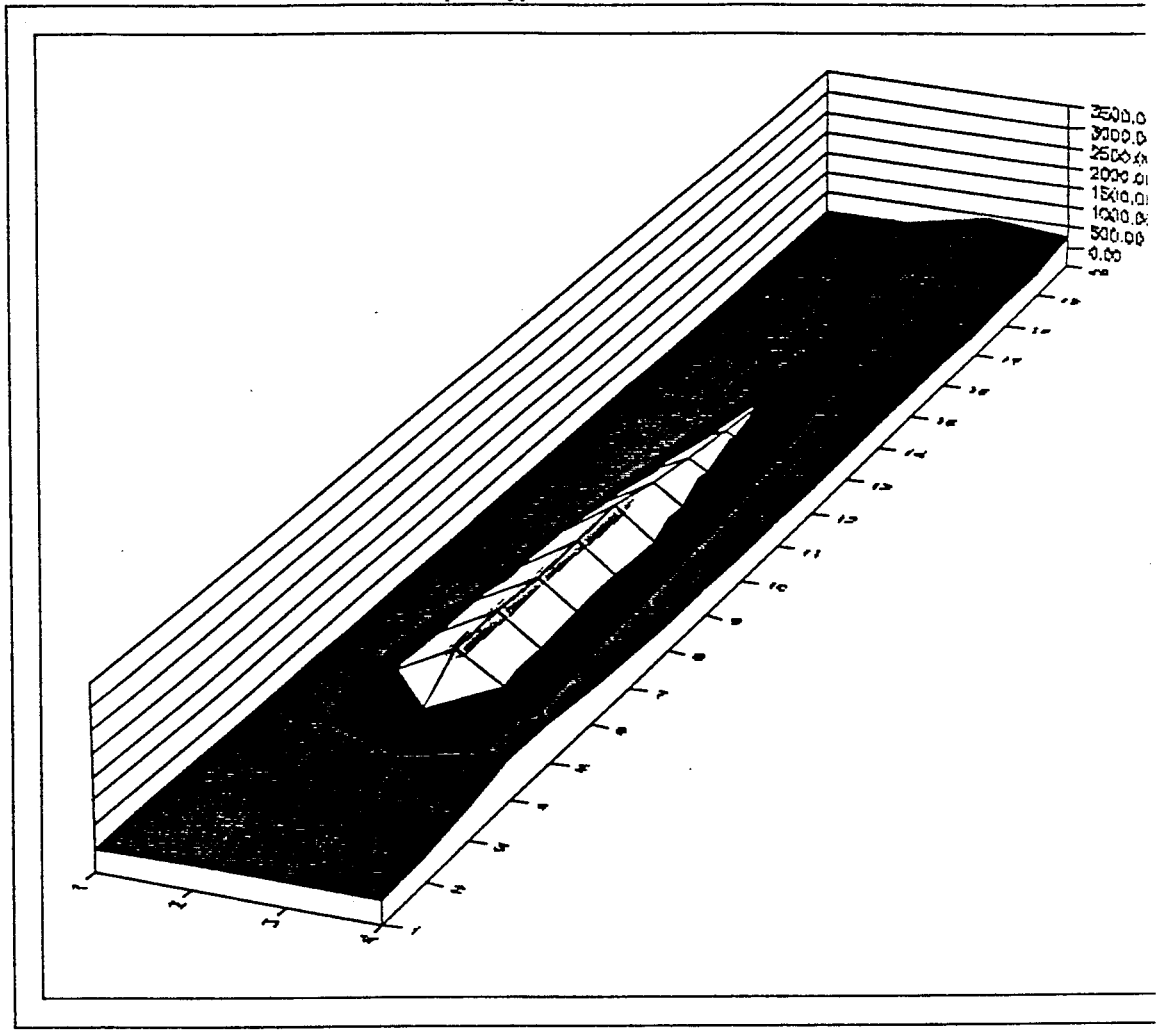

Reverse Color Analysis

Reverse color is processed identically with the method used for the obverse. Color is analyzed using the lighting condition 156 simultaneously with the results placed into a 4IN1 image of RGB and composite. The RGB components are processed to locate the hue and saturation of each of the 57,600 pixels in the half size image. The frequency of each hue/sat combination is computed and the values for hues 1 to 4 and saturation levels 1 to 20 are placed into Parms. Analysis of coins in the standard set have shown that we can define "white" as a particular location of the "center of gravity" of the image in the hue-saturation space.

The percent of toning is based upon the distance of the CG of the target coin from the CG of a "white" coin using the following method. First the hue-sat frequencies are reduced by the value of FreqBase with a lower limit of 0. Then the CG is computed according to the following equation:

$$\text{CalcPctToning} = \min(\max((\text{ColorDist} - \text{Base})/\text{Factor}, 0), 1)$$

where $\text{ColorDist} = \text{SQRT}((\text{CGx} - \text{WhiteCGx})^{**}2 + \text{yWt}*(\text{CGx} - \text{WhiteCGx})^{**}2)$ with $\text{CGx} = \sum(V_{ij}*(j-1))/\sum V_{ij}$ and $\text{CGy} = \sum(V_{ij}*(i-1))/\sum V_{ij}$ with the constants defined as shown below:

| | |
|---|---|
| Base | 1.75 |
| Factor | 2.00 |
| FreqBase | 525.00 |
| yWt | 4.50 |
| WhiteCGx | 3.00 |
| WhiteCGy | 1.00 |

Below we see an example of a "white" reverse in coin G103 shown in two forms: within hues 1 to 4 and again showing all hues. The all hues display is shown to provide a comparison with potentially cleaned and heavily toned coins shown later.

213            214
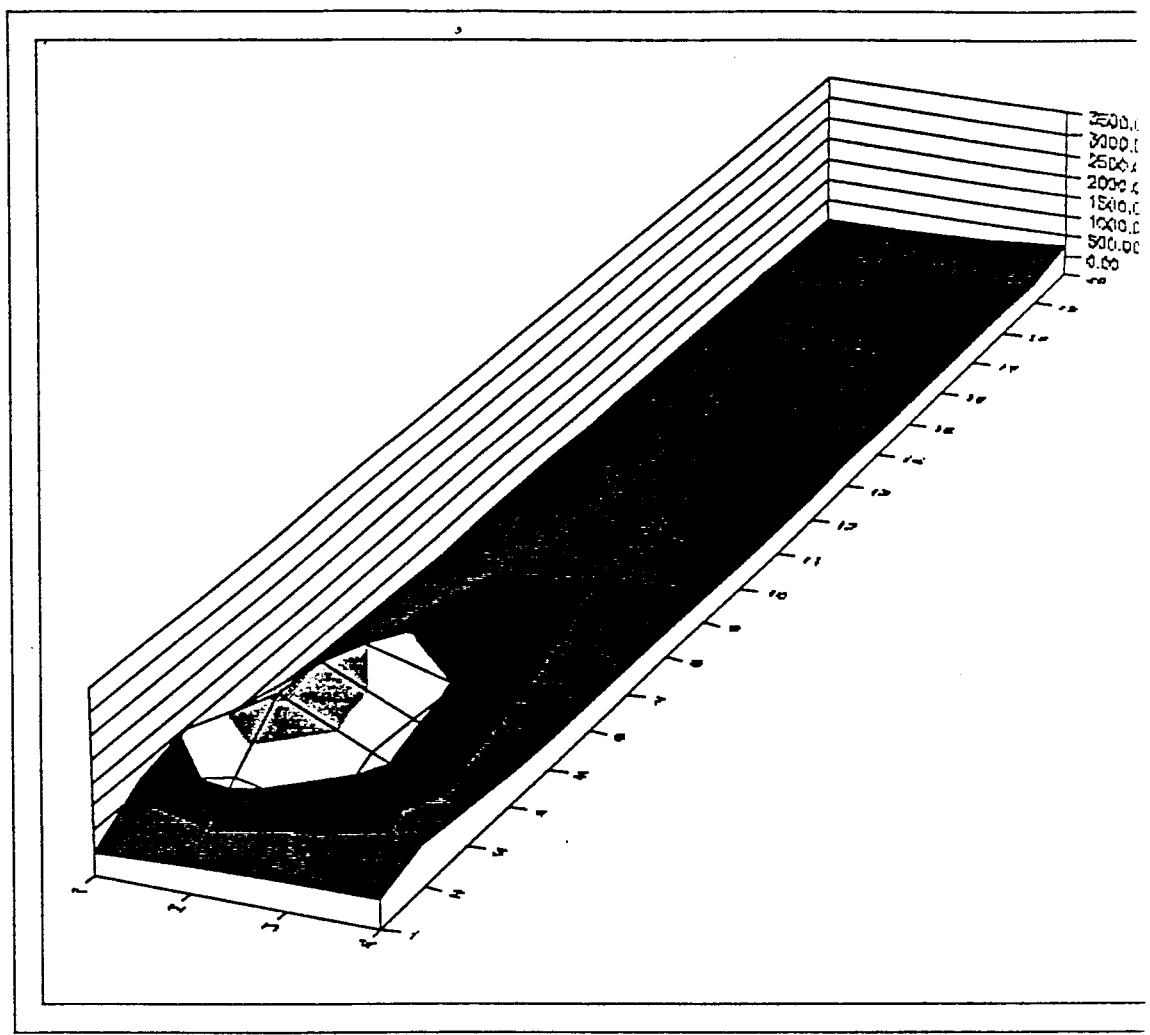
Above is shown the standard of reverse "white", G103. Next we also show this same coin in the full color domain.

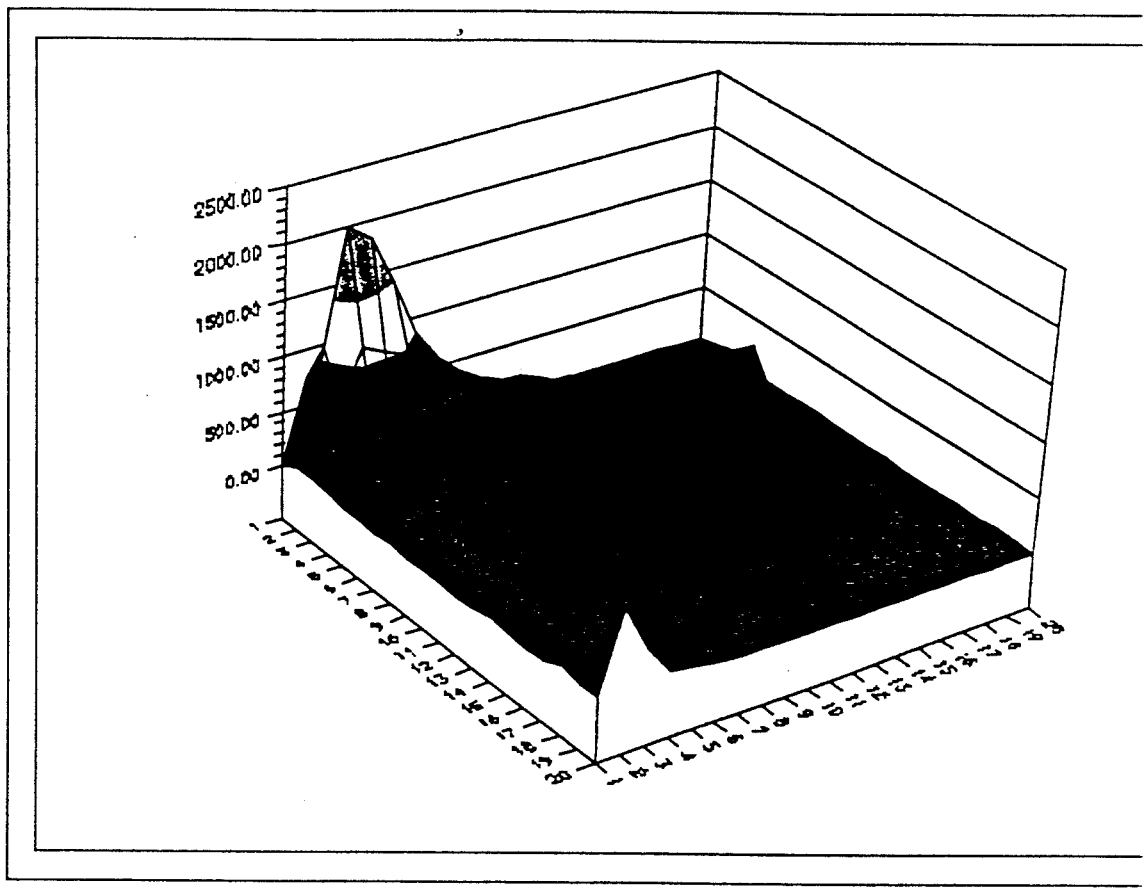
Above is G103, a normal "white" coin. Remember that in reality the hue axis should be considered to be wrapped about a cylinder and this explains why the values at hues 1 and 20 wrap around to each other.

Next we shown an example of an exceptional coin selected because of the very low values for the total of all frequency values within hues 1 to 4. This particular coin has a total value, 0, that is none of the input frequency values are greater than 525.

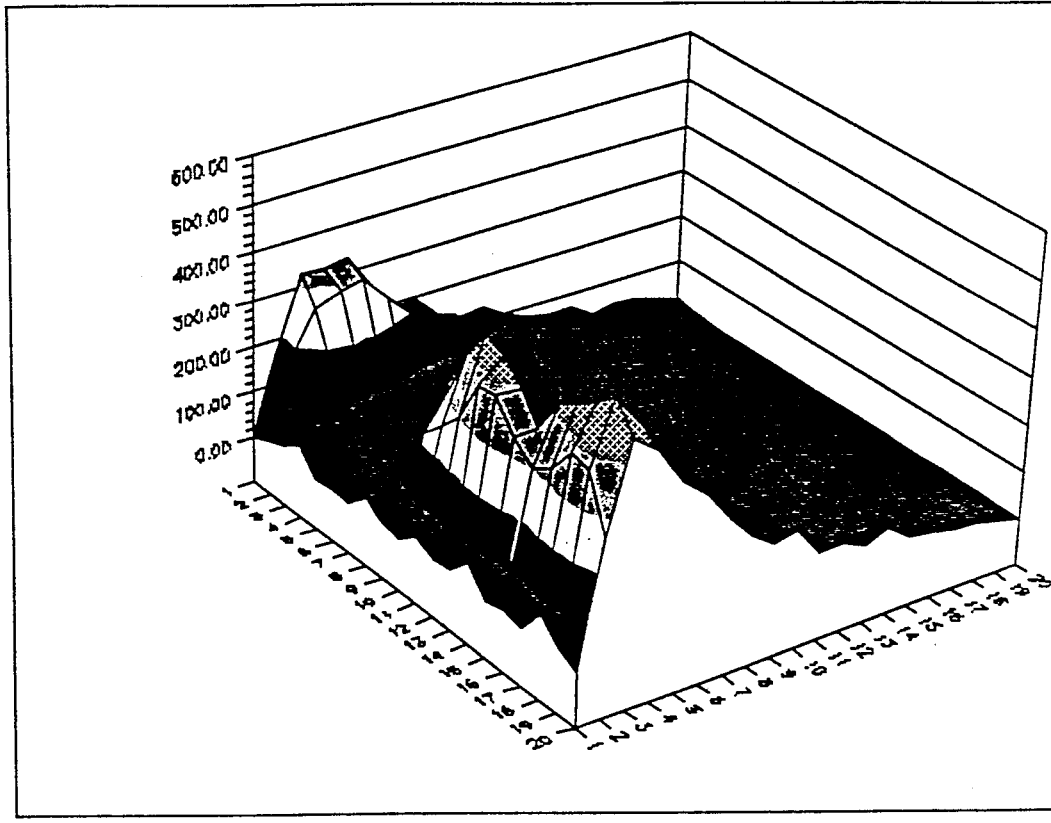

Above G312. Note that all of the values although strangely distributed are less than 350 which is less than the 525 normal base level.

Cleaning is related to the deviations displayed in these charts as well as to deviations in the form of the histograms for these cleaned coins. Cleaning my be defined using the following equation:
    CleaningPct = 125 - .025*TotalCt   limited to the range 1 to 100.
This defines a linear equation starting from a 100% cleaned value at a TotalCt of 1000 dropping to a 0% value at 5000.

It can also be noted that in the case of a coin such as G312 other metrics may also be used to indicate the peculiar nature of the toning. First the L1Brightness is only 5.31; the average RGB value for this coin is (13.7K, 12.9K, 15.3K) while the typical "white" coin, such as G103, has an RGB value (47.6K, 44.3K, 47.0K).

APPENDIX C

Appendix C

Metric Definitions

The numerous and various metrics referenced in Appendix B are named to correspond to the metric measured, the image from which the measurement is made, the region within which the metric is measured, and the value for operators such as a threshold applied when the measurement was taken.

As an example of this, consider the obverse QuickGrade metrics C3FsQgCkTh25, C3FsQgFldTh21, and C3FsQgFldTh33. The capitol letters start a new designation so that the first metric, C3FsQgCkTh25, is the "Third Connectivity Metric from the FindScratches image of the QuickGrade Analysis of the Cheek region measured at a threshold of 25." The second metric, C3FsQgFldTh21, similarly is the "Third Connectivity Metric from the FindScratches image of the QuickGrade Analysis of the Field region measured at a threshold of 21."

The Ci Designation

Many metrics start with the designation C1, C2 or C3. C1 is the number of distinct objects found in an image that satisfy a certain criteria. C2 is a count of the number of pixels that satisfy that criteria. C3 is an augmented pixel count that factors in the human psychological effect of clumps of various sizes. In general, the equation for the C3 metric is $$C3 = 1 + count/(augFactor) \quad \text{for count} >= minCount$$

where count in the C2 metric for a single object, and augFactor and minCount are input factors such as 3 and 3 based upon experiments with human grader perception.

The process of measuring the metrics is based upon a Connectivity analysis which scans a processed image and counts the number of distinct connected objects. This analysis permits two objects which are separated by a gap to be treated as a single connected object. The C1 value then is the number of such distinct objects. The C2 count is the sum of the pixels in the various objects and the C3 count is the sum of the augmented count of pixels in the various objects. Note that the augmented count C3 must be calculated for each individual object and summed over the total of all objects in the image. This is different than for the simple C2 count which is independent of the number of distinct objects.

Region Designations

The regions of the coin are defined by the associated masks constructed for each type of coin but for a Morgan the region designations are:

| | |
|---|---|
| Ck | Cheek |
| Fld | Field |
| Nk | Neck |
| Cam | Cameo, raised center devices |
| Hat | Hat |
| LongHair | Long Flowing hair |
| FineHair | Fine Hair above the ear |
| FC | Full coin excluding background |
| Rim | Outside Rim |
| Face | Front of face and neck |
| Str | Strike region above obv ear |
| Lets | Letters and Start |
| Date | Date |
| Br | Breast |
| LBr, CBr | Large Breast, Center Breast |
| Cl | Claws |
| WH | Wings and Head of Eagle |
| Wr | Wreath |
| LBM | Luster Band Mask |
| Seg | Low Frequency Segregation Mask |

Lighting Condition Designations

When a particular lighting condition is used in the measurement of a particular metric, that condition is specified using the Si designation. The obverse and reverse sides are implicit in the metric being computed. The value of "i" indicates the lighting condition and generally is a single integer ranging from 1 to 9 although multiple lighting conditions such as 156 are also used in color analysis indicating the image obtained with lights 1, 5, and 6 all on simultaneously.

In some instances, the lighting condition is a suffix to the Fs or Dfs designator.

In addition, lighting conditions 10, 11, and 12 represent the result of the accumulation of information from multiple individual lighting conditions. S10 is the maximum brightness image formed from the input images S1 to S4 inclusive. S11 is the maximum brightness image formed from the input images S5 to S9 inclusive. S12 is the maximum brightness image formed from the input images S1 to S9 inclusive.

Additionally, a trailing "X" designates a brightness corrected image in which the brightness of the input images is modified using a quadratic equation function to define a logarithmic scaling factor applied to the image.

The Fs and Dfs Designations

The designations Fs and Dfs represent the result of processing an image using the "Variable Iris Method". The Fs image is the bright flaws found within a region, often a low frequency region defined by a low frequency segregation mask. Similarly the Dfs image is the dark flaw found within a region. The Fs and Dfs images are continuous images in which the intensity of the flaws is proportional to the visibility of the flaw under a particular condition. Generally an Fs or Dfs designation is followed later by a threshold value, Thxx, at which the Fs or Dfs image is thresholded creating two classes of regions: objects and not-objects. Depending on the application, in one case an object can be a part of a flaw and in other cases it can be a single strand of hair, and so forth.

Full Marks Analysis Metrics

The numerous metrics involved in the marks analysis are in general of the form XxNnRi# where Xx is the region of measurement including Ck for Cheek, Nk for Neck, Fld for Field, and RedFld for Luster Band Reduced Field. The Nn term defines the threshold value at which the metric is measured, and Ri designates the Fs Reduction Stamp applied to the input Fs images during Fs accumulation by region. There are 5 basic Reduction Stamps applied to the Fs images, R1 to R5, where the magnitude of the reduction is defined in the appropriate marks documentation. The final # symbol indicates that the metric is scaled by a factor of 1000 to make the values easier to handle in the documentation.

Thus the metric Ck30R1# is a measure of the flaws in the cheek region at a threshold of 30 when accumulated using a signal reduction factor defined as R1 with the result multiplied by 1000. All marks analysis metrics are of the C3 variety and so this is left out of the designation.

The flaws found during the high frequency marks analysis method are also measured using the C3 technique and represent the augmented count of flaws found in various regions of the coin such as the LongHair, that is the long large flowing hair low on the coin, the FineHair which is the fine closely aligned hair above the ear and forehead, and so forth. These flaws are not used to defined the marks grade directly but are used as penalty values applied to the result of the low frequency marks analysis.

What is claimed is:

1. An image capture system, comprising:
translation means for moving a first object in two dimensions, said two dimensions forming a plane;
rotation means for rotating said first object within said plane;
means including a camera for forming a first electronic image of said first object;
means for storing and retrieving a first electronic image of a reference object, said reference object being of the same type of object as said first object;
means for locating a distinct landmark on said first object;
location comparison means for comparing a location of said distinct landmark with a location of a corresponding landmark on said reference object;
orientation comparison means for comparing an orientation of said landmark with an orientation of said corresponding landmark;
translation and orientation control means for causing said translation means to move said first object a distance corresponding to a difference in locations of said first object landmark and said reference object landmark and for rotating said first object through an angle corresponding to an angular difference in orientations of said two landmarks;
means for causing said camera to form a second electronic image of said first object such that said second image of said first object is aligned with said first image of said reference object, said alignment resulting from movement of said object by said rotation means and said translation means,
wherein said translation and orientation control means further comprises means for positioning said distinct landmark on said first object in respect to said corresponding landmark on said reference object, subsequently rotating said first object about the center of said distinct landmark through a computed angular offset between a second landmark on said first object and a second landmark on said second object.

2. A system as claimed in claim 1, wherein said translation and orientation control means includes means for causing said translation and rotation to occur simultaneously.

3. A system as claimed in claim 1, wherein said camera is a video camera.

4. A system as claimed in claim 3, wherein said video camera is an RGB video camera.

5. A system as claimed in claim 3, further comprising means for inputting a video signal from said camera into a computer, said video signal inputting means including a real time image processing section having a plurality of look-up tables and a high speed frame buffer memory.

6. A system as claimed in claim 5, wherein said input means further comprises analog to digital conversion means for converting said video signal into a 480 line $\times$ 640 pixel image and for storing said image in said frame buffer memory.

7. A system as claimed in claim 6, wherein each pixel comprises eight bits of data.

8. A system as claimed in claim 1, wherein said translation means comprises an X table, a Y table, means for linearly moving said X table, and means for linearly moving said Y table in a direction perpendicular to the direction of movement of said X table.

9. A system as claimed 8, wherein each of said respective means for linearly moving said X and Y tables comprises a stepper motor.

10. A system as claimed in claim 8, wherein said rotation means comprises a rotatable table and means for rotating the table.

11. A system in claim 10, wherein said respective means for linearly moving said X table and said Y table, and said means for rotating said rotatable table, each comprises a stepper motor.

12. A system as claimed in claim 1, wherein said rotation means comprises a rotatable table and means for rotating the table.

13. A system as claimed in claim 12, wherein said means for rotating said table comprises a stepper motor.

14. A system as claimed in claim 1, wherein said rotation means comprises a table covered with means including a soft, high friction material for isolating said first object from other system elements.

15. A system as claimed in claim 1, wherein said rotation means comprises object holding means for holding a plurality of objects to be graded in sequence, one side at a time.

16. A system as claimed in claim 15, wherein said object holding means comprises a removable grading tray.

17. A system as claimed in claim 16, wherein said removable grading tray is made of a foam material.

18. A system as claimed in claim 1, wherein said rotation means comprises a piece of foam permanently mounted to a metal plate which is connected to a rotation table motor, and a second detachable piece of foam having a high coefficient of friction in respect to said first piece of foam and including means defining a surface on which objects are place for grading.

19. A system as claimed in claim 1, wherein said translation and rotation means move said first object incrementally, and the increments of movement are smaller than one pixel of either of said images.

20. A system as claimed in claim 1, wherein said translation and orientation control means comprises means for causing rotation means to rotate said object through an angle $\theta$ equal to the difference in orientation between said first and second object landmarks as determined by said orientation comparison means, and means for causing said translation means to move said first object over mutually perpendicular distances $\Delta X$ and $\Delta Y$ determined by formulas $$\Delta X = X_0 \cos \theta - Y_0 \sin \theta - X_0$$

and $$\Delta Y = X_0 \sin \theta + Y_0 \cos \theta - Y_0$$

where $X_0$ and $Y_0$ are initial distances of the object along said mutually perpendicular axes from the axis of rotation about which said rotation means rotates said first object.

21. A system as claimed in claim 20, wherein said translation and rotation means move said first object incrementally, and the increments of movement are smaller than one pixel of either of said images.

22. A system as claimed in claim 21, wherein said translation and orientation control means includes means for controlling said movement in increments smaller than the resolution of the image by creating a bi-quadratic error surface from the correlation value of the optimum alignment pixel point and the eight surrounding pixels, and subsequently computing the location of the minimum value of a continuous version of the correlation function and thus the floating point angular offset.

23. A system as claimed in claim 1, further comprising means for repeating each of said object movements in an iterative process until alignment is achieved.

24. A system as claimed in claim 1, further comprising lighting means including a plurality of different individually controlled lights for varying an angle of illumination of said first object during image capture.

25. A system as claimed in claim 24, wherein said lighting means comprises eight different lights.

26. A system as claimed in claim 24, further comprising means including a computer for individually switching said lights on and off as a function of the type of characteristic of said first object sought by the computer for use in grading said first object, said image of said reference object being aligned with said image of said first object upon physical movement of said first object by said translation and rotation means such that reflections from said lights when capturing an image of said first object are aligned with reflections captured during capture of the reference object image.

27. An image capture system, comprising:
translation means for moving a first object in two dimensions, said two dimensions forming a plane;
rotation means for rotating said first object within said plane;
means including a camera for forming a first electronic image of said first object;
means for storing and retrieving a first electronic image of a reference object, said reference object being of the same type of object as said first object;
means for locating a distinct landmark on said first object;
location comparison means for comparing a location of said distinct landmark with a location of a corresponding landmark on said reference object;
orientation comparison means for comparing an orientation of said landmark with an orientation of said corresponding landmark;
translation and orientation control means for causing said translation means to move said first object a distance corresponding to a difference in locations of said first object landmark and said reference object landmark and for rotating said first object through an angle corresponding to an angular difference in orientations of said two landmarks;
means for causing said camera to form a second electronic image of said first object such that said second image of said first object is aligned with said first image of said reference object, said alignment resulting from movement of said object by said rotation means and said translation means.
wherein said first object and said reference object are coins.

28. A system as claimed in claim 6, wherein said first object and said reference object are coins.

29. A system as claimed in claim 8, wherein said first object and said reference object are coins.

30. A system as claimed in claim 17, wherein said first object and said reference object are coins.

31. A system as claimed in claim 19, wherein said first object and said reference object are coins.

32. A system as claimed in claim 24, wherein said first object and said reference object are coins.

33. A system as claimed in claim 26, wherein said first object and said reference object are coins.

34. A method of capturing an image of an object, comprising the steps of:
a. forming an image of a first object;
b. locating a distinct landmark in said image of said first object;
c. retrieving a stored image of a reference object of the same type as said first object;
d. comparing a location and orientation of said first object landmark with a location and orientation of the corresponding landmark on said reference object;
e. moving said first object a distance corresponding to a difference in locations of said first and reference object landmarks;
f. rotating said first object about a center of said first object landmark through an angle corresponding to an angular offset between a second landmark on said first object and a second landmark on said reference object;
g. forming a second image of said first object, said second image being aligned with said image of said reference object as a result of said movement and rotation of said first object.

35. A method as claimed in claim 34, wherein step (a) comprises the step of converting said image of a first object into a digital image.

36. A method as claimed in claim 34, wherein step (e) comprises the step of moving said first object in a first direction and a second direction perpendicular to said first direction.

37. A method as claimed in claim 34, further comprising the steps of providing a holder for a plurality of objects and capturing images of said plurality of objects in sequence, one side at a time.

38. A method as claimed in claim 34, wherein step (f) comprises the step of rotating said object through an angle $\theta$ equal to the difference in orientation between said first and second object landmarks, and step (e) comprises the step of moving said first object over mutually perpendicular distances $\Delta X$ and $\Delta Y$ determined by the formulas $$\Delta X = X_0 \cos \theta - Y_0 \sin \theta - X_0$$

$$\Delta Y = X_0 \sin \theta + Y_0 \cos \theta - Y_0$$

where $X_0$ and $Y_0$ are the initial distances of the object along said mutually perpendicular axes from the axis of rotation about which said first object is rotated.

39. A method as claimed in claim 34, wherein steps (e) and (f) comprises the steps of moving said object incrementally in increments of movement which are smaller than 1 pixel of said image of said first object.

40. A method as claimed in claim 39, wherein steps e and f further comprise the steps of creating a bi-quadratic error surface from the correlation value of the optimum alignment pixel point and the eight surrounding pixels, and subsequently computing the location of the minimum value of a continuous version of the correlation function and thus the floating point angular offset.

41. A method as claimed in claim 39, further comprising the steps of repeating each of said object movements in an iterative process until alignment is achieved.

42. A method as claimed in claim 38, further comprising the steps of repeating each of said object movements in an iterative process until alignment is achieved.

43. A method as claimed in claim 34, further comprising the step of varying an angle of illumination by which said object is illuminated during formation of said image by selectively switching on at least one of a plurality of different individual lights while selectively leaving at least one of said plurality of different individual lights off.

44. A method as claimed in claim 43, wherein step (g) is repeated under a plurality of different lighting conditions while said first object remains stationary.

45. A method as claimed in claim 34, further comprising the step of initializing the center of rotation around which said object is rotated by
- first roughly defining the center by touching a display screen showing an object positioning table on which the object is positioned at a point which is somewhat near the center of rotation of the table;
- defining a better center point by measuring the motion of a point on the screen near the center of the table as the table is rotated through 180°.
- and finally defining the precise center of rotation by measuring the motion of a point on the outside edge of the table as the table rotates through 180°.

46. A method as claimed in claim 45, further comprising the step of aligning an X-axis of a first object positioning motor, as depicted on a display screen, with an X-axis in the screen system by
- first approximately aligning the respective axes by following the motion of a point moving from one side of the screen to the other; and
- subsequently following the motion of an object positioning table on which the object is located through the full range of translation through which the table can be translated, followed by a 180° rotation about the precise center of rotation to bring the target point back into view of the camera.

47. A method as claimed in claim 46, further comprising the step of calibrating motor translation to displayed image motion by determining the amount of pixels traversed on the screen for a given movement of the table.

* * * * *